United States Patent
Kim et al.

(10) Patent No.: US 10,898,860 B2
(45) Date of Patent: Jan. 26, 2021

(54) FLUID SEPARATION APPARATUS COMPRISING FLUID SEPARATION MEMBRANE, AND FLUID SEPARATION MEMBRANE MODULE

(71) Applicant: ARSTROMA CO., LTD., Daegu (KR)

(72) Inventors: Gwan Shig Kim, Gyeongsangbuk-do (KR); Ky Yeong Shin, Daegu (KR)

(73) Assignee: ARSTROMA CO., LTD.

( * ) Notice: Subject to any disclaimer, the term of this patent is extended or adjusted under 35 U.S.C. 154(b) by 565 days.

(21) Appl. No.: 15/559,682

(22) PCT Filed: Mar. 24, 2016

(86) PCT No.: PCT/KR2016/003012
§ 371 (c)(1),
(2) Date: Sep. 19, 2017

(87) PCT Pub. No.: WO2016/153299
PCT Pub. Date: Sep. 29, 2016

(65) Prior Publication Data
US 2018/0280886 A1    Oct. 4, 2018

(30) Foreign Application Priority Data

Mar. 24, 2015  (KR) .................. 10-2015-0040454
Mar. 24, 2015  (KR) .................. 10-2015-0040455
(Continued)

(51) Int. Cl.
*B01D 53/22*  (2006.01)
*B01D 63/06*  (2006.01)
(Continued)

(52) U.S. Cl.
CPC .......... *B01D 63/068* (2013.01); *B01D 53/22* (2013.01); *B01D 53/228* (2013.01); *B01D 63/06* (2013.01);
(Continued)

(58) Field of Classification Search
CPC ............... B01D 63/06; B01D 2313/50; B01D 2053/223; B01D 71/24; B01D 69/081;
(Continued)

(56) References Cited

U.S. PATENT DOCUMENTS 3,203,086 A * 8/1965 Eudier ................. B01D 53/228
29/527.2
3,265,445 A * 8/1966 Cronin ................. B65G 53/521
406/196
(Continued)

FOREIGN PATENT DOCUMENTS

CA  3003318  11/2014
CN  101703853  5/2010
(Continued)

OTHER PUBLICATIONS

Morita Translation CA 2703799 A1 63 pages Apr. 30, 2009 (Year: 2009).*
(Continued)

*Primary Examiner* — Anthony R Shumate
(74) *Attorney, Agent, or Firm* — Onello & Mello, LLP

(57) ABSTRACT

A fluid separation apparatus comprising a fluid separation membrane is provided. The fluid separation apparatus comprises a fluid separation membrane extending in one direction and having a cross-section with a closed curve shape, wherein the fluid separation membrane has a thickness of 0.1 mm to 2 mm, and an outer diameter of 60 mm to 360 mm when the cross-section is adjusted to be circular.

11 Claims, 90 Drawing Sheets

(30) Foreign Application Priority Data

| Mar. 24, 2015 | (KR) | 10-2015-0040524 |
| Mar. 24, 2015 | (KR) | 10-2015-0040525 |
| Feb. 5, 2016 | (KR) | 10-2016-0014820 |
| Feb. 5, 2016 | (KR) | 10-2016-0014822 |
| Feb. 5, 2016 | (KR) | 10-2016-0014828 |
| Feb. 5, 2016 | (KR) | 10-2016-0014830 |
| Feb. 5, 2016 | (KR) | 10-2016-0014833 |
| Feb. 5, 2016 | (KR) | 10-2016-0014835 |

(51) Int. Cl.
| B01D 71/24 | (2006.01) |
| C02F 1/44 | (2006.01) |
| B01D 69/02 | (2006.01) |
| B01D 69/04 | (2006.01) |
| B01D 69/08 | (2006.01) |
| B01D 71/70 | (2006.01) |
| B01D 69/12 | (2006.01) |

(52) U.S. Cl.
CPC ......... *B01D 69/02* (2013.01); *B01D 69/043* (2013.01); *B01D 69/046* (2013.01); *B01D 69/081* (2013.01); *B01D 69/082* (2013.01); *B01D 69/12* (2013.01); *B01D 71/24* (2013.01); *B01D 71/70* (2013.01); *C02F 1/44* (2013.01); *B01D 2053/223* (2013.01); *B01D 2257/504* (2013.01); *B01D 2258/06* (2013.01); *B01D 2313/14* (2013.01); *B01D 2313/146* (2013.01); *B01D 2313/243* (2013.01); *B01D 2313/50* (2013.01); *B01D 2325/04* (2013.01); *B01D 2325/06* (2013.01)

(58) Field of Classification Search
CPC ........... B01D 71/70; B01D 2257/504; B01D 53/228; B01D 2325/04; B01D 2313/243; B01D 63/068; B01D 69/12; B01D 69/082; B01D 53/22; B01D 69/043; B01D 2258/06; B01D 2325/06; B01D 69/046; B01D 2313/146; B01D 2313/14; B01D 69/02; C02F 1/44
See application file for complete search history.

(56) References Cited

U.S. PATENT DOCUMENTS

| 4,545,833 | A | * | 10/1985 | Tafara | B01D 29/111 |
| | | | | | 112/441 |
| 4,767,426 | A | * | 8/1988 | Daly | B01D 39/2024 |
| | | | | | 156/86 |
| 4,956,087 | A | * | 9/1990 | Garcera | B01D 63/066 |
| | | | | | 210/321.8 |
| 5,006,243 | A | * | 4/1991 | Arnaud | B01D 29/27 |
| | | | | | 210/232 |
| 5,366,625 | A | * | 11/1994 | Pedersen | B01D 63/021 |
| | | | | | 156/292 |
| 5,723,769 | A | * | 3/1998 | Barber | G01N 1/34 |
| | | | | | 73/19.12 |
| 5,779,897 | A | | 7/1998 | Kalthod et al. | |
| 5,931,987 | A | * | 8/1999 | Buxbaum | B01D 53/22 |
| | | | | | 55/524 |
| 5,954,849 | A | * | 9/1999 | Berkhoel | B01D 46/0004 |
| | | | | | 55/498 |
| 6,136,192 | A | * | 10/2000 | Booth | B01D 29/23 |
| | | | | | 210/450 |
| 6,740,142 | B2 | * | 5/2004 | Buettner | B01D 39/1623 |
| | | | | | 156/204 |
| 6,755,898 | B2 | | 6/2004 | Park et al. | |
| 7,309,385 | B2 | | 12/2007 | Hong et al. | |
| 7,650,805 | B2 | | 1/2010 | Nauseda et al. | |
| 8,496,122 | B2 | | 7/2013 | Goehl et al. | |
| 8,512,460 | B2 | | 8/2013 | Moniwa et al. | |
| 9,028,740 | B2 | | 5/2015 | Gohl et al. | |
| 10,040,031 | B2 | * | 8/2018 | Kim | B01D 63/103 |
| 2003/0178369 | A1 | * | 9/2003 | Eguchi | B01D 65/08 |
| | | | | | 210/650 |
| 2004/0016344 | A1 | | 1/2004 | Park et al. | |
| 2004/0176798 | A1 | * | 9/2004 | Epstein | A61B 17/12022 |
| | | | | | 606/213 |
| 2005/0252982 | A1 | * | 11/2005 | Akita | B01D 71/54 |
| | | | | | 236/44 A |
| 2006/0160200 | A1 | * | 7/2006 | Rathenow | B01D 67/0072 |
| | | | | | 435/177 |
| 2007/0079649 | A1 | | 4/2007 | Nauseda et al. | |
| 2007/0271883 | A1 | * | 11/2007 | Chung | B01D 46/2411 |
| | | | | | 55/361 |
| 2008/0213142 | A1 | * | 9/2008 | Katsurayama | C01B 3/48 |
| | | | | | 422/222 |
| 2009/0118551 | A1 | | 5/2009 | Buijs et al. | |
| 2010/0258497 | A1 | | 10/2010 | Morita | |
| 2011/0315624 | A1 | * | 12/2011 | Jeong | B01D 69/04 |
| | | | | | 210/500.23 |
| 2013/0108517 | A1 | * | 5/2013 | Tosti | B01D 59/32 |
| | | | | | 422/187 |
| 2015/0008185 | A1 | * | 1/2015 | Shimizu | B01D 71/16 |
| | | | | | 210/652 |
| 2016/0059181 | A1 | | 3/2016 | Kim et al. | |
| 2016/0271564 | A1 | * | 9/2016 | Yamada | B01D 69/12 |
| 2017/0189862 | A1 | * | 7/2017 | Imasaka | B01D 53/228 |
| 2017/0354129 | A1 | * | 12/2017 | Machida | C07K 14/70503 |
| 2019/0070566 | A1 | * | 3/2019 | Kidambi | B01D 61/243 |
| 2019/0127870 | A1 | * | 5/2019 | Langley | B01D 53/228 |

FOREIGN PATENT DOCUMENTS

| EP | 2239044 | 10/2010 |
| JP | 54067746 | 5/1979 |
| JP | 54078398 | 6/1979 |
| JP | 10099657 | 4/1998 |
| JP | 2002253936 | 9/2002 |
| JP | 2002301475 | 10/2002 |
| JP | 2005230814 | 9/2005 |
| JP | 2005532165 | 10/2005 |
| JP | 2006043677 | 2/2006 |
| JP | 3974616 | 9/2007 |
| JP | 2007270720 | 10/2007 |
| JP | 2007307518 | 11/2007 |
| JP | 2008050210 | 3/2008 |
| JP | 2009011965 | 1/2009 |
| JP | 2009101311 | 5/2009 |
| JP | 2009131840 | 6/2009 |
| JP | 2011056399 | 3/2011 |
| KR | 19980014068 | 5/1998 |
| KR | 20040065934 | 7/2004 |
| KR | 200368690 | 12/2004 |
| KR | 1020050012338 | 2/2005 |
| KR | 20050083852 | 8/2005 |
| KR | 1020050093018 | 9/2005 |
| KR | 100530312 | 11/2005 |
| KR | 20070093140 | 9/2007 |
| KR | 20130011394 | 1/2013 |
| KR | 101295108 | 8/2013 |
| KR | 20130113184 | 10/2013 |
| KR | 101354680 | 1/2014 |
| KR | 20140114109 | 9/2014 |
| KR | 20140119016 | 10/2014 |
| KR | 20140129932 | 11/2014 |
| KR | 20170093438 | 8/2017 |
| RU | 2134151 | 8/1999 |

OTHER PUBLICATIONS

IMAI Translation JP 54078398 13 pages Jun. 4, 1979 (Year: 1979).*
Ohnishi Translation JP 54067746 8 pages May 14, 1979 (Year: 1979).*
Yamazaki Machine Translation JP 10-099657 13 pages Apr. 21, 1998 (Year: 1998).*

(56) References Cited

OTHER PUBLICATIONS

Kim Translation KR 2020040023380 10 pages Dec. 3, 2004 (Year: 2004).*
Japanese Office Action dated Jan. 7, 2020 issued in corresponding Japanese Application No. 2017-549400, with English translation.
Russian Office Action dated Jul. 1, 2019 issued in corresponding Russian Application No. 2017135420, with English translation.
Extended European Search Report dated Feb. 4, 2019 issued in corresponding European Application No. 16769117.9.
GKM Sinter Metals Filters GmBH, "THINK Filter Technology—SIKA-R . . . IS/AS" brochure Rev. 1.2, pp. 1-16.
Chinese Office Action dated May 19, 2020 issued in corresponding Chinese Application No. 201680014401.X.
Australian Office Action dated Aug. 18, 2020 issued in corresponding Australian Application No. 2016236944.

* cited by examiner

FLUID SEPARATION APPARATUS COMPRISING FLUID SEPARATION MEMBRANE, AND FLUID SEPARATION MEMBRANE MODULE

TECHNICAL FIELD

The present inventive concept relates to a fluid separation apparatus comprising a fluid separation membrane, and a fluid separation membrane module.

BACKGROUND ART

The greenhouse effect due to carbon dioxide, methane gas, etc. plays a great role in global warming which is currently the subject of global interest. Global warming not only disturbs the ecosystem but also has a great influence on the social life of human beings. Therefore, efforts are being made in various ways to reduce the release of greenhouse gases into the atmosphere.

Carbon dioxide has recently become one of the most noteworthy greenhouse gases. Carbon dioxide can be generated from the combustion of waste in sewage treatment plants, wastewater treatment plants, and landfill sites. Also, carbon dioxide can be generated in large amounts in thermal power plants or steel mills. Therefore, a technology for separating and removing only carbon dioxide from waste gas is being studied. In addition to carbon dioxide, a technology for separating hydrogen gas is also attracting a lot of attention as the interest in hydrogen fuel increases. Furthermore, since purely separated oxygen or nitrogen can be utilized in various fields, research on a method of separating oxygen or nitrogen is continuing. In the future, as technologies for utilizing specific gases or liquids develop, it is expected that technologies for separating more various fluids will be required.

Separation of a specific fluid cannot be used in industry simply by establishing a separation theory. For example, carbon dioxide separation technologies such as an absorption method, an adsorption method, a cryogenic method and a membrane separation method have been proposed for a long time. However, few of the above methods have been commercialized for practical reasons such as the necessity of enormous energy, the presence of side effects, and the difficulty of achieving a large size.

Nonetheless, since the membrane separation method uses relatively low energy compared to other methods, it has been evaluated to be suitable for commercialization. Until now, the membrane separation method has been studied mainly in a direction to improve the separation efficiency of a membrane. The primary goal of the membrane separation method is to develop a small-sized (e.g., 1 inch×1 inch) separation membrane that can exhibit a separation efficiency of 90% or more in the laboratory. Thus, enlargement and commercialization are considered as a next challenge.

To obtain a separation efficiency of 90% or more in the laboratory, many researchers have attempted to make a membrane thinner and to set the pressure difference inside and outside the membrane higher. However, as the thickness is smaller and the pressure is higher, the durability of the separation membrane becomes weaker. Therefore, some researchers are also studying the materials of membranes that are durable even under the above conditions.

However, even if a high-efficiency membrane is developed at the laboratory level, commercializing the high-efficiency membrane is a separate problem. First of all, it is very difficult to produce a thin separation membrane in large quantities. In addition, since expensive raw materials must be used, the production cost is greatly increased. Moreover, applying a thin separation membrane to large-sized equipment requires assembling a large number of separation membranes, resulting in increased assembly time and assembly cost. Also, the use of high pressure for high efficiency increases the processing cost. Even though separation is theoretically possible, realistic commercialization is impossible if the production and processing costs are excessive.

Hence, it is necessary to develop fluid separation technology that requires a low processing cost, has cost-effective separation efficiency, and is applicable on a commercial scale.

DISCLOSURE

Technical Problem

Aspects of the inventive concept provide a fluid separation apparatus which has improved separation efficiency, is capable of separating a large amount of fluid, and can be mass-produced.

Aspects of the inventive concept also provide a fluid separation membrane module which has improved separation efficiency, is capable of separating a large amount of fluid, and can be mass-produced.

Aspects of the inventive concept also provide an air purifier which is capable of separating harmful gases effectively.

However, aspects of the inventive concept are not restricted to the one set forth herein. The above and other aspects of the inventive concept will become more apparent to one of ordinary skill in the art to which the inventive concept pertains by referencing the detailed description of the inventive concept given below.

Technical Solution

According to an aspect of the inventive concept, there is provided a fluid separation apparatus including a fluid separation membrane extending in one direction and having a cross-section with a closed curve shape, wherein the fluid separation membrane has a thickness of 0.1 mm to 2 mm, and an outer diameter of 60 mm to 360 mm when the cross-section is adjusted to be circular.

According to another aspect of the inventive concept, there is a fluid separation apparatus including: a chamber; a first flow path which guides, into the chamber, a mixed fluid containing multiple types of fluids that include a target fluid to be separated; a fluid separation part which is provided within the chamber and includes a plurality of separation units separating at least a portion of the target fluid from the mixed fluid; a second flow path which guides the target fluid separated by the fluid separation part to the outside of the chamber; and a third flow path which guides a residual fluid within the chamber to the outside of the chamber, wherein each of the separation units includes a plurality of fluid separation membranes which are located within the chamber to be bent at least once in a U shape and connected to the second flow path, wherein each of the fluid separation membranes allows at least a portion of the target fluid to move from the mixed fluid flowing outside the fluid separation membrane into the fluid separation membrane.

According to another aspect of the inventive concept, there is provided a fluid separation apparatus including: a fluid separation membrane module which includes a fluid separation membrane; a supply flow pipe which is located on an input side of the fluid separation membrane module; a discharge flow pipe which is located on an output side of the fluid separation membrane module; and a compressor which is connected to the fluid separation membrane module by the supply flow pipe and applies pressure to a fluid, wherein at least part of the supply flow pipe and at least part of the discharge flow pipe are disposed adjacent to each other to form a heat exchanger.

According to another aspect of the inventive concept, there is provided a fluid separation membrane module including: a plurality of separation membranes which are stacked to overlap each other; a plurality of interlayer spacers, each being disposed between the separation membranes and including a frame portion and a central portion surrounded by the frame portion to be at least partially open; and an assembly pipe which penetrates the separation membranes and the interlayer spacers, wherein the separation membranes are disposed on both surfaces of the frame portion.

According to another aspect of the inventive concept, there is provided a fluid separation membrane module including: a plurality of separation membranes which are stacked to overlap each other; and a plurality of interlayer spacers, each being disposed between the separation membranes and including a frame portion, a central portion surrounded by the frame portion to be at least partially open, and a side opening penetrating the frame portion in a lateral direction.

According to another aspect of the inventive concept, there is provided a fluid separation membrane module including: a plurality of tubular separation membranes which are stacked to overlap each other; an end spacer which is installed at both ends of each of the separation membranes; an inter-tube spacer which is disposed between neighboring separation membranes to overlap the end spacer; and an assembly pipe which penetrates the end spacer and the inter-tube spacer.

According to another aspect of the inventive concept, there is provided an air purifier including: a fluid separation apparatus which includes a fluid separation membrane; a vacuum pump which discharges air separated in the fluid separation apparatus to the outside; and a flow pipe which connects the fluid separation apparatus with the vacuum pump.

The above and other aspects of the inventive concept will become more apparent by referencing the detailed description of the inventive concept and the attached drawings.

Advantageous Effects

A fluid separation apparatus and a fluid separation membrane module according to embodiments of the inventive concept have improved separation efficiency, can separate a large amount of fluid, and can be easily mass-produced.

In addition, an air purifier according to an embodiment of the inventive concept can effectively reduce the concentration of carbon dioxide, sulfur dioxide, etc. in an enclosed room.

However, the effects of the inventive concept are not restricted to the one set forth herein. The above and other effects of the inventive concept will become more apparent by referencing a detailed description of the inventive concept given below.

MODE FOR INVENTION

Advantages and features of the present inventive concept and methods of accomplishing the same may be understood more readily by reference to the following detailed description of exemplary embodiments and the accompanying drawings. The inventive concept may, however, be embodied in many different forms and should not be construed as being limited to the embodiments set forth herein. Rather, these embodiments are provided so that this disclosure will be thorough and complete and will fully convey the concept of the invention to those skilled in the art, and the inventive concept will only be defined by the appended claims.

It will be understood that when an element or layer is referred to as being "on" another element or layer, the element or layer can be directly on another element or layer or intervening elements or layers. Like numbers refer to like elements throughout.

It will be understood that, although the terms first, second, third, etc., may be used herein to describe various components, these components should not be limited by these terms. These terms are only used to distinguish one component from another component. Thus, a first component discussed below could be termed a second component without departing from the teachings of the inventive concept.

Hereinafter, embodiments of the inventive concept will be described with reference to the attached drawings.

Figure 1:
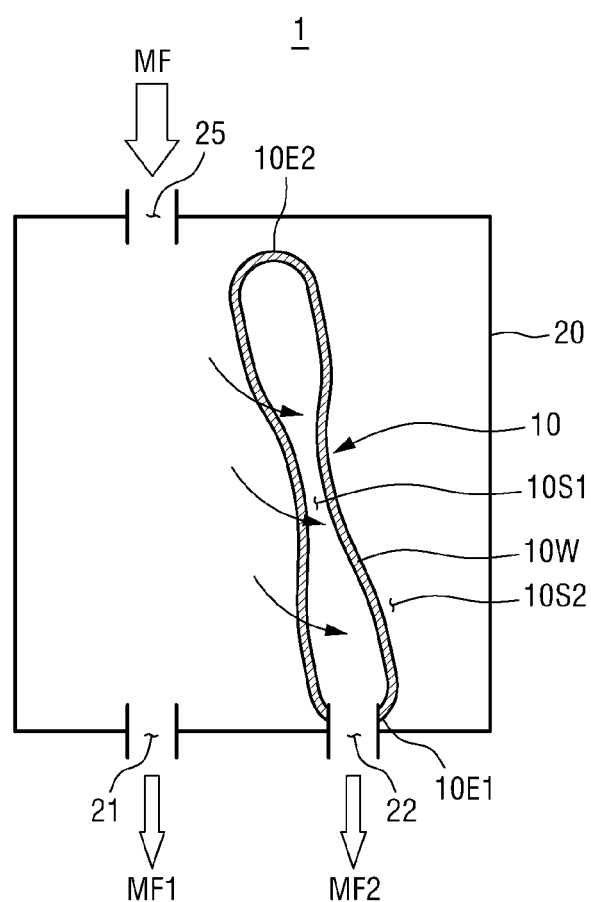
FIG. 1 is a schematic view of a fluid separation apparatus according to an embodiment of the inventive concept.

FIG. 1 is a schematic view of a fluid separation apparatus according to an embodiment of the inventive concept. Referring to FIG. 1, the fluid separation apparatus 1 is an apparatus used to separate a specific fluid from a fluid mixture MF.

A fluid may be a gas or a liquid. The fluid mixture MF includes a plurality of different fluids. For example, the fluid mixture MF may be an exhaust gas of a thermal power plant or a factory, an automobile exhaust gas, a by-product gas, a waste landfill gas, waste water, or the like.

A plurality of gases may be mixed completely uniformly, but not necessarily so. For example, in a space where a fluid mixture containing a first fluid and a second fluid is disposed, only the first fluid may exist in a specific region, and only the second fluid may exist in another specific region. In addition, the content of the first fluid may be greater in a specific region than in another specific region.

Separating a specific fluid from the fluid mixture MF includes not only completely separating the specific fluid from the fluid mixture MF but also outputting (generating) a fluid mixture MF1 or MF2 having an increased content of the specific fluid from the input (provided) fluid mixture MF. For example, when the input fluid mixture MF contains nitrogen and carbon dioxide in a content ratio of 3:1, if any one of an output fluid and the output fluid mixture MF1 or MF2 is 100% carbon dioxide or contains nitrogen and carbon dioxide in a content ratio of less than 3:1, it is interpreted that carbon dioxide has been separated. If any one of the output fluid and the output fluid mixture MF1 or MF2 is 100% nitrogen or contains nitrogen and carbon dioxide in a content ratio of greater than 3:1, it is interpreted that nitrogen has been separated. In addition, as the content of the specific fluid is increased by a greater degree, it is interpreted that the efficiency of separating the specific fluid is higher.

In addition to carbon dioxide and nitrogen mentioned above, various fluids can be separated. Examples of a fluid to be separated may include, but not limited to, acetone, ammonia, argon, benzene, butane (n-C4H10), carbon disulfide (CS2), carbon monoxide, ethane, ethylene, helium, hexane (n-C6H14), hydrogen, hydrogen sulfide, methane, methanol, nitrogen monoxide, nitrogen dioxide, nitrous oxide (N2O), octane, oxygen, pentane, propane, sulfur dioxide, toluene, and water vapor.

The fluid separation apparatus 1 includes a chamber 20 and a fluid separation membrane 10 disposed within the chamber 20. The fluid separation membrane may be formed in a tubular shape or a plate-like shape. In the current embodiment, a case where the tubular fluid separation membrane 10 is applied will be described as an example. Although not shown in the drawing, a membrane spacer may be disposed inside the tubular fluid separation membrane 10 to prevent inner walls of the fluid separation membrane 10 from coming into close contact with each other.

The inside 10s1 of the fluid separation membrane 10 and the outside 10s2 of the fluid separation membrane 10 are physically separated by fluid separation membrane walls composed of the fluid separation membrane 10 itself. That is, the space inside the chamber 20 is divided by the fluid separation membrane 10. At least a portion of a fluid may move between the inside and outside 10s1 and 10s2 of the fluid separation membrane 10 by passing through the fluid separation membrane 10, and this characteristic is used to separate a specific fluid.

The chamber 20 provides a limited space. The space inside the chamber 20 is physically separated from the space outside the chamber 20. The chamber 20 spatially limits the movement of a fluid supplied into the chamber 20. In addition, the chamber 20 may allow various process parameters such as temperature, pressure and humidity inside the chamber 20 to be controlled independently and differently from the outside of the chamber 20. The limited space of the chamber 20 does not necessarily denote an enclosed space, but may also include a space open to the outside.

For example, the chamber 20 may include at least three fluid passages (21, 22 and 25). In an exemplary embodiment, the chamber 20 includes a fluid inlet 25, a first fluid outlet 21, and a second fluid outlet 22.

The first fluid outlet 21 and the second fluid outlet 22 are passages through which a fluid mixture or a fluid is discharged (output) to the outside of the chamber. The space inside the fluid separation membrane 10 is spatially connected to the first fluid outlet 21. The second fluid outlet 22 is not connected to the space inside the fluid separation membrane 10.

The fluid inlet 25 is a passage through which the fluid mixture MF is injected (input) into the chamber 20. In an embodiment, the fluid inlet 25 is not connected to the internal space of the fluid separation membrane 10, as shown in FIG. 1. In this case, the fluid mixture MF is injected to the inside of the chamber 20 as well as the outside 10s2 of the fluid separation membrane 10 through the fluid inlet 25. Of the fluid mixture injected into the chamber 20, fluid components flowing to the inside 10s1 of the fluid separation membrane 10 through the walls of the fluid separation membrane 10 are discharged toward the first fluid outlet 21 (see 'MF1'), and fluid components remaining on the outside 10s2 of the fluid separation membrane 10 may be discharged toward the second fluid outlet 22 (see 'MF2'). If the fluid mixture MF introduced through the fluid inlet 25 contains nitrogen and carbon dioxide and if the mobility of carbon dioxide through the fluid separation membrane 10 is higher than that of nitrogen, the concentration of nitrogen becomes relatively high on the outside 10s2 of the fluid separation membrane 10 as the concentration of carbon dioxide becomes relatively low on the outside 10s2 of the fluid separation membrane 10. On the other hand, the concentration of nitrogen becomes relatively low on the inside 10s1 of the fluid separation membrane 10 as the concentration of carbon dioxide becomes relatively high on the inside 10s1 of the fluid separation membrane 10. Accordingly, the fluid mixture MF2 having a relatively high nitrogen content may be discharged through the second fluid outlet 22, and the fluid mixture MF1 having a relatively high carbon dioxide content may be discharged through the first fluid outlet 21.

The concentration of specific components is relatively higher in each of the fluid mixtures MF1 and MF2 discharged through the first fluid outlet 21 and the second fluid outlet 22 than in the input fluid mixture MF. If the fluid mixture MF1 or MF2 discharged from the first fluid outlet 21 or the second fluid outlet 22 is re-injected into the fluid separation apparatus 1 or injected into another fluid separation apparatus more than once, the concentration of the specific components can be further increased. The fluid mixtures MF1 and MF2 discharged from the first fluid outlet 21 and the second fluid outlet 22 may be selectively discarded or stored in a tank and may be used in various other fields if needed.

Figure 2:
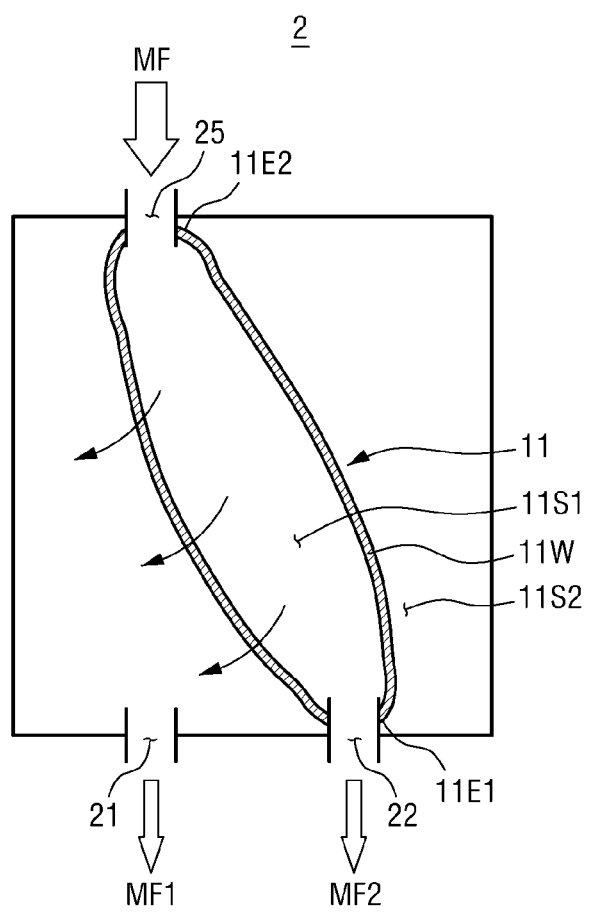
FIG. 2 is a schematic view of a fluid separation apparatus according to another embodiment of the inventive concept.

FIG. 2 is a schematic view of a fluid separation apparatus according to another embodiment of the inventive concept.

Referring to FIG. 2, the fluid separation apparatus 2 according to the current embodiment is different from the embodiment of FIG. 1 in that a fluid mixture MF is injected into the inside 11s1 of a fluid separation membrane 11.

The current embodiment is the same as the embodiment of FIG. 1 in that an end 11E1 of the fluid separation membrane 11 is spatially connected to a first fluid outlet 21 or passes through the first fluid outlet 21 to be exposed to the outside of a chamber 20 and that a second fluid outlet 22 is not spatially connected to the fluid separation membrane 11. However, the current embodiment is different from the embodiment of FIG. 1 in that the internal space of the fluid separation membrane 11 is connected to a fluid inlet 25.

The fluid mixture MF is injected into the inside 11s1 of the fluid separation membrane 11 through the fluid inlet 25. Of the fluid mixture injected into the inside 11s1 of the fluid separation membrane 11, fluid components flowing to the outside 11s2 of the fluid separation membrane 11 through the fluid separation membrane 11 may be discharged toward the second fluid outlet 22 (see 'MF2'), and fluid components remaining on the inside 11s1 of the fluid separation membrane 11 may be discharged toward the first fluid outlet 21 (see 'MF1'). If the fluid mixture MF introduced through the fluid inlet 25 contains nitrogen and carbon dioxide and if the mobility of carbon dioxide through the fluid separation membrane 11 is higher than that of nitrogen, the concentration of nitrogen becomes relatively high on the inside 11s1 of the fluid separation membrane 11 as the concentration of carbon dioxide becomes relatively low on the inside 11s1 of the fluid separation membrane 11. On the other hand, the concentration of nitrogen becomes relatively low on the outside 11s2 of the fluid separation membrane 11 as the concentration of carbon dioxide becomes relatively high on the outside 11s2 of the fluid separation membrane 11. Accordingly, a fluid mixture MF1 having a relatively high nitrogen content may be discharged through the first fluid outlet 21, and a fluid mixture MF2 having a relatively high carbon dioxide content may be discharged through the second fluid outlet 22.

Figure 3:
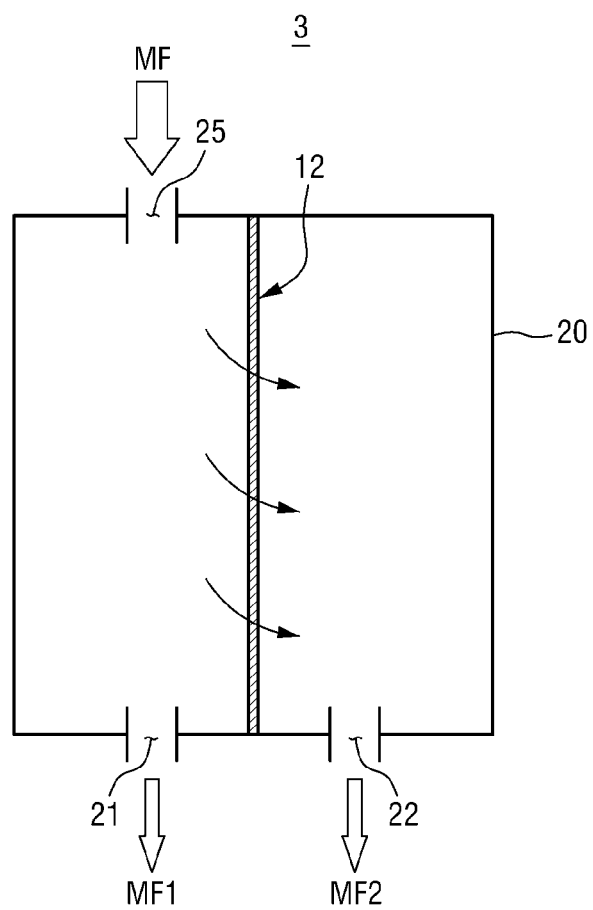
FIG. 3 is a schematic view of a fluid separation apparatus according to another embodiment of the inventive concept.

FIG. 3 is a schematic view of a fluid separation apparatus according to another embodiment of the inventive concept.

Referring to FIG. 3, the fluid separation apparatus 3 according to the current embodiment is different from the embodiment of FIG. 1 in that a plate-shaped fluid separation membrane 12 is used.

The plate-shaped fluid separation membrane 12 divides the space inside a chamber 20. In the current embodiment, one side of the fluid separation membrane 12 corresponds to the space outside the fluid separation membrane 10 of FIG. 1, and the other side of the fluid separation membrane 12 corresponds to the space inside the fluid separation membrane 10 of FIG. 1. A fluid inlet 25 and a first fluid outlet 21 are disposed on the one side of the fluid separation membrane 12, and a second fluid outlet 22 is disposed on the other side of the fluid separation membrane 12. Although not shown in the drawing, the fluid separation membrane 12 may be provided in a modular form instead of completely dividing the internal space of the chamber 20. The module may be disposed within the chamber 20, and the fluid separation membrane 12 may be structured to divide the space within the module. The module may include an outermost cover that defines and seals an outer space. In this case, the chamber 20 may be omitted.

In the above-described embodiments of FIGS. 1 through 3, the fluid separation membrane 10, 11 or 12 may be provided in a plurality in the chamber 20. In the case of the tubular fluid separation membranes 10 and 11, a plurality of fluid separation membranes 10 or 11 may be disposed adjacent to each other. In the case of the plate-shaped fluid separation membrane 12, a plurality of fluid separation membranes 12 may be arranged in parallel to each other at predetermined intervals to divide the space within the chamber 20 into a plurality of spaces. Alternatively, a plurality of fluid separation membranes 12 may be stacked and provided in a modular form. In this case, a membrane spacer (not shown) may be disposed between the fluid separation membranes 12 to prevent the fluid separation membranes 12 from coming into close contact with each other.

The fluid separation membrane will now be described in more detail.

Figure 4:
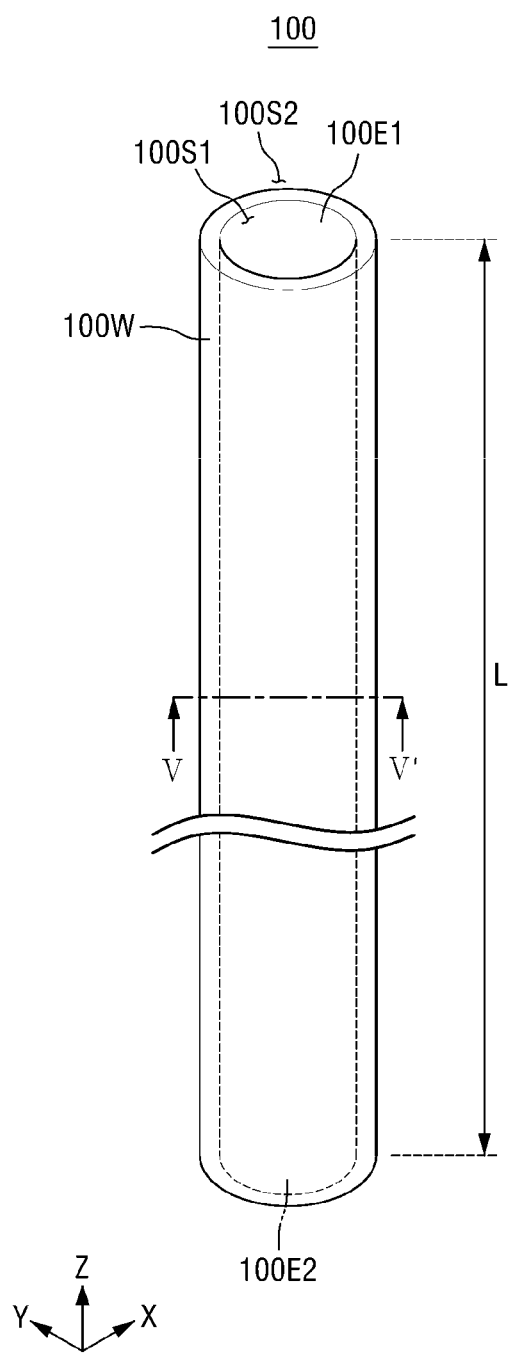
FIG. 4 is a perspective view of a fluid separation membrane according to an embodiment of the inventive concept.
Figure 5:
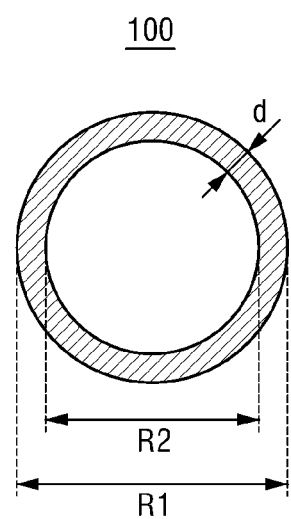
FIG. 5 is a cross-sectional view taken along the line V-V' of FIG. 4.

FIG. 4 is a perspective view of a fluid separation membrane according to an embodiment of the inventive concept. FIG. 5 is a cross-sectional view taken along the line V-V' of FIG. 4. In FIGS. 4 and 5, a tubular fluid separation membrane is shown.

Referring to FIGS. 4 and 5, the fluid separation membrane 100 may extend in a direction Z. The fluid separation membrane 100 may extend in a length direction within a chamber, but may also be bent one or more times.

An end 100E1 of the fluid separation membrane 100 is open. The open end 100E1 of the fluid separation membrane 100 is spatially connected to a first fluid outlet of a fluid separation apparatus or is exposed to the outside of the chamber through the first fluid outlet. The other end 100E2 of the fluid separation membrane 100 may be closed or open.

A cross-section of the fluid separation membrane 100 taken perpendicular to the direction Z in which the fluid separation membrane 100 extends forms a closed curve. The cross-section of the fluid separation membrane 100 may be circular. However, the cross-section of the fluid separation membrane 100 is not limited to the circular shape and can have various other closed curve shapes such as an elliptical shape. In FIGS. 4 and 5, a case wherein the cross-section of the fluid separation membrane 100 is circular will be described as an example.

Walls 100w of the tubular fluid separation membrane 100 may be integrally formed along an outer circumference of the tubular fluid separation membrane 100. Here, when the walls 100w of the tubular fluid separation membrane 100 are integrally formed, it means not that a plurality of separation membranes are joined to form a tube or that a single separation membrane is rolled and both ends of the single separation membrane are joined to form a tube, but that the walls 100w of the tubular fluid separation membrane 100 are formed along the outer circumference as a single piece without joined portions. An example case is when the walls 100w of the fluid separation membrane 100 are formed into a tubular shape from the beginning by a method such as extrusion.

A thickness d of the fluid separation membrane 100, in other words, a thickness of the walls 100w is related to a method of manufacturing the fluid separation membrane 100. As described above, the fluid separation membrane 100 can be manufactured by an extrusion method suitable for mass production. For example, a polymer material such as silicone rubber may have a thickness d of 0.1 mm or more, so that it can be easily manufactured into a tubular shape by an extrusion method. If the polymer material has a thickness d of 0.4 mm or more, commercial mass production is possible. On the other hand, as the thickness d of the fluid separation membrane 100 increases, a distance by which a fluid should move increases, thus reducing separation efficiency. If the thickness of the fluid separation membrane 100 exceeds 2 mm, it has been verified that fluid mobility in the fluid separation apparatus using low energy is drastically reduced, and a contact area between a fluid and the surface of the fluid separation membrane 100 relative to space is also reduced, thus reducing fluid separation efficiency. Therefore, it is preferred that the thickness d of the fluid separation membrane 100 is selected within the range of 0.1 to 2 mm or 0.4 to 2 mm.

A size (width) of the fluid separation membrane 100 depends on a length of an outer circumference of the cross-section of the fluid separation membrane 100. The length of the outer circumference of the circular cross-section of the fluid separation membrane 100 is $\pi$ times an outer diameter (an external diameter) R1 of the fluid separation membrane 100. In an embodiment in which the cross-section of the fluid separation membrane is a closed curve instead of the circular shape, the length of the outer circumference of the cross-section may be $\pi$ times the outer diameter of the fluid separation membrane when the cross-section of the fluid separation membrane is adjusted to be circular.

If the outer diameter R1 of the fluid separation membrane 100 is too small, an inner diameter (an internal diameter) R2 of the fluid separation membrane 100 becomes excessively small compared with the thickness d of the fluid separation membrane 100. This reduces the efficiency of fluid movement. On the other hand, if the outer diameter R1 of the fluid separation membrane 100 is too large, the surface area of the fluid separation membrane 100 exposed to a fluid relative to space decreases, thereby reducing the fluid movement efficiency. In view of the above, the outer diameter R1 of the fluid separation membrane 100 may be 60 to 360 mm.

If a length L of the fluid separation membrane 100 extending in the direction Z is too small, the number of installations of the fluid separation membrane 100 should be increased, which is disadvantageous in terms of handling. Therefore, it is preferred that the length L of the fluid separation membrane 100 is 500 mm or more. On the other hand, if the length of the fluid separation membrane 100 is too large, it is difficult to discharge a fluid introduced into the fluid separation membrane 100 only by using low energy. In addition, it is difficult to uniformly control the concentration of a specific fluid in the fluid separation membrane 100. Therefore, it is preferred that the length of the fluid separation membrane 1000 is 5000 mm or less.

The mechanical strength of the fluid separation membrane 100 may be different at the time of manufacture and after completion. For example, when the tubular fluid separation membrane 100 is manufactured by an extrusion method, a tube material may be in a molten or semi-molten state at the time of manufacture. In this case, the mechanical strength of the fluid separation membrane 100 is weaker than after complete solidification. If the absolute mechanical strength of the fluid separation membrane 100 is weak, the fluid separation membrane 100 can be destroyed by its own weight, extrusion pressure, other external forces, or local stress. Therefore, it is necessary to secure sufficient mechanical strength in order to prevent the destruction of the tube during manufacture.

The mechanical strength S of the fluid separation membrane 100 at the time of manufacture becomes greater as the thickness d of the fluid separation membrane 100 increases and becomes smaller as the diameter R1 and the length L of the fluid separation membrane 100 increase. To secure the mechanical strength S of the fluid separation membrane 100 sufficient to prevent the destruction of the tube during manufacture, the thickness d, the diameter R1 and the length L of the fluid separation membrane may satisfy the following relational expression:

$$S \propto d/(L \times R1) \geq 1/3000000 \qquad (1).$$

A plurality of fluid separation membranes 100 may be disposed in the chamber. The fluid separation membranes 100 may be disposed adjacent to each other. In an exemplary embodiment, a gap between adjacent fluid separation membranes 100 may be equal to or greater than the thickness d of the walls 100w of the fluid separation membranes 100 and less than π/2 times the outer diameter R1 of the fluid separation membranes 100. For example, the gap between neighboring fluid separation membranes 100 may range generally from 0.1 mm to 500 mm. When the gap between the neighboring fluid separation membranes 100 is 0.1 mm or more, the neighboring fluid separation membranes 100 can be prevented from coming into close contact with each other. Accordingly, this can prevent a reduction in the effective surface areas of the fluid separation membranes 100 through which a fluid passes. By setting the gap between the neighboring fluid separation membranes 100 to 500 mm or less, the contact area between a fluid and the surface of each of the fluid separation membranes 100 within the limited space of the chamber can be sufficiently increased.

A plurality of fluid separation membranes 100 may form one column. In addition, a plurality of columns of the fluid separation membranes 100 can be arranged in a row direction within the chamber.

The fluid separation membrane 100 allows transfer of a specific fluid. The fluid separation membrane 100 may allow a specific fluid to move between the inside 100s1 and the outside 100s2 of the fluid separation membrane 100. The fluid separation membrane 100 may include micro-pores so that a specific fluid can pass through the micro-pores. However, the inventive concept is not limited to this case, and various other methods can be used to allow a specific fluid to pass through the walls 100w of the fluid separation membrane 100. For example, a specific fluid may move into the walls 100w by being dissolved, absorbed or adsorbed into the walls 100w of the fluid separation membrane 100 or may pass through the fluid separation membrane 100 through chemical bonding and decomposition. The fluid can be moved by a diffusion method such as Knudsen diffusion, molecular diffusion, surface diffusion or super micro-pore diffusion or by a method such as filtration or osmosis.

The energy required for a specific fluid to pass through the fluid separation membrane 100 may be provided by, but not limited to, the difference in pressure or fluid concentration between the inside and outside 100s1 and 100s2 of the fluid separation membrane 100, the kinetic energy of fluids, or the physical or chemical energy interaction between the fluid and the fluid separation membrane 100.

The fluid separation membrane 100 may include a polymer material such as cellulose acetate, polysulfone or silicone rubber, or an inorganic material such as silica-based ceramics, silica-based glass, alumina-based ceramics, porous stainless steel, porous titanium or porous silver. The material that forms the fluid separation membrane 100 may be selected in view of not only the type of a mixed fluid and the selectivity of an object fluid to be separated but also the ease of manufacturing method, the possibility of mass production, durability and the like. In general, the polymer material is relatively easy to manufacture than the inorganic material. For example, in the case of silicone rubber, it is easy to make a desired shape by an extrusion method, and mass production is also easy. Although varying according to the type and manufacturing method of silicone rubber, it is not difficult to manufacture silicone rubber in which the selectivity of carbon dioxide and nitrogen is about 3:1 or even 5:1 or more. Therefore, silicone rubber can be easily used to separate carbon dioxide from a mixed gas of carbon dioxide and nitrogen.

The fluid separation membrane 100 may be made of a flexible material. If the material of the fluid separation membrane 100 is flexible, it is easy to bend the fluid separation membrane 100. Therefore, the fluid separation membrane 100 can be easily installed in various shapes. In addition, the fluid separation membrane 100 may be made of a material having flexibility and elasticity. If the fluid separation membrane 100 has flexibility and elasticity, when a membrane spacer is inserted into the inside 100s1 of the fluid separation membrane 100, the fluid separation membrane 100 can be stretched in a width direction of the membrane spacer, and the movement of the membrane spacer can be suppressed by the force of restitution. Since silicone rubber has all of the above characteristics, it can be used as an excellent material for the fluid separation membrane 100.

The fluid separation membrane 100 may further include a nanoceramic material in addition to the above-described materials. The nanoceramic material can increase the strength of the fluid separation membrane 100 and improve the affinity to a specific fluid.

Fe-based, Pd-based, Ti-based and Al-based oxides, which are nanoceramic materials, are carbon dioxide-friendly materials and can be applied to the fluid separation membrane for separating carbon dioxide. For example, any one of $Fe_2O_3$, $TiO_2$, PdO, $Al_2O_3$, MgO, NiO, $Y_2O_3$, $SiO_2$, $ZrO_2$ and Zeolite which are nanoceramic materials or a mixture of these materials can be applied.

A nanoceramic material may be used in an amount of 0.001 to 10% by weight based on the total weight of a polymer material such as silicone rubber.

The nanoceramic material may be mixed with the polymer material such as silicone rubber and provided accordingly. For example, the fluid separation membrane 100 may be manufactured by extruding a mixture of silicone rubber and a nanoceramic material. In this case, the nanoceramic material may be distributed within the polymer material.

The nanoceramic material can also be provided in the form of a coating layer. For example, after a tube is manufactured by extruding a polymer material, it may be dipped in and coated with a suspension diluted with nanoceramic powder. Alternatively, the tube may be coated with the suspension by spray coating, flow coating or roll coating, or the nanoceramic material may be directly deposited on the tube.

The nanoceramic coating layer may be formed only on inner walls of the tube, only on outer walls of the tube, or on both the inner and outer walls. A position where the nanoceramic coating layer is formed may be appropriately selected according to the space into which a fluid mixture is injected and the ease of manufacture. For example, when a mixture of carbon dioxide and nitrogen is supplied to the outside 100s2 of the fluid separation membrane 100, it is advantageous, in terms of selective separation of carbon dioxide, to form a nanoceramic coating layer having high affinity to carbon dioxide on the outer walls of the tube. However, the inventive concept is not limited to this case, and it is also possible to coat the nanoceramic material on the inner and outer walls of the tube in consideration of separation efficiency and ease of manufacture.

Figure 6:
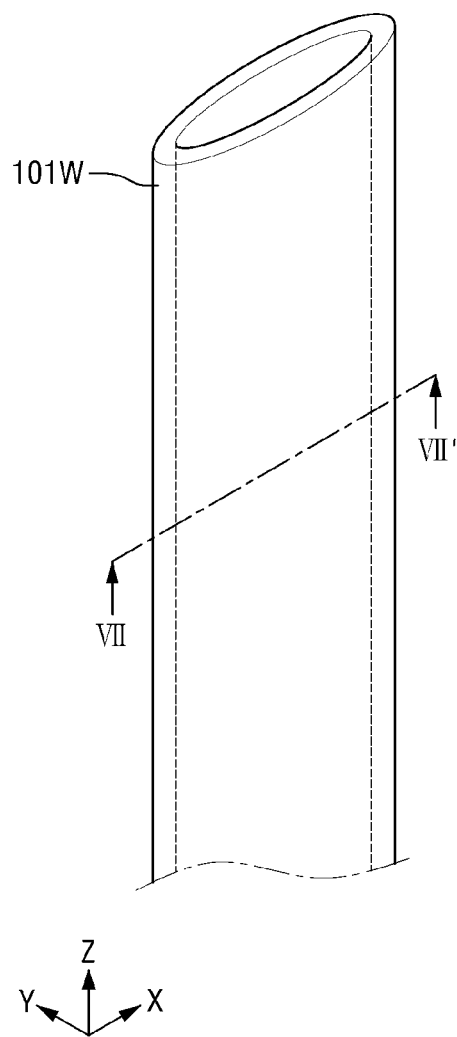
FIG. 6 is a perspective view of a fluid separation membrane according to another embodiment of the inventive concept.
Figure 7:
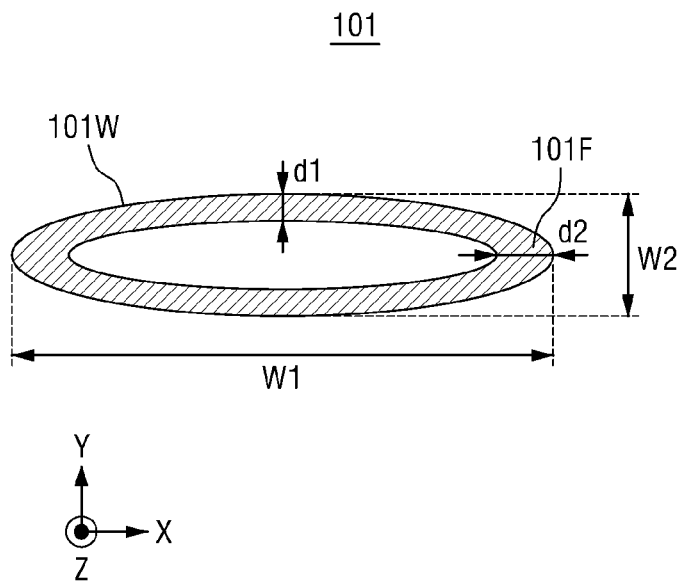
FIG. 7 is a cross-sectional view taken along the line VII-VII' of FIG. 6.

FIG. 6 is a perspective view of a fluid separation membrane according to another embodiment of the inventive concept. FIG. 7 is a cross-sectional view taken along the line VII-VII' of FIG. 6.

Referring to FIGS. 6 and 7, the current embodiment is different from the embodiment of FIG. 5 in that a cross-section of the fluid separation membrane 101 taken perpendicular to a direction Z in which the fluid separation membrane 101 extends forms a closed curve instead of a circular shape. That is, the cross-section of the fluid separation membrane 101 has a distorted shape compared to the circular shape. An exemplary cross-sectional shape of the fluid separation membrane 101 is an elliptical shape.

Figure 8:
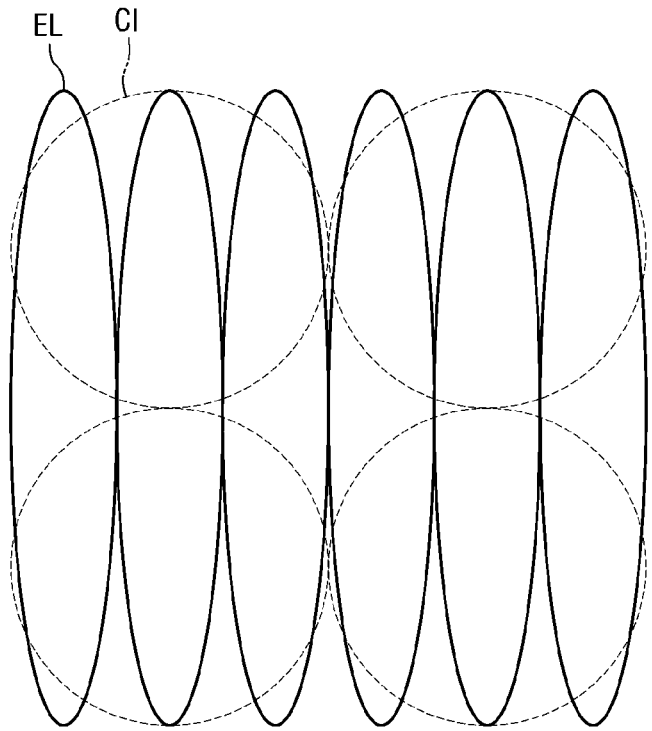
FIG. 8 is a schematic view showing relative spaces occupied by a circle and an ellipse.

FIG. 8 is a schematic view showing relative spaces occupied by a circle and an ellipse. Referring to FIG. 8, assuming that an outer circumference of an ellipse EL and an outer circumference of a circle CI are the same, the space occupied by the ellipse EL is smaller than the space occupied by the circle CI. Therefore, more ellipses EL than circles CI can be placed in the same space.

Referring back to FIGS. 6 and 7, since a fluid moves through walls 101w of the fluid separation membrane 101, the larger the area of the fluid exposed to the walls 101w of the fluid separation membrane 101, the greater the amount of movement of the fluid. If the outer circumference of the fluid separation membrane 101 is equal, the amount of movement of the fluid is theoretically the same because the fluid separation membrane 101 has the same surface area regardless of whether the cross-section of the fluid separation membrane 101 is circular or elliptical. However, if the cross-section of the fluid separation membrane 101 is elliptical, more fluid separation membranes 101 can be placed in the same space. Therefore, the total surface area may be increased. In addition, even if the number of the fluid separation membranes 101 is the same, the fluid separation membranes 101 can have a greater outer circumference, that is, a wider surface area in the same space when having an elliptical cross-section than when having a circular cross-section. Therefore, it can be understood that the efficiency of fluid movement relative to space is greater in the case of the elliptical cross-section than in the case of the circular cross-section.

Figure 9:
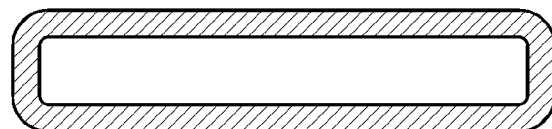
FIGS. 9 and 10 are cross-sectional views of fluid separation membranes according to various embodiments of the inventive concept.
Figure 10:
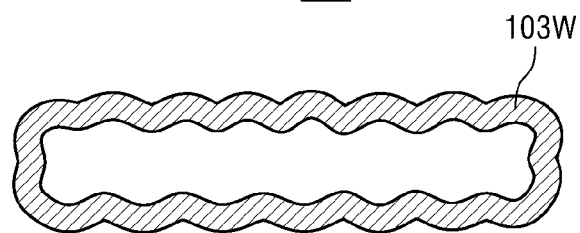

FIGS. 9 and 10 are cross-sectional views of fluid separation membranes according to various embodiments of the inventive concept.

A cross-section of the fluid separation membrane 102 can be shaped not only like an ellipse, but also like a rectangle, a rectangle with rounded corners, or a closed curve with a relatively long length in one direction as shown in FIG. 9. Even in this case, the efficiency of fluid movement relative to space can be improved compared with the case of a circular cross-sectional shape. Alternatively, walls 103w of the fluid separation membrane 103 may have a corrugated shape as shown in FIG. 10. When the walls 103w have a corrugated shape, the fluid separation tube 102 may have a larger surface area relative to the space provided.

In the following embodiments, a case where a fluid separation membrane has an elliptical cross-sectional shape will be described as an example. In addition, a direction in which the cross-sectional shape has a largest width is defined as a first direction X (a long-diameter direction), and a direction perpendicular to the above direction is defined as a second direction Y. Referring to FIG. 7, a width W1 of the fluid separation membrane 101 in the first direction X is greater than a width W2 of the fluid separation membrane 101 in the second direction Y. The width W1 of the fluid separation membrane 101 in the first direction X is theoretically greater than $\frac{1}{2}\pi$ of the length of the outer circumference of the cross-section of the fluid separation membrane 101 and equal to or less than ½ of the length of the outer circumference of the cross-section of the fluid separation membrane 101. A case where the width W1 of the fluid separation membrane 101 in the first direction X is $\frac{1}{2}\pi$ of the length of the outer circumference of the cross-section of the fluid separation membrane 101 corresponds to a case where the cross-section of the fluid separation membrane 101 is circular, and a case where the width W1 of the fluid separation membrane 101 in the first direction X is ½ of the length of the outer circumference of the cross-section of the fluid separation membrane 101 corresponds to a case where the walls 100w of the fluid separation membrane 101 are substantially in close contact with each other. In an embodiment, a ratio of the width W1 of the fluid separation membrane 101 in the first direction X to the length of the outer circumference of the cross-section of the fluid separation membrane 101 may be set within the range of 1/4 to 49/100. When the ratio is 1/4 or more can the efficiency of fluid movement relative to space be improved. Keeping the ratio at 49/100 or less helps to prevent the walls 101w of the fluid separation membrane 101 from coming into complete contact with each other and thus closing the inside of the fluid separation membrane 101.

It is preferred that an outer diameter of the fluid separation membrane 101 is 60 to 300 mm when the cross-section of the fluid separation membrane 101 is adjusted to be circular. If the outer diameter is smaller than 60 mm, an inner diameter of the fluid separation membrane 101 may be too small compared with the thickness of the walls 101w, thus reducing the efficiency of fluid movement. On the other hand, if the outer diameter of the fluid separation membrane 101 is too large, the surface area of the fluid separation membrane 101 exposed to a fluid relative to space may decrease, thereby reducing the efficiency of fluid movement.

A thickness d1 or d2 of the walls 101w of the fluid separation membrane 101 may be uniform along the outer circumference of the fluid separation membrane 101, but not necessarily so. For example, the thickness d1 or d2 of the fluid separation membrane 101 may be generally uniform (see 'd1') along the first direction X and may be relatively larger or smaller (see 'd2') in a portion 101F bent at a relatively small angle at both ends in the first direction X.

Figure 11:
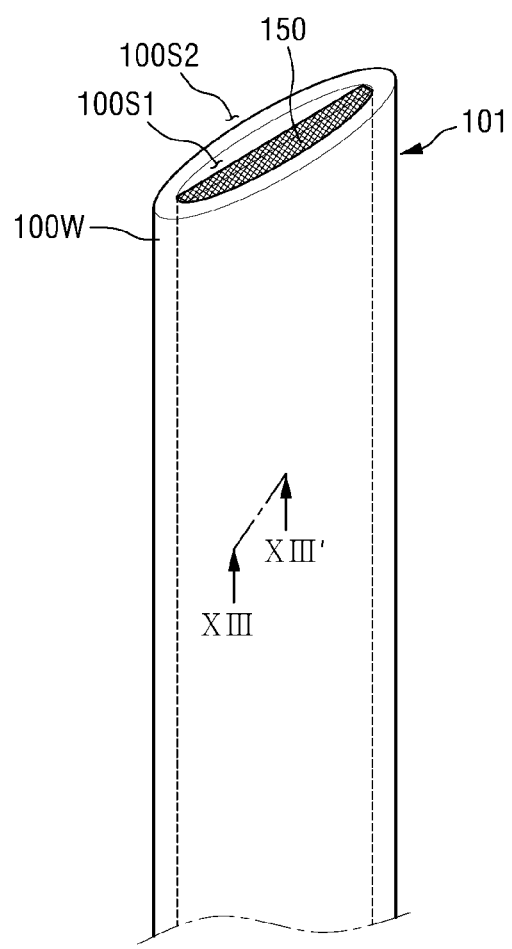
FIG. 11 is a perspective view showing a membrane spacer inserted into the fluid separation membrane of FIG. 6.
Figure 12:
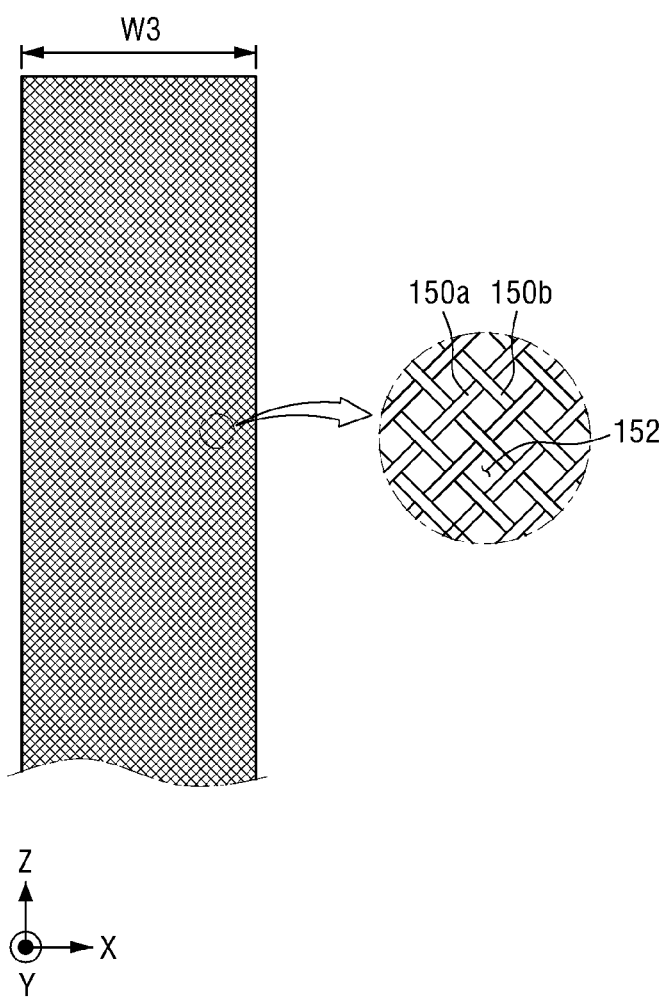
FIG. 12 is a plan view of the membrane spacer of FIG. 11.
Figure 13:
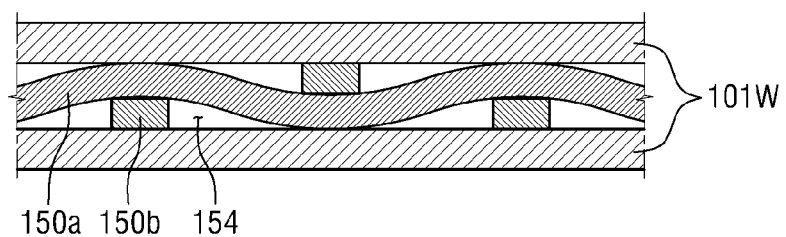
FIG. 13 is a cross-sectional view taken along the line XIII-XIII' of FIG. 11.

FIG. 11 is a perspective view showing a membrane spacer inserted into the fluid separation membrane of FIG. 6. FIG. 12 is a plan view of the membrane spacer of FIG. 11. FIG. 13 is a cross-sectional view taken along the line XIII-XIII' of FIG. 11.

Referring to FIGS. 11 through 13, the membrane spacer 150 is disposed in the fluid separation membrane 101. The membrane spacer 150 is disposed inside the fluid separation membrane 101 to prevent the walls 101w of the fluid separation membrane 101 from coming into close contact with each other and thus closing the fluid separation membrane 101.

The membrane spacer 150 may have the same length as the fluid separation membrane 101 and be disposed over the entire extending direction Z of the fluid separation membrane 101. However, the inventive concept is not limited to this case, and the membrane spacer 150 may also be disposed in a portion, e.g., a central portion of the fluid separation membrane 101 and may not be disposed in the vicinity of one end or both ends of the fluid separation membrane 101. Alternatively, a plurality of membrane spacers 150 may be disposed in the length direction Z. The membrane spacers 150 may be spaced apart from each other.

A width direction W3 of the membrane spacer 150 may correspond to the first direction X of the fluid separation membrane 101, and a thickness direction of the membrane spacer 150 may correspond to the second direction Y of the fluid separation membrane 101. A width W3 of the membrane spacer 150 is smaller than or equal to the inner diameter (=W1−2*d2) of the fluid separation membrane 101 in the first direction X. When the width W3 of the membrane spacer 150 is equal or close to the inner diameter of the fluid separation membrane 101 in the first direction X, the movement of the membrane spacer 150 on the inside 101s1 of the fluid separation membrane 101 is suppressed, and the degree to which the walls 101w of the fluid separation membrane 101 are in close contact with each other in a space in which the membrane spacer 150 is not disposed in the direction of the width W3 can be reduced. When the width W3 of the membrane spacer 150 is 0.5 times or more the inner diameter of the fluid separation membrane 101 in the first direction X, it has been verified that the membrane spacer 150 has a significant effect on preventing the movement of the membrane spacer 150 and preventing the walls 101w of the fluid separation membrane 101 from coming into close contact with each other. In view of the above, the width W3 of the membrane spacer 150 may be 0.5 to 1 times the inner diameter of the fluid separation membrane 101 in the first direction X.

In some embodiments, the membrane spacer 150 may be bent or folded once or more within the fluid separation membrane 101. For example, if a maximum width of the membrane spacer 150 when spread out is greater than a maximum width W1 of the fluid separation membrane 101, the membrane spacer 150 may be bent or folded once or more so that it can be inserted into the fluid separation membrane 101. In this case, the width W3 of the membrane spacer 150 is defined herein as the width of the membrane spacer 150 in the first direction X in a state where the membrane spacer 150 is bent or folded inside the fluid separation membrane 101.

The membrane spacer 150 has a plurality of openings 153cb through which a fluid can pass in the thickness direction (the second direction Y). In an exemplary embodiment, the membrane spacer 150 may have a net shape. The openings 153cb provide spaces in which a fluid can stay or move inside the fluid separation membrane 101.

The membrane spacer 150 may provide a fluid passage 154 in the length direction Z. The fluid passage 154 in the length direction Z inside the fluid separation membrane 101 is needed to transfer a separated fluid to an end of the fluid separation membrane 101. When the walls 101w of the fluid separation membrane 101 come into complete contact with the membrane spacer 150 due to the difference in pressure between the inside and the outside of the fluid separation membrane 101, if only the openings 153cb in the thickness direction of the membrane spacer 150 are available, a fluid is trapped in the openings 153cb of the membrane spacer 150 and is not easily transferred to an end of the fluid separation membrane 101. To prevent this, the membrane spacer 150 may be configured to provide the fluid passage 154 in the length direction Z. As an example of the above configuration, the membrane spacer 150 may have a twisted net structure.

As shown in the enlarged view of FIG. 12, the twisted net structure is formed as threads 150a of a net in one direction and threads 150b of the net in another direction repeatedly intersect each other in a downward direction and an upward direction. Therefore, even if the walls 101w of the fluid separation membrane 101 are closely attached to the membrane spacer 150, gaps can be maintained at the intersections of the threads 150a and 150b. These gaps may provide the fluid passage 154 in the length direction Z.

In some embodiments, the membrane spacer 150 may also provide a fluid passage in the width direction W3 (the first direction X). Since the twisted net structure shown in FIG. 12 maintains the gaps at the intersections of the threads 150a and 150b, it can provide not only the fluid passage 154 in the length direction Z but also a fluid passage in the width direction W3.

The membrane spacer 150 may be made of a polymer material such as synthetic resin, nylon or polyester or may be made of a metal material.

Figure 14:
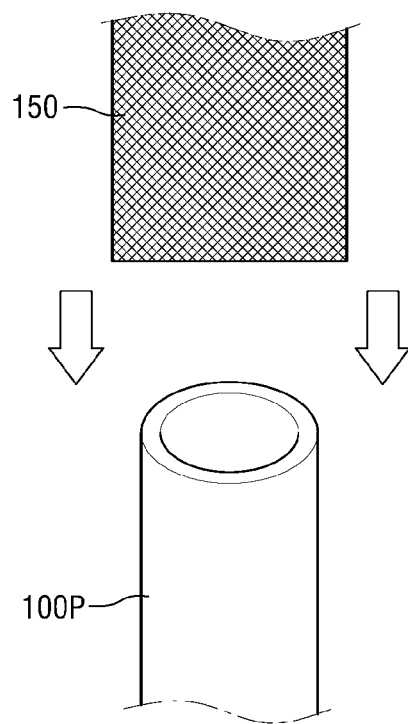
FIG. 14 is a perspective view showing a process of inserting a membrane spacer into a fluid separation membrane.

FIG. 14 is a perspective view showing a process of inserting a membrane spacer into a fluid separation membrane. When a fluid separation membrane has an elliptical cross-section from the beginning, a membrane spacer 150 may be inserted into the fluid separation membrane after a width direction W3 of the membrane spacer 150 is aligned with a long-diameter direction of an inner diameter of the fluid separation membrane 101.

However, as shown in FIG. 14, a fluid separation membrane 100p having a circular cross-section can be provided. Tubes formed of a flexible material by an extrusion process maintain their circular cross-sections unless other external forces act. In this case, a membrane spacer 150 having a width larger than an inner diameter of the fluid separation membrane 100p is prepared and inserted into the fluid separation membrane 100p, thereby giving a distorted cross-sectional shape to the fluid separation membrane 101. If the membrane spacer 150 is made of a material having a higher strength than the fluid separation membrane 100p and if the bending strength of the membrane spacer 150 in the width direction is greater than the force of restitution of the distorted fluid separation membrane 100p, the membrane spacer 150 maintains its shape without deformation in the width direction W3, and the fluid separation membrane 101 is stretched accordingly to have a distorted cross-sectional shape.

A portion of the fluid separation membrane 101 located at an end of the membrane spacer 150 in the width direction W3 may be subjected to a relatively higher pressure than other portions and can be stretched more. Therefore, even if the circular cross-section of the fluid separation membrane 100p has a uniform thickness, the thickness of the above portion of the fluid separation membrane 101 may become relatively small after the insertion of the membrane spacer 150. That is, the thickness of the fluid separation membrane 101 may be generally uniform across the first direction but may be relatively small in a portion bent at a relatively small angle at both ends in the first direction.

A width W3 of the membrane spacer 150 is larger than the inner diameter of the circular fluid separation membrane 100p. The width W3 of the membrane spacer 150 may be less than or equal to $\pi/2$ times the inner diameter of the circular fluid separation membrane 100p to prevent damage due to excessive stress on the fluid separation membrane 101. However, if the fluid separation membrane 101 has sufficient elasticity and strength, the width W3 of the membrane spacer 150 can exceed $\pi/2$ times the inner diameter of the circular fluid separation membrane 100p. For example, if walls 101w of the fluid separation membrane 101 are silicone rubber having a thickness of 25 to 100 mm, they may have sufficiently excellent elasticity and strength. Therefore, the fluid separation membrane 101 can be applied to the membrane spacer 150 of various widths. In addition, since the fluid separation membrane 101 within the above range has a superior selectivity of nitrogen to carbon dioxide, it can be suitably applied to an apparatus for separating carbon dioxide from a mixture of nitrogen and carbon dioxide.

Figure 15:
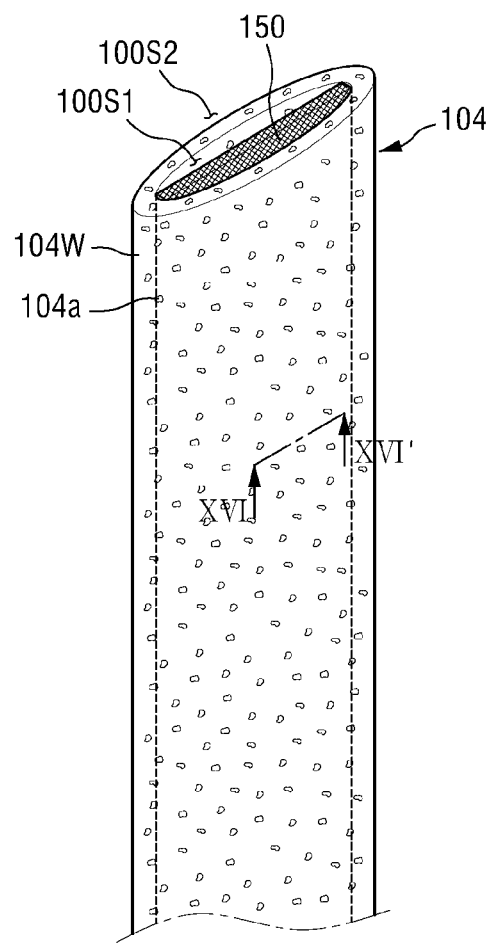
FIG. 15 is a perspective view showing a fluid separation membrane and a membrane spacer inserted into the fluid separation membrane according to another embodiment of the inventive concept.
Figure 16:
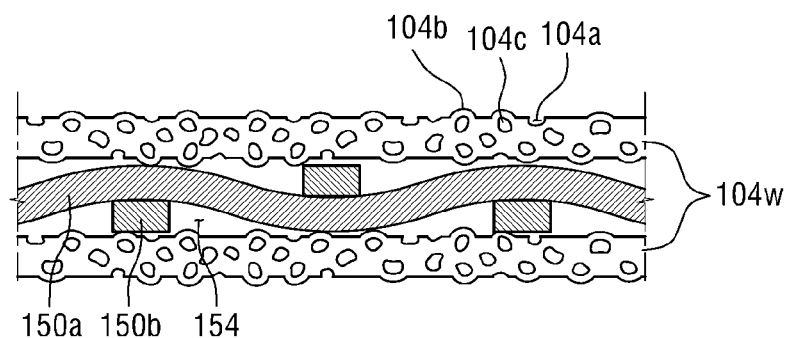
FIG. 16 is a cross-sectional view taken along the line XVI-XVI' of FIG. 15.

FIG. 15 is a perspective view showing a fluid separation membrane and a membrane spacer inserted into the fluid separation membrane according to another embodiment of the inventive concept. FIG. 16 is a cross-sectional view taken along the line XVI-XVI' of FIG. 15.

Referring to FIGS. 15 and 16, the current embodiment is different from the embodiment of FIG. 11 in that the fluid separation membrane 104 according to the current embodiment includes a plurality of surface recesses and protrusions 104a and 104b on its surface and a plurality of internal pores 104c inside its membranous walls 104w.

The internal pores 104c may be distributed throughout the inside of the membranous walls 104w of the fluid separation membrane 104. The internal pores 104c may be closed pores. The internal pores 104c may have a spherical or partially spherical shape, an elliptical or partially elliptical shape, or an amorphous random shape.

Internal pores 104c disposed close to the surface of the fluid separation membrane 104 cause the surface of the fluid separation membrane 104 to protrude. Thus, portions protruding from the surface of the fluid separation membrane 104 are referred to as the surface protrusions 104b. On the other hand, internal pores 104c formed in contact with or adjacent to the surface of the fluid separation membrane 104 fail to form closed pores. Instead, these internal pores 104c form open pores. Accordingly, the surface of the fluid separation membrane 104 is depressed. Thus, portions recessed from the surface of the fluid separation membrane 104 are referred to as the surface recesses 104a. The surface recesses and protrusions 104a and 104b may be formed on both surfaces of the fluid separation membrane 104.

The density of the surface protrusions 104b on the surface of the fluid separation membrane 104 may be, but is not limited to, greater than the density of the surface recesses 104a on the surface of the fluid separation membrane 104.

A size (maximum width) of the internal pores 104c may be smaller than a thickness of the membranous walls 104w of the fluid separation membrane 104. The internal pores 104c may be formed by a blowing agent. The size of the internal pores 104c formed by the blowing agent may be 0.1 μm to 1 mm. When the size of the internal pores 104c is 0.1 μm or more, the effective surface area of the internal pores 104 may be increased, and the thickness of the internal pores 104c may be reduced. When the size of the internal pores 104c is 1 mm or less, it is advantageous for preventing the formation of a passage in the thickness direction. A width and depth of the surface recesses 104a may be smaller than or equal to the size of the internal pores 104c.

Despite the presence of the surface recesses and protrusions 104a and 104b and the internal pores 104c, the fluid separation membrane 104 may not have a complete opening that penetrates one surface and the other surface of the fluid separation membrane 104 in the thickness direction. That is, the surface recesses 104a and the internal pores 104c can overlap each other in the thickness direction. However, since the spaces of the surface recesses 104a and the internal pores 104c are surrounded by the membranous walls 104w that form the the fluid separation membrane 104, they are not connected to each other. In this case, an effective area for fluid movement in the entire surface of the fluid separation membrane 104 does not include a direct passage in the thickness direction. Therefore, a fluid can move only through the membranous walls 104w of the fluid separation membrane 104.

The separation efficiency or mobility of a fluid through the fluid separation membrane 104 is generally proportional to the contact area of the fluid separation membrane 104 and inversely proportional to the thickness of the fluid separation membrane 104. When the fluid separation membrane 104 includes the surface recesses and protrusions 104a and 104b, the fluid separation efficiency can be increased because the contact area between a fluid and the fluid separation membrane 104 is increased. In addition, a path through the surface recesses and protrusions 104a and 104b and/or the internal pores 104c is a path through the membranous walls 104w of the fluid separation membrane 104 having a substantially smaller thickness. Therefore, since the actual thickness of the membranous walls 104w of the fluid separation membrane 104 through which a fluid passes is reduced, the fluid separation efficiency can be increased.

Although the overall thickness of the membranous walls 104w through which a fluid passes is reduced by the surface recesses and protrusions 104a and 104b and the internal pores 104c, the average thickness of the entire fluid separation membrane 104 may be maintained greater than the overall thickness. This positively affects the strength of the fluid separation membrane 104. In other words, the effect of a mechanically thick and durable but thin membrane can be achieved. Therefore, the fluid separation membrane 104 is easy to manufacture and handle, can be enlarged, and can be applied on a commercial scale.

The volume of the internal pores 104c may be 0.1 to 20%, more preferably, 1 to 10% of the total volume of the fluid separation membrane 104. The internal pores 104c having a volume of 0.1% or more, preferably, 1% or more is advantageous for increasing the effective surface area and bringing about the effect of a thin membrane. To prevent the internal pores 104c from being too large or combined to form an undesired direct passage in the thickness direction, the volume of the internal pores 104c may be set to 20% or less, preferably, 10% or less.

The fluid separation membrane 104 described above may be produced as follows. First, a liquid fluid separation membrane material, for example, a mixture of liquid silicone rubber and a blowing agent is prepared. Examples of the blowing agent may include [4,4'-oxybis (benzenesulfonyl hydrazide) (OBSH), [4-methylbenzene sulfonhydrazide] (TSH), azodicarbonamide, and ptoluenesulfonyl semicarbazide (PTSS). A content ratio of the material of the fluid separation membrane 104 and the blowing agent may be 0.1 to 20%.

Next, after a separation membrane is initially molded by a method such as extrusion, a blowing process is performed to form the surface recesses and protrusions 104a and 104b and the internal pores 104c.

Through the above process, the fluid separation membrane 104 may further include a residual blowing agent component in addition to the basic material of the membranous walls 104w. The residual blowing agent component may be a blowing agent component initially mixed with the fluid separation membrane material and then remaining after the surface recesses and protrusions 104a and 104b or the internal pores 104c are formed by the blowing process or may be a blowing agent component remaining intact because no blowing reaction has occurred.

Figure 17:
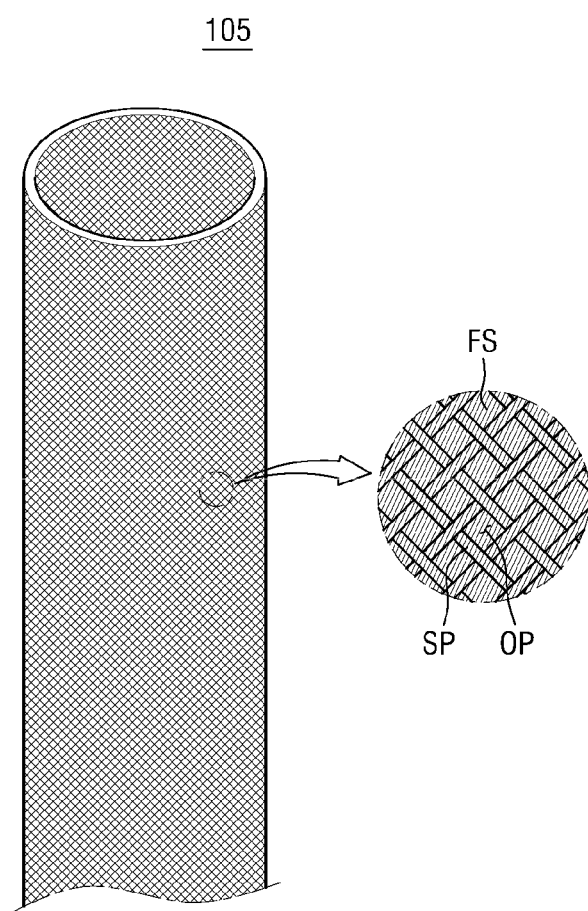
FIG. 17 is a perspective view of a tubular fluid separation membrane according to another embodiment of the inventive concept.
Figure 18:
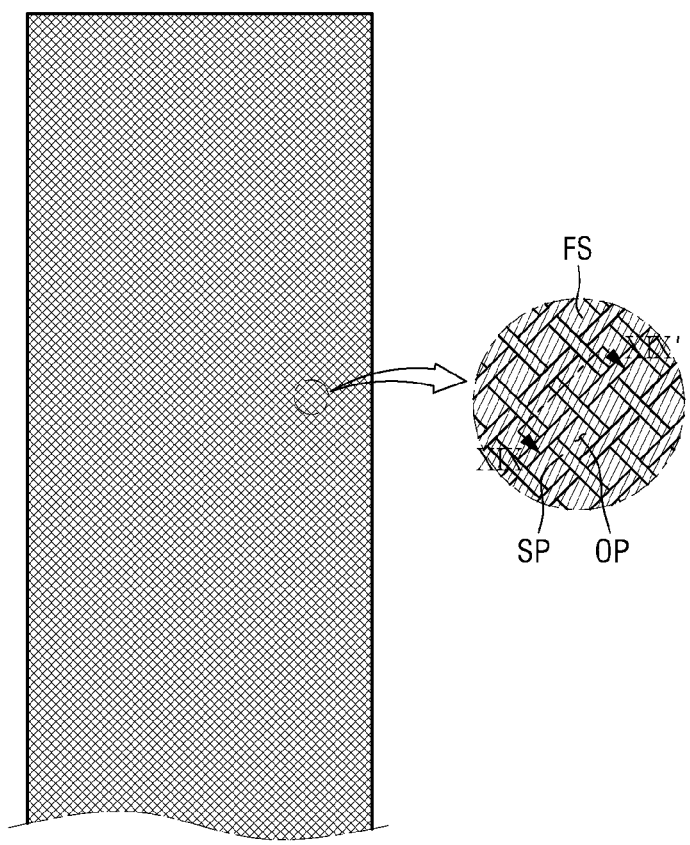
FIG. 18 is a perspective view of a plate-shaped fluid separation membrane according to another embodiment of the inventive concept.
Figure 19:
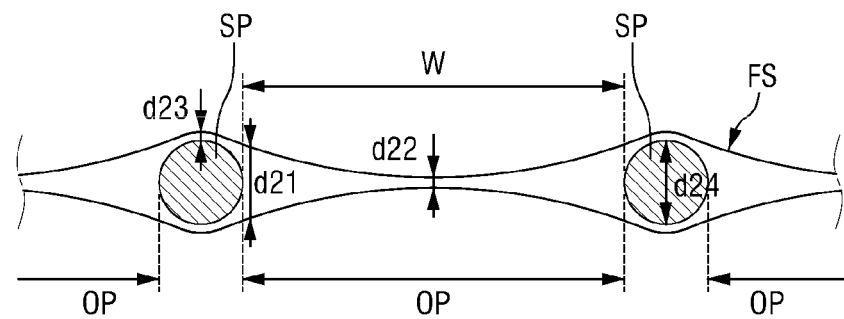
FIG. 19 is a cross-sectional view taken along the line XIX-XIX' of FIG. 18.
Figure 20:
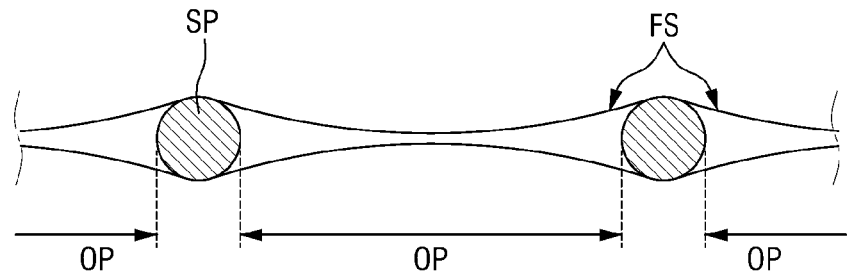
FIG. 20 is a cross-sectional view of a fluid separation membrane according to another embodiment of the inventive concept.

FIG. 17 is a perspective view of a tubular fluid separation membrane according to another embodiment of the inventive concept. FIG. 18 is a perspective view of a plate-shaped fluid separation membrane according to another embodiment of the inventive concept. FIG. 19 is a cross-sectional view taken along the line XIX-XIX' of FIG. 18. Since a cross-sectional view of the tubular fluid separation membrane of FIG. 17 is substantially the same as FIG. 19, it is omitted. FIG. 20 is a cross-sectional view of a fluid separation membrane according to another embodiment of the inventive concept.

Referring to FIGS. 17 through 19, each of the fluid separation membranes 105 and 106 includes a support portion SP having openings OP and a separation membrane portion FS covering the support portion SP.

The support portion SP includes a plurality of openings OP. Each of the openings OP is open in a thickness direction (a vertical direction in FIG. 19).

A thickness of the support portion SP may be 10 µm to 1 mm. The support portion SP having a thickness of 10 µm or more is advantageous in securing the mechanical strength of the fluid separation membranes 105 and 106. If the support portion SP is too thick, the proportion of the thin separation membrane portion FS is reduced. Therefore, it is difficult to expect high fluid separation efficiency. In view of the above, the thickness of the support portion SP may be 1 mm or less.

A gap between regions of the support portion SP, in other words, a width of each opening OP, may be 0.1 to 10 mm. When a width w of the openings OP is 0.1 mm or more, a sufficient effective area for fluid movement can be secured. When the width w of the openings OP is 10 mm or less, it is advantageous in securing the mechanical strength of the fluid separation membranes 105 and 106.

Like a net or a mosquito net, the support portion SP may have the openings OP of a certain shape. In the above example, the support portion SP may have a twisted net structure with warp and weft.

In another example, the support portion SP, like nonwoven fabric, may have randomly shaped openings OP. Even in this case, at least some of the openings OP are open in the thickness direction.

The support portion SP may be made of a material that does not allow the movement of a fluid. For example, the support portion SP may be made of natural fiber or synthetic resin. The support portion SP may be made of, for example, Manila hemp, pulp, rayon, acetate fiber, polyester fiber, polyvinyl alcohol fiber, polyamide fiber, or polyolefin fiber singly or in combination. The support portion SP can also be made of a metal material. Examples of the metal material include stainless steel (SUS), iron, aluminum, and alloys of these materials.

The separation membrane portion FS is formed to fill the openings OP. In an embodiment, the separation membrane portion FS may be formed on an upper surface and a lower surface of the support portion SP to cover the support portion SP while filling the openings OP. That is, the separation membrane portion FS may be formed as a single piece.

In another embodiment, the separation membrane portion FS may be physically separated in each opening OP, as shown in FIG. 20. That is, the separation membrane portion FS may not be formed on the upper surface and the lower surface of the support portion SP, but may be formed only to fill the openings OP. In this case, the upper surface and the lower surface of the support portion SP may be exposed at least partially without being covered with the separation membrane portion FS.

In another embodiment, the separation membrane portion FS may be formed on the upper surface and the lower surface of the support portion SP in some regions of the support portion SP and may not be formed on the upper surface and/or the lower surface of the support portion SP in some other regions of the support portion SP to expose the upper surface and/or the lower surface of the support portion SP.

The separation membrane portion FS can be formed using the surface tension of a liquid separation membrane material as will be described later. Using this method, it is possible to mass-produce an ultra-thin separation membrane. Since the mobility of a fluid increases as the thickness of the separation membrane portion FS decreases, the separation efficiency can be increased.

A thickness of the separation membrane portion FS may vary according to position. For example, a thickness d221 of the separation membrane portion FS which does not overlap the support portion SP in the thickness direction and is located around the support portion SP is relatively large. A thickness d22 of the separation membrane portion FS located in a central portion of each opening OP between regions of the support portion SP is relatively small. The thickness d22 of the separation membrane portion FS in the central portion of each opening OP between the regions of the support portion SP may be smaller than a thickness d24 of the support portion SP. The separation membrane portion FS may become thinner as the distance from the periphery of the support portion SP increases.

In some embodiments, the separation membrane portion FS may also be located on the upper and lower surfaces of the support portion SP. A thickness d23 of the separation membrane portion FS on the upper and lower surfaces of the support portion SP may be relatively small. The thickness d23 of the separation membrane portion FS on the upper and lower surfaces of the support portion SP may be smaller than the thickness d22 of the separation membrane portion FS in the central portion of each opening OP. In some other embodiments, the separation membrane portion FS may not be located on the upper and lower surfaces of the support portion SP (see FIG. 20) as described above. In this case, the thickness of the separation membrane portion FS on the upper and lower surfaces of the support portion SP is interpreted as zero.

The total thickness of each of the fluid separation membranes 105 and 106 may be largest in a region where the support portion SP is disposed, that is, a region where the separation membrane portion FS is formed on the upper and lower surfaces of the support portion SP and may be smallest in the central portion of each opening OP.

The thickness of the separation membrane portion FS may be 5 to 200 µn on the upper and lower surfaces (d23) of the support portion SP, may be 10 to 200 µm in the central portion (d22) of each opening OP, and may be 10 µm to 1 mm on the periphery (d221) of the support portion SP where the separation membrane portion FS does not overlap the support portion SP. If the separation membrane portion FS is relatively thin in the central portion of each opening OP as described above, the mobility of a fluid through the separation membrane portion FS can be increased.

The separation membrane portion FS may be made of the materials mentioned in the embodiment of FIG. 4.

The fluid separation membranes 105 and 106 described above can be applied together with the spacer described above with reference to FIGS. 11 through 13. In the case of the tubular fluid separation membrane 105, the membrane spacer is inserted into the fluid separation membrane 105. In the case of the plate-shaped fluid separation membrane 106, a plurality of fluid separation membranes 106 may be stacked with the membrane spacer disposed between the fluid separation membranes 106.

Figure 21:
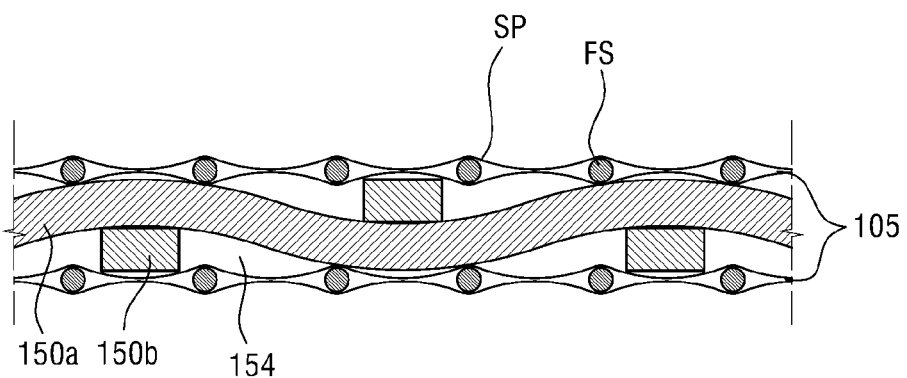
FIG. 21 is a cross-sectional view showing a state in which a membrane spacer is inserted into the fluid separation membrane of FIG. 17.

FIG. 21 is a cross-sectional view showing a state in which a membrane spacer is inserted into the fluid separation membrane of FIG. 17.

Referring to FIG. 21, as in the embodiment of FIG. 1, when a mixed fluid is supplied to the outside of the fluid separation membrane 105, the pressure outside the fluid separation membrane 105 may be set higher than the pressure inside the fluid separation membrane 105 in order to increase the mobility of a specific fluid. If the difference in pressure between the inside and the outside of the fluid separation membrane 105 is set to about 0.5 kgf/cm², commercially available separation efficiency can be achieved. In an embodiment, a pressure of 0 to 4 kgf/cm² may be applied to the outside of the fluid separation membrane 105, and a pressure of 0 to −1 kgf/cm² may be applied to the inside of the fluid separation membrane 105.

When negative pressure is applied to the inside of the fluid separation membrane 105, the fluid separation membrane 105 having a flexible characteristic may be distorted, causing inner walls of the separation membrane portion FS to come into close contact with each other. If the fluid separation membrane 105 is distorted, when a plurality of fluid separation membranes 105 are arranged, the arrangement density of the fluid separation membranes 105 can be increased, thus increasing separation efficiency per unit area.

When the inner walls of the separation membrane portion FS come into complete contact with each other in a region, a fluid cannot enter the inner walls of the separation membrane portion FS in the region. If this region where the inner walls of the separation membrane portion FS are in close contact with each other increases, the fluid separation area is reduced, thus reducing the separation efficiency. Moreover, it is difficult to extract a separated fluid because a passage in a length direction of the separation membrane portion FS is blocked. Therefore, the membrane spacer 150 is inserted into the fluid separation membrane 105 to prevent the inner walls of the fluid separation membrane 105 from coming into close contact with each other and thus closing the fluid separation membrane 105.

A thickness of the membrane spacer 150 may be greater than a maximum thickness of the fluid separation membrane 105 (i.e., the thickness of the fluid separation membrane 105 on the support portion). In addition, openings 153cb of the membrane spacer 150 may be larger than the openings OP of the fluid separation membrane 105.

An exemplary method of manufacturing the fluid separation membranes of FIGS. 17 and 18 will now be described.

First, a water tank containing a support portion SP having a plurality of openings OP and a liquid separation membrane material such as molten silicone rubber is prepared. When the support portion SP immersed in the water tank is taken out, the liquid separation membrane material is deposited on the openings OP of the support portion SP by surface tension. As a result, a thin membrane is formed. Next, the liquid separation membrane material of the thin membrane is solidified or cured to form the fluid separation membrane 105 or 106 of FIG. 17 or 18. That is, a fluid separation membrane including the support portion SP and a separation membrane portion FS can be easily manufactured by a simple method using the surface tension of the liquid separation membrane material. Therefore, the manufacturing cost is reduced, and the process efficiency is improved, which, in turn, makes it easy to mass-produce the fluid separation membrane on a commercial scale.

Alternatively, a thin membrane may formed in the openings OP of the support portion SP by applying or spraying the liquid separation membrane portion FS onto the support portion SP. Then, the thin membrane may be solidified or cured to form the fluid separation membrane of FIG. 17 or 18.

Figure 22:
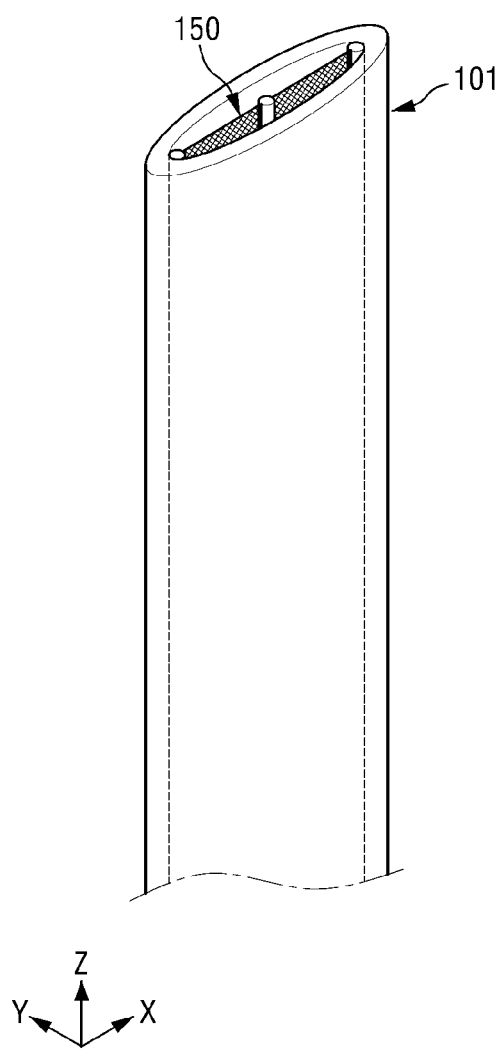
FIG. 22 is a perspective view of a tubular fluid separation membrane and a spacer disposed in the tubular fluid separation membrane according to another embodiment of the inventive concept.
Figure 23:
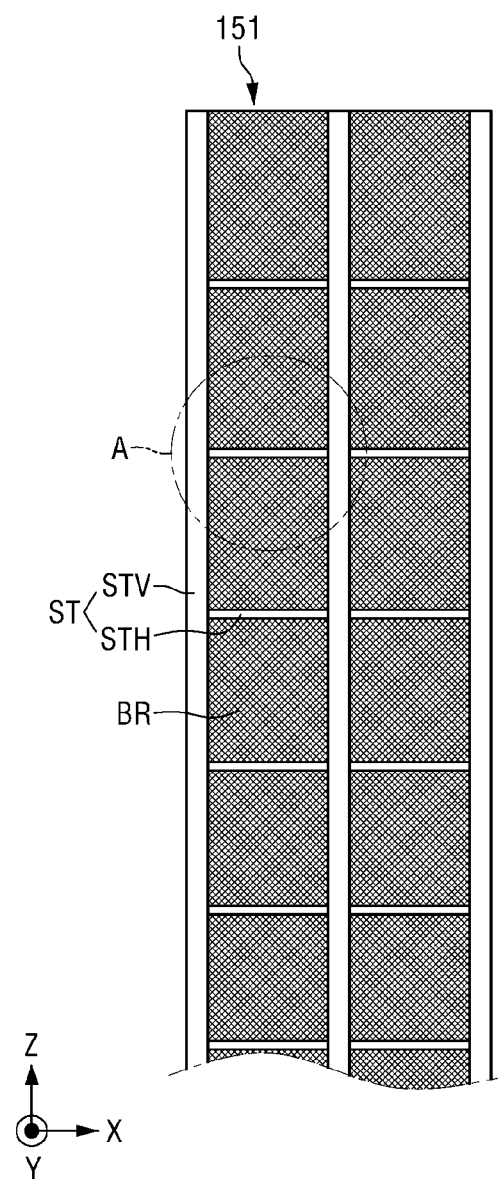
FIG. 23 is a plan view of the spacer shown in FIG. 22.
Figure 24:
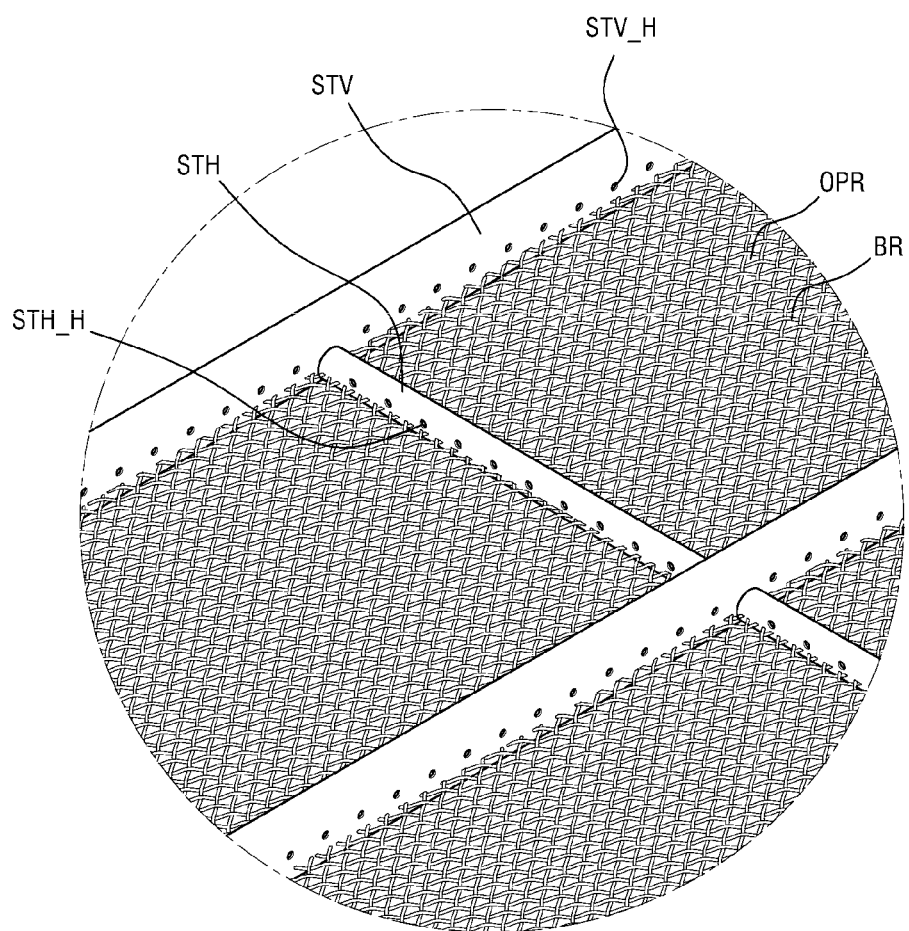
FIG. 24 is a perspective view of a region 'A' of FIG. 23.

FIG. 22 is a perspective view of a tubular fluid separation membrane and a spacer disposed in the tubular fluid separation membrane according to another embodiment of the inventive concept. FIG. 23 is a plan view of the spacer shown in FIG. 22. FIG. 24 is a perspective view of a region 'A' of FIG. 23.

Referring to FIGS. 22 through 24, the fluid separation membrane 101 according to the current embodiment is the same as the fluid separation membrane of FIG. 11 but different from FIG. 11 in the structure of the membrane spacer 153ca.

The membrane spacer 153ca is disposed inside the fluid separation membrane 101. The membrane spacer 153ca includes stem portions ST. The stem portions ST are formed in a hollow shape. The empty spaces inside the stem portions ST can be used as fluid passages.

The stem portions ST can rapidly discharge a separated fluid introduced into the tube of the fluid separation membrane 101. The separated fluid introduced into the tube of the fluid separation membrane 101 is discharged through a second fluid outlet as described above with reference to FIG. 1. To facilitate the discharge of the fluid, a negative pressure pump may be installed outside the second fluid outlet. However, while the fluid can be easily discharged in a region close to the second fluid outlet due to a strong negative pressure applied by the negative pressure pump, it is relatively difficult for the fluid to move in a region far from the second fluid due to weak pressure. In particular, as the length and diameter of the fluid separation membrane 101 are larger, the pressure in the region far from the negative pressure pump is weaker. Therefore, the power to discharge the fluid cannot be sufficiently transmitted. In addition, a net portion BR of the membrane spacer 153ca can interfere with fluid movement.

The stem portions ST solve the above problem of pressure drop. Since the stem portions ST are formed in a hollow shape, a fluid can be rapidly discharged using only a low-volume negative pressure pump. If the fluid is discharged rapidly, the pressure inside the fluid separation membrane 101 can be maintained at a set pressure, thereby improving the separation efficiency. In particular, even when the length of the fluid separation membrane 101 is set to 500 to 5000 mm for application on a commercial scale, pressure non-uniformity in a length direction can be improved through the rapid fluid discharge. Accordingly, this can reduce a reduction in separation efficiency due to an increase in length. In view of the above, it may be preferred that the second fluid outlet is connected to the stem portions ST of the membrane spacer 153ca.

The stem portions ST may include at least one vertical stem portion STV extending in a length direction Z and a plurality of horizontal stem portions STH extending in a width direction X. The vertical stem portion STV and horizontal stem portions STH may meet or intersect each other. The empty spaces inside the vertical stem portion STV and the horizontal stem portions STH may be connected to each other in regions where the vertical stem portion STV and the horizontal stem portions STH meet or intersect each other.

The vertical stem portion STV provides a fluid passage in the length direction Z. An end of the vertical stem portion STV is connected to an end of the fluid separation membrane 101 or to the outside of the fluid separation membrane 101. The vertical stem portion STV may be located at a center or an edge of the membrane spacer 153ca in the length direction Z. An inner diameter of the vertical stem portion STV may be larger than those of the horizontal stem portions STH.

The horizontal stem portions STH provide fluid passages in the width direction X. Since the horizontal stem portions STH are connected to the vertical stem portion STV as described above, a fluid flowing through the horizontal stem portions STH can be discharged through the vertical stem portion STV.

A direction in which the horizontal stem portions STH extend does not need to be exactly the same as the width direction X. The horizontal stem portions STH can extend in a direction at a predetermined angle to the width direction. Also, the horizontal stem portions STH can extend not in a straight line but in a curve.

In an embodiment, the horizontal stem portions STH may be arranged parallel to each other at regular intervals. However, the inventive concept is not limited to this case, and the horizontal stem portions STH can also be arranged at irregular intervals. For example, the horizontal stem portions STH may be arranged at large intervals in a region close to an end (close to the negative pressure pump) and may be arranged at small intervals in a region far from the end.

The vertical stem portion STV may include a plurality of holes STV_H. The holes STV_H of the vertical stem portion ST pass through walls of the vertical stem portion STV in a thickness direction and connect the outside of the vertical stem portion STV to the empty space inside the vertical stem portion STV.

The holes STV_H may be disposed only in the vicinity of the net portion BR or may be arranged at a greater density in the vicinity of the net portion BR than in other regions. When negative pressure is formed in the tube of the fluid separation membrane 101, upper and lower parts of the vertical stem portion STV come into close contact with walls of the adjacent fluid separation membrane 101, thus making it difficult to secure a fluid movement space between them. On the other hand, a relatively wide space can be secured on a side of the vertical stem portion STV adjacent to the net portion BR because the vertical stem portion STV is thicker than the net portion BR. Therefore, the holes STV_H are arranged in this region to allow a separated fluid introduced into the tube of the fluid separation membrane 101 to effectively enter the vertical stem portion STV. However, the holes STV_H can also be arranged in the upper and lower parts of the vertical stem portion STV in addition to the region around the net portion BR. For example, the holes STV_H may be arranged evenly over the entire vertical stem portion STV.

Each of the horizontal stem portions STH may also include a plurality of holes STH_H. The holes STH_H of the horizontal stem portions STH pass through walls of the horizontal stem portions STH in the thickness direction to connect the outside of the horizontal stem portions STH to the empty spaces inside the horizontal stem portions STH. Like the holes STV_H of the vertical stem portion STV, the holes SHV_H may be arranged only in the vicinity of the net portion BR or may be arranged at a greater density in the vicinity of the net portion BR than in other regions.

In another embodiment, the horizontal stem portions STH may not be utilized as fluid passages, but may only perform the function of connecting between the vertical stem portions STV. In this case, the inside of the horizontal stem portions STH may be filled or may not be spatially connected to the vertical stem portions STV in regions where the horizontal stem portions STH intersect the vertical stem portions STV. In addition, the holes STH_H of the horizontal stem portions STH can be omitted.

When the membrane spacer 153ca includes the vertical stem portions STV and the horizontal stem portions STH as described above, a fluid that passes through the fluid separation membrane 101 can be rapidly discharged to the outside over a shortest distance.

The membrane spacer 153ca may further include the net portion BR in addition to the stem portions ST. The net portion BR may be hollow or filled. The net portion BR has a plurality of openings OPR through which a fluid can pass. Even when the inner walls of the fluid separation membrane 101 come into close contact with each other, the openings OPR secure a certain space between the inner walls of the fluid separation membrane 101.

The net portion BR may be formed in a net shape. For example, the net portion BR may have a twisted net structure. Outer diameters of threads that form a net of the net portion BR may be smaller those of the stem portions ST. Unlike the stem portions ST, the inside of the net portion BR may be filled.

The net portion BR may be disposed in a space between the stem portions ST. In an embodiment, one net portion BR may be disposed in each space defined between the stem portions ST. In this case, each net portion BR may be coupled to adjacent stem portions ST. The net portion BR may be joined and fixed to the stem portions ST using, but not limited to, binding threads or wires or an adhesive.

In another embodiment, the net portion BR may be provided as a single piece. That is, one net portion BR may be disposed over a plurality of spaces defined by the stem portions ST. In this case, the net portion BR may overlap the stem portions ST. While the net portion BR can be joined to the stem portions ST by binding threads, binding wires, an adhesive, or the like, the net portion BR and the stem portions ST can also be placed adjacent to each other without being fixed to each other.

The stem portions ST and the net portion BR of the membrane spacer 153ca may be made of a polymer material such as synthetic resin, nylon or polyester, or a metal material. The stem portions ST and the net portion BR of the membrane spacer 153ca may be made of, but not limited to, the same material.

In the current embodiment, the tubular fluid separation membrane 101 and the membrane spacer 153ca inserted into the tubular fluid separation membrane 101 have been described. However, it will be easily understood by those skilled in the art that a membrane spacer having substantially the same structure as the membrane spacer 153ca can also be placed in a plate-shaped fluid separation membrane module.

Figure 25:
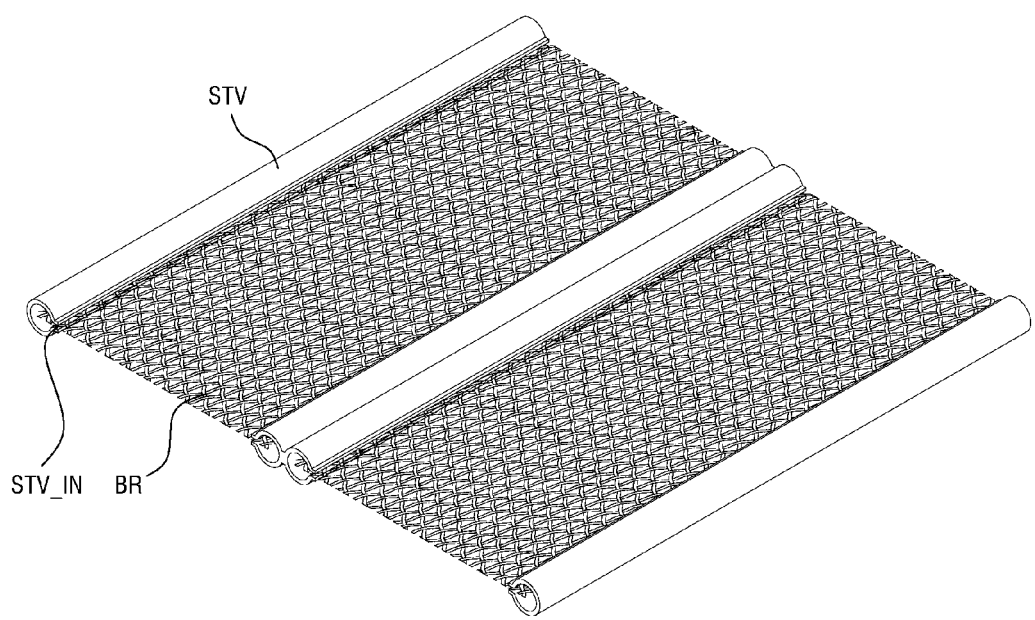
FIG. 25 is a perspective view of a membrane spacer according to another embodiment of the inventive concept.

FIG. 25 is a perspective view of a membrane spacer according to another embodiment of the inventive concept.

Referring to FIG. 25, the membrane spacer 153cb according to the current embodiment is different from the embodiment of FIG. 24 in that a vertical stem portion STV further includes a net insertion opening STV_IN. In addition, horizontal stem portions are omitted in FIG. 25.

The vertical stem portion STV located at edges of the membrane spacer 153cb includes the net insertion opening STV_IN on an inner side of the vertical stem portion STV. The net insertion opening STV_IN extends along a direction in which the vertical stem portion STV extends. The net insertion opening STV_IN is spatially connected to the empty space inside the vertical stem portion STV. A width of the net insertion opening STV_IN may be smaller than an inner diameter of the vertical stem portion STV.

The vertical stem portion STV located at a center of the membrane spacer 153cb may include the net insertion opening STV_IN on both sides. That is, the vertical stem portion STV located at the center is formed by connecting two tubes, and the net insertion opening STV_IN may be disposed on both sides of the vertical stem portion STV. In this case, the vertical stem portion STV located at the center may have two fluid passages.

A net portion BR may be inserted into the net insertion opening STV_IN of an adjacent vertical stem portion STV and may be pressed and fixed by the net insertion opening STV_IN. Although the net portion BR is inserted into the net insertion portion STV_IN of the vertical stem portion STV_IN, a space between the net portion BR and the vertical stem portion STV is not completely closed. Instead, a gap is formed between the net portion BR and the vertical stem portion STV. Therefore, a fluid can enter the vertical stem portion STV through the gap. Although not shown in the drawing, a plurality of holes may also be formed in the vicinity of the net insertion opening STV_IN.

In the current embodiment, a fluid can be rapidly discharged through the empty space inside the vertical stem portion STV, and the net portion BR can be easily coupled to the vertical stem portion STV.

Figure 26:
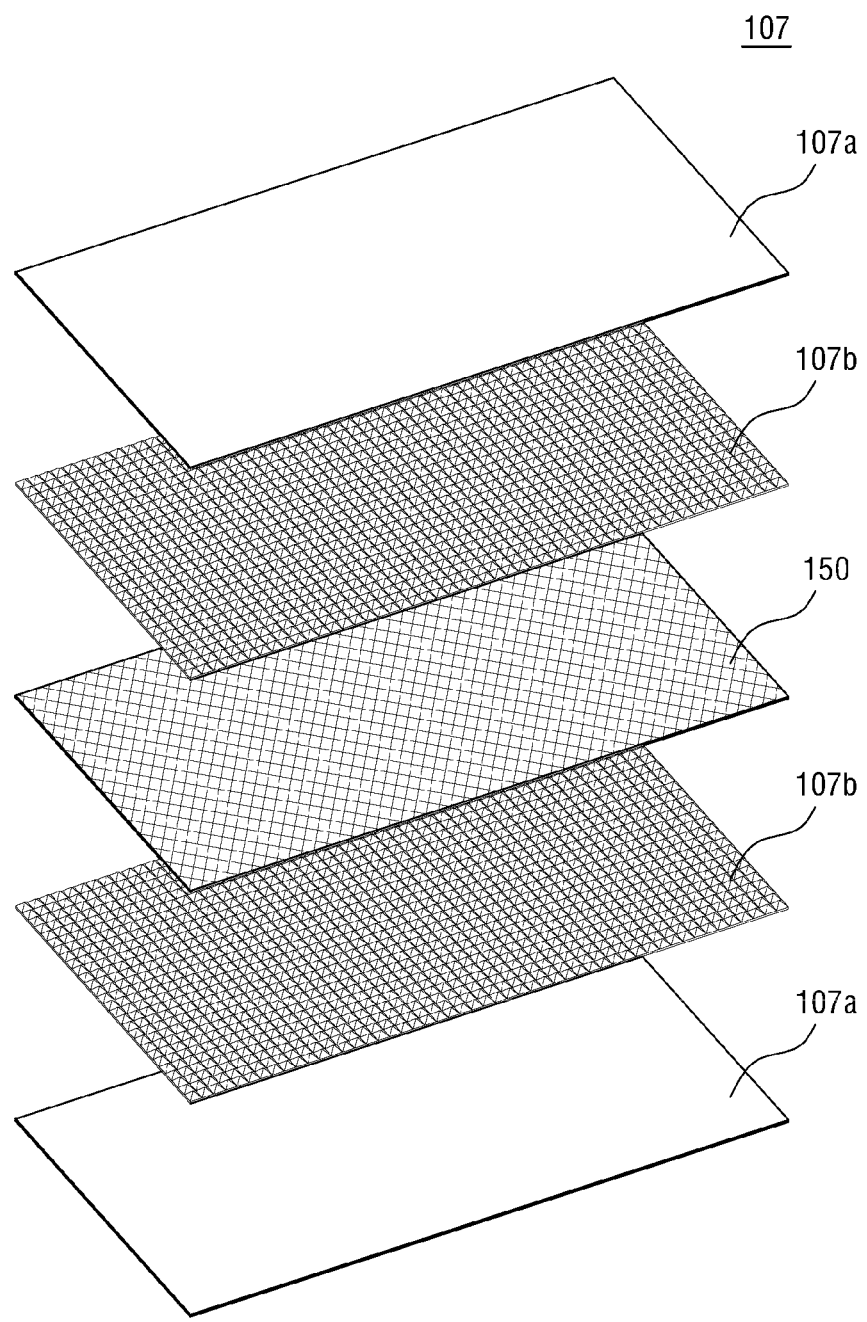
FIG. 26 is an exploded perspective view of a fluid separation membrane and a membrane spacer according to another embodiment of the inventive concept.
Figure 27:
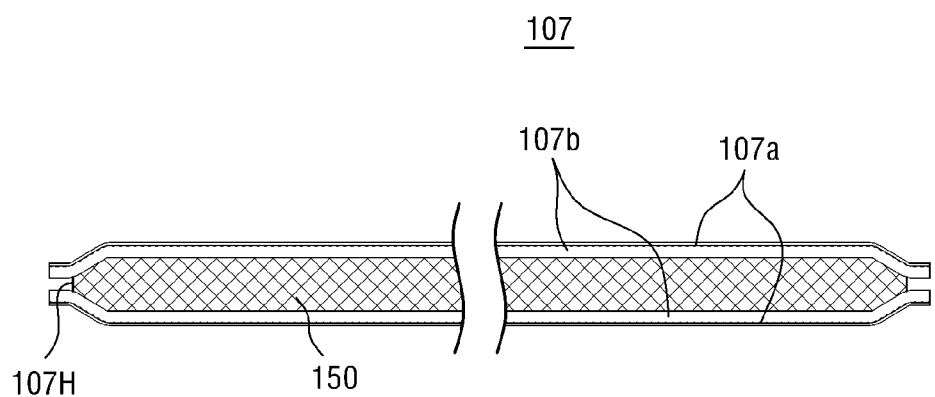
FIG. 27 is a cross-sectional view of the fluid separation membrane and the membrane spacer shown in FIG. 26.

FIG. 26 is an exploded perspective view of a fluid separation membrane and a membrane spacer according to another embodiment of the inventive concept. FIG. 27 is a cross-sectional view of the fluid separation membrane and the membrane spacer shown in FIG. 26.

Referring to FIGS. 26 and 27, the fluid separation membrane 107 according to the current embodiment includes a support membrane 107b and a separation thin membrane 107a.

The support membrane 107b may be made of a porous material having a rough surface. The support membrane 107b may include 50 to 10000 surface irregularities per $cm^2$. The surface irregularities may have a height of 1 to 500 μm.

The support membrane 107b may include a plurality of holes penetrating the support membrane 107b in a thickness direction. A fluid can move from one side to the other side of the support membrane 107b through the holes. The holes may have a size of 1 to 200 μm.

The separation thin membrane 107a is a portion that actually separates a fluid and may be made of silicone rubber described above. The separation thin membrane 107a is disposed on the rough surface of the support membrane 107b.

In an exemplary embodiment, two support membranes 107b and two separation thin membranes 107a are prepared to manufacture one fluid separation membrane 107. The separation thin membranes 107a are placed on outer surfaces of the two support membrane 107b with the two support membranes 107b placed between the separation thin membranes 107a. Then, two facing sides (relatively long vertical sides) of the support membranes 107b are attached and sealed with an adhesive. The remaining two unsealed sides are utilized as vent holes 107H. The overall shape of the fluid separation membrane 107 is tubular.

The membrane spacer 150 may be placed inside the fluid separation membrane 107 as needed. The membrane spacer 150 may be placed between the two support membranes 107b.

In another embodiment, the separation thin membrane 107a may be formed directly on the support membrane 107b. That is, a liquid separation thin membrane material may be coated on the support membrane 107b and then dried and/or cured to form the solid separation thin membrane 107a having a small thickness. In this case, the support membrane 107b and the separation thin membrane 107a directly coated on the support membrane 107b may be treated as a single membrane. When this method is used, the separation thin membrane 107a can be formed much thinner than when the separation thin membrane 107a is formed separately.

Figure 28:
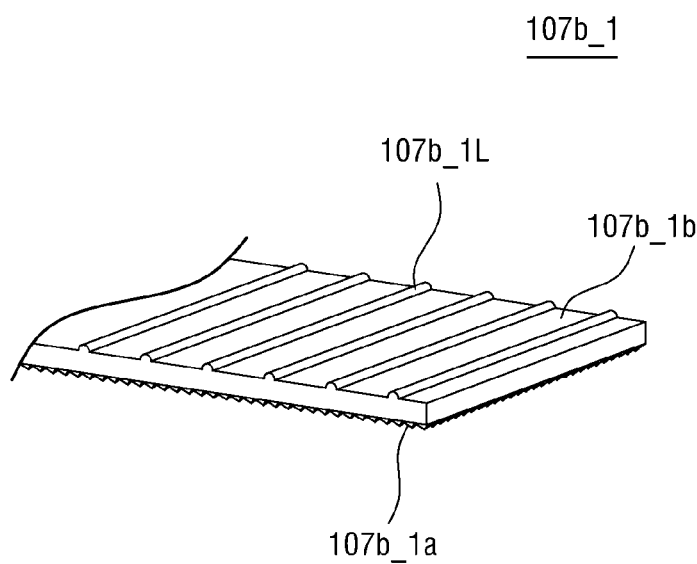
FIG. 28 is a perspective view of a support membrane according to another embodiment of the inventive concept.
Figure 29:
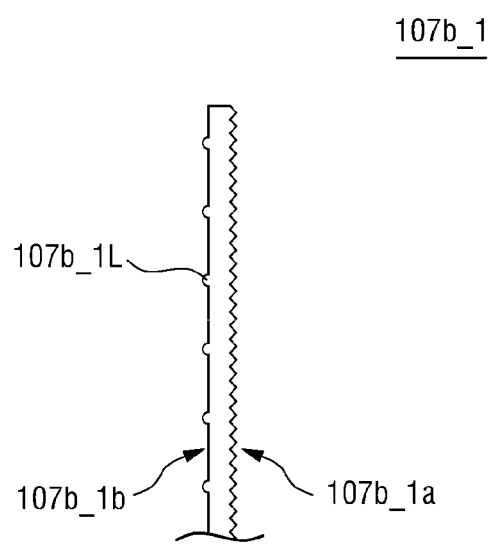
FIG. 29 is a cross-sectional view of the support membrane shown in FIG. 28.

FIG. 28 is a perspective view of a support membrane according to another embodiment of the inventive concept. FIG. 29 is a cross-sectional view of the support membrane shown in FIG. 28.

Referring to FIGS. 28 and 29, the support membrane 107b_1 according to the current embodiment has a first surface 107b_1a and a second surface 107b_1b. The first surface 107b_1a of the support membrane 107b_1 is rough as described above in the embodiment of FIG. 27. On the other hand, the second surface 107b_1b of the support membrane 107b_1 includes line-type protrusions 107b_1L extending in one direction. The rough first surface 107b_1a of the support membrane 107b_1 in a separation membrane 107 is an outer surface on which a separation thin membrane 107a is formed, and the second surface 107b_1b of the support membrane 107b_1 having the protrusions 107b_1L is an inner surface facing the space inside the separation membrane 107.

Inner surfaces of two support membranes 107b_1 included in one separation membrane 107 face each other. The protrusions 107b_1L formed on the second surface 107b_1b of each of the two support membranes 107b_1 facing each other may extend in the same or different directions from the protrusions 107b_1L formed on the second surface 107b_1 of the other support membrane 107b_1.

For example, one of the two facing support membranes 107b_1 may include horizontal protrusions, and the other one may include vertical protrusions intersecting the horizontal protrusions. In this case, a fluid movement space may be secured by the intersecting protrusions and serve as a membrane spacer.

If all the protrusions of the two facing support membranes 107b_1 are horizontal protrusions, a membrane spacer may be needed. Even in this case, a membrane spacer having vertical threads may be selected to secure a fluid movement space. However, the inventive concept is not limited to this case, and various other modifications are possible.

Figure 30:
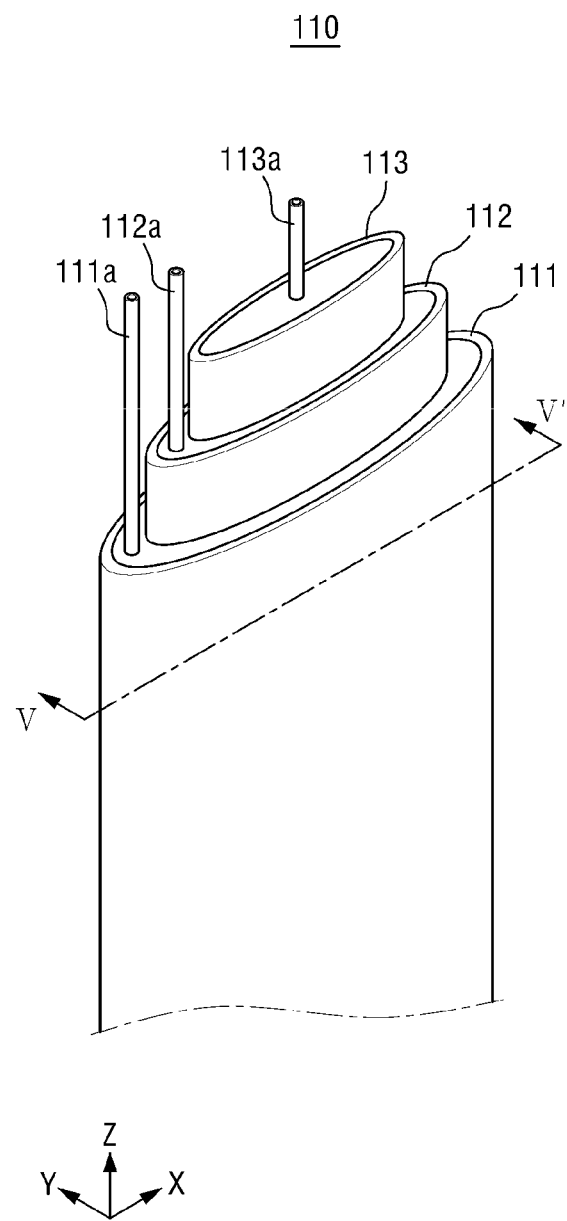
FIG. 30 is a perspective view of a fluid separation membrane according to another embodiment of the inventive concept.

FIG. 30 is a perspective view of a fluid separation membrane according to another embodiment of the inventive concept.

Referring to FIG. 30, the fluid separation membrane 110 generally extends in a direction Z. The fluid separation membrane 110 includes a plurality of separation membranes extending in the direction Z. In FIG. 30, the fluid separation membrane 110 has three separation membranes, i.e., a first separation membrane 111, a second separation membrane 112 and a third separation membrane 113. However, the fluid separation membrane 110 can also have two separation membranes or four or more separation membranes.

Each of the separation membranes 111 through 113 is shaped like a hollow tube. Each of the separation membranes 111 through 113 performs substantially the same function as the above-described fluid separation membrane 100 of FIG. 4.

The first separation membrane 111 is located at an outermost position, the second separation membrane 112 is inserted into the first separation membrane 111, and the third separation membrane 113 is inserted into the second separation membrane 112. Due to this structure, the first separation membrane 111, the second separation membrane 112, and the third separation membrane 113 may be arranged to overlap each other.

If the fluid separation membrane 110 is applied to the embodiment of FIG. 1, the first separation membrane 111 serves as a primary separation membrane that separates a fluid first. The second separation membrane 112 serves as a secondary separation membrane, and the third separation membrane 113 serves as a tertiary separation membrane. If the fluid separation membrane 110 is applied to the embodiment of FIG. 2, a mixed fluid is injected into the third separation membrane 113. In this case, the third separation membrane 113 serves as a primary separation membrane that separates the fluid first. Also, the second separation membrane 112 serves as a secondary separation membrane, and the first separation membrane 111 serves as a tertiary separation membrane. A case where the fluid separation membrane 110 is applied to the embodiment of FIG. 1 will hereinafter be described as an example.

The first through third separation membranes 111 through 113 may be made of the material of the fluid separation membrane 100 of FIG. 4. The first through third separation membranes 111 through 113 may be made of the same material or different materials.

Respective ends of the first through third separation membranes 111 through 113 in a length direction may be sealed with silicone or an adhesive, and a first separated fluid discharge pipe 111a, a second separated fluid discharge pipe 112a, and a third separated fluid discharge pipe 113a may be installed at the sealed ends. However, the inventive concept is not limited to this case, and the first through third separated fluid discharge pipes 111a through 113a can also be respectively installed in walls of the separation membranes 111 through 113 instead of the sealed ends, and respective ends of the first through third separation membranes 111 through 113 can be open.

Figure 31:
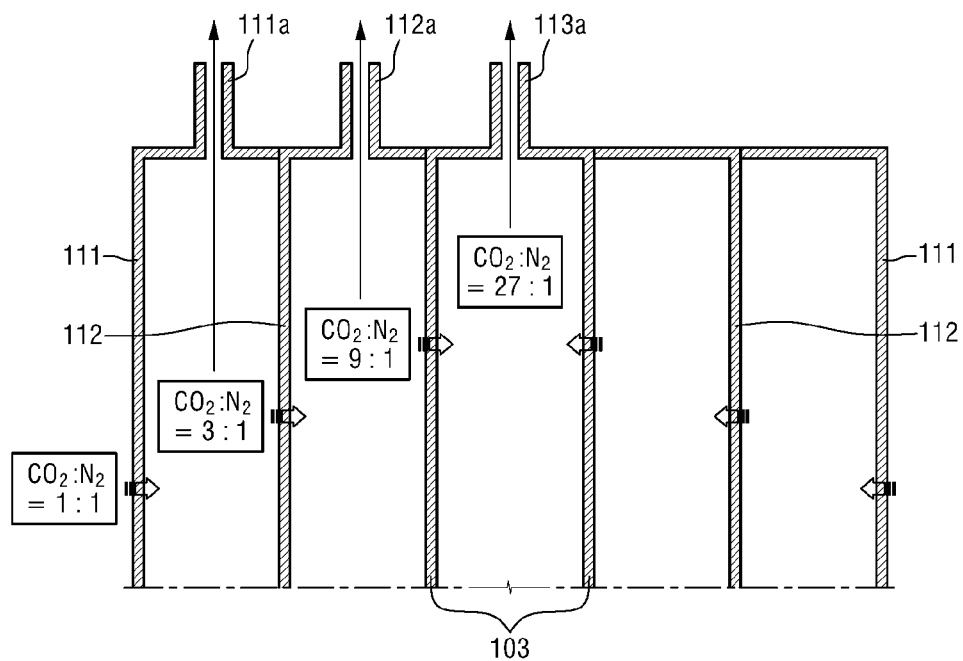
FIG. 31 is a cross-sectional view taken along the line XXXI-XXXI' of FIG. 30.

FIG. 31 is a cross-sectional view taken along the line XXXI-XXXI' of FIG. 30 and is a cross-sectional view for explaining the mechanism of separating a highly concentrated fluid using a fluid separation membrane. In FIG. 31, a process in which a specific fluid is separated through multiple stages in the fluid separation membrane 110 is shown based on the assumption that the first through third separation membranes 111 through 113 are all made of silicone rubber in which the selectivity of carbon dioxide and nitrogen is 3:1. Referring to FIG. 31, when a mixed gas containing carbon dioxide and nitrogen in a ratio of 1:1 is injected to the outside of the fluid separation membrane 110, the mixed gas passes through the first separation membrane 111 according to the selectivity. As a result, the content ratio of carbon dioxide and nitrogen in a firstly separated gas inside the first separation membrane 111 becomes approximately 3:1. If the firstly separated gas passes through the second separation membrane 112, the content ratio of carbon dioxide and nitrogen in a secondly separated gas inside the second separation membrane 112 becomes approximately 9:1. Similarly, if the secondly separated gas passes through the third separation membrane 113, the content ratio of carbon dioxide and nitrogen in a thirdly separated gas inside the third separation membrane 113 becomes approximately 27:1. Therefore, in the third separation membrane 113, carbon dioxide far more highly concentrated than the selectivity of an individual selection membrane can be obtained.

To facilitate the movement of a fluid from the outside of the first separation membrane 111 to the inside of the third separation membrane 113, a predetermined pressure difference may be maintained between the outside of the first separation membrane 111 and the inside of the third separation membrane 113. For example, the inside of the third separation membrane 113 may be adjusted to have a relatively lower pressure than the outside of the first separation membrane 111 by a pressurizing pump or a negative pressure pump. The pressure of a gas may be reduced sequentially from the outside of the first separation membrane 111 to the inside of the first separation membrane 111, the inside of the second separation membrane 112, and the inside of the third separation membrane 113 in this order.

As described above, the first through third separated fluid discharge pipes 111a through 113a are installed at the ends of the first through third separation membranes 111 through 113. Therefore, separated gases having different content ratios can be obtained. A gas separated by each of the separation membranes 111 through 113 may be re-circulated or stored in a separate chamber.

An outer diameter of each of the separation membranes 111 through 113 when each of the separation membranes 111 through 113 is adjusted to be circular may be selected within the range of 60 to 500 mm.

When each of the separation membranes 111 through 113 is adjusted to have a circular cross-section, the outer diameter of the first separation membrane 111 may be larger than the outer diameter of the second separation membrane 112, and the outer diameter of the second separation membrane 112 may be larger than the outer diameter of the third separation membrane 113. When the outer diameter of a separation membrane located on an outer side is large, a smaller separation membrane can be easily inserted into the separation membrane. However, the inventive concept is not limited to this case, and the outer diameters of the first through third separation membranes 111 through 113 can be equal. Alternatively, the outer diameter of a separation membrane inserted into another separation membrane may be larger than the outer diameter of the another separation membrane. In this case, the separation membrane disposed inside the another separation membrane may be more crumpled or have more surface wrinkles than the another separation membrane.

Figure 32:
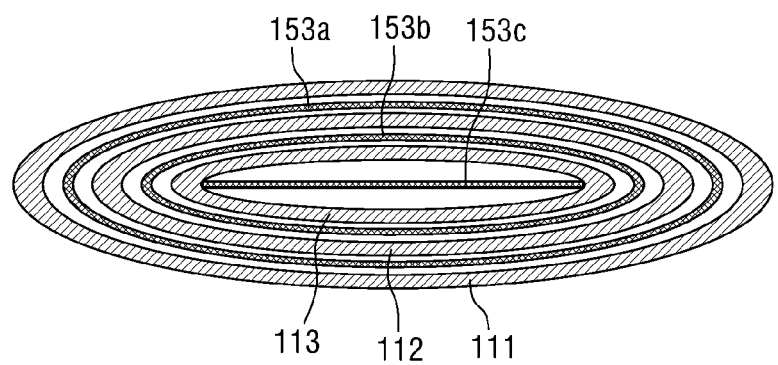
FIG. 32 is a cross-sectional view showing a membrane spacer inserted into the fluid separation membrane of FIG. 30.

FIG. 32 is a cross-sectional view showing a membrane spacer inserted into the fluid separation membrane of FIG. 30.

Referring to FIG. 32, since the fluid separation membrane 110 according to the current embodiment includes the separation membranes 111 through 113 overlapping each other, a plurality of membrane spacers may each be inserted between the separation membranes 111 through 113. For example, the membrane spacers may include a first membrane spacer 153a, a second membrane spacer 153b, and a third membrane spacer 153c.

The first membrane spacer 153a is disposed inside the first separation membrane 111 and at the same time outside the second separation membrane 112 to prevent the first separation membrane 111 and the second separation membrane 112 from coming into complete contact with each other. The second membrane spacer 153b is disposed inside the second separation membrane 112 and at the same time outside the third separation membrane 113 to prevent the second separation membrane 112 and the third separation membrane 113 from coming into complete contact with each other. The third membrane spacer 153 is disposed inside the third spacer 113 to prevent the inner walls of the third separation membrane 113 from coming into complete contact with each other.

A space in which each of the first membrane spacer 153a and the second membrane spacer 153b is disposed is shaped like a donut-shaped hollow closed curve. Therefore, like the first through third separation membranes 111 through 113, the first membrane spacer 153a and the second membrane spacer 153b may be formed in a tubular shape whose cross-section forms a closed curve, as shown in FIG. 32. On the other hand, since the third membrane spacer 153c is disposed in a circular or elliptical empty space, it may be formed in a plate-like shape as shown in FIG. 32.

However, the inventive concept is not limited to the above example, and the third membrane spacer 153c can also be formed in a tubular shape. In this case, inner walls of the tubular third membrane spacer 153c may be in close contact with each other and thus may not substantially define an internal through hole. In this case, the third membrane spacer 153c may perform a spacing function substantially similar to that of a pair of plate-shaped membrane spacers.

The first membrane spacer 153a and the second membrane spacer 153b can also have a plate-like shape instead of a tubular shape. In this case, a plate-shaped spacer may naturally be rolled into a tubular shape as it fills a donut-shaped empty space. Both ends of the plate-shaped spacer may come into contact with each other or at least partially overlap each other as the plate-shaped spacer is rolled into a tubular shape, or may be separated from each other. In some cases, two or more membrane spacers may be placed in the direction of rolling into a tubular shape.

The plate-shaped third membrane spacer 153 may be inserted into the third separation membrane 113 having a circular cross-section narrower than the third membrane spacer 153. Accordingly, the cross-section of the third separation membrane 113 may change to a distorted or elliptical shape with a longer diameter in one direction. If the third separation membrane 113 having the elliptical cross-sectional shape due to the third membrane spacer 153 inserted into the third separation membrane 113 is inserted into each of the second separation membrane 112 and the first separation membrane 111, cross-sections of the second separation membrane 112 and the first separation membrane 111 may also become distorted or elliptical.

In the current embodiment, since the fluid separation membrane 110 includes the overlapping separation membranes 111 through 113, a highly concentrated fluid can be separated in a simple way.

Hereinafter, a fluid separation membrane module and a fluid separation apparatus including the fluid separation membranes according to the various embodiments of the inventive concept described above will be described.

Figure 33:
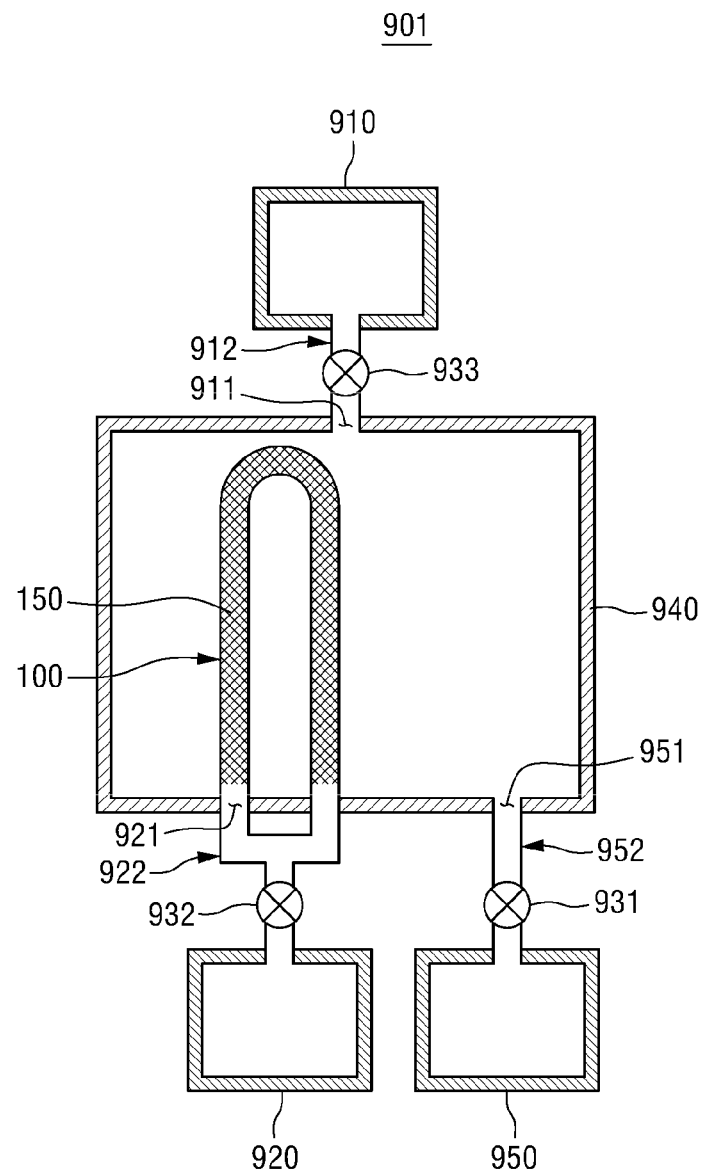
FIG. 33 is a schematic view of a fluid separation apparatus according to another embodiment of the inventive concept.

FIG. 33 is a schematic view of a fluid separation apparatus according to another embodiment of the inventive concept.

Referring to FIG. 33, the fluid separation apparatus 901 according to the current embodiment includes a chamber 940, a fluid separation membrane 100 which is disposed inside the chamber 940, a spacer 150 which is inserted into the fluid separation membrane 100, a fluid inlet 951 and second fluid outlets 922 which are disposed on a side of the chamber 940 and a first fluid outlet 911 which is disposed on the other side of the chamber 940 and further includes a fluid mixture providing tank 950 which is disposed outside the chamber 940, a residual fluid storage tank 910, a separated fluid storage tank 920, and a plurality of pumps 931 through 933.

The fluid mixture providing tank 950 stores a fluid mixture and provides the stored fluid mixture into the chamber 940. The fluid mixture providing tank 950 is connected to the fluid inlet 951 by a first fluid carrying pipe 952. A first pump 931 is installed in the first fluid carrying pipe 952.

The separated fluid storage tank 920 stores a fluid introduced into the fluid separation membrane 100. The residual fluid storage tank 920 is spatially connected to the inside of the fluid separation membrane 150 by a second fluid carrying pipe 922. A second pump 932 is installed in the second fluid carrying pipe 922.

In the embodiment of FIG. 33, two second fluid outlets 921 are provided in the chamber 940, and the fluid separation membrane 100 having both ends open is bent once. The second fluid carrying pipe 922 branches into two branch pipes in the vicinity of the chamber 940, and the branch pipes of the second fluid carrying pipe 922 are inserted into the second fluid outlets 921, respectively. Both ends of the fluid separation membrane 100 are coupled to the different branch pipes of the second fluid carrying pipe 922, respectively.

The residual fluid storage tank 910 stores a fluid remaining outside the fluid separation membrane 100 as well as inside the chamber 940. The residual fluid storage tank 910 is connected to the first fluid outlet 911 by a third fluid carrying pipe 912. A third pump 933 may be installed in the third fluid carrying pipe 912.

In some embodiments, the first fluid outlet 911 is disposed above the fluid inlet 951. In this case, a mixed fluid flows in an upward direction.

The first pump 931 increases the pressure of a fluid mixture introduced into the chamber 940. When the pressure inside the chamber 940 is increased, a pressure difference occurs between the inside and the outside of the fluid separation membrane 100, thus promoting the flow of a fluid through the fluid separation membrane 100. However, if too high a pressure is applied, not only the process cost is increased, but also the flow rate of the fluid is excessively increased. Thus, the amount of fluid passing through the fluid separation membrane 100 may be reduced. In view of these points, a suitable fluid pressure applied to the inside of the chamber 940 by the first pump 931 may be 0 to 4 kgf/cm$^2$.

The second pump 932 maintains the pressure difference between the inside and the outside of the fluid separation membrane 100 by applying negative pressure to the inside of the fluid separation membrane 100 and efficiently discharges a fluid present in the fluid separation membrane to the separated fluid storage tank 920. The rapid discharge of a fluid present in the fluid separation membrane 100 not only increases the process speed but also allows the concentration of a specific fluid inside the fluid separation membrane 100 to be kept low. Keeping the concentration of a specific fluid low in the fluid separation membrane 100 is advantageous for enhancing the efficiency of fluid movement by diffusion or osmotic pressure. The pressure applied by the second pump 932 may be in the range of 0 to −1 kgf/cm$^2$.

A pressure difference of about 0.5 kgf/cm$^2$ between the inside and outside of the fluid separation membrane 100 can lead to commercially available separation efficiency. For example, when the pressure applied by the first pump 931 is 0.5 kg/cm$^2$ and the negative pressure applied by the second pump 932 is maintained at about −0.5 kgf/cm², commercially available separation efficiency can be obtained. If the pressure difference between the inside and outside of the fluid separation membrane 100 is greater than the above level, the separation efficiency may be improved, but the processing cost may also increase due to the use of high energy. The pressure difference which is commercially available in view of the processing cost and enables effective separation may be maintained in the range of 0.5 to 2 kgf/cm² between the inside and outside of the fluid separation membrane 100.

The third pump 933 rapidly discharges a fluid remaining in the chamber 940 to the outside. When a specific fluid in a fluid mixture injected into the chamber 940 moves into the fluid separation membrane 100 through the fluid separation membrane 100, the concentration of the specific fluid in the remaining fluid mixture becomes low. If the remaining fluid mixture is left in the chamber 940 for a long time, the efficiency of separation into the fluid separation membrane is reduced, and the probability that the specific fluid will move back from the fluid separation membrane 100 to the chamber 940 increases. Rapidly discharging the residual fluid at an appropriate timing has a great effect on the process efficiency. Therefore, when the third pump 933 applies a pressure of about 0 to 2 kgf/cm², the residual fluid can be appropriately discharged. However, the current embodiment is not limited to this case, and the third pump 933 can be omitted or replaced by a valve.

If a separated fluid discharged through the first fluid outlet 911 or the second fluid outlets 921 of the fluid separation apparatus 901 is not to be stored, a storage tank for the separated fluid can be omitted. For example, in a case where carbon dioxide is to be separated from a mixed gas of nitrogen and carbon dioxide and where a material having high selectivity to carbon dioxide is used as the fluid separation membrane 100, a fluid having a high carbon dioxide content discharged through the second fluid outlets 921 is stored in the separated fluid storage tank 920, but a fluid having a high nitrogen content discharged through the first fluid outlet 911 may be output to the outside through an exhaust stack. In this case, the residual fluid storage tank 910 may be omitted.

During the fluid separation process, the temperature inside the chamber 940 may be maintained in the range of 0 to 60° C. In an exemplary embodiment, the temperature inside the chamber 940 is maintained in the range of 20 to 40° C. Such a relatively low temperature condition can help to reduce costs, maintain the durability of the inside of the chamber 940 and the fluid separation membrane 100, and suppress unwanted reactions of fluids inside the chamber 940.

Figure 34:
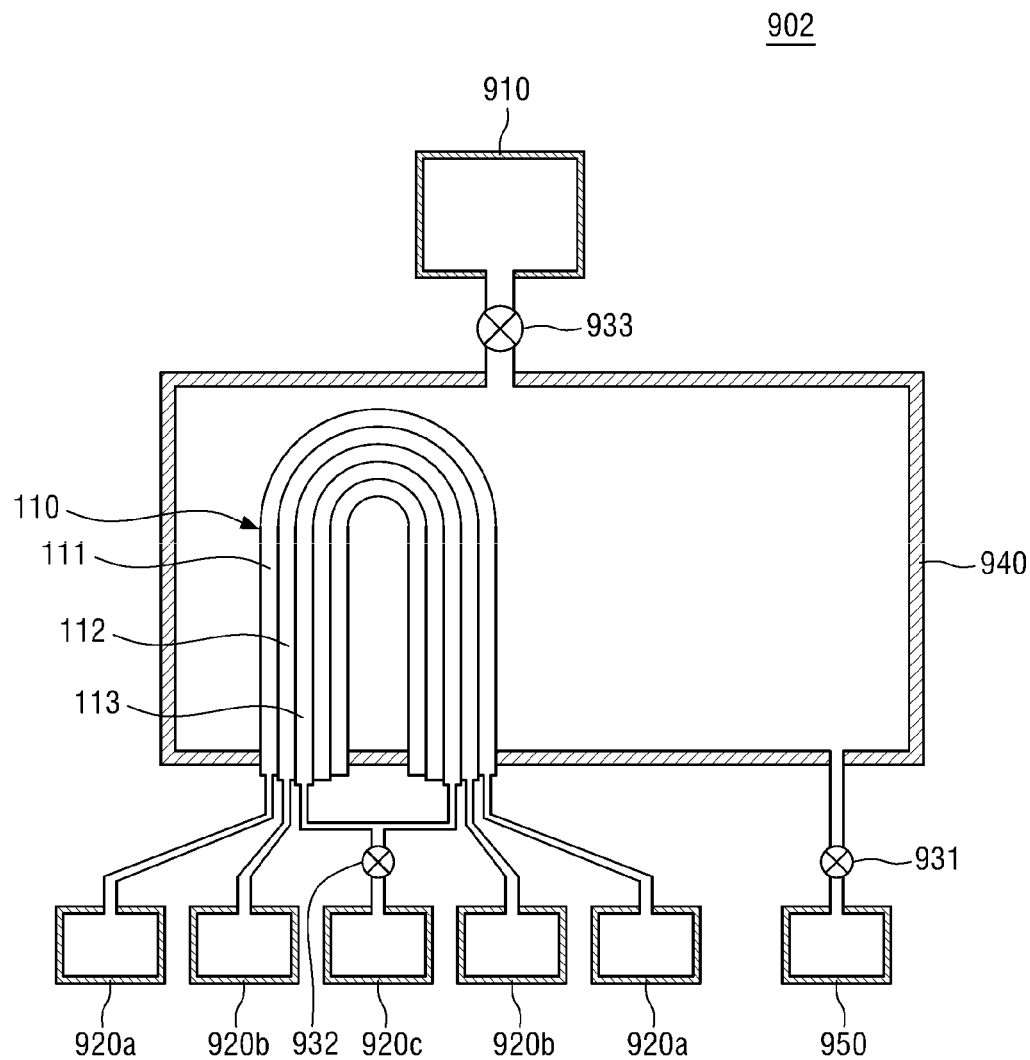
FIG. 34 is a schematic view of a fluid separation apparatus according to another embodiment of the inventive concept.

FIG. 34 is a schematic view of a fluid separation apparatus according to another embodiment of the inventive concept. The fluid separation apparatus 902 of FIG. 34 employs the fluid separation membrane 110 of FIG. 30 instead of the fluid separation membrane 100 of the fluid separation apparatus 901 of FIG. 33.

Therefore, the fluid separation apparatus 902 according to the current embodiment may include a first separated fluid storage tank 920a, a second separated fluid storage tank 920b, and a third separated fluid storage tank 920c. The first separated fluid storage tank 920a stores a firstly separated fluid introduced to the inside of a first separation membrane 111 and the outside of a second separation membrane 112 through the first separation membrane 111. The second separated fluid storage tank 920b stores the secondarily separated fluid introduced to the inside of the second separation membrane 112 and the outside of a third separation membrane 113 through the second separation membrane 112. The third separated fluid storage tank 920c stores the thirdly separated fluid introduced into the third separation membrane 113 through the third separation membrane 113. A second pump 932 is installed between the third separation membrane 113 and the third separated fluid storage tank 920c.

Other components are substantially the same as those of the embodiment of FIG. 33, and thus a redundant description of the components will be omitted.

Figure 35:
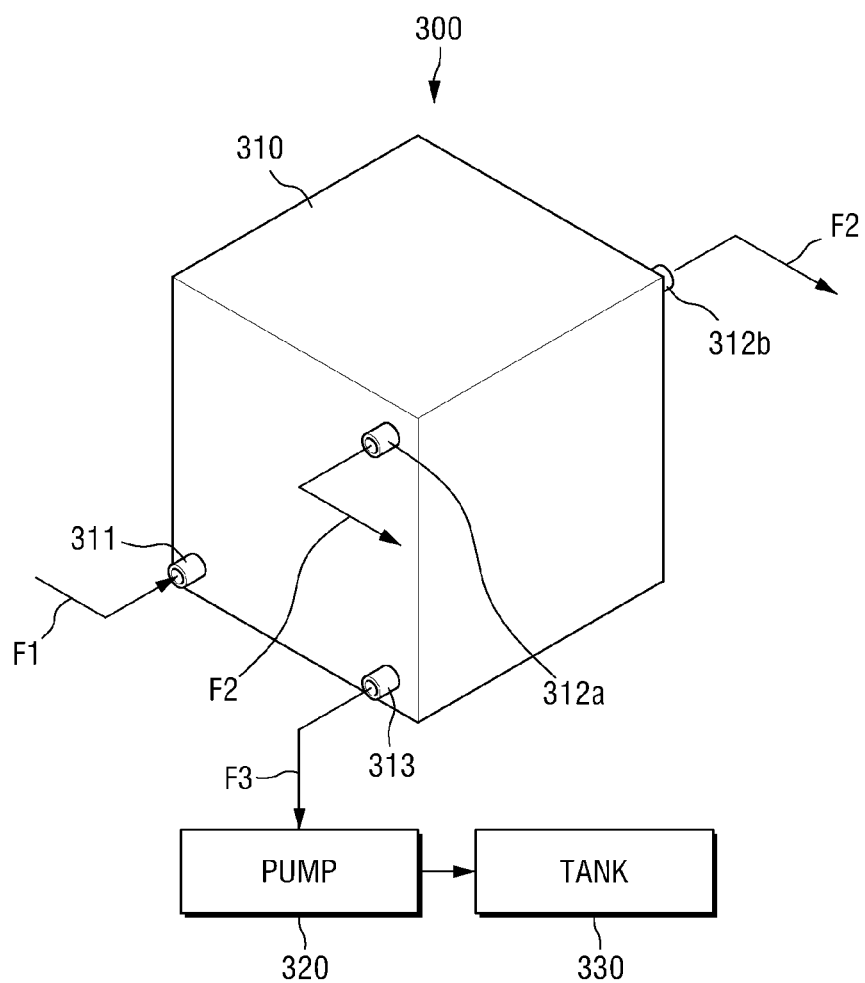
FIG. 35 is a schematic view of a fluid separation apparatus according to another embodiment of the inventive concept.

FIG. 35 is a schematic view of a fluid separation apparatus according to another embodiment of the inventive concept.

Referring to FIG. 35, the fluid separation apparatus 300 according to the embodiment of the inventive concept includes a chamber 310 having a mixed fluid inlet 311, residual fluid outlets 312a and 312b, and a separated fluid outlet 313.

The mixed fluid inlet 311 forms part of a first flow path F1 along which a mixed fluid flows into the chamber 310.

The first flow path F1 may be connected to a tank (not shown) which stores a mixed gas and a pump (not shown) which causes the mixed gas to flow toward the mixed fluid inlet 311.

A fluid separation unit 140 (see FIG. 36) is provided in the chamber 310. The fluid separation unit 140 separates carbon dioxide, which is a fluid to be separated, from a mixed gas introduced into the chamber 310 through the mixed fluid inlet 311. The fluid separation unit 140 separates at least a portion of carbon dioxide from the mixed gas inside the chamber 310. A gas separated from the mixed gas by the fluid separation unit 140 can contain other gases in addition to carbon dioxide.

The gas separated from the mixed gas by the fluid separation unit 140 is discharged to the outside of the chamber 310 through the separated fluid outlet 313 that forms part of a second flow path F3.

The residual fluid outlets 312a and 312b form a third flow path F2 along which the residual gas inside the chamber 310 flows to the outside of the chamber 310. The residual gas denotes a gas that has not been separated by the fluid separation unit 140 from the mixed gas introduced into the chamber 310. The third flow path F2 may be connected to a tank (not shown) that collects the residual gas discharged to the outside of the chamber 310.

Since the fluid separation apparatus 1 according to the current embodiment can use a plurality of chambers 310 stacked on each other, the mixed fluid inlet 311, the residual fluid outlets 312a and 312b, and the separated fluid outlet 313 may be formed on a side surface, a front surface, or a rear surface of the chamber 310, as shown in FIG. 35.

In addition, as shown in FIG. 35, the residual fluid outlets 312a and 312b may be formed on the front surface and the rear surface of the chamber 310, respectively. Depending on the installation environment of the chamber 310, the residual fluid outlets 312a and 312b respectively formed on the front surface and the rear surface of the chamber 310 may be all used, or only one of them may be used. For example, when it is difficult to install a pipe for forming the third flow path F2 on the rear surface of the chamber 310 due to characteristics of the installation place of the chamber 310, a residual gas may be discharged only through the residual fluid outlet 312a formed on the front surface of the chamber 310.

Although not shown, the mixed fluid inlet 311 and/or the separated fluid outlet 313 can also be formed on the front and rear surfaces of the chamber 310, respectively.

As shown in FIG. 35, the second flow path F3 may be connected to a pump 320 and a tank 330.

The pump 320 maintains the second flow path F3 and a space connected to the second flow path F3 in a negative pressure atmosphere. The negative pressure atmosphere formed by the pump 320 causes a gas separated by the fluid separation unit 140 to be discharged out of the chamber 310 more smoothly. In addition, the negative pressure atmosphere formed by the pump 320 creates a pressure difference between the mixed gas and the separated gas, thereby promoting a series of processes in which carbon dioxide is separated from a mixed gas.

The separated gas discharged out of the chamber 310 through the second flow path F3 is collected in the tank 330.

Figure 36:
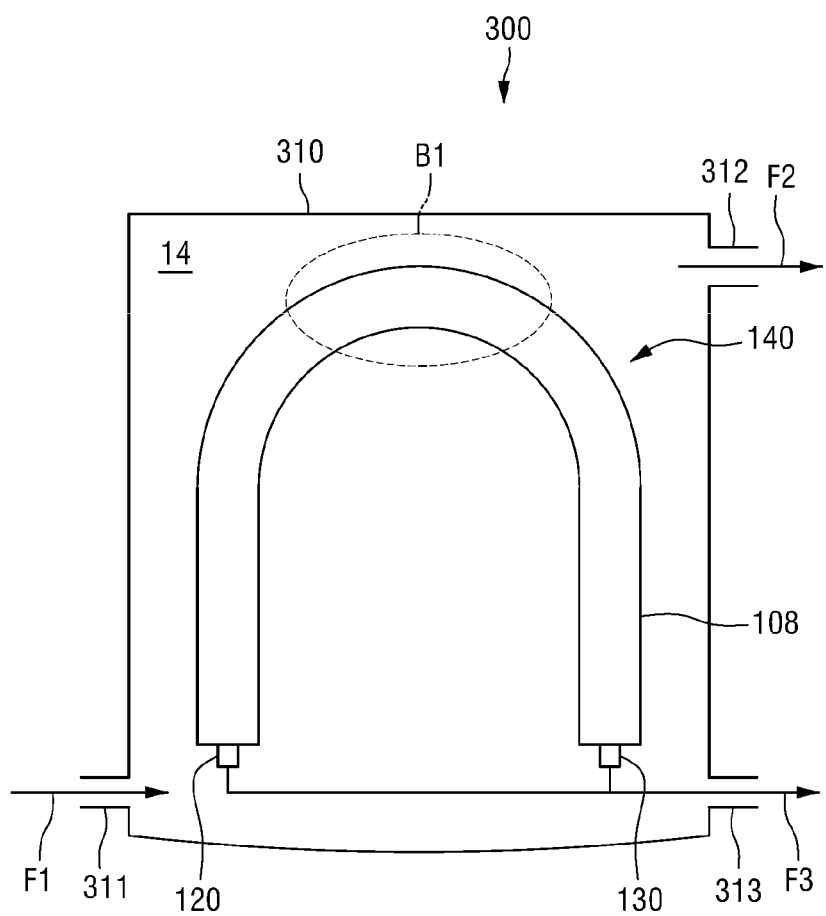
FIG. 36 is a schematic view showing the internal configuration of a chamber of the fluid separation apparatus of FIG. 35.

FIG. 36 is a schematic view showing the internal configuration of the chamber of the fluid separation apparatus of FIG. 35.

Referring to FIG. 36, the fluid separation unit 140 of the fluid separation apparatus 300 includes a fluid separation membrane 108 installed in the chamber 310 to have a bending region B1 bent in a U shape toward a lower part of the chamber 310.

The fluid separation membrane 108 may be a tubular fluid separation membrane among the fluid separation membranes according to the various embodiments described above.

As shown in FIG. 36, both ends of the fluid separation membrane 108 are connected to the second flow path F3. For easy connection of both ends of the fluid separation membrane 108 to the second flow path F3, adapting tubes 120 and 130 having inner and outer diameters smaller than an inner diameter of the fluid separation membrane 108 may be provided at both ends of the fluid separation membrane 108, respectively, as shown in FIG. 36.

The space inside the chamber 310 is divided into a first space composed of the internal space of the fluid separation membrane 108 and the second flow path F3 and a second space connected to the first flow path F1 and the third flow path F2.

Since the second flow path F3 connected to the pump 320 receives negative pressure from the pump 320, a negative pressure atmosphere is formed in the first space connected to the second flow path F3. A negative pressure atmosphere of about −1 bar or more may be formed in the internal space of the fluid separation membrane 108 which forms part of the first space.

Unlike the first space, the second space in the chamber 310 which is connected to the first flow path F1 and the third flow path F2 may have a positive pressure atmosphere. To form the positive pressure atmosphere in the first space, a compression pump (not shown) for compressing a mixed gas may be connected to the first flow path F1 along which the mixed gas is supplied. A positive pressure atmosphere of 0 to 4 bar may be formed in the first space.

A mixed gas introduced into the chamber 310 through the mixed fluid inlet 311 along the first flow path F1 flows toward the residual fluid outlet 12 while contacting the fluid separation membrane 108. The mixed fluid inlet 311 and the residual fluid outlet 12 may be separated from each other in a diagonal direction of the chamber 310, so that the mixed gas can be evenly distributed throughout the chamber 310.

In addition, when the mixed gas has the property of spreading by rising upward in the atmosphere, the mixed fluid inlet 311 may be formed in the lower part of the chamber 310, and the residual fluid outlet 12 may be formed in an upper part of the chamber 310 as shown in FIG. 36. Conversely, when the mixed gas has the property of spreading by descending in the atmosphere, the mixed fluid inlet 311 may be formed in the upper part of the chamber 310, and the residual fluid outlet 12 may be formed in the lower part of the chamber 310.

The fluid separation membrane 108 may contact the mixed gas within the chamber 310 and separate carbon dioxide from the mixed gas by allowing carbon dioxide contained in the mixed gas to permeate into the space inside the fluid separation membrane 108. This is possible due to the characteristics of silicone which is a main component of the fluid separation membrane 108 as described above and the carbon dioxide selectivity of silicone.

In addition, since the positive pressure atmosphere is formed in the first space (outside the fluid separation membrane 108) within the chamber 310 in which the mixed gas exists and the negative pressure atmosphere is formed in the space inside the fluid separation membrane 108, carbon dioxide can be smoothly passed from the mixed gas into the fluid separation membrane 108 by the pressure difference between the inside and the outside of the fluid separation membrane 108.

Meanwhile, as shown in FIG. 36, the fluid separation membrane 108 according to the current embodiment is installed in the chamber 310 to have the U-shaped bending region B1.

As shown in FIG. 36, the fluid separation membrane 108 installed to have the bending region B1 bent once and a U-shape as a whole has a wider contact area with a mixed gas than a separation tube installed in a straight line although the separation tube installed in the straight line has the same inner and outer diameters as those of the U-shaped fluid separation membrane 108. Therefore, the efficiency of carbon dioxide separation is improved.

In addition, it is easier to install one fluid separation membrane 108 by bending the fluid separation membrane 108 once as shown in FIG. 36 than to install two fluid separation membranes 107 in a straight line. Therefore, the work of installing the fluid separation membrane 108 in the chamber 310 can be simplified.

Furthermore, when a fluid separation membrane is installed in a straight line, both ends of the fluid separation membrane exist in the upper part and the lower part of the chamber 310, respectively. Therefore, the connection structure between both ends of the fluid separation membrane and the second flow path F3 is complicated. On the other hand, when the fluid separation membrane 108 is installed to have the bending region B1 bent once and a U shape as a whole as shown in FIG. 36, both ends of the fluid separation membrane 108 exist in the lower part of the chamber 310. Therefore, the connection structure between both ends of the fluid separation membrane 108 and the second flow path F3 is relatively simple.

In FIG. 36, both ends of the fluid separation membrane 108 are connected to the second flow path F3 so as to separate carbon dioxide from a mixed gas by allowing carbon dioxide contained in the mixed gas to permeate into the space inside the fluid separation membrane 108. However, both ends of the fluid separation membrane 108 can also be connected to the first flow path F1 and the third flow path F2, respectively, so that the mixed gas can move into the space inside the fluid separation membrane 108, while carbon dioxide contained in the mixed gas permeates out of the fluid separation membrane 108.

Figure 37:
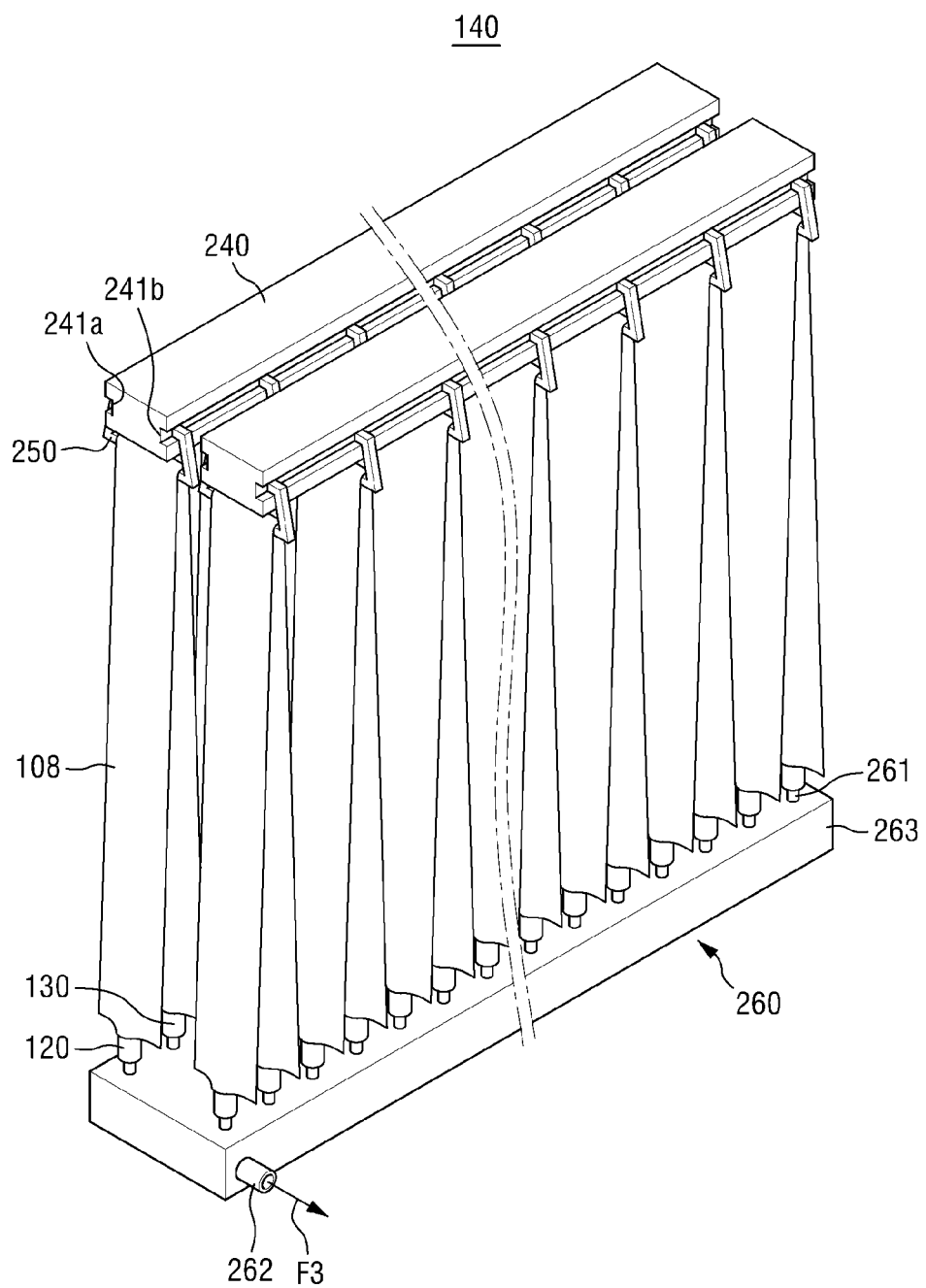
FIG. 37 is a perspective view of a fluid separation unit shown in FIG. 36.

FIG. 37 is a perspective view of the fluid separation unit shown in FIG. 36.

Referring to FIG. 37, the fluid separation unit 140 according to the current embodiment includes a plurality of fluid separation membranes 108, a separation tube holding part (240 and 250) which supports the fluid separation membranes 108, and a separated fluid collecting part 260 which receives a gas separated from a mixed gas by the fluid separation membranes 108.

As shown in FIG. 37, the fluid separation membranes 108 may be arranged in two columns. The separation tube holding part (240 and 250) includes a hanger holder 240 provided in each column of the fluid separation membranes 108 and a plurality of separation tube hangers 250 supported by the hanger holder 240.

Figure 38:
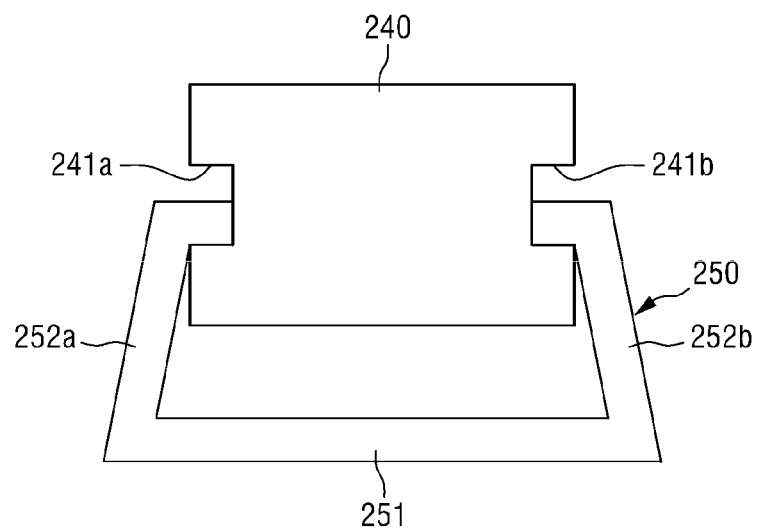
FIG. 38 is a front view showing the coupling relationship between a separation tube hanger and a hanger holder of FIG. 37.

FIG. 38 is a front view showing the coupling relationship between the separation tube hanger and the hanger holder of FIG. 37.

Referring to FIGS. 37 and 38, each separation tube hanger 250 supports a central portion of a fluid separation membrane 108 to keep the fluid separation membrane 108 bent in a U shape.

Each separation tube hanger 250 includes a support portion 251 which supports one point in the fluid separation membrane 108 and a pair of hook portions 252*a* and 252*b* which extend upward from both ends of the support portion 251. The pair of hook portions 252*a* and 252*b* may extend in a direction approaching each other, so that the separation tube hanger 250 forms a C shape as a whole.

As shown in FIGS. 37 and 38, the hanger holder 240 is shaped like a bar extending in a direction, and receiving portions 241*a* and 242*b*, which support ends of the hook portions 252*a* and 252*b* of the separation tube hanger 250, are formed on both sides of the hanger holder 240 to be recessed into the hanger holder 240. The receiving portions 241*a* and 242*b* also extend along a direction.

While a separation tube hanger 250 is supporting a fluid separation membrane 108 such that the fluid separation membrane 108 is bent in a U shape, the ends of the hook portions 252*a* and 252*b* of the separation tube hanger 250 are inserted into front ends of the receiving portions 241*a* and 242*b* of the hanger holder 240, respectively. Then, the inserted ends of the hook portions 252*a* and 252*b* are slid toward a rear end of the hanger holder 240 along the receiving portions 241*a* and 242*b*. In this way, a plurality of separate tube hangers 250 are arranged in a line in the hanger holder 240, as shown in FIG. 37. Here, the fluid separation membranes 108 may be arranged such that a gap between the fluid separation membranes 108 is equal to or greater than a thickness of each of the fluid separation membranes 108 and is equal to or smaller than a diameter or width of each of the fluid separation membranes 108. For example, the gap between the fluid separation membranes 108 may be set within the range of 0.1 to 500 mm. When the gap between the fluid separation membranes 108 is smaller than 0.1 mm, the fluid separation membranes 108 may come into close contact with each other, thereby reducing effective surface areas of the fluid separation membranes 108. When the gap between the fluid separation membranes 108 exceeds 500 mm, the number of the fluid separation membranes 108 installed in the chamber 310 is reduced more than necessary. This reduces fluid separation efficiency.

Figure 39:
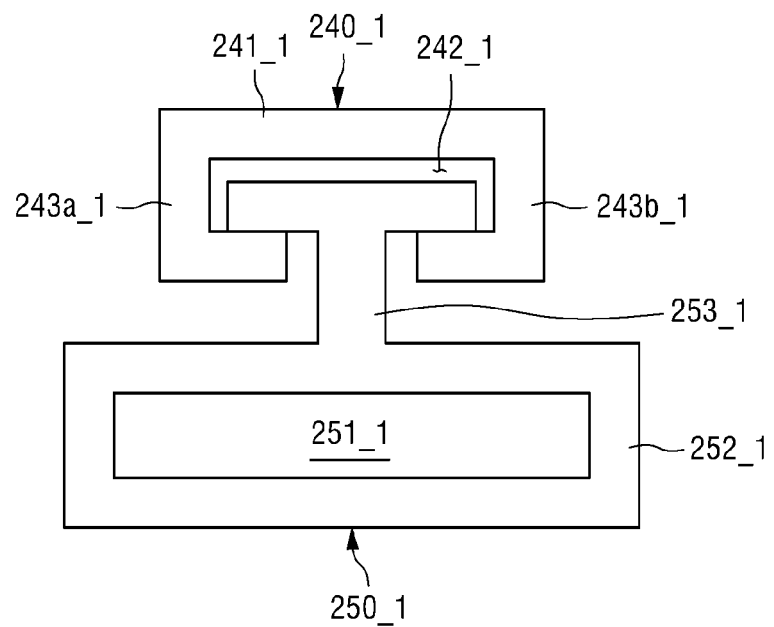
FIGS. 39 and 40 are front views showing the coupling relationship between a separation tube hanger and a hanger holder according to other embodiments.
Figure 40:
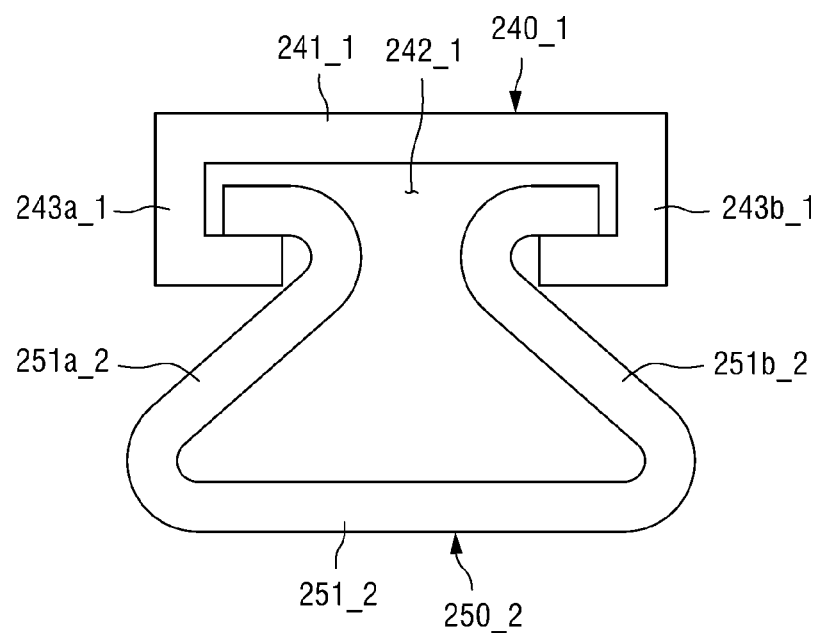

FIGS. 39 and 40 are front views showing the coupling relationship between a separation tube hanger and a hanger holder according to other embodiments.

Referring to FIG. 39, as another embodiment, a separation tube hanger 250_1 may consist of a ring-shaped support portion 252_1 and a T-shaped hook portion (253_1 and 254_1).

A fluid separation membrane 108 is inserted into a bore 251_1 of the ring-shaped support portion 252_1. A lower end of the support portion 252_1 supports a central portion of the fluid separation membrane 108 to keep the fluid separation membrane 108 bent in a U shape.

The hook portion (253_1 and 254_1) consists of a vertical bar 253_1 extending upward from a central portion of an upper end of the support portion 252_1 and a horizontal bar 254_1 extending to both sides from an end of the vertical bar 253_1.

As shown in FIG. 39, a hanger holder 240_1 includes a loop portion 241_1 extending in a direction and a pair of holding portions 243*a*_1 and 243*b*_1 extending downward from both ends of the loop portion 241_1. The pair of holding portions 243*a*_1 and 243*b*_1 may extend in a direction approaching each other, so that the hanger holder 240_1 forms a C shape as a whole.

A receiving portion 242_1 of the hanger holder 240_1 is formed in a space between the loop portion 241_1 and the holding portions 243*a*_1 and 243*b*_1, and the horizontal bar 254_1 of the separation tube hanger 250_1 is slidably received in the receiving portion 242_1.

Referring to FIG. 40, as another embodiment of the separation tube hanger, a separation tube hanger 250_2 includes a support portion 251_2 which supports one point in a fluid separation membrane 108 and a pair of hook portions 251*a*_2 and 251*b*_2 which extend upward from both ends of the support portion 251_2. The pair of hook portions 251*a*_2 and 251*b*_2 are bent in S shapes that are horizontally symmetrical to each other. Thus, ends of the pair of hook portions 251*a*_2 and 251*b*_2 are received in a receiving portion 242_1 of a hanger holder 240_1.

Figure 41:
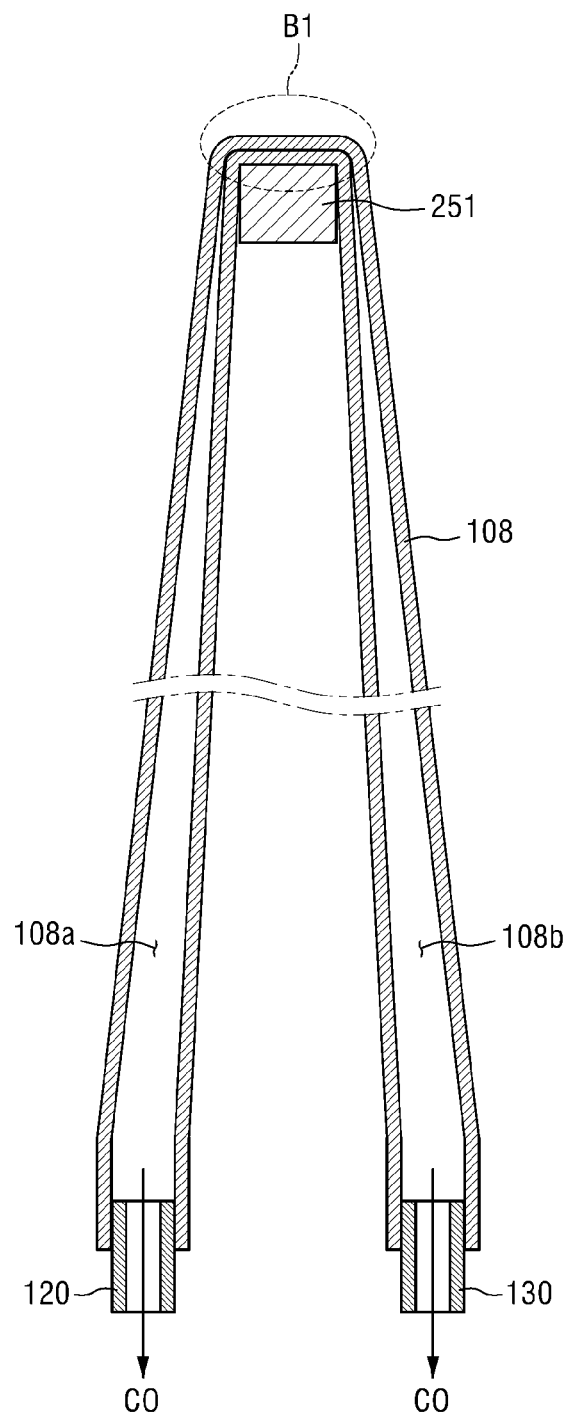
FIG. 41 is a cross-sectional view of a fluid separation membrane shown in FIG. 37.

FIG. 41 is a cross-sectional view of a fluid separation membrane shown in FIG. 37.

Referring to FIG. 41, a fluid separation membrane 108 may be blocked at one point supported by the support portion 251 in the bending region B1. Since the fluid separation membrane 108 is a tube containing silicone as its main component, it has excellent ductility. Thus, the point supported by the support portion 251 may be blocked due to the weight of the fluid separation membrane 108.

Since a region of the fluid separation membrane 108 is blocked, the space inside the fluid separation membrane 108 is divided into two spaces 108*a* and 108*b*. A carbon dioxide-containing separated gas flowing into each of the spaces 108*a* and 108*b* through the fluid separation membrane 108 moves from the blocked point to both ends of the fluid separation membrane 108.

Since a central portion of the fluid separation membrane 108 is blocked to divide the space inside the fluid separation membrane 108 into two spaces 108*a* and 108*b* and a separated gas is discharged from the two spaces 108*a* and 108*b*, the efficiency of discharging the separated gas is increased.

The separated gas that has moved to both ends of the fluid separation membrane 108 is moved to the separated fluid collecting part 260 through the adapting tubes 120 and 130.

Figure 42:
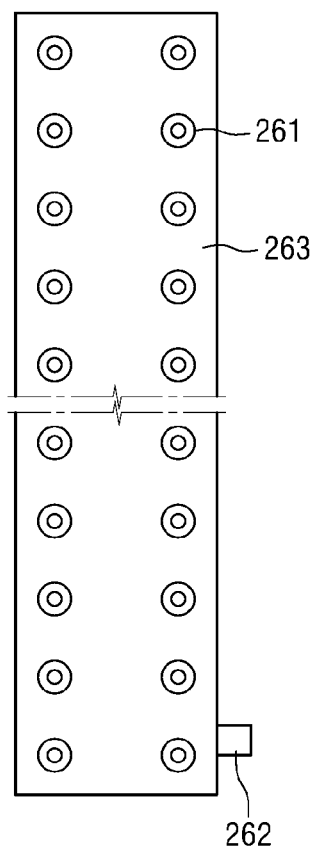
FIG. 42 is a plan view of a separated fluid collecting part shown in FIG. 37.

FIG. 42 is a plan view of the separated fluid collecting part shown in FIG. 37.

Referring to FIGS. 37 and 42, the separated fluid collecting part 260 includes a plurality of relay tubes 261 which are connected one-to-one to the adapting tubes 120 and 130, a main body 263 which has the relay tubes 261 arranged on a surface, and a main body outlet 262 which is formed at a side of the main body 263.

The relay tubes 261 relay a separated gas moving from the inside of the fluid separation membrane 108 through the adapting tubes 120 and 130 to the inside of the main body 263. To this end, the relay tubes 261 are connected to the inside of the main body 263. The relay tubes 261 and the adapting tubes 120 and 130 are naturally kept sealed due to the pressure difference between the inside and outside of them.

A retention space (not shown) into which separated gases are delivered through the relay tubes 261 is formed in the main body 263. The retention space may be one space connected to the relay tubes 261.

The main body outlet 262 is connected to the retention space and discharges separated gases introduced into the retention space. The main body outlet 262 is directly or indirectly connected to the separated fluid outlet 313 of the chamber 310 to guide a separated gas to the separated fluid outlet 313.

The separated fluid collecting part 260 forms part of the second flow path F3. The separated fluid collecting part 260 is disposed between the fluid separation membranes 108, wherein the number of the fluid separation membranes 108 is larger than the number of the separated fluid outlets 313. The separated fluid collecting part 260 collects a gas collected in each of the fluid separation membranes 108 and guides the collected gas to the separated fluid outlet 313. Since the fluid separation membranes 108 are connected to the second flow path F3 simply by connecting the relay tubes 261 to the adapting tubes 120 and 130, the fluid separation unit 140 can be easily installed in the chamber 310.

Figure 43:
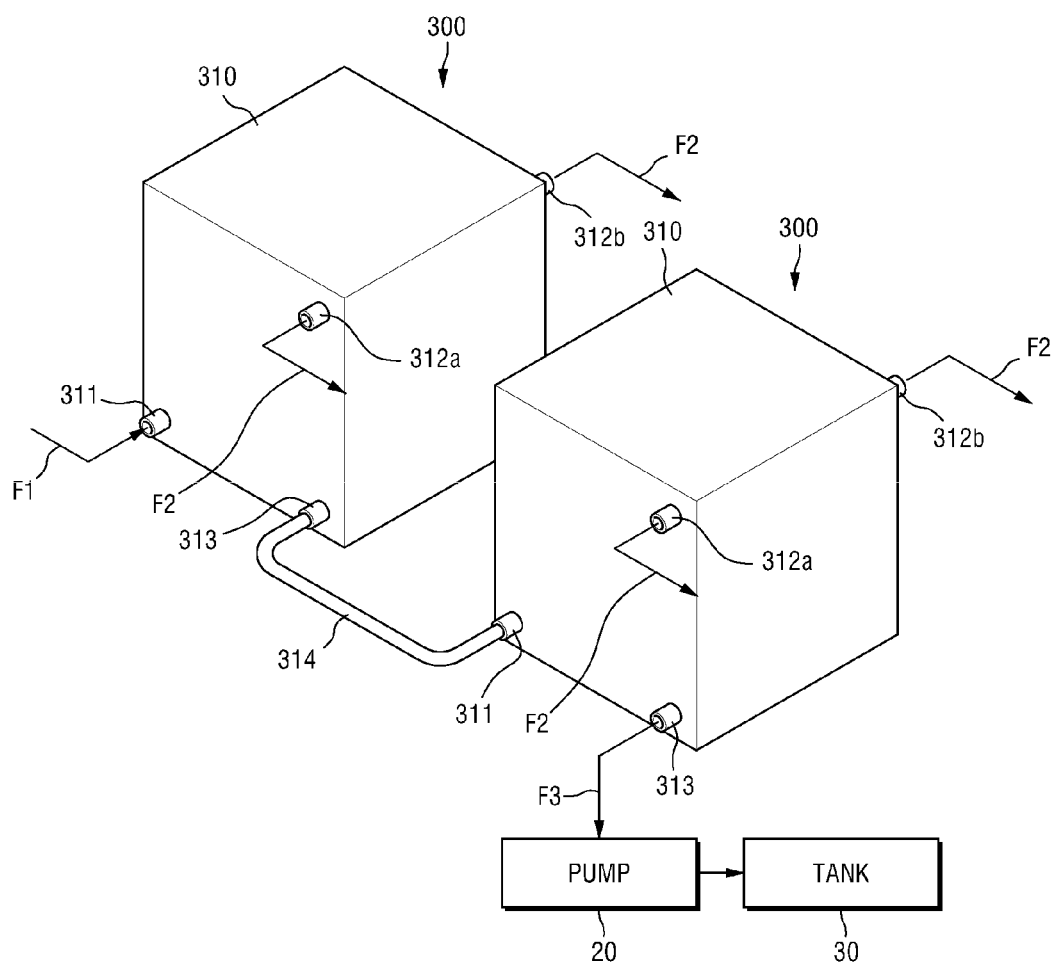
FIG. 43 shows an example in which fluid separation apparatuses according to an embodiment of the inventive concept are connected in series for use.

FIG. 43 shows an example in which fluid separation apparatuses according to an embodiment of the inventive concept are connected in series for use.

Referring to FIG. 43, the fluid separation apparatuses according to the embodiment of the inventive concept may be used by connecting two chambers 310 in series.

For ease of description, the chamber 310 located on the left side of FIG. 43 will be referred to as a first chamber, and the chamber 310 located on the right side will be referred to as a second chamber.

To connect the first chamber and the second chamber in series, the first chamber and the second chamber are installed adjacent to each other, and a connection pipe 314 for connecting a separated fluid outlet 313 of the first chamber to a mixed fluid inlet 311 of the second chamber is installed.

A gas (a firstly separated fluid) separated by a separation tube (a first separation tube) in the first chamber is supplied as a mixed gas to the second chamber through the connection pipe 314.

Since the firstly separated fluid contains carbon dioxide which was firstly separated in the first chamber, the carbon dioxide content of the firstly separated fluid is high.

A separation tube (a second separation tube) in the second chamber separates at least a portion of the carbon dioxide contained in the firstly separated fluid. Thus, a gas (a secondly separated fluid) separated by the second separation tube has a higher carbon dioxide content than the firstly separated fluid.

When a flow path F3 for guiding the secondly separated fluid to the outside of the second chamber is referred to as a fourth flow path, a pump 320 and a tank 330 may be installed on the fourth flow path. The negative pressure provided by the pump 320 may be applied to the first separation tube and the second separation tube.

When a flow path F2 for guiding a residual gas inside the second chamber to the outside of the second chamber is referred to as a fifth flow path, the fifth flow path may be connected to a tank (not shown) for collecting residual gases, together with a third flow path F2 for guiding a residual gas inside the first chamber to the outside of the first chamber.

In FIG. 43, the first chamber and the second chamber are horizontally disposed, but the first chamber and the second chamber can also be stacked on each other.

In addition, although two chambers are connected in series in FIG. 43, three or more chambers can also be connected in series according to the concentration of carbon dioxide required in a final separated gas.

Figure 44:
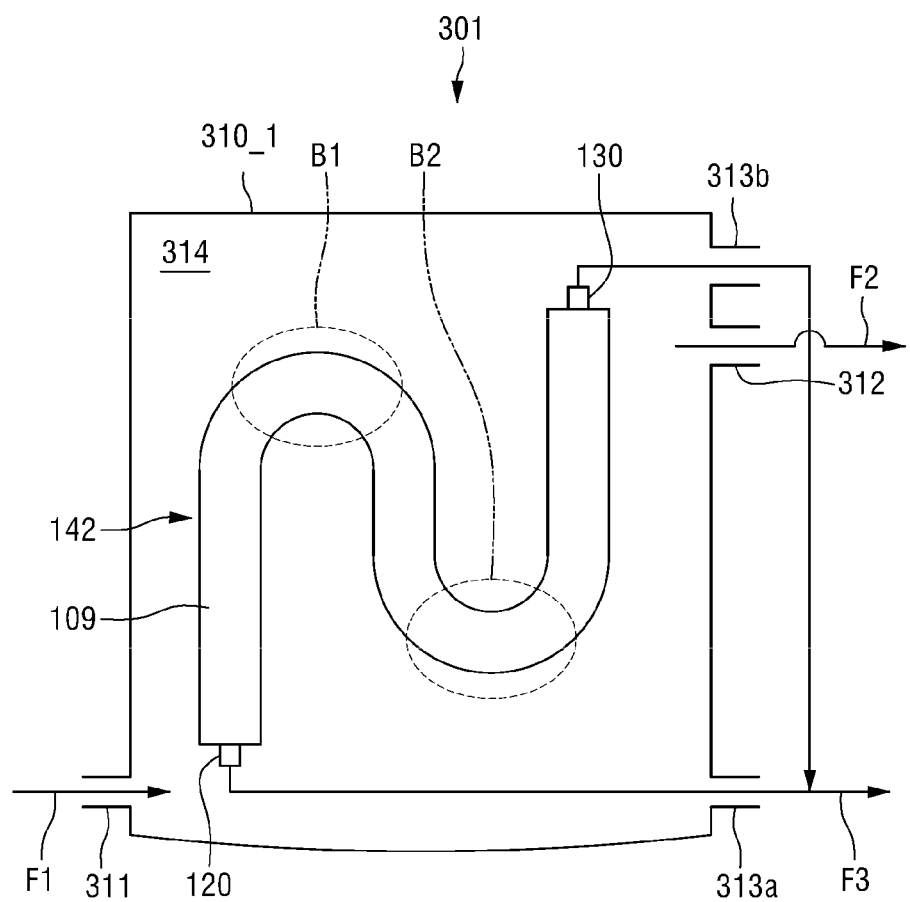
FIG. 44 is a schematic view showing the internal configuration of a fluid separation apparatus according to another embodiment of the inventive concept.

FIG. 44 is a schematic view showing the internal configuration of a fluid separation apparatus according to another embodiment of the inventive concept.

Referring to FIG. 44, a fluid separation unit 141 of the fluid separation apparatus 301 according to the current embodiment includes a fluid separation membrane 109 which is installed in a chamber 310_1 to have two bending regions B1 and B2 bent in a U shape. Therefore, the fluid separation membrane 109 according to the current embodiment is bent in a substantially S shape as a whole.

Compared with the fluid separation membrane 108 shown in FIG. 36, the fluid separation membrane 109 according to the current embodiment additionally includes the bending region B2. Therefore, an end of the fluid separation membrane 109 is located in a lower part of the chamber 310_1, and the other end is located in an upper part of the chamber 310_1.

Accordingly, separated fluid outlets 313a and 313b may be formed in the upper and lower parts of the chamber 310_1 according to the current embodiment, respectively. Separated gases discharged from the separated fluid outlets 313a and 313b may be combined in a second flow path F3 outside the chamber 310_1 and may flow along the second flow path F3.

Alternatively, the chamber 310_1 may include one separated fluid outlet 313 as shown in FIG. 36, and separated gases discharged from both ends of the fluid separation membrane 109 may be combined within the chamber 310_1 to be discharged through the separated fluid outlet 313.

A case where a fluid separation membrane is bent three times, four times, or more times can be fully expected from the fluid separation membrane 108 of FIG. 36 and the fluid separation membrane 109 of FIG. 44.

Figure 45:
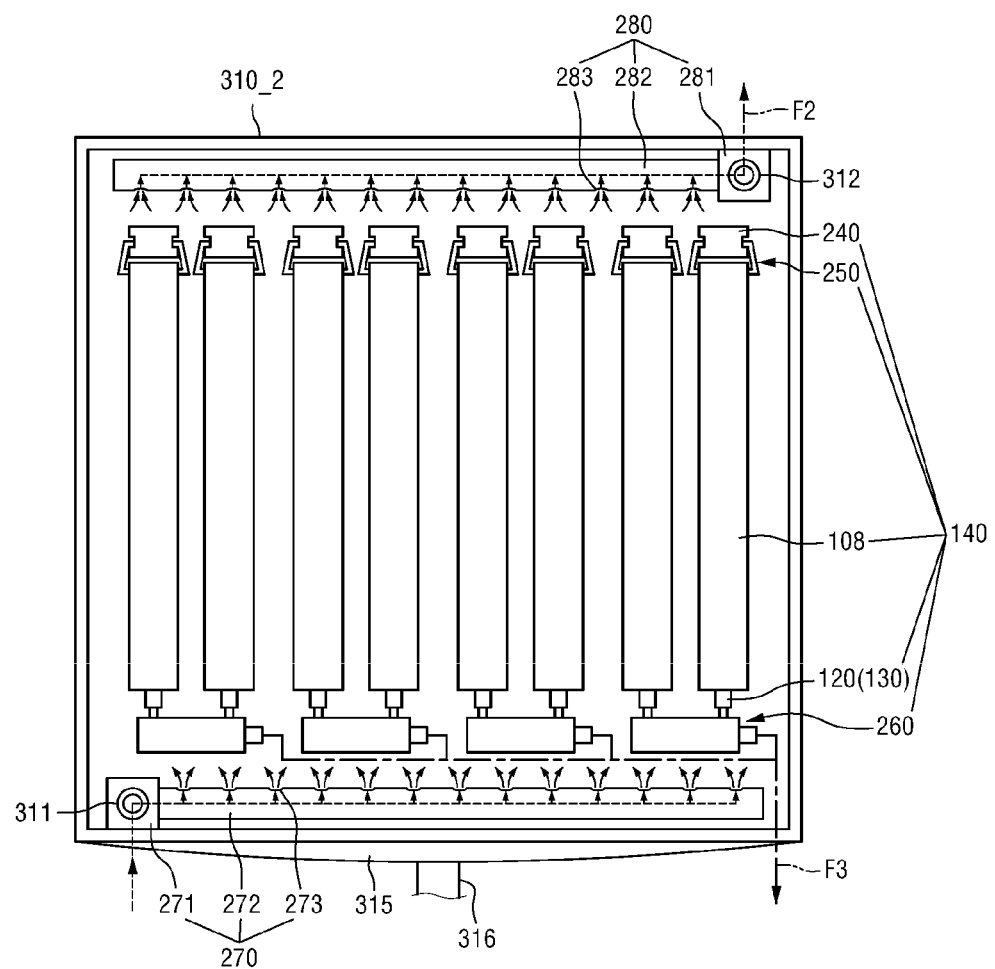
FIG. 45 is a schematic view showing the internal configuration of a fluid separation apparatus according to another embodiment of the inventive concept.

FIG. 45 is a schematic view showing the internal configuration of a fluid separation apparatus according to another embodiment of the inventive concept.

Referring to FIG. 45, in a chamber 310_2 of the fluid separation apparatus according to the current embodiment, a mixed fluid diffusing part 270 which is connected to a mixed fluid inlet 311 to form part of a first flow path F1, a fluid separation part which is composed of a plurality of fluid separation units 140 for separating carbon dioxide from a mixed gas introduced into the chamber 310_2 through the mixed fluid diffusing part 270, and a residual fluid collecting part 280 which is connected to the residual fluid outlet 312 to form part of a third flow path F3 are provided.

In FIG. 45, the fluid separation part composed of four fluid separation units 140 is shown for ease of description. However, the number of the fluid separation units 140 installed in the chamber 310_2 may vary according to the size of the chamber 310_2 and/or the size of each of the fluid separation units 140.

The space inside the chamber 310_2 is divided into a first space connected to a second flow path F3 and a second space connected to the first flow path F1 and the third flow path F2.

The first space is composed of internal spaces of the fluid separation units 140 and the second flow path F3, and the second space is composed of spaces inside the chamber which are connected to the mixed fluid diffusing part 270 and the residual fluid collecting part 280.

When a mixed gas has the property of spreading by rising upward in the atmosphere, the mixed fluid inlet 311 and the mixed fluid diffusing part 270 may be formed in a lower part of the chamber 310_2, and the residual fluid outlet 312 and the residual fluid collecting part 280 may be formed in an upper part of the chamber 310_2 as shown in FIG. 45.

Conversely, when the mixed gas has the property of spreading by descending in the atmosphere, the mixed fluid inlet 311 and the mixed fluid diffusing part 270 may be formed in the upper part of the chamber 310_2, and the residual fluid outlet 312 and the residual fluid collecting part 280 may be formed in the lower part of the chamber 310_2.

As shown in FIG. 45, a bottom surface 315 of the chamber 310_2 may curve downward in the middle. A condensed water outlet 316 is connected to the inside of the chamber 310_2 in a central portion of the bottom surface and is formed toward the lower part of the chamber 310_2.

The condensed water outlet 316 forms a passage through which condensed water generated as a mixed gas and/or a residual gas in the chamber 310_2 is cooled is discharged out of the chamber 310_2.

Other components inside and outside the chamber 310_2 are substantially the same as those described above with reference to FIGS. 35 through 37, and thus a redundant description of the components will be omitted. Instead, the mixed fluid diffusing part 270 and the residual fluid collecting part 280 will be described in detail.

Figure 46:
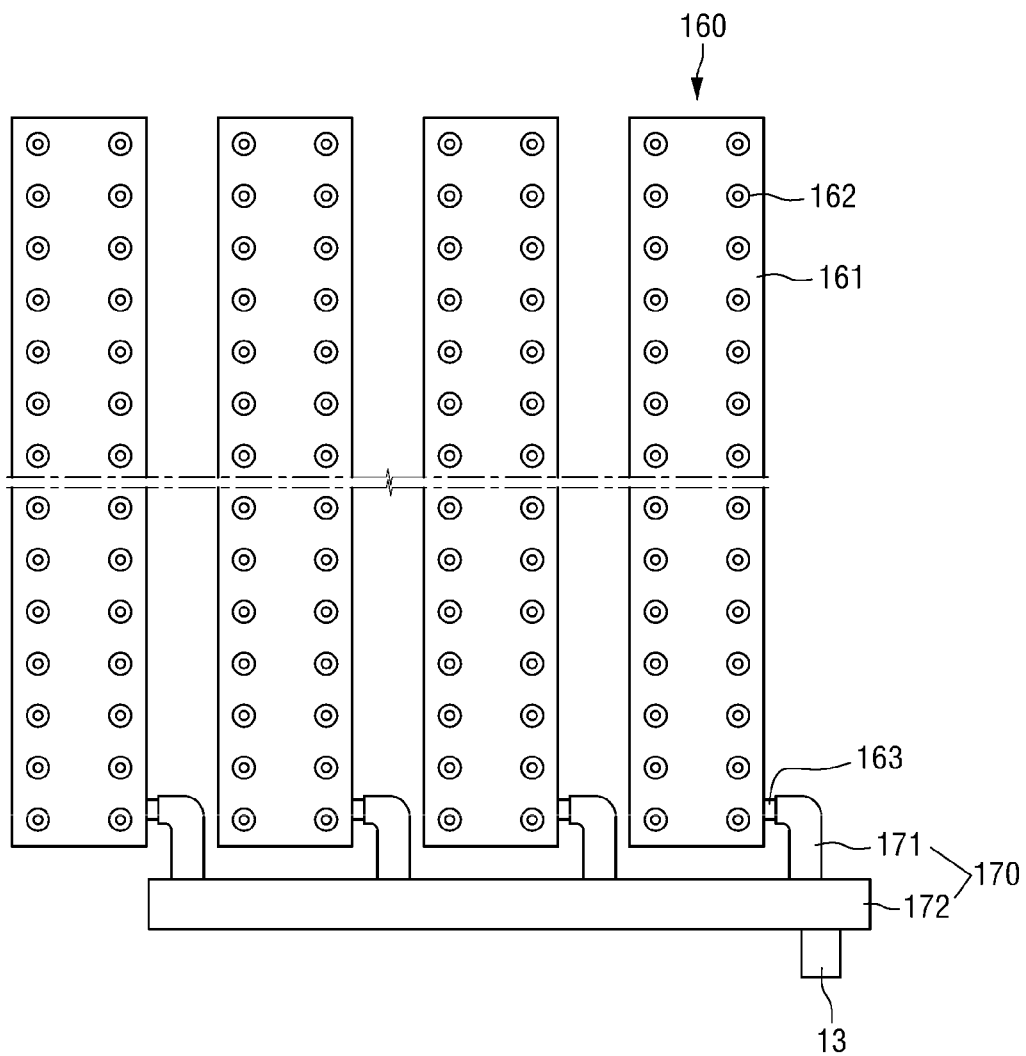
FIG. 46 is a plan view showing the coupling relationship between a first separated fluid collecting part and a second separated fluid collecting part.

FIG. 46 is a plan view showing the coupling relationship between a first separated fluid collecting part and a second separated fluid collecting part. Referring to FIGS. 45 and 46, the fluid separation apparatus according to the current embodiment further includes the second separated fluid collecting part 270 connected to each fluid separation unit 140.

The second separated fluid collecting part 270 forms part of the second flow path F3 and includes a collecting pipe 272 which is connected to a separated fluid outlet 313 within the chamber 310_2 and a plurality of branch pipes 271 which branch from the collecting pipe 272 and are connected to main body outlets 163 of the fluid separation units 140, respectively.

The branch pipes 271 are connected to the collecting pipe 272. Therefore, separated gases discharged through the respective main body outlets 163 of the fluid separation units 140 are introduced into the collecting pipe 272 through the branch pipes 271, respectively. Then, the separated gases are discharged out of the chamber 310_2 through the separated fluid outlet 13.

The first separated fluid collecting part 260 and the second separated fluid collecting part 270 form part of the second flow path F3 and are disposed between a plurality of fluid separation membranes 108, wherein the number of the fluid separation membranes 108 is greater than the number of the separated fluid outlets 313. The first separated fluid collecting part 260 and the second separated fluid collecting part 270 collect a separated gas collected in each of the fluid separation membranes 108 and guide the separated gas to the separated fluid outlet 313. In addition, since the fluid separation membranes 108 are connected to the second flow path F3 simply by connecting relay tubes 262 to adapting tubes 120 and 130 and connecting the main body outlets 263 to the branch pipes 271, the fluid separation units 140 can be easily installed in the chamber 310_2.

Figure 47:
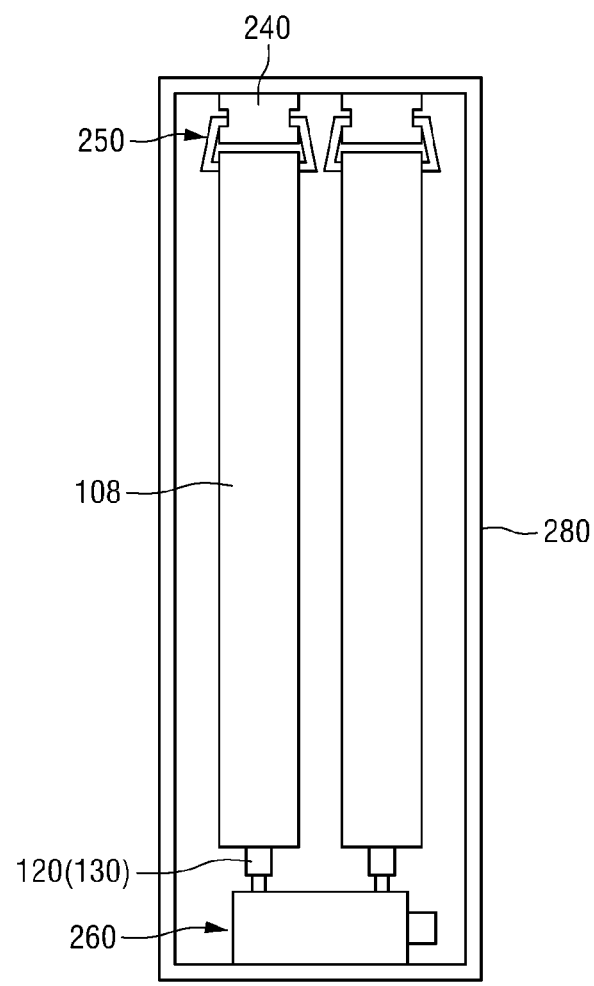
FIG. 47 is a schematic front view of a fluid separation unit according to another embodiment of the inventive concept.

FIG. 47 is a schematic front view of a fluid separation unit according to another embodiment of the inventive concept.

Referring to FIG. 47, the fluid separation unit 142 according to the current embodiment further includes a frame 280 compared with the fluid separation units 140 of FIG. 46.

The frame 280 is a structure that fixes a main body 261 of a first separated fluid collecting part 260 to a hanger holder 240.

Since the first separated fluid collecting part 260 and a separation tube holding part (240 and 250) are integrated with each other by the frame 280, the fluid separation unit 142 can be installed and disassembled as one module within the chamber 310_2.

That is, as shown in FIG. 47, the first separated fluid collecting part 260 may be fixed in a lower part of the frame 280, and the hanger holder 240 may be fixed in an upper part of the frame 280. In this case, a plurality of fluid separation membranes 108 may be supported by separation tube hangers 250, and the separation tube hangers 250 may be installed on the hanger holder 240. Then, the fluid separation unit 142 can be installed as one module within the chamber 310_2. Therefore, the installation convenience of the fluid separation unit 142 is improved.

Moreover, since each fluid separation unit 142 can be independently removed or replaced in the chamber 310_2, its maintenance is easy.

Figure 48:
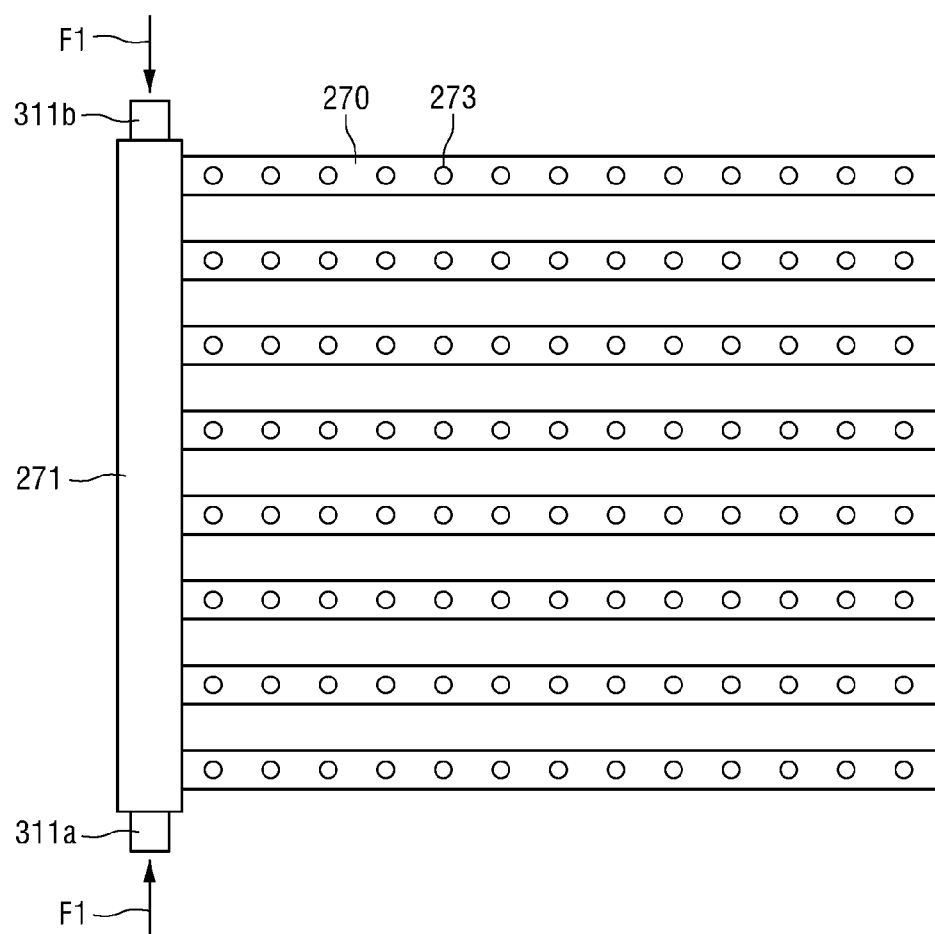
FIG. 48 is a schematic plan view of a mixed fluid diffusing part of FIG. 45 according to the inventive concept.

FIG. 48 is a schematic plan view of the mixed fluid diffusing part of FIG. 45 according to the inventive concept.

Referring to FIGS. 45 and 48, the mixed fluid diffusing part 270 forms part of the first flow path F1 and includes a first mixed fluid guide pipe 271 which is connected to the mixed fluid inlet 311 within the chamber 310_2 and a plurality of second mixed fluid guide pipes 272 which branch from the first mixed fluid induction pipe 271.

The mixed fluid diffusing part 270 is configured to uniformly diffuse a mixed gas, which is introduced into the chamber 310_2 through the mixed fluid inlet 311, within the chamber 310_2.

To this end, the first mixed fluid guide pipe 271 may extend to a length corresponding to the width of the chamber 310_2. The second mixed fluid guide pipes 272 may be arranged at regular intervals and extend in a direction perpendicular to the first mixed fluid guide pipe 271.

As shown in FIGS. 45 and 48, a plurality of diffusion holes 273 may be formed in the second mixed fluid guide pipes 272 to face the fluid separation units 140.

Figure 49:
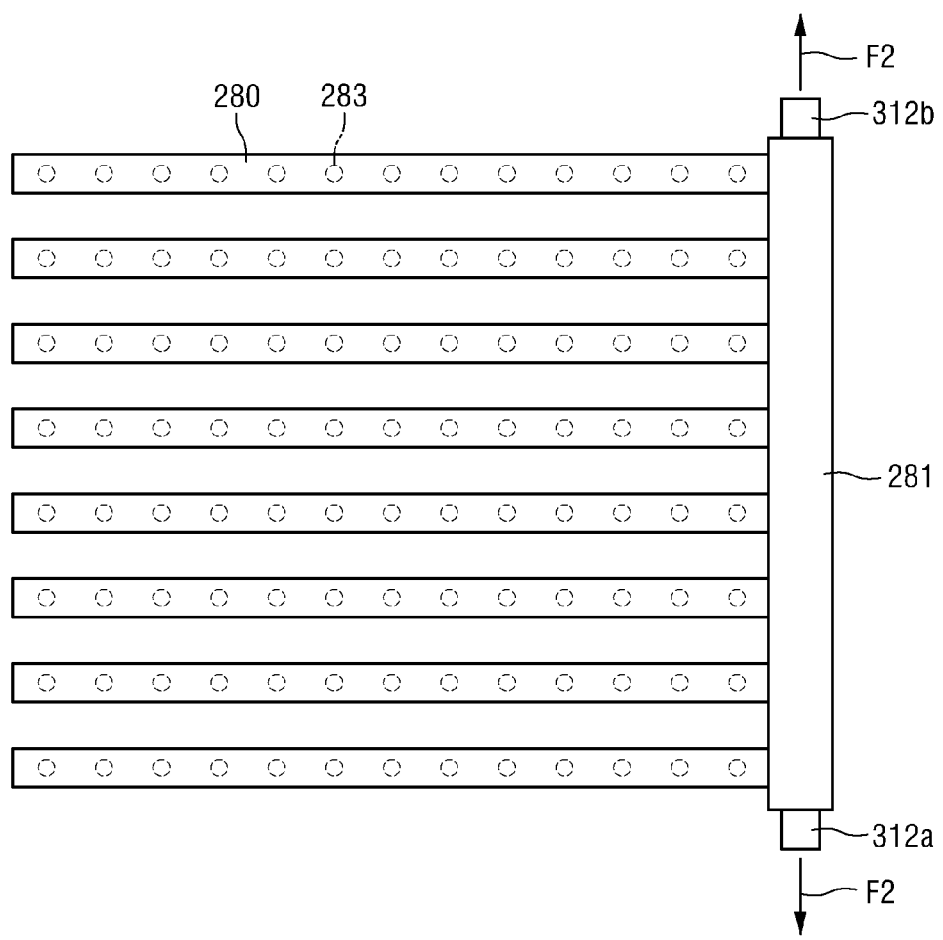
FIG. 49 is a schematic plan view of a residual fluid collecting part shown in FIG. 45.

FIG. 49 is a schematic plan view of the residual fluid collecting part shown in FIG. 49.

Referring to FIGS. 45 and 49, the residual fluid collecting part 280 forms part of the third flow path F2 and includes a first residual fluid guide pipe 281 which is connected to the residual fluid outlet 312 within the chamber 310_2 and a plurality of second residual fluid guide pipes 282 which branch from the first residual fluid guide pipe 281.

The residual fluid collecting part 280 is configured to more effectively discharge a residual gas inside the chamber 310_2 to the outside of the chamber 310_2.

To this end, the first residual fluid guide pipe 281 may extend to a length corresponding to the width of the chamber 310_2. The second residual fluid guide pipes 282 may be arranged at regular intervals and extend in a direction perpendicular to the first mixed fluid guide pipe 271.

As shown in FIGS. 45 and 49, a plurality of collection holes 283 may be formed in the second residual fluid guide pipes 282 to face the fluid separation units 140.

Figure 50:
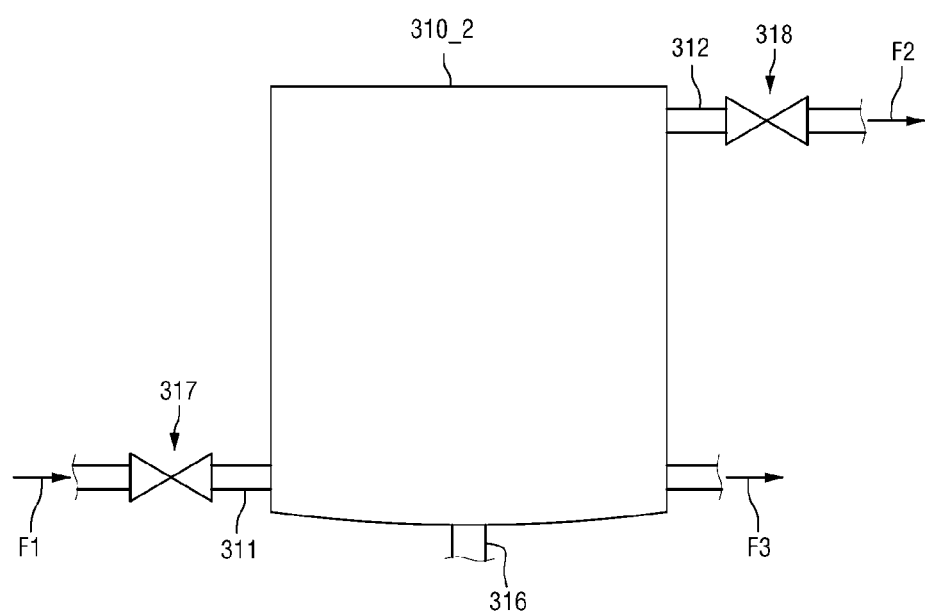
FIG. 50 is a schematic view showing valves on a first flow path and a third flow path.

FIG. 50 is a schematic view showing valves on the first flow path and the third flow path.

Referring to FIG. 50, a first control valve 317 for opening and closing the first flow path F1 may be provided on the first flow path F1.

For safe operation of the fluid separation apparatus 302, the first control valve 317 controls the opening and closing of the first flow path F1 such that the pressure of a mixed gas supplied into the chamber 310_2 is maintained below a limit pressure.

Therefore, the first control valve 317 opens the first flow path F1 when the pressure of the mixed gas flowing along the first flow path F1 is equal to or lower than the limit pressure and closes the first flow path F1 when the pressure of the mixed gas exceeds the limit pressure.

In addition, a second control valve 318 for opening and closing the third flow path F2 may be provided on the third flow path F2.

The second control valve 318 controls the discharge of a residual gas through the third flow path F2 such that the first space in the chamber 310_2 is maintained in a required positive pressure atmosphere.

Therefore, the second control valve 318 closes the third flow path F2 when the pressure in the first space inside the chamber 310_2 is lower than a required pressure and opens the third flow path F2 when the pressure in the first space inside the chamber 310_2 is higher than the required pressure.

Hereinafter, a fluid separation membrane module modularized by including the above-described fluid separation membranes and applied to a fluid separation apparatus will be described.

Figure 51:
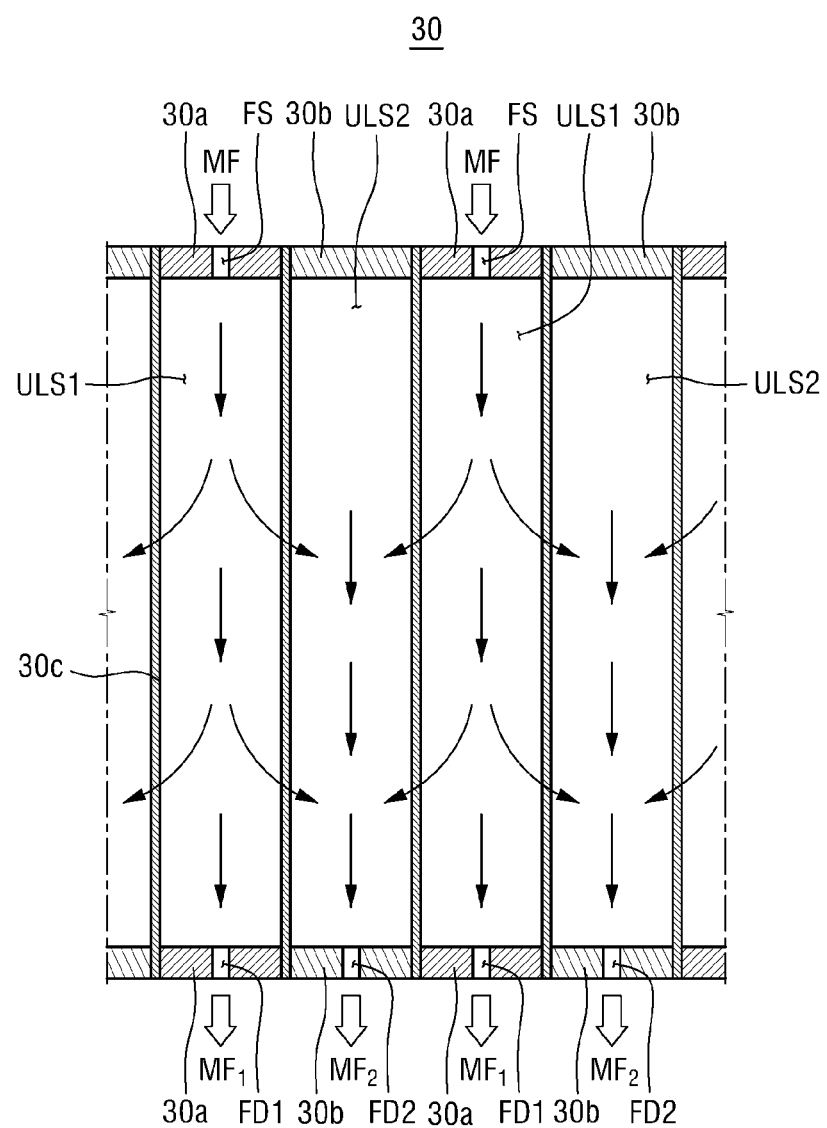
FIG. 51 is a schematic view of a fluid separation membrane module according to an embodiment of the inventive concept.

FIG. 51 is a schematic view of a fluid separation membrane module according to an embodiment of the inventive concept. Referring to FIG. 51, the fluid separation membrane module 30 is a device used to separate a specific fluid from a fluid mixture MF by using a plurality of fluid separation membranes 30c stacked on each other.

The fluid separation membrane module 30 includes the fluid separation membranes 30c stacked on each other and a plurality of interlayer spacers 30a and 30b. Each of the fluid separation membranes 30c may be plate-shaped. The fluid separation membranes 30c are arranged to overlap each other.

One side and the other side of each fluid separation membrane 30c are physically separated by walls of the fluid separation membrane 30c itself. At least a portion of a fluid may move between the one side and the other side of the fluid separation membrane 30c by passing through the fluid separation membrane 30c, and this characteristic is used to separate a specific fluid. The interlayer spacer 30a or 30b is installed between neighboring fluid separation membranes 30c to couple the neighboring fluid separation membranes 30c while physically defining a space between the neighboring fluid separation membranes 30c. In the present specification, a space surrounded by the neighboring fluid separation membranes 30c and the interlayer spacer 30a or 30b will be referred to as a "unit limited space."

A plurality of unit limited spaces are arranged in a stacking direction to overlap each other. The unit limited spaces include a first unit limited space ULS1 and a second unit limited space ULS2.

The first unit limited space ULS1 is a space directly provided with the fluid mixture MF. To this end, the first unit limited space ULS1 includes a fluid inlet FS. In addition, the first unit limited space ULS1 includes a first fluid outlet FD1 for discharging a residual fluid MF1 remaining after separation.

The second unit limited space ULS2 is a space not directly provided with the fluid mixture MF. Therefore, the second unit limited space ULS2 does not include a fluid inlet. The second unit limited space ULS2 includes a second fluid outlet FD2 for discharging a separated fluid MF2.

The first unit limited space ULS1 and the second unit limited space ULS2 are disposed adjacent to each other. For example, a plurality of first unit limited spaces ULS1 and a plurality of second unit limited spaces ULS2 may be alternately arranged. A first unit limited space ULS1 and a second unit limited space ULS2 adjacent to each other may share one fluid separation membrane 30c, and a fluid may move through the shared fluid separation membrane 30c.

For example, in a case where the fluid mixture MF provided through the fluid inlet FS of the first unit limited space ULS1 contains nitrogen and carbon dioxide and where the mobility of carbon dioxide through the fluid separation membrane 30c is higher than that of nitrogen, the concentration of nitrogen in the first unit limited space ULS1 becomes relatively high as the concentration of carbon dioxide in the first unit limited space ULS1 becomes relatively low. In addition, the concentration of nitrogen in the second unit limited space ULS2 adjacent to the first unit limited space ULS1 becomes relatively low as the concentration of carbon dioxide in the second unit limited space ULS2 becomes relatively high. Therefore, the fluid mixture MF1 having a relatively high nitrogen content is discharged through the first fluid outlet FD1, and the fluid mixture MF2 having a relatively high carbon dioxide content is discharged through the second fluid outlet FD2.

Each of the first and second unit limited spaces ULS1 and ULS2 includes two stacked fluid separation membranes 30c. Therefore, a fluid can move to both sides through the two fluid separation membranes 30c. That is, since second unit limited spaces ULS2 are disposed on both sides of one first unit limited space ULS1, a portion of the mixed fluid MF supplied into the first unit limited space ULS1 may move to the second unit limited spaces ULS2 on both sides. In addition, since two first unit limited spaces ULS1 are disposed on both sides of one second unit limited space ULS2, a portion of the mixed fluid MF may move to the second unit limited space ULS2 from the first unit limited spaces ULS1 on both sides.

In the fluid separation membrane module 30 according to the current embodiment, a plurality of unit limited spaces are arranged in the stacking direction. Therefore, a plurality of separation spaces can be secured within one module. The number of stacked unit limited spaces may be, for example, several tens to several thousands. As the number of stacked unit limited spaces increases, the separation capacity may also increase. Therefore, a large amount of fluid can be separated.

The structure of the above-described fluid separation membrane module will now be described in more detail.

Figure 52:
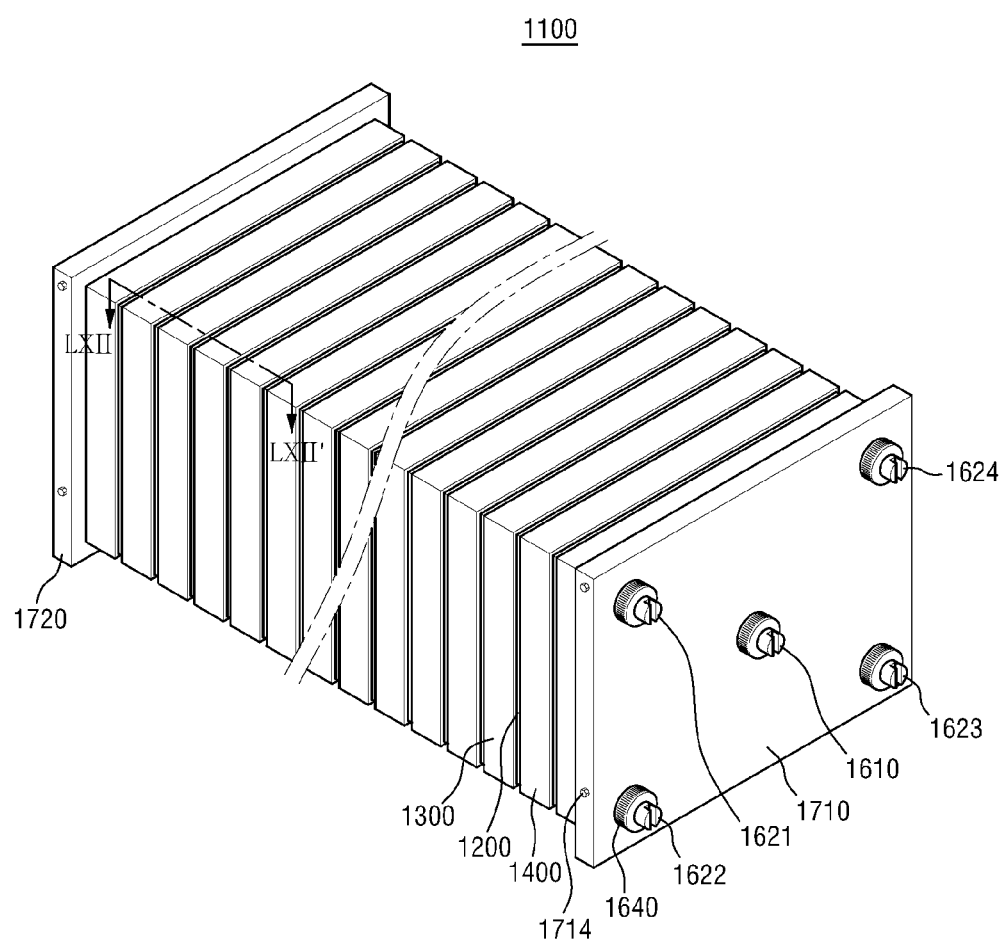
FIG. 52 is a perspective view of a fluid separation membrane module according to an embodiment of the inventive concept.
Figure 53:
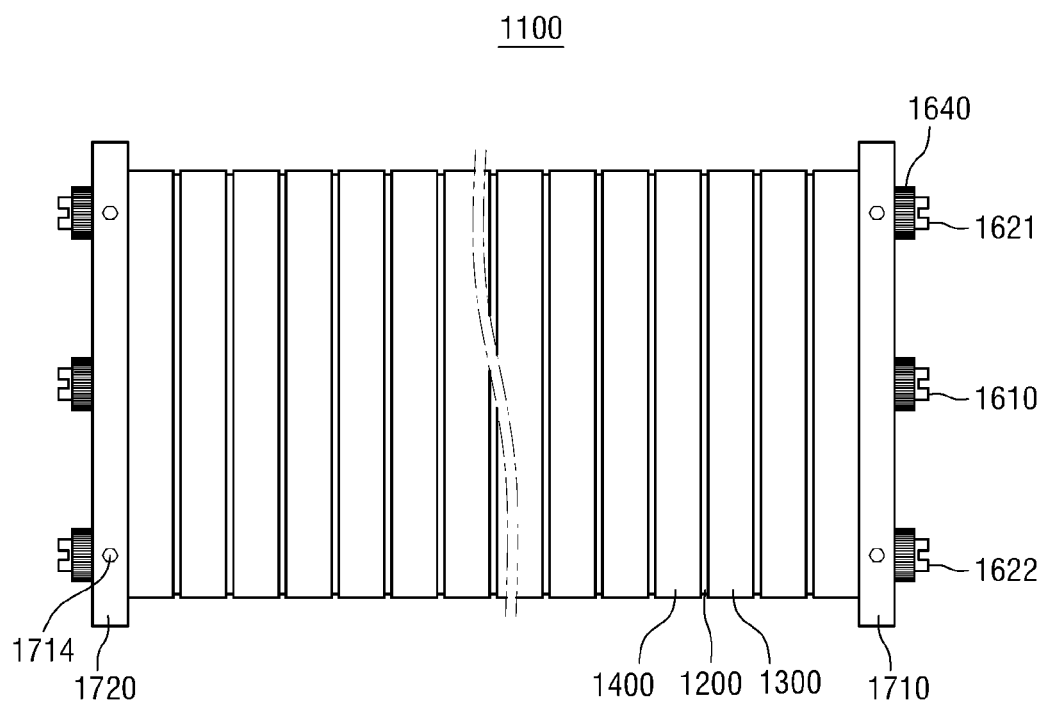
FIG. 53 is a front view of the fluid separation membrane module shown in FIG. 52.
Figure 54:
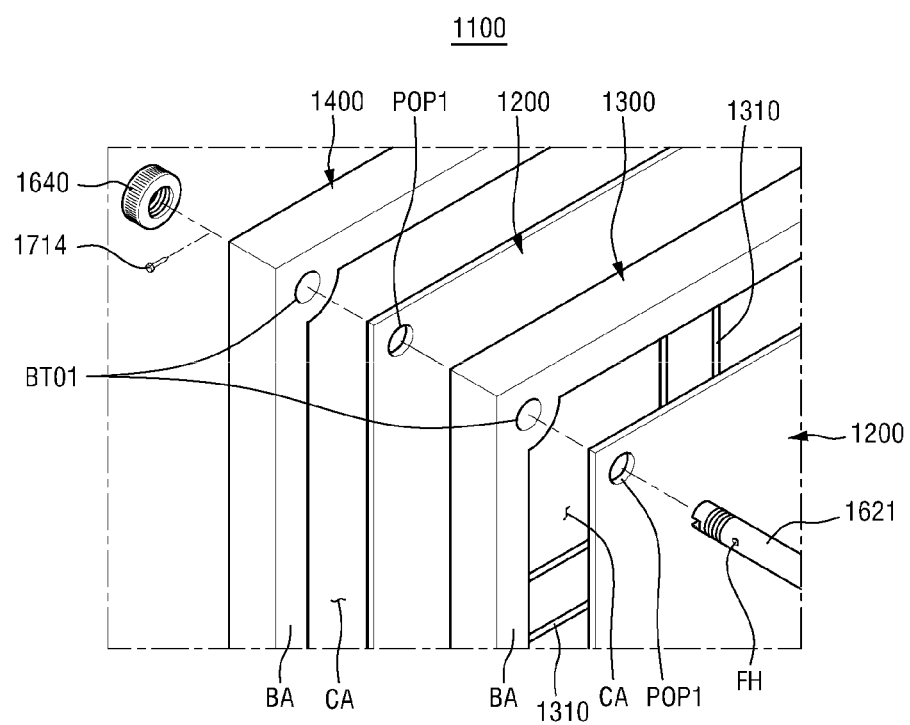
FIG. 54 is a partial exploded perspective view of the fluid separation membrane module shown in FIG. 52.

FIG. 52 is a perspective view of a fluid separation membrane module according to an embodiment of the inventive concept. FIG. 53 is a front view of the fluid separation membrane module shown in FIG. 52. FIG. 54 is a partial exploded perspective view of the fluid separation membrane module shown in FIG. 52.

Referring to FIGS. 52 through 54, the fluid separation membrane module 1100 according to the current embodiment includes a plurality of fluid separation membranes 1200, a plurality of first interlayer spacers 1300, a plurality of second interlayer spacers 1400, and one or more assembly pipes 1610 and 1621 through 1624.

Since the fluid separation membranes 1200 are the same as those described above, a redundant description of the fluid separation membranes 1200 will be omitted.

Figure 55:
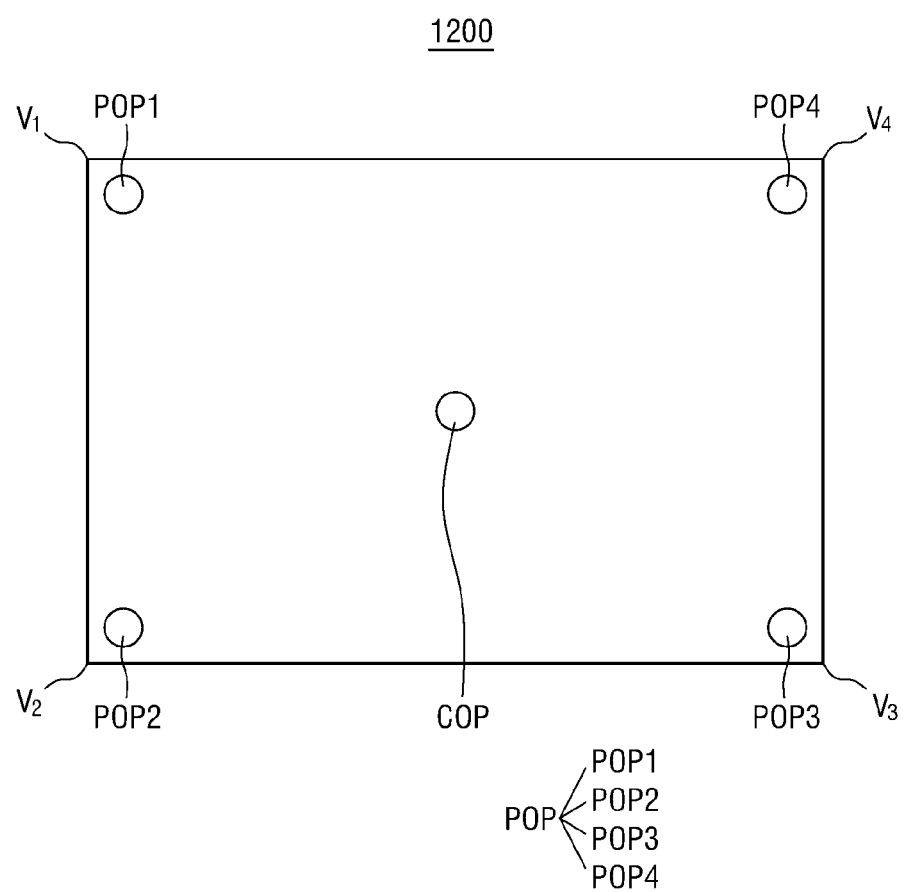
FIG. 55 is a plan view of a fluid separation membrane according to an embodiment of the inventive concept.

FIG. 55 is a plan view of a fluid separation membrane according to an embodiment of the inventive concept.

Referring to FIGS. 52 through 55, the fluid separation membrane 1200 is shaped like a rectangular plate and has four sides and four vertices at four corners. In the present specification, a portion that forms a vertex of a polygon in a plan view will be referred to as a corner. Of the four corners, an upper left corner will be referred to as a first corner V1. Accordingly, the other corners will be referred to as a second corner V2, a third corner V3, and a fourth corner V4 sequentially along a counterclockwise direction.

The fluid separation membrane 1200 includes a plurality of openings (COP and POP). In the drawings, one central opening COP and four peripheral openings POP (corner openings) are shown as an example. However, the number and positions of the openings COP and POP of the fluid separation membrane 1200 are not limited to this example and can be variously modified.

The central opening COP is located at the center of the rectangular shape of the fluid separation membrane 1200. The central opening COP may be located at the center of gravity of the rectangular shape. A central assembly pipe 1610 is inserted into the central opening COP of the fluid separation membrane 1200.

The peripheral openings POP are disposed adjacent to the sides or corners of the fluid separation membrane 1200. In the drawings, one corner opening POP is formed at each corner as a peripheral opening POP. Frame assembly pipes 1621 and 1623 having openings corresponding to each first unit limited space ULS1 are respectively inserted into a first corner opening POP1 and a third corner opening POP3 facing each other in a diagonal direction, and frame assembly pipes 1622 and 1624 having openings corresponding to each second unit limited space ULS2 are respectively inserted into a second corner opening POP2 and a fourth corner opening POP4.

The first interlayer spacers 1300 and the second interlayer spacers 1400 are alternately stacked. The first interlayer spacers 1300 define the first unit limited spaces ULS1, and the second interlayer spacers 1400 define the second unit limited spaces ULS2. Each fluid separation membrane 1200 is interposed between the first and second interlayer spacers 1300 and 1400.

Figure 56:
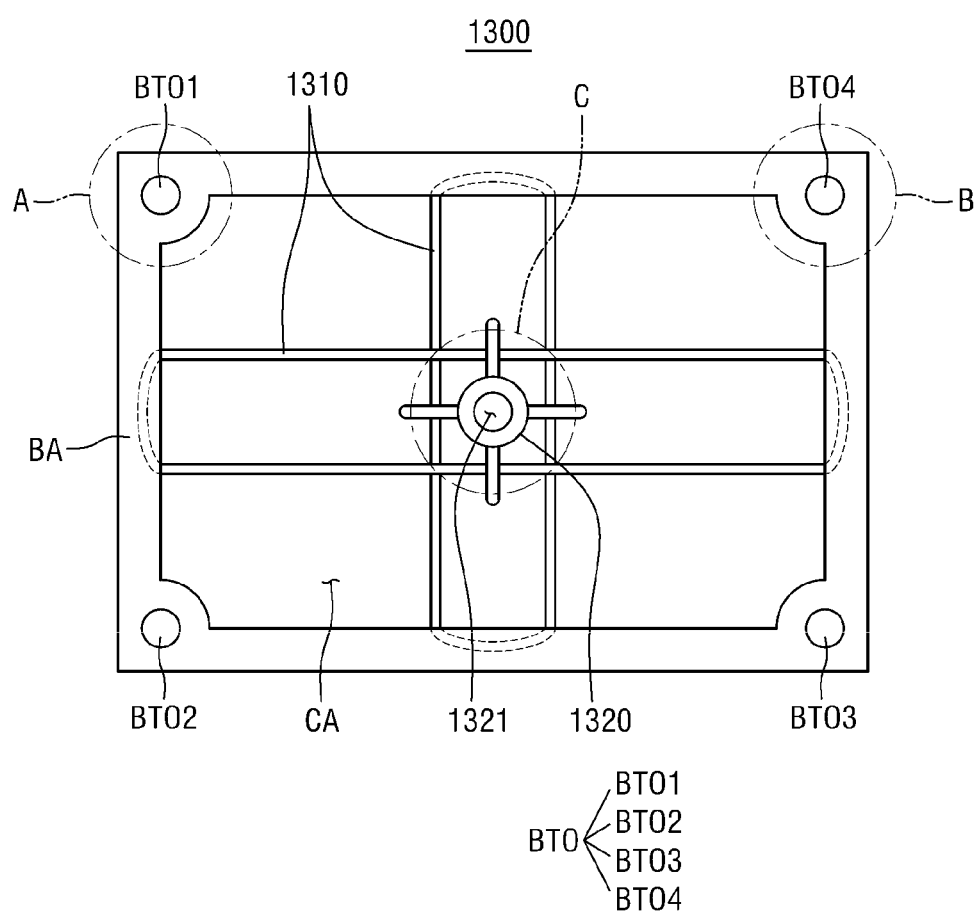
FIG. 56 is a plan view of a first interlayer spacer shown in FIG. 52.
Figure 57:
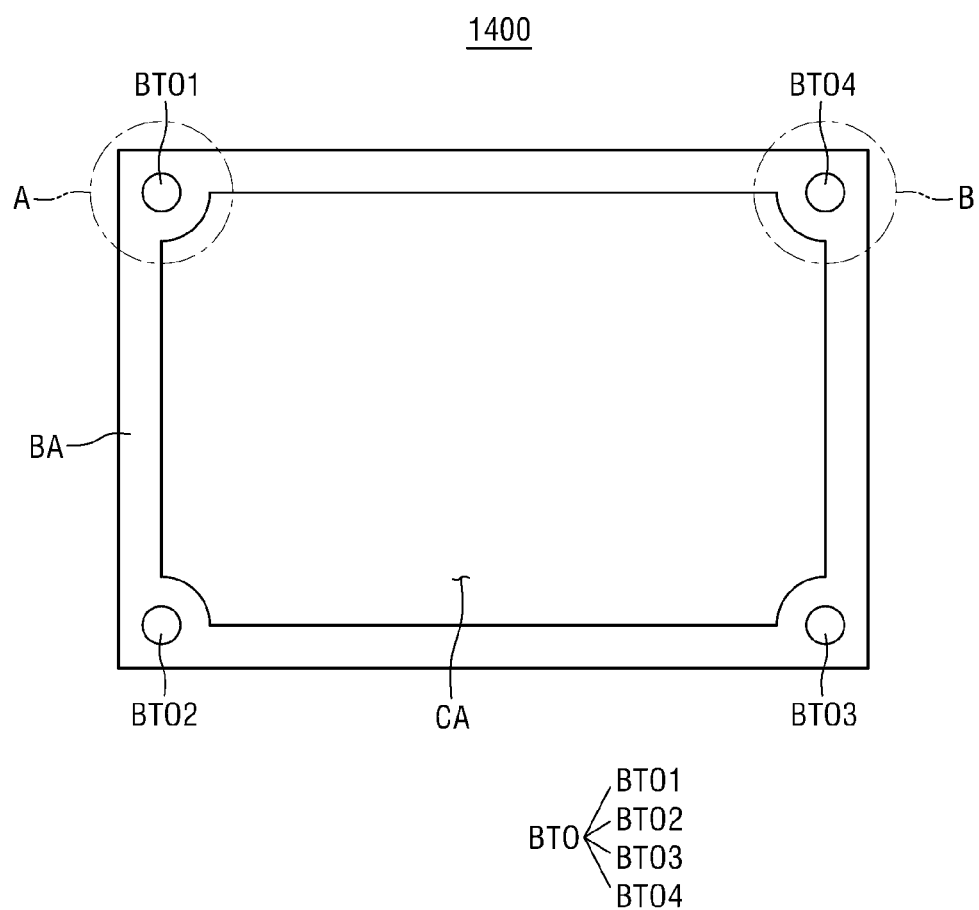
FIG. 57 is a plan view of a second interlayer spacer shown in FIG. 52.

FIG. 56 is a plan view of a first interlayer spacer shown in FIG. 52. FIG. 57 is a plan view of a second interlayer spacer shown in FIG. 52. Referring to FIGS. 52 through 57, each of the first and second interlayer spacers 1300 and 1400 has a rectangular frame portion BA, and a central portion CA surrounded by the frame portion BA is at least partially open. The fluid separation membranes 1200 are disposed on both surfaces (upper and lower surfaces) of the frame portion BA of each of the first and second interlayer spacers 1300 and 1400. For this arrangement, the size of each of the fluid separation membranes 1200 may be smaller than or equal to the size of the frame portion BA of each of the first and second interlayer spacers 1300 and 1400 and may be greater than the size of the central portion CA surrounded by the frame portion BA.

When the fluid separation membrane module 1100 is securely fastened by the assembly pipes 1610 and 621 through 624, the fluid separation membranes 1200 may come into complete contact with both surfaces of the frame portion BA of each of the first and second interlayer spacers 1300 and 1400. Therefore, fluid movement is suppressed between the fluid separation membranes 1200 and the frame portion BA in contact with the fluid separation membranes 1200, thereby forming a substantially sealed space.

Since the central portion CA of each of the first and second interlayer spacers 1300 and 1400 is open, when the separation membranes 1200 are installed on both sides (the upper and lower surfaces of the frame portion BA) of each of the first and second interlayer spacers 1300 and 1400, a space in which a fluid can move or be stored can be secured between the fluid separation membranes 1200.

Each of the first and second interlayer spacers 1300 and 1400 includes a plurality of frame openings BTO formed in the frame portion BA. The frame openings BTO pass through the frame portion BA in a thickness direction of the frame portion BA. When each of the fluid separation membranes 1200 has four corner openings POP, each of the first and second interlayer spacers 1300 and 1400 may also have four frame openings BTO, that is, first through fourth frames openings BTO1 through BTO4 at positions corresponding to the four corner openings POP. The frame openings BTO of each of the first and second interlayer spacers 1300 and 1400 are aligned to overlap the corresponding corner openings POP of each of the fluid separation membranes 1200, respectively.

Figure 58:
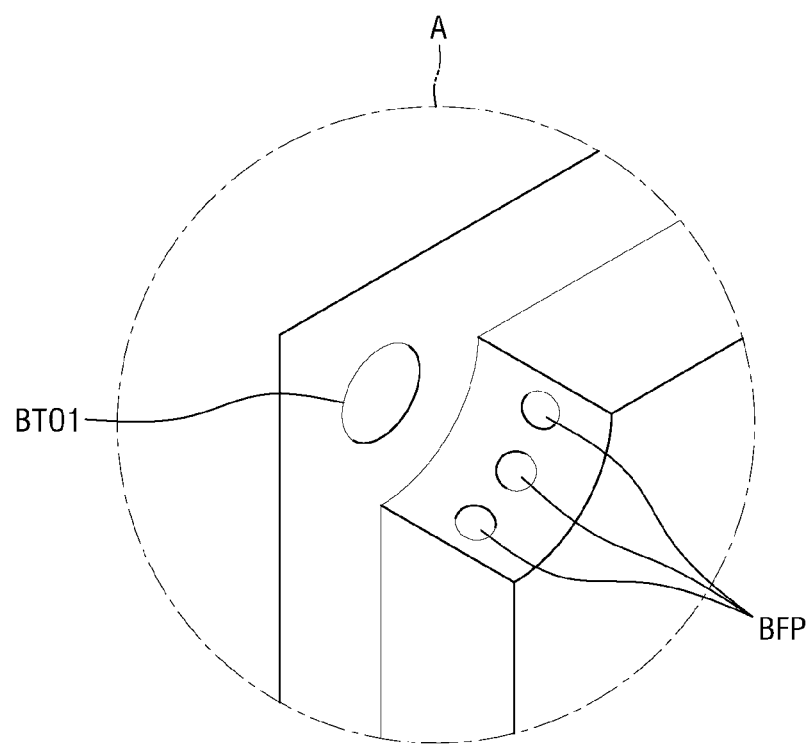
FIG. 58 is a partial perspective view of a region 'A' of FIG. 56.
Figure 59:
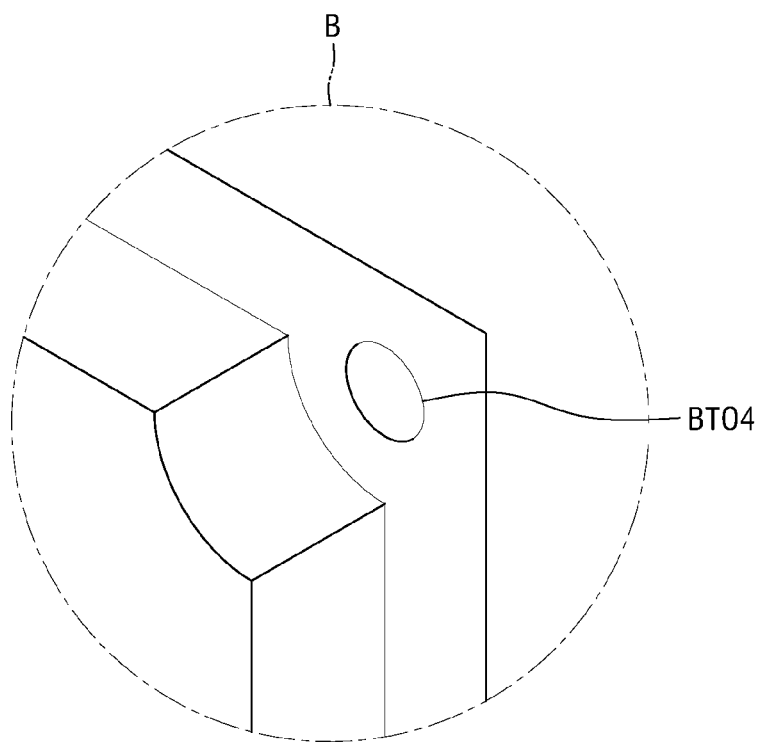
FIG. 59 is a partial perspective view of a region 'B' of FIG. 56.

FIG. 58 is a partial perspective view of a region 'A' of FIG. 52. FIG. 59 is a partial perspective view of a region 'B' of FIG. 52.

Referring to FIGS. 52 through 59, corner portions of the first and second interlayer spacers 1300 and 1400 where the frame openings BTO are formed may protrude inwards. If inner corners of the first and second interlayer spacers 1300 and 1400 have a protruding shape, it is easy to secure openings of a sufficient size at the corners. In the drawings, the inner corners of the first and second interlayer spacers 1300 and 1400 are curved surfaces that are convex inwards. However, the inner corners of the first and second interlayer spacers 1300 and 1400 can also be inclined surfaces or convex polygonal surfaces when seen from above.

Each of the first and second interlayer spacers 1300 and 1400 may further include frame fluid passages BFP which connect the inside of a corresponding frame opening BTO to the open central portion CA surrounded by the frame portion BA. Respective ends of the frame fluid passages BFP are open toward an inner surface (inner surfaces of the corners) of the frame portion BA of each of the first and second interlayer spacers 1300 and 1400, and the other ends are connected to the corresponding frame opening BTO of each of the first and second interlayer spacers 1300 and 1400.

To prevent a fluid discharged from a first unit limited space ULS1 and a fluid discharged from a second unit limited space ULS2 from being mixed with each other, the frame fluid passages BFP of the first interlayer spacer 1300 and the frame fluid passages BFP of the second interlayer spacer 1400 may be provided at the frame openings BTO located at different positions that do not overlap each other.

For example, the frame fluid passages BFP of the first interlayer spacer 1300 may be connected to the first frame opening BTO1 and the third frame opening BTO3. That is, the first frame opening BTO1 and the third frame opening BTO3 may be open frame openings that are spatially connected to the open central portion COP of the first interlayer spacer 1300, in other words, the first unit limited space ULS1.

On the other hand, no frame fluid passages may be formed at the second frame opening BTO2 and the fourth frame opening BTO4 of the first interlayer spacer 1300. That is, the second frame opening BTO2 and the fourth frame opening BTO4 of the first interlayer spacer 1300 may be closed frame openings that are not spatially connected to the open central portion CA of the first interlayer spacer 1300, in other words, the first unit limited space ULS1.

Conversely, the frame fluid passages BFP of the second interlayer spacer 1400 may be connected to the second frame opening BTO2 and the fourth frame opening BTO4. That is, the second frame opening BTO2 and the fourth frame opening BTO2 may be open frame openings that are spatially connected to the open central portion CA of the second interlayer spacer 1400, in other words, the second unit limited space ULS2.

On the other hand, no frame fluid passages may be formed at the first frame opening BTO and the third frame opening BTO3 of the second interlayer spacer 1400. That is, the first frame opening BTO1 and the third frame opening BTO3 of the second interlayer spacer 1400 may be closed frame openings that are not spatially connected to the open central portion CA of the second interlayer spacer 1400, in other words, the second unit limited space ULS2.

The frame assembly pipes 1621 through 1624 are inserted into the frame openings BTO of the first and second interlayer spacers 1300 and 1400. Here, the frame fluid passages BFP may be connected to pipe holes DH of the frame assembly pipes 1621 through 1624. Therefore, the unit limited spaces ULS1 and ULS2 may be spatially connected to the inside of the frame assembly pipes 1621 through 1624 through the frame fluid passages BFP. The frame fluid passages BFP may serve as any one of a fluid inlet, a first fluid outlet, and a second fluid outlet. That is, a fluid can smoothly move between the unit limited spaces ULS1 and ULS2 and the frame assembly pipes 1621 through 1624 through the frame fluid passages BFP.

The frame portion BA of each of the first and second interlayer spacers 1300 and 1400 may have a uniform thickness. However, a region of the frame portion BA where the frame fluid passages BFP are formed may be thicker than a region where the frame fluid passages BFP are not formed. If the region where the frame fluid passages BFP are formed is relatively thick, the frame fluid passages BFP having a sufficiently large inner diameter can be secured.

Figure 60:
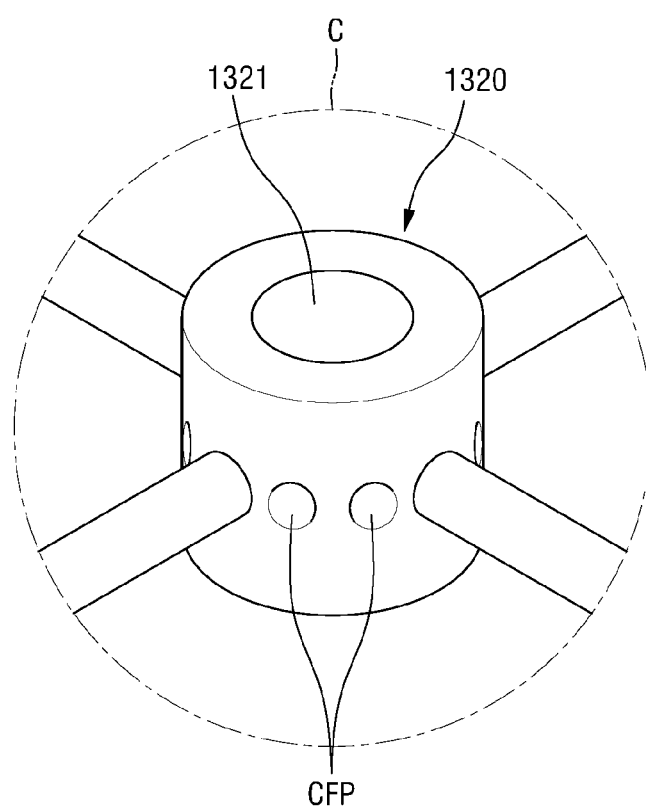
FIG. 60 is a perspective view of a region 'C' of FIG. 56.

FIG. 60 is a perspective view of a region 'C' of FIG. 56. Referring to FIGS. 52 through 60, the first interlayer spacer 1300 may further include a reinforcing member 1310 which connects facing sides of the frame portion BA. The reinforcing member 1310 may connect a side of the frame portion BA to the other side facing the above side. The reinforcing member 1310 may pass the central portion CA of the first interlayer spacer 1300. In the drawings, two reinforcing members 1310 that connect sides facing in different directions are provided. However, the inventive concept is not limited to this case. Each reinforcing member 1310 may be installed to traverse the central portion CA of the first interlayer spacer 1300. In an embodiment, the reinforcing members 1310 may be made of steel wire. Each of the reinforcing members 1310 may form a closed curve, and part of each of the reinforcing members 1310 may be inserted and coupled to the inside of the frame portion BA. In another embodiment, the reinforcing members 1310 may be integrally formed with the frame portion BA by, e.g., injection. However, the inventive concept is not limited to this case, and the reinforcing members 1310 may also be plate-shaped.

The reinforcing members 1310 installed in the first interlayer spacer 1300 can prevent distortion of the frame portion BA due to the expansion of pressure in the first unit limited space ULS1.

The reinforcing members 1310 may be thinner than the frame portion BA. Therefore, a space can be secured even in a region where each of the reinforcing members 1310 is disposed. The thickness of each of the reinforcing members 1310 may be about 2 to 70% of the thickness of the frame portion BA.

A region where a pair of reinforcing members 1310 intersect each other may overlap the central opening COP of the fluid separation membrane 1200. In addition, a central opening structure 1320 may be installed in the intersecting region of the pair of reinforcing members 1310.

The central opening structure 1320 is formed in a donut shape and includes an opening 1321. The opening 1321 inside the central opening structure 1320 may overlap the central opening COP of the fluid separation membrane 1200. The central assembly pipe 1610 is inserted into the opening 1321 of the central opening structure 1320 and the central opening COP of the fluid separation membrane 1200.

In some embodiments, if the central assembly pipe 1610 includes pipe holes DH, the central opening structure 1320 may include a plurality of central fluid passages CFPs. For example, respective ends of the central fluid passages CFP may be open in a side surface of the central opening structure 1320 and may be connected to the opening 1321 inside the central opening structure CFP. Therefore, the inside of the central assembly pipe 1610 may be spatially connected to the first unit limited spaces ULS1 by the pipe holes DH and the central fluid passages CFP. The central fluid passages CFP may serve as any one of a fluid inlet, a first fluid outlet, and a second fluid outlet. That is, a fluid can smoothly move between the first unit limited spaces ULS1 and the center assembly pipe 1610 through the central fluid passages CFP. However, when the central assembly pipe is used only to reinforce mechanical strength, the above-described pipe holes or central fluid passages may be omitted.

Figure 61:
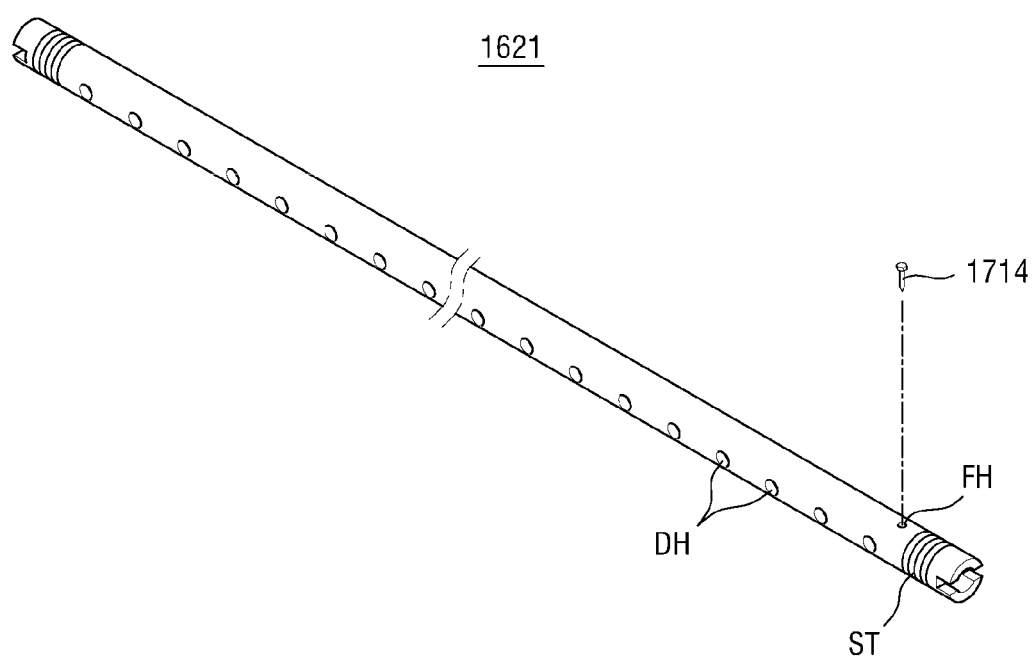
FIG. 61 is a perspective view of a frame assembly pipe shown in FIG. 52.
Figure 62:
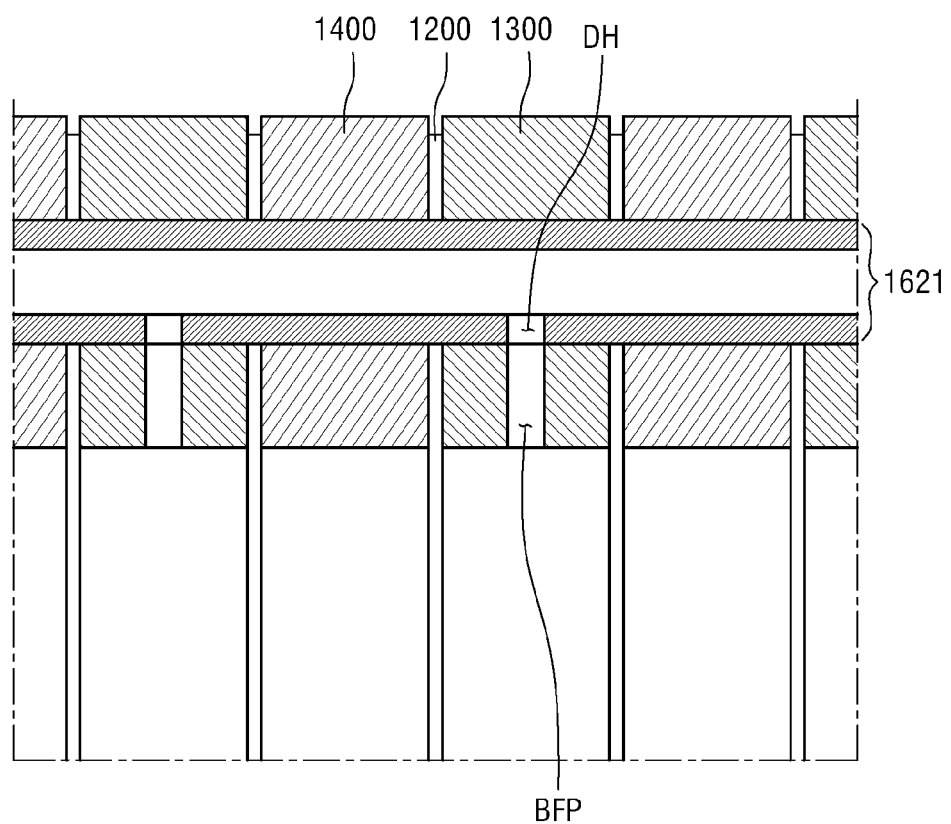
FIG. 62 is a cross-sectional view taken along the line LXII-LXII' of FIG. 52.

FIG. 61 is a perspective view of a frame assembly pipe shown in FIG. 52. FIG. 62 is a cross-sectional view taken along the line LXII-LXII' of FIG. 52.

Referring to FIGS. 52 through 62, the frame assembly pipes 1621 through 1624 have substantially the same shape. Each of the frame assembly pipes 1621 through 1624 is shaped like a hollow pipe. The empty spaces inside the frame assembly pipes 1621 through 1624 are utilized as passages for fluids introduced from the unit limited spaces ULS1 and ULS2.

Each of the frame assembly pipes 1621 through 1624 includes a plurality of pipe holes DH. The pipe holes DH are arranged at intervals of a pitch or twice the pitch of the unit limited spaces ULS1 and ULS2 stacked on each other. The pipe holes DH of the frame assembly pipes 1621 through 1624 are connected to the frame fluid passages BFP of the first and second interlayer spacers 1300 and 1400. The empty spaces inside the frame assembly pipes 1621 through 1624 may be spatially connected to the frame fluid passages BFP via the pipe holes DH. When the first unit limited spaces ULS1 and the second unit limited spaces ULS2 are alternately stacked, the frame assembly pipes 1621 and 623 respectively inserted into the first frame opening BTO1 and the third frame opening BTO3 may each have a pipe hole DH for each first unit limited space ULS1, and the frame assembly pipes 1622 and 624 respectively inserted into the second frame opening BTO2 and the fourth frame opening BTO4 may each have a pipe hole DH for each second unit limited space ULS2.

Screw threads ST may be formed at both ends of each of the frame assembly pipes 1621 through 1624. After the fluid separation membranes 1200 and the first and second interlayer spacers 1300 and 1400 are stacked and then the central assembly pipes 1621 through 1624 are inserted into the fluid separation membranes 1200 and the first and second interlayer spacers 1300 and 1400, assembly nuts 1640 are coupled to the screw threads ST, thereby securely coupling the fluid separation membranes 1200 and the first and second interlayer spacers 1300 and 1400 to each other.

Each of the frame assembly pipes 1621 through 1624 may further include fixing holes FH formed at both ends. Fixing pins 1714 are inserted into the fixing holes FH, so that each of the frame assembly pipes 1621 through 1624 can be held in an accurate position without being rotated. The fixing holes FH and the fixing pins 1714 can be omitted.

The central assembly pipe 1610 may have substantially the same shape as the frame assembly pipes 1621 through 1624 except that it does not have the fixing holes FH. That is, screw threads ST may be formed at both ends of the central assembly pipe 1610 and may be coupled to the assembly nuts 1640. When the central assembly pipe 1610 is used to increase mechanical strength, the inside of the central assembly pipe 1610 may be filled. However, when the central assembly pipe 1610 is used as an additional fluid passage, it may have a hollow shape and pipe holes DH, like the frame assembly pipes 1621 through 1624.

Different pressures may be applied to the first unit limited space ULS1 and the second unit limited space ULS2. For example, a relatively high pressure may be applied to the first unit limited space ULS1 provided with a fluid mixture, and a relatively low pressure may be applied to the second unit limited space ULS2 from which a separated fluid is discharged. To this end, a first pump (not shown) for applying a pressure of 0 to 4 kgf/cm$^2$ may be connected to assembly pipes, for example, the first and third frame assembly pipes 1621 and 623 which inject a fluid into the first unit limited space ULS1, and a second pump (not shown) for applying a pressure of 0 to −1 kgf/cm$^2$ may be connected to the second and fourth frame assembly pipes 1622 and 624 through which a fluid is discharged from the second unit limited space ULS2.

Unlike the first interlayer spacer 1300, the second interlayer spacer 1400 may not include the reinforcing members 1310 and the central opening structure 1320 but may be composed only of the frame portion BA. As described above, when the pressure of the second unit limited space ULS2 is set lower than that of the first unit limited space ULS1, the second interlayer spacer 1400 is less likely to be distorted due to pressure expansion. Therefore, the reinforcing members 1310 can be omitted. However, the inventive concept is not limited to this case.

The fluid separation membrane module 1100 may further include outermost covers 1710 and 1720. The outermost covers 1710 and 1720 are located at outermost positions on both sides in the stacking direction of the fluid separation membrane module 1100. Like the fluid separation membrane 1200, each of the outermost covers 1710 and 1720 may include a plurality of peripheral openings and/or a central opening.

Each of the outermost covers 1710 and 1720 may define an outermost unit limited space ULS1 or ULS2 in the fluid separation membrane module 1100. That is, the unit limited space ULS1 or ULS2 located at the outermost position in the stacking direction of the fluid separation membrane module 1100 may be composed of the fluid separation membrane 1200, the interlayer spacer 1300 or 400, and the outermost cover 1710 or 1720. The outermost covers 1710 and 1720 may have substantially the same shape (plate-like shape and openings) as the fluid separation membrane 1200. However, unlike the fluid separation membrane 1200, the outermost covers 1710 and 1720 may be made of a material that does not allow fluid movement, for example, a metal material having certain rigidity. In this case, in the outermost unit limited space ULS1 or ULS2, a fluid can pass only through the fluid separation membrane 1200 in an inward direction. The outermost unit limited space in the stacking direction may be the first unit limited space ULS1. However, the inventive concept is not limited to this case, and the outermost unit limited space in the stacking direction may also be the second unit limited space ULS2. Alternatively, the outermost unit limited space at one side may be the first unit limited space ULS1, and the outermost unit limited space at the other side may be the second unit limited space ULS2.

When the outermost covers 1710 and 1720 are installed in the fluid separation membrane module 1100, the assembly pipes 1610 and 621 through 624 are inserted into corresponding openings of the outermost covers 1710 and 1720, and the assembly nuts 1640 are coupled to the assembly pipes 1610 and 1621 through 1624 on the outside of the outermost covers 1710 and 1720. The fixing pins 1714 are inserted from side surfaces of the outermost covers 1710 and 1720. If the outermost covers 1710 and 1720 are made of a rigid metal, they can prevent deformation due to pressure difference, protect the fluid separation membranes 1200 inside the outermost covers 1710 and 1720, and prevent the separation membrane module 1100 from being deformed or damaged by the pressure applied when the assembly nuts 1640 are coupled.

The fluid separation membrane module 1100 according to the embodiment of the inventive concept is easy to assemble because, after the plate-shaped fluid separation membranes 1200 and the interlayer spacers 1300 and 1400 are stacked, the fluid separation membranes 1200 can be fixed at one time using the assembly pipes 1610 and 1621 through 1624. Such an assembly process is easy to automate, thus leading to high process efficiency.

Hereinafter, other embodiments of the inventive concept will be described.

Figure 63:
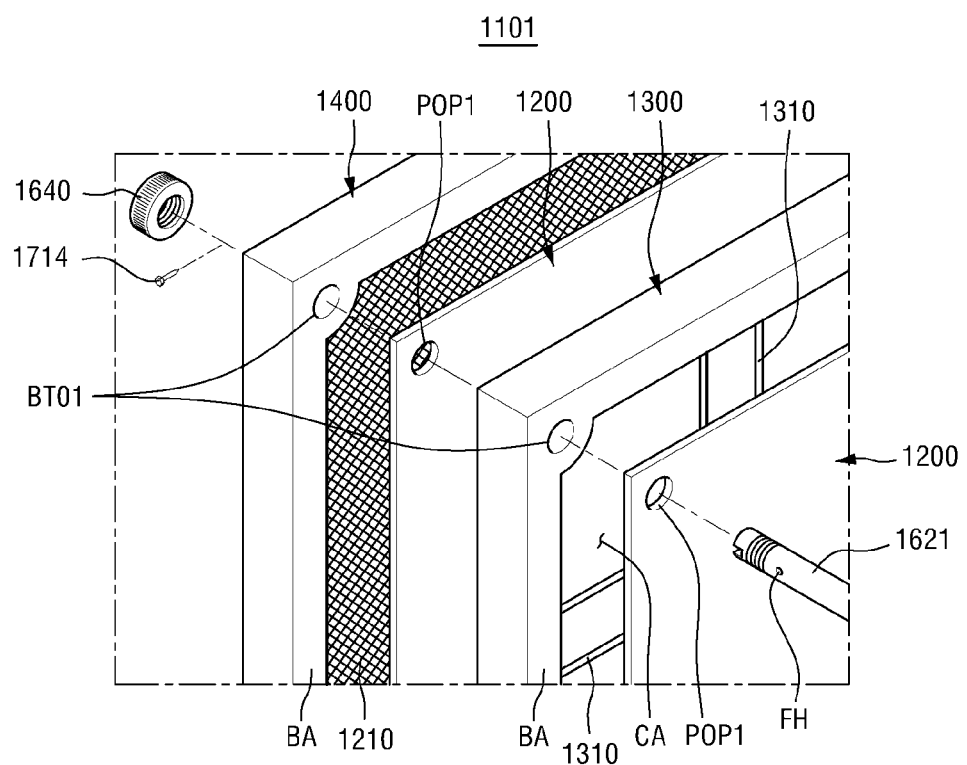
FIG. 63 is an exploded perspective view of a fluid separation membrane module according to another embodiment of the inventive concept.
Figure 64:
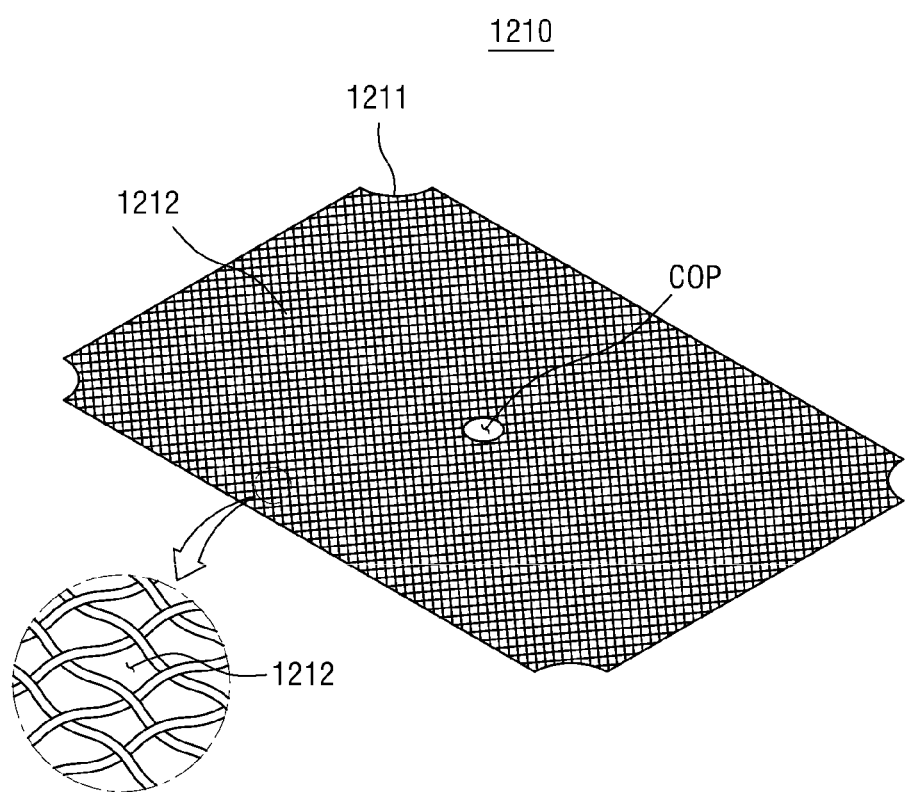
FIG. 64 is a perspective view of a membrane spacer shown in FIG. 63.
Figure 65:
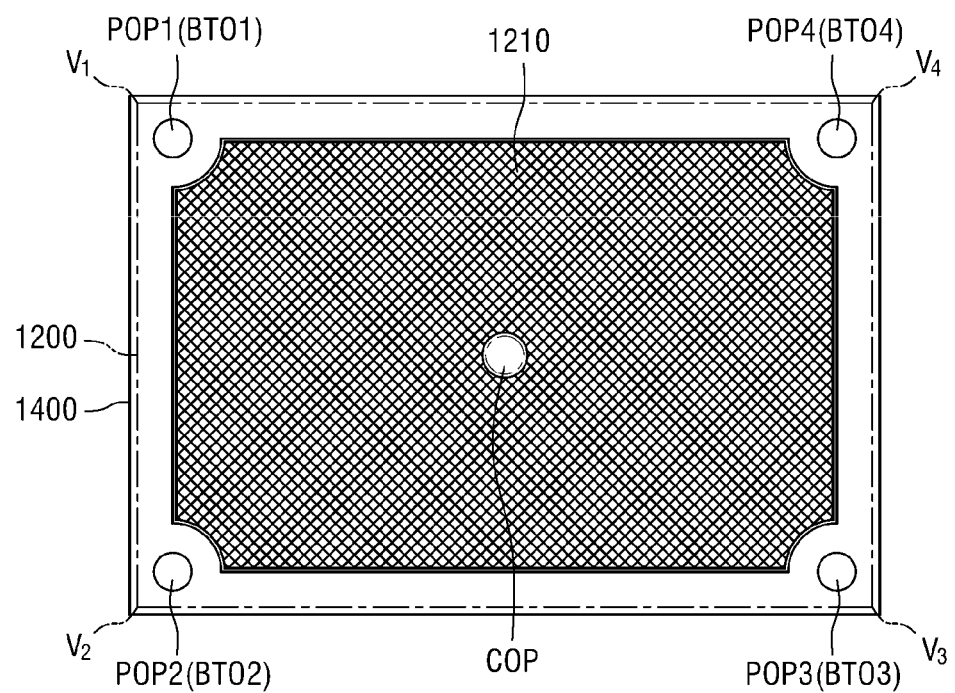
FIG. 65 is a plan layout view showing a separation membrane, a second interlayer spacer and the membrane spacer shown in FIG. 63.

FIG. 63 is an exploded perspective view of a fluid separation membrane module according to another embodiment of the inventive concept. FIG. 64 is a perspective view of a membrane spacer shown in FIG. 63. FIG. 65 is a plan layout view showing a separation membrane, a second interlayer spacer and the membrane spacer shown in FIG. 63.

Referring to FIGS. 63 through 65, the fluid separation membrane module 1101 according to the current embodiment is different from the embodiment of FIG. 2 in that it further includes the membrane spacer 1210.

Specifically, the membrane spacer 1210 may be disposed in a second unit limited space ULS2. When the second unit limited space ULS2 has a lower pressure than a first unit limited space ULS1, it may contract due to the pressure difference. If two fluid separation membranes 1200 come into complete contact with each other, a space in which a fluid can move is reduced. Therefore, the membrane spacer 1210 is disposed between adjacent two fluid separation membranes 1200 in the second unit limited space ULS2 to prevent the fluid separation membranes 1200 from coming into complete contact with each other.

The membrane spacer 1210 may be large enough to cover most of the second unit limited space ULS2 but may be smaller than the fluid separation membrane 1200. While the fluid separation membrane 1200 overlaps a frame portion BA of each of first and second interlayer spacers, the membrane spacer 1210 may be placed only inside the frame portion BA of each of the first and second interlayer spacers 1300 and 1400 without overlapping the frame portion BA. The membrane spacer 1210 may not include frame openings. Instead, regions where frame openings BTO of the first and second interlayer spacers 1300 and 1400 are formed, that is, corner portions of the membrane spacer 120 may be concavely cut (see reference numeral '1211'). A frame assembly pipe 1621 passes outside the concavely cut portion 1211 of the membrane spacer 1210. However, the corner portions are not necessarily cut in a concave shape and can also be cut in other shapes such as a diagonal line.

A central opening COP may be provided at the center of the membrane spacer 1210 to allow insertion of a central assembly pipe 1610 (see FIG. 52). The membrane spacer 1210 is initially fixed by the insertion of the central assembly pipe 1610 (see FIG. 52). Then, the membrane spacer 1210 is fixed again when adjacent fluid separation membranes 1200 come into contact with each other due to the contraction of the second unit limited space ULS2.

The membrane spacer 1210 has a plurality of openings 1212 through which a fluid can move in a thickness direction. In an exemplary embodiment, the membrane spacer 1210 may have a net shape. The openings 1212 provide spaces in which a fluid can stay or move within the second unit limited space ULS2.

The membrane spacer 1210 may also provide a fluid passage in a planar direction. The fluid passage in the planar direction inside the second unit limited space ULS2 is necessary to transfer a separated fluid to the frame portion BA (corner portion) of the second unit limited space ULS2. When two adjacent fluid separation membranes 1200 come into complete contact with the membrane spacer 1210, if only the openings 1212 in the thickness direction are present in the membrane spacer 1210, a fluid may be trapped in the openings 1212 of the membrane spacer 1210. Therefore, it is difficult for the fluid to be transferred to the frame openings BTP of the second interlayer spacer 1400. To prevent this, the membrane spacer 1210 may be configured to provide a fluid passage in the planar direction. As an example of the above configuration, a membrane spacer having a twisted net structure may be applied.

As shown in the enlarged view of FIG. 64, the twisted net structure is formed as threads of a net in one direction and threads of the net in another direction repeatedly intersect each other in a downward direction and an upward direction. Therefore, even if neighboring fluid separation membranes 1200 are closely attached to the membrane spacer 1210, gaps can be maintained at the intersections of the threads. These gaps may provide a fluid passage in the planar direction.

The membrane spacer 1210 may be made of a polymer material such as synthetic resin, nylon or polyester, or may be made of a metal material.

Figure 66:
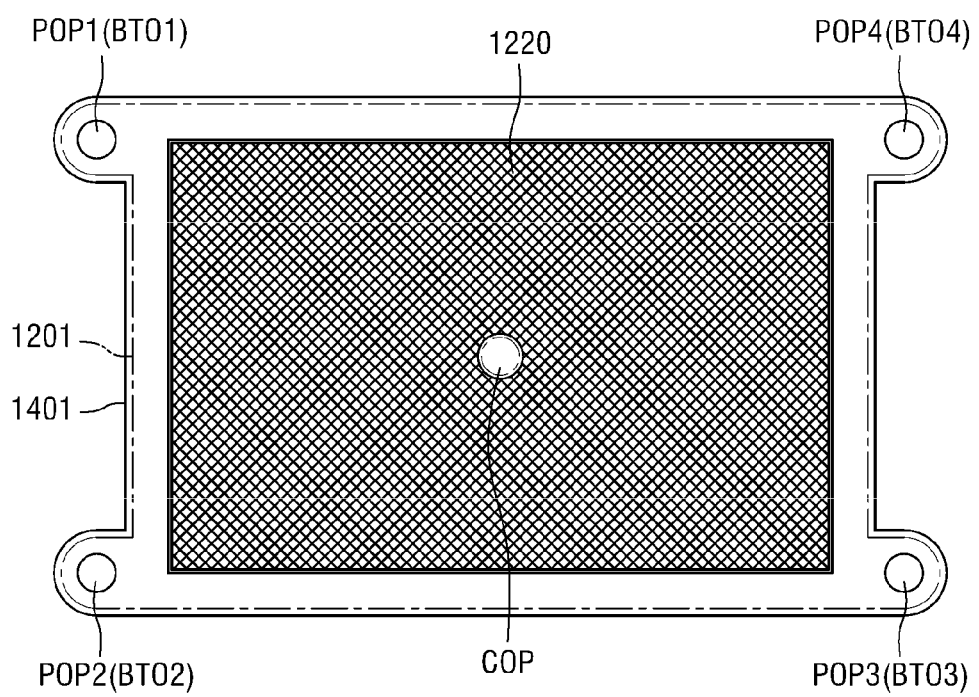
FIG. 66 is a plan layout view showing a separation membrane, a second interlayer spacer and a membrane spacer of a fluid separation membrane module according to another embodiment of the inventive concept.

FIG. 66 is a plan layout view showing a separation membrane, a second interlayer spacer and a membrane spacer of a fluid separation membrane module according to another embodiment of the inventive concept.

Referring to FIG. 66, the fluid separation membrane module according to the current embodiment is different from the embodiment of FIG. 65 in that portions where peripheral openings POP of the fluid separation membrane 1201 and frame openings BTO of a first interlayer spacer (not shown) and the second interlayer spacer 1401 are formed protrude outwards and thus the membrane spacer 1220 has a rectangular shape.

In the current embodiment, even though the membrane spacer 1220 has a rectangular shape, since the frame openings BTO of the first and second interlayer spacers 1300 and 1400 through which frame assembly pipes 1621 through 1624 (see FIG. 52) pass protrude, the frame assembly pipes 1621 through 1624 (see FIG. 52) may pass the outside the membrane spacer 1220. Since the rectangular membrane spacer 1220 is easy to manufacture, the manufacturing cost can be reduced.

Figure 67:
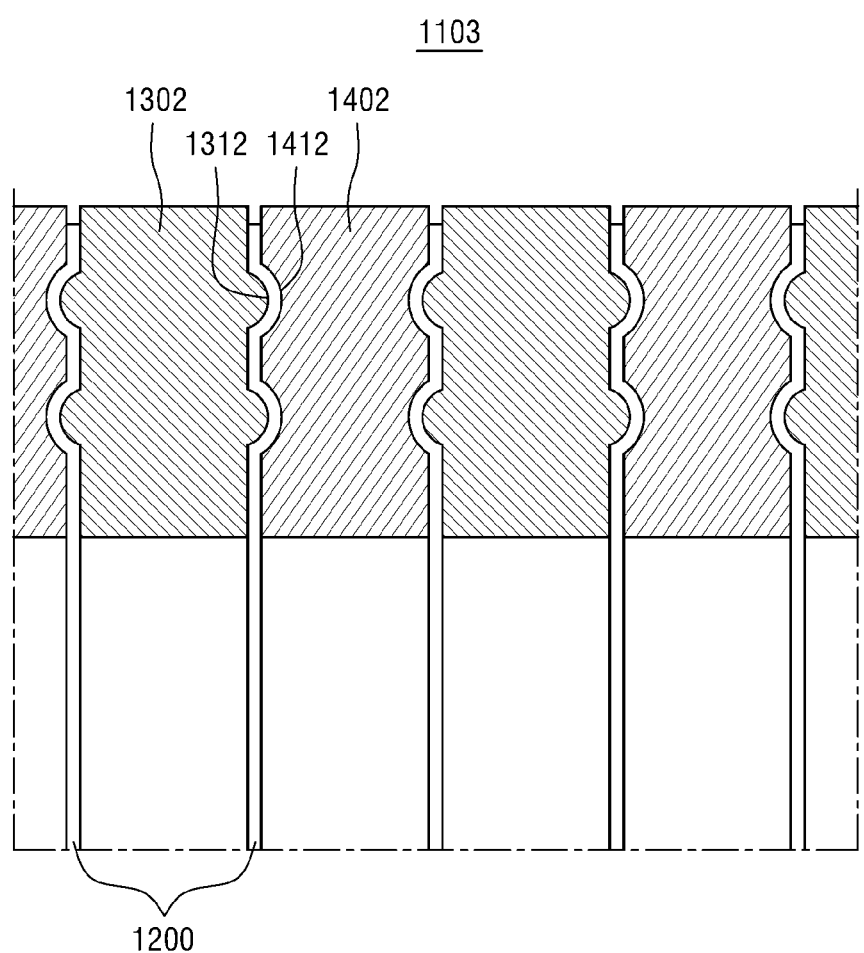
FIG. 67 is a partial cross-sectional view of a fluid separation membrane module according to another embodiment of the inventive concept.
Figure 68:
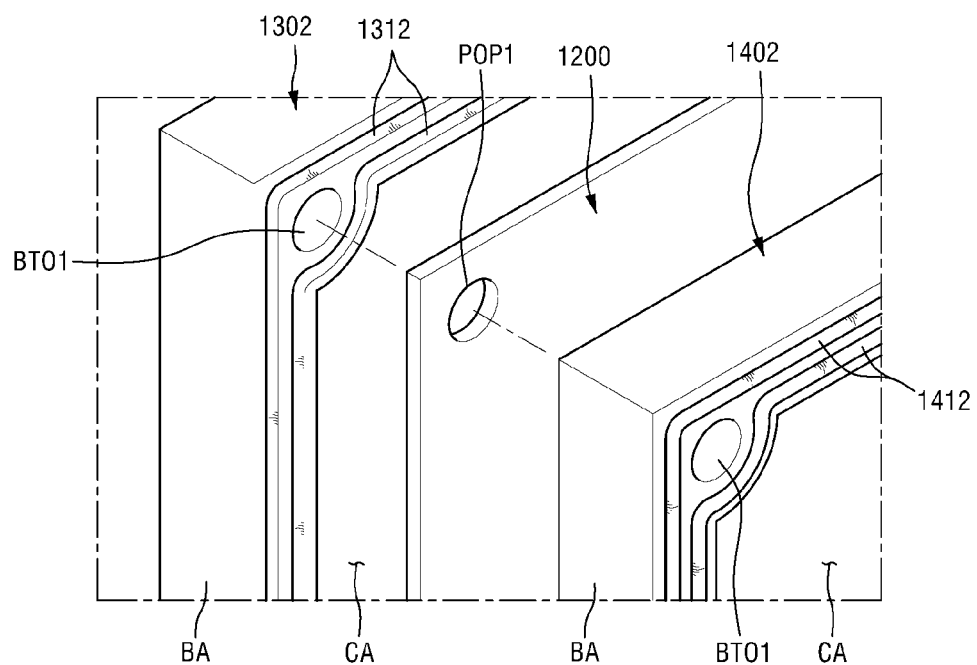
FIG. 68 is an exploded perspective view of a first interlayer spacer, a separation membrane, and a second interlayer spacer shown in FIG. 67.

FIG. 67 is a partial cross-sectional view of a fluid separation membrane module according to another embodiment of the inventive concept. FIG. 68 is an exploded perspective view of a first interlayer spacer, a separation membrane, and a second interlayer spacer shown in FIG. 67.

Referring to FIGS. 67 and 68, the fluid separation membrane module 1103 according to the current embodiment is different from the embodiment of FIG. 52 in that respective frame portions BA of the first interlayer spacer 1302 and the second interlayer spacer 1402 have protrusions and recesses engaged with each other.

For example, the first interlayer spacer 1302 includes a plurality of protrusions 1312 which convexly protrude along both surfaces of the frame portion BA, and the second interlayer spacer 1402 includes a plurality of recesses 1412 which are concavely recessed along both surfaces of the frame portion BA. The recesses 1412 of the second interlayer spacer 1402 may be shaped to fit the protrusions 1312 of the first interlayer spacer 1302. Each of the height of the protrusions 1312 and the depth of the recesses 1412 may be 5 to 80% of the thickness of the frame portion BA.

Due to this structure, when the first interlayer spacer 1302 and the second interlayer spacer 1402 are arranged alternately with the fluid separation membrane 1200 interposed between them, the protrusions 1312 of the first interlayer spacer 1302 are inserted into the recesses 1412 of the second interlayer spacer 1402. This can improve the airtightness of the fluid separation membrane module 1103 and increase the mechanical stability of the fluid separation membrane module 1103.

In the drawings, two lines of linear protrusions 1312 are formed along both surfaces of the first interlayer spacer 1302, and two lines of linear recesses 1412 are formed along both surfaces of the second interlayer spacer 1402. However, the number, shape, arrangement, and the like of the protrusions 1312 and the recesses 1412 can be variously modified. For example, each of the number of the protrusions and the number of the recesses may be one or may be three or more. In addition, the protrusions and the recesses may be a plurality of island patterns instead of linear patterns. Alternatively, the recesses may be formed in the first interlayer spacer, and the protrusions may be formed in the second interlayer spacer. Alternatively, the protrusions may be formed in one surface of each of the first interlayer spacer and the second interlayer spacer, and the recesses may be formed in the other surface. Alternatively, the protrusions and the recesses may all be disposed in one surface of each of the first and second interlayer spacers. It will be apparent to those skilled in the art that various other modifications can be made to enhance the airtightness and mechanical stability of the fluid separation membrane module.

Figure 69:
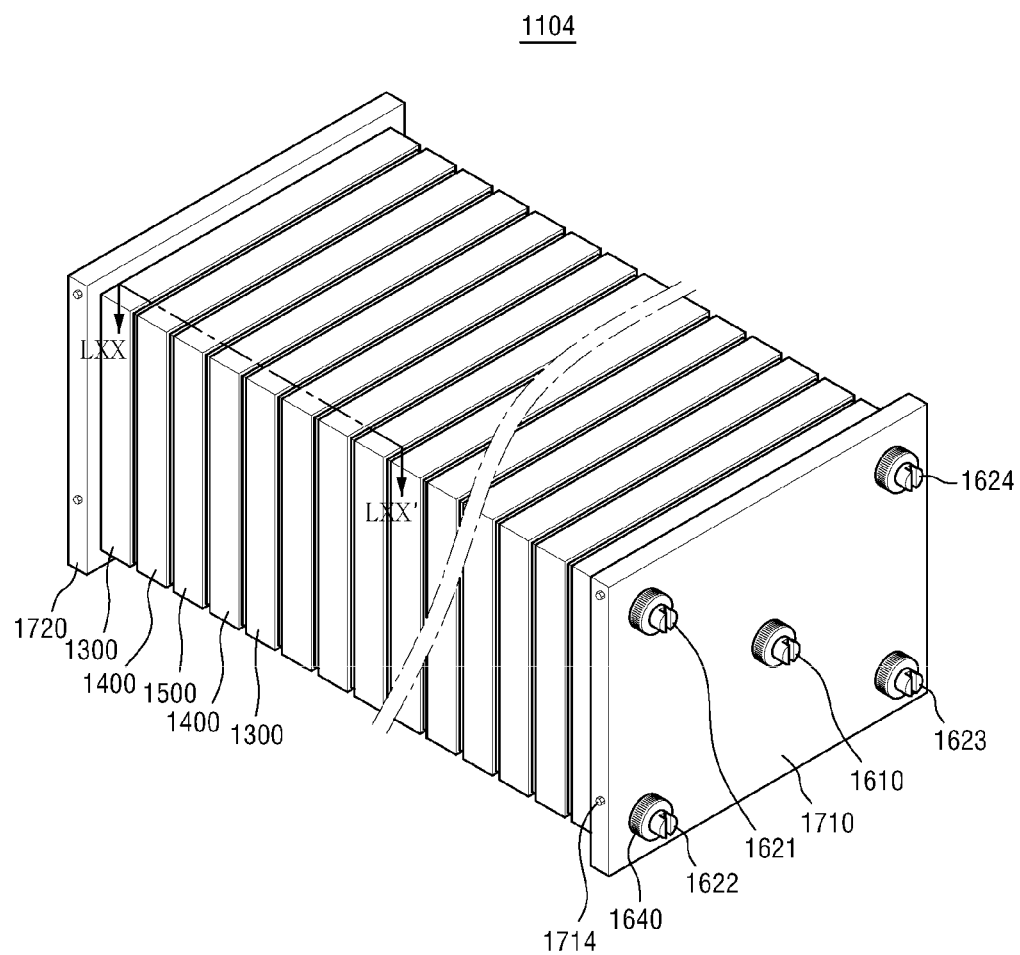
FIG. 69 is a perspective view of a fluid separation membrane module according to another embodiment of the inventive concept.
Figure 70:
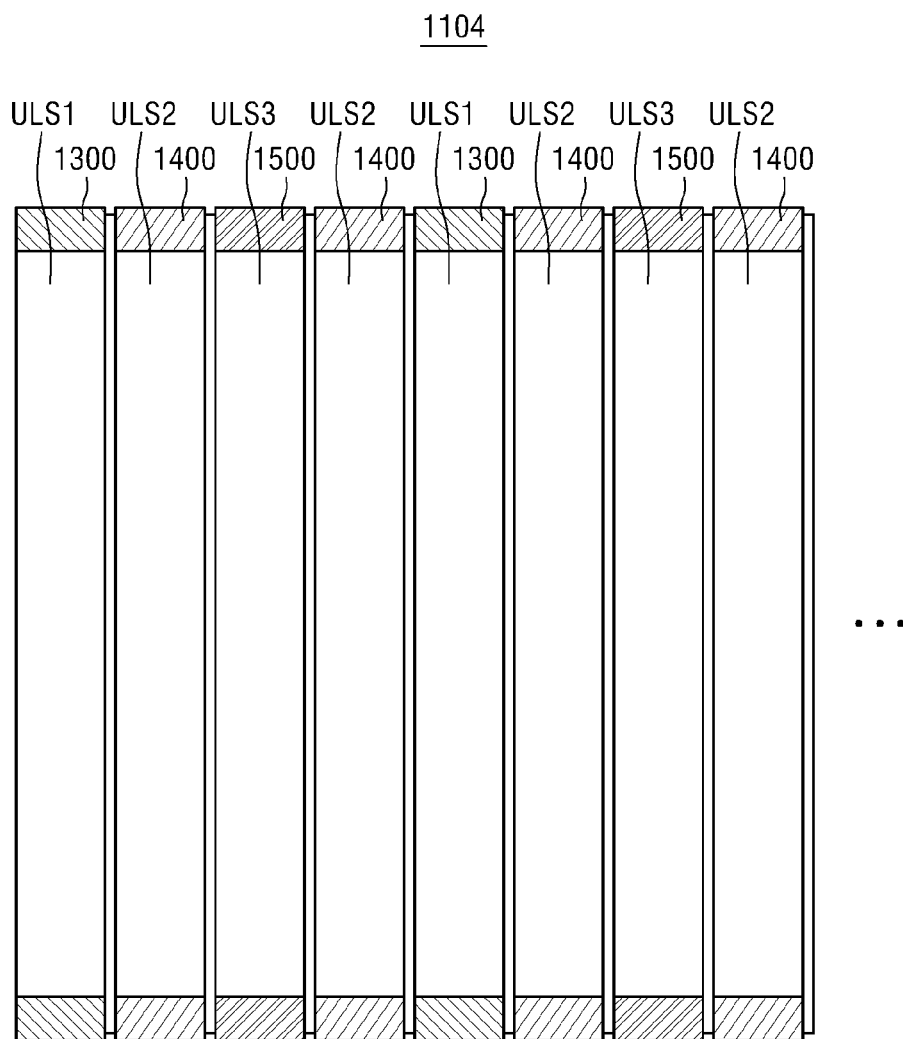
FIG. 70 is a cross-sectional view taken along the line LXX-LXX' of FIG. 69.

FIG. 69 is a perspective view of a fluid separation membrane module according to another embodiment of the inventive concept. FIG. 70 is a cross-sectional view taken along the line LXX-LXX' of FIG. 69.

Referring to FIGS. 69 and 70, the fluid separation membrane module 1104 according to the current embodiment is different from the embodiment of FIG. 52 in that it further includes a third unit limited space ULS3 in addition to a first unit limited space ULS1 and a second unit limited space ULS2. The third unit limited space is disposed adjacent to the second unit limited space ULS2 to enable multistage fluid separation.

More specifically, the second unit limited space ULS2 may be disposed on both sides of the third unit limited space ULS3 and the first unit limited space ULS1. In addition, the first unit limited space ULS1 may be disposed on a side of the second unit limited space ULS2, and the third unit limited space ULS3 may be disposed on the other side of the second unit limited space ULS2. That is, the unit limited spaces of the fluid separation membrane module 1104 may be stacked in the order of the first unit limited space ULS1, the second unit limited space ULS2, the third unit limited space ULS3, the second unit limited space ULS2, and the first unit limited space ULS1. In the fluid separation membrane module 1104, the number of the first unit limited spaces ULS1 and the number of the third unit limited spaces ULS3 may be substantially equal to each other, and the number of the second unit limited spaces ULS2 may be twice the number of the third unit limited spaces ULS3.

When a mixed fluid is supplied to the first unit limited space ULS1, the fluid is firstly separated as it moves to the adjacent second unit limited space ULS2. The firstly separated fluid is secondly separated as it moves to the adjacent third unit limited space ULS3. The mixed fluid secondly separated as it passes through the two separation membranes from the first unit limited space ULS1 has a higher concentration of a specific fluid. That is, a highly concentrated fluid can be obtained through the multistage separation. More unit limited spaces can be arranged to separate a more highly concentrated fluid. For example, if a fourth unit limited space is placed adjacent to the third unit limited space ULS3, it is possible to separate the mixed fluid thirdly. Therefore, a more highly concentrated fluid can be separated. In this way, the number of unit limited spaces can be increased or decreased according to the required concentration of a fluid.

Like the second unit limited space ULS2, the third unit limited space ULS3 includes two fluid separation membranes 1200 and a third interlayer spacer 1500. The third interlayer spacer 1500 may have substantially the same shape as a second interlayer spacer 1400. Also, as in the embodiment of FIG. 63, a membrane spacer may be disposed in the third unit limited space ULS3 and/or the second unit limited space ULS2.

To prevent fluids discharged from the first through third unit limited spaces ULS1 through ULS3 from being mixed with each other, frame fluid passages BFP of the first through third interlayer spacers 1300 through 1500 may be formed at different positions.

For example, the first interlayer spacer 1300 that forms the first unit limited space ULS1 may have the frame fluid passages BFP at a first frame opening BTO1 and a third frame opening BTO3, the second interlayer spacer 1400 that forms the second unit limited space ULS2 may have the frame fluid passages BFP at a second frame opening BTO2, and the third interlayer spacer 1500 that forms the third unit limited space ULS3 may have the frame fluid passages BFP at a fourth frame opening BTO4. In addition, each of frame assembly pipes 1621 through 1624 passing through corresponding frame openings BTO may include pipe holes DH connected to the frame fluid passages BFP when it is coupled to the first through third interlayer spacers 1300 through 1500. It is apparent that the intervals of the pipe holes DH formed in the frame assembly pipes 1521 through 1524 will vary according to the arrangement and stacking intervals of the frame fluid passages BFP.

Different pressures may be applied to the first unit limited space ULS1 and the third unit limited space ULS3. For example, a relatively high pressure may be applied to the first unit limited space ULS1 to which a fluid mixture is provided, and a relatively low pressure may be applied to the third unit limited space ULS3 from which a separated fluid is discharged. A first pump (not shown) for applying a pressure of 0 to 8 kgf/cm$^2$ may be connected to the first and third frame assembly pipes 1621 and 1623 which inject a fluid into the first unit limited space ULS1, and a second pump (not shown) for applying a pressure of 0 to −1 kgf/cm$^2$ may be connected to the fourth frame assembly pipe 1624 through which a fluid is discharged from the third unit limited space ULS3. Even if no pressure is directly applied to the second unit limited space ULS2, the intermediate pressure between the pressure of the adjacent first unit limited space ULS1 and the pressure of the adjacent third unit limited space ULS3 may be applied to the second unit limited space ULS2.

Figure 71:
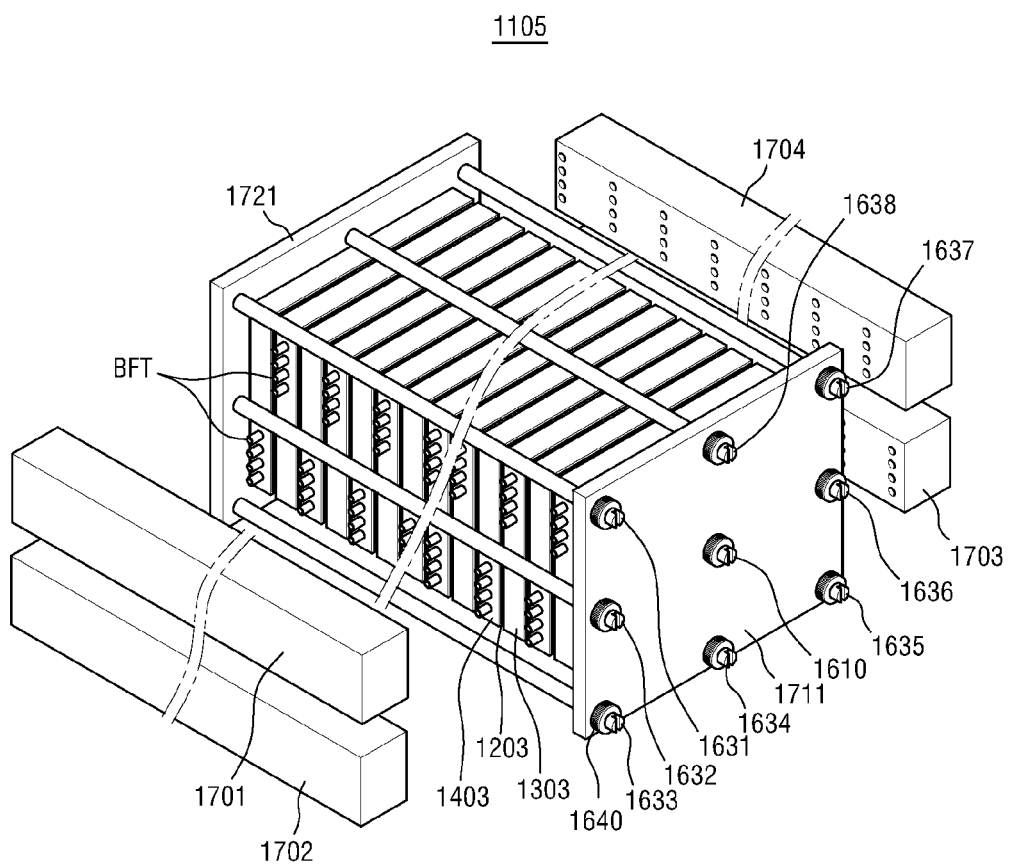
FIG. 71 is an exploded perspective view of a fluid separation membrane module according to another embodiment of the inventive concept.
Figure 72:
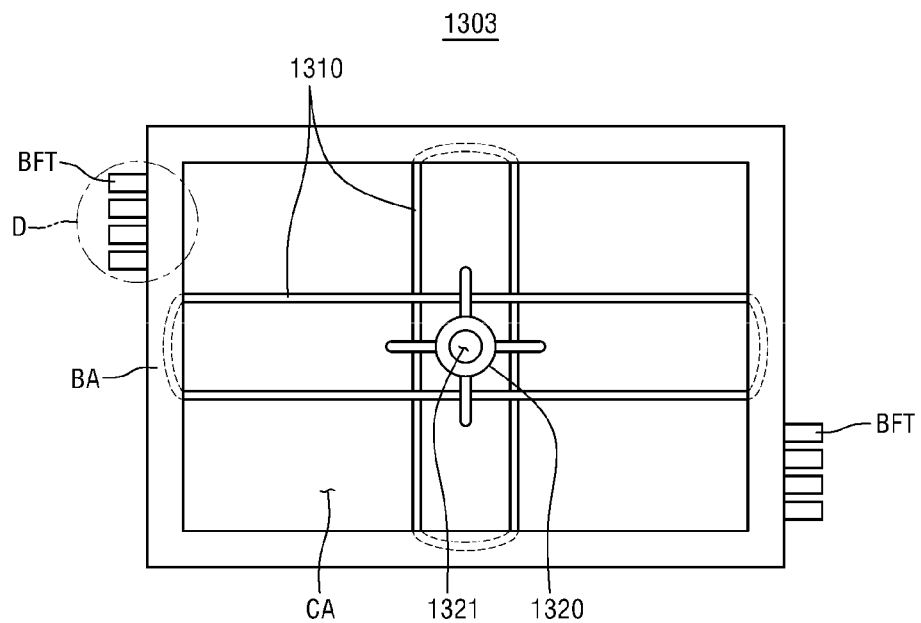
FIG. 72 is a plan view of a first interlayer spacer shown in FIG. 71.
Figure 73:
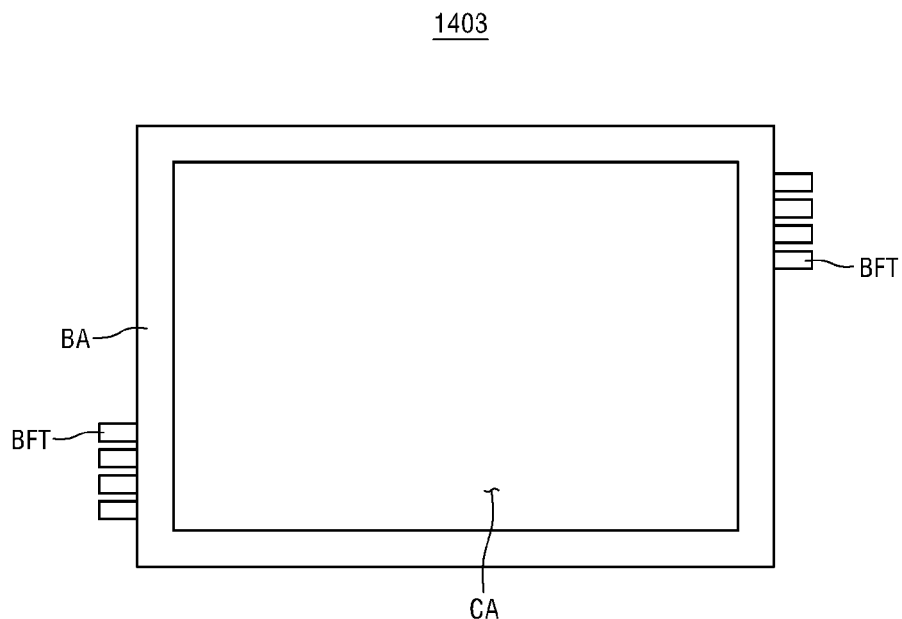
FIG. 73 is a plan view of a second interlayer spacer shown in FIG. 71.
Figure 74:
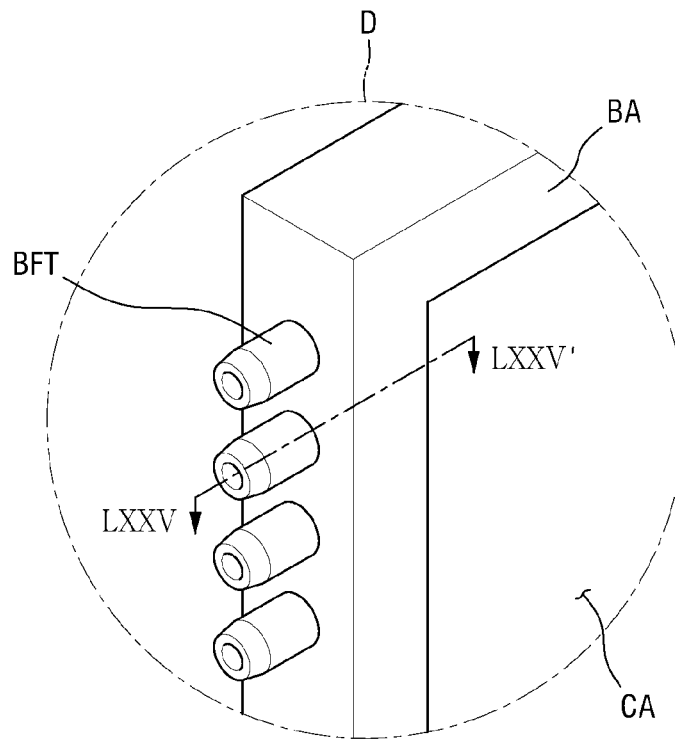
FIG. 74 is a perspective view of a region 'D' of FIG. 72.
Figure 75:
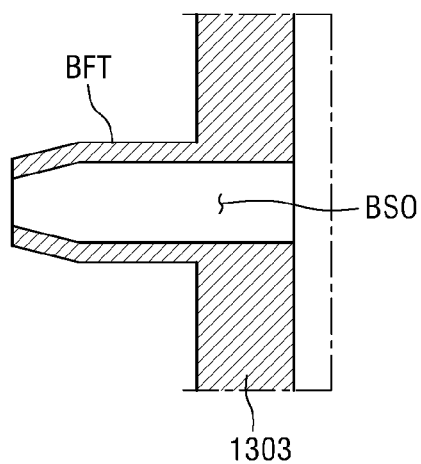
FIG. 75 is a cross-sectional view taken along the line LXXV-LXXV' of FIG. 74.

FIG. 71 is an exploded perspective view of a fluid separation membrane module according to another embodiment of the inventive concept. FIG. 72 is a plan view of a first interlayer spacer shown in FIG. 71. FIG. 73 is a plan view of a second interlayer spacer shown in FIG. 71. FIG. 74 is a perspective view of a region 'D' of FIG. 72. FIG. 75 is a cross-sectional view taken along the line LXXV-LXXV' of FIG. 74.

Referring to FIGS. 71 through 75, the fluid separation membrane module 1105 according to the current embodiment is different from the embodiment of FIG. 2 in that at least one side opening BSO passing through a frame portion BA in a lateral direction is formed while frame openings passing through the frame portion BA in a thickness direction are omitted from the first interlayer spacer 1303 and the second interlayer spacer 1403.

The side opening BSO penetrates outer and inner surfaces of a side of the frame portion BA of each of the first interlayer spacer 1303 and the second interlayer spacer 1403. A width of the side opening BSO may range from 10 to 90% of a thickness of the frame portion BA. Although a cross-section of the side opening BSO is circular in the drawings, it is not limited to the circular shape.

One or more side openings BSO may be disposed at a side of the frame portions BA of each of the first interlayer spacer 1303 and the second interlayer spacer 1403. For example, 1 to 30 side openings BSO may be disposed at one side of the frame portion BA, but the inventive concept is not limited to this case.

Positions where the side opening BSO is formed in the first interlayer spacer 1303 may alternate with positions where the side opening BSO is formed in the second interlayer spacer 1403. For example, in the case of the first interlayer spacer 1303, one or more side openings BSO may be formed in an upper part of a left side of the frame portion BA and a lower part of a right side of the frame portion BA. On the other hand, in the case of the second interlayer spacer 1403, one or more side openings BSO may be formed in an upper part of a right side of the frame portion BA and a lower part of a left side of the frame portion BA.

A frame fluid flow pipe BFT may be provided outside a side opening BSO. The frame fluid flow pipe BFT may protrude from an outer surface of the frame portion BA. The frame fluid flow pipe BFT is connected to the side opening BSO. A central portion CA of each of the first interlayer spacer 1303 and the second interlayer spacer 1403 which is surrounded by the frame portion BA, in other words, a first unit limited spacer ULS1 or a second unit limited space ULS2 is spatially connected to the outside through the side opening BSO and the frame fluid flow pipe BFT. The side opening BSO (and the frame fluid flow pipe) serves as a frame fluid passage. That is, the side opening BSO may serve as any one of a fluid inlet, a first fluid outlet, and a second fluid outlet.

In an exemplary embodiment that does not limit the inventive concept, the side openings BSO disposed in the upper part of the left side of the frame portion BA of the first interlayer spacer 1303 are used as fluid inlets, and the side openings BSO disposed in the lower part of the right side of the frame portion BA may be used as first fluid outlets. In addition, the side openings BSO disposed in the upper part of the right side of the frame portion BA of the second interlayer spacer 1403 and in the lower part of the left side of the frame portion BA may be used as second fluid outlets.

Figure 76:
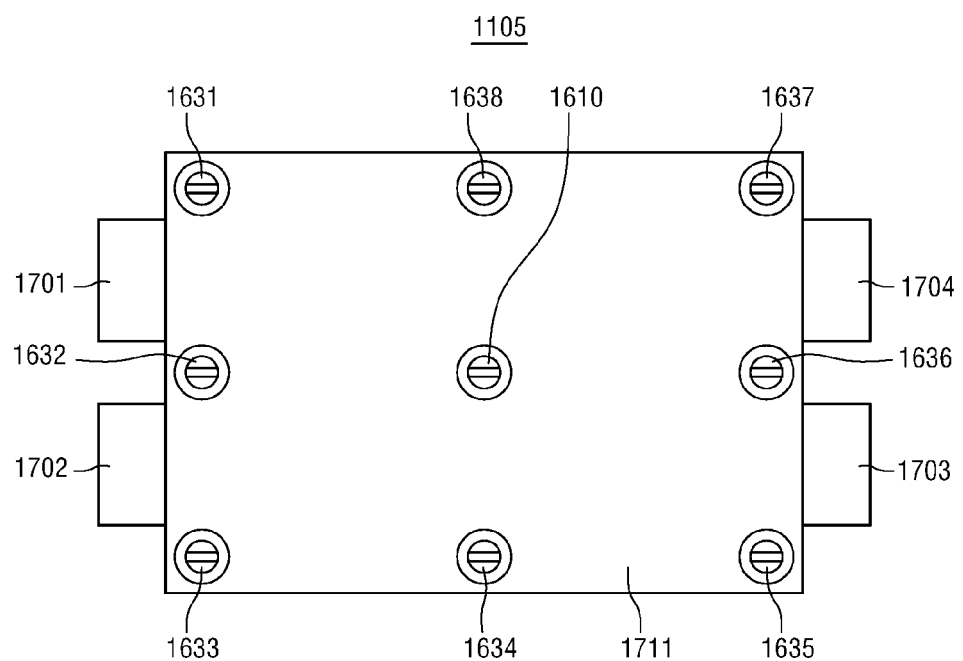
FIG. 76 is a side view of the fluid separation membrane module shown in FIG. 71.
Figure 77:
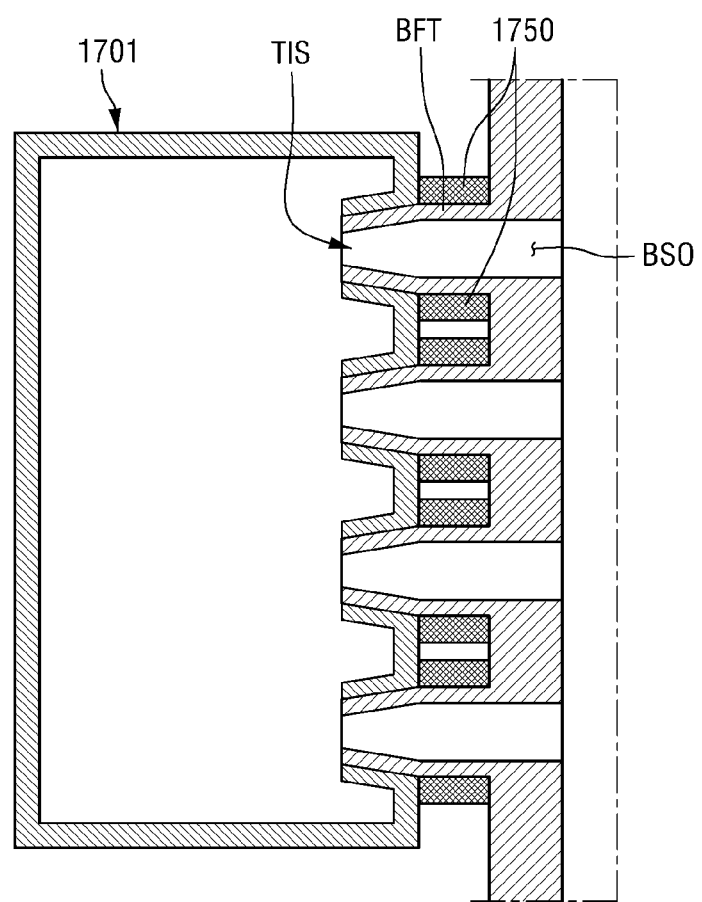
FIG. 77 is a cross-sectional view of a coupling portion between a collector and the first interlayer spacer shown in FIG. 71.

FIG. 76 is a side view of the fluid separation membrane module shown in FIG. 71. FIG. 77 is a cross-sectional view of a coupling portion between a collector and the first interlayer spacer shown in FIG. 71.

Referring to FIGS. 71 through 77, the side openings BSO and the frame fluid flow pipe BFT connected to the side openings BSO have the same function and may be connected to collectors 1701 through 1704. For example, a plurality of collectors 1701 through 1704 may be disposed on an upper left side, a lower right side, an upper right side and a lower right side of each of the interlayer spacers 1303 and 1403 and may be connected to the frame fluid flow pipes BFT respectively connected to adjacent side openings BSO. A mixed fluid may be supplied to the unit limited spaces ULS1 and ULS2 connected to the collectors 1701 through 1704 through the collectors 1701 through 1704, or a separated fluid discharged from each of the unit limited spaces ULS1 and ULS2 may be collected by the collectors 1701 through 1704.

Each of the collectors 1701 through 1704 includes fluid flow pipe insertion holes TIS. The fluid flow pipe insertion holes TIS may protrude into each of the collectors 1701 through 1704. An inner protruding portion of each of the fluid flow pipe insertion holes TIS may be tapered so as to have a smaller width toward the inside. A sealant such as a gasket for preventing fluid outflow may be attached between the collectors 1701 through 1704 and the first and second interlayer spacers 1301 and 1401 connected to the collectors 1701 through 1704.

Figure 78:
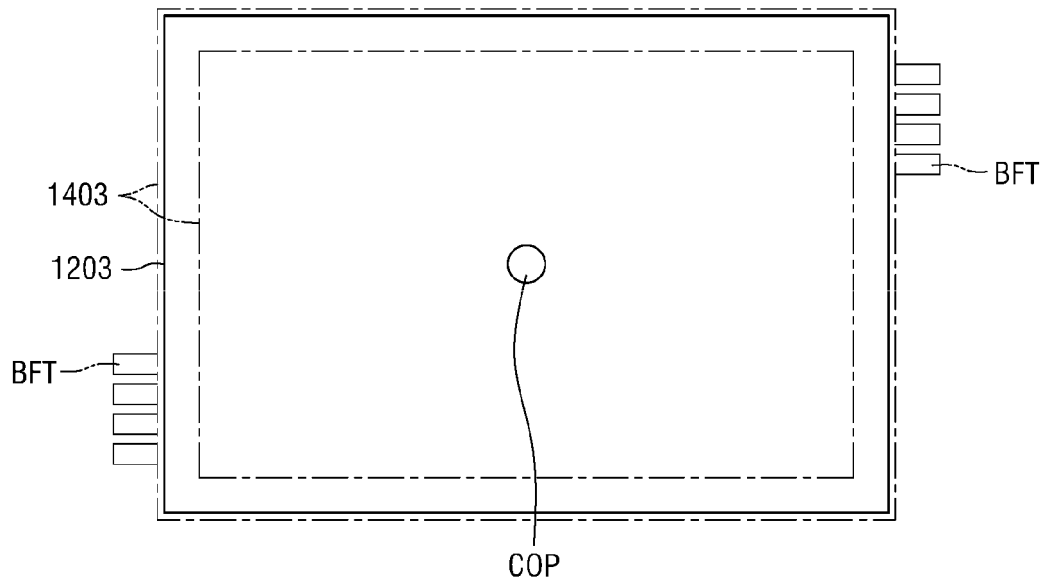
FIG. 78 is a plan layout view showing a separation membrane and the second interlayer spacer of FIG. 71 together.

FIG. 78 is a plan layout view showing a separation membrane and the second interlayer spacer of FIG. 71 together. Referring to FIGS. 71 through 78, a fluid separation membrane 1203 is disposed on upper and lower surfaces of the frame portion BA of each of the first and second interlayer spacers 1303 and 1403. A size of the fluid separation membrane 1201 is smaller than or equal to a size of the frame portion BA of each of the first and second interlayer spacers 1303 and 1403 and larger than a size of the central portion of each of the first and second interlayer spacers 1303 and 1403 which is surrounded by the frame portion BA. When openings passing through the frame portion BA of each of the first interlayer spacer 1303 and the second interlayer spacer 1403 in the thickness direction are omitted as in the current embodiment, side openings can also be omitted from the fluid separation membrane 1203. However, the fluid separation membrane 1203 may include a central opening COP, and the first interlayer spacer 1303 may include a central opening structure 1320. Therefore, as a central assembly pipe 1610 passes through the central opening COP and the central opening structure 1320, the movement of the fluid separation membrane 1203 can be prevented.

The fluid separation membrane module 1105 may further include outermost covers 1711 and 1721. The outermost covers 1711 and 1721 are located at outermost positions on both sides in a stacking direction of the fluid separation membrane module 1105. Each of the outermost covers 1711 and 1721 may include peripheral openings as well as a central opening through which the central assembly pipe 1610 passes. For example, one or more peripheral openings may be formed at corners and sides of each of the outermost covers 1711 and 1721. The outermost covers 1711 and 1721 may be larger in size than the first and second interlayer spacers 1303 and 403 and the fluid separation membrane 1203. Further, the peripheral openings of the outermost covers 1711 and 1721 may be located outside the first and second interlayer spacers 1303 and 1403 and the fluid separation membrane 1203.

Frame assembly pipes 1631 through 1638 are respectively inserted into corresponding peripheral openings of the outermost covers 1711 and 1721 located on both sides. The frame assembly pipes 1631 through 1638 pass outside the first and second interlayer spacers 1303 and 1403 to penetrate through the peripheral openings of the outermost covers 1711 and 721 on both sides. Assembly nuts 1640 for fixing the central and frame assembly pipes 1610 and 1631 through 1638 are coupled to the assembly pipes 1610 and 1631 through 1638 on the outer sides of the outermost covers 1631 through 1638.

In the current embodiment, a fluid flows through the side openings BSO and the frame fluid flow pipes BFT of the first and second interlayer spacers 1303 and 1403. Therefore, the central and frame assembly pipes 1610 and 1631 through 1638 may not include pipe holes DH.

Although not described in separate drawings, it will be easily understood by those skilled in the art that multistage separation can be applied in the current embodiment by further placing a third unit limited space ULS3 and the like as in the embodiment of FIG. 69.

Figure 79:
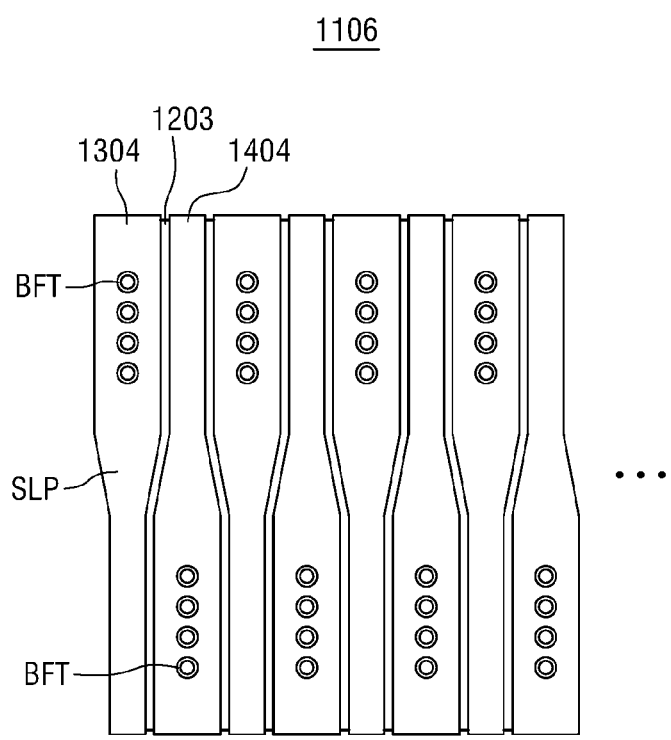
FIG. 79 is a side view of a fluid separation membrane module according to another embodiment of the inventive concept.
Figure 80:
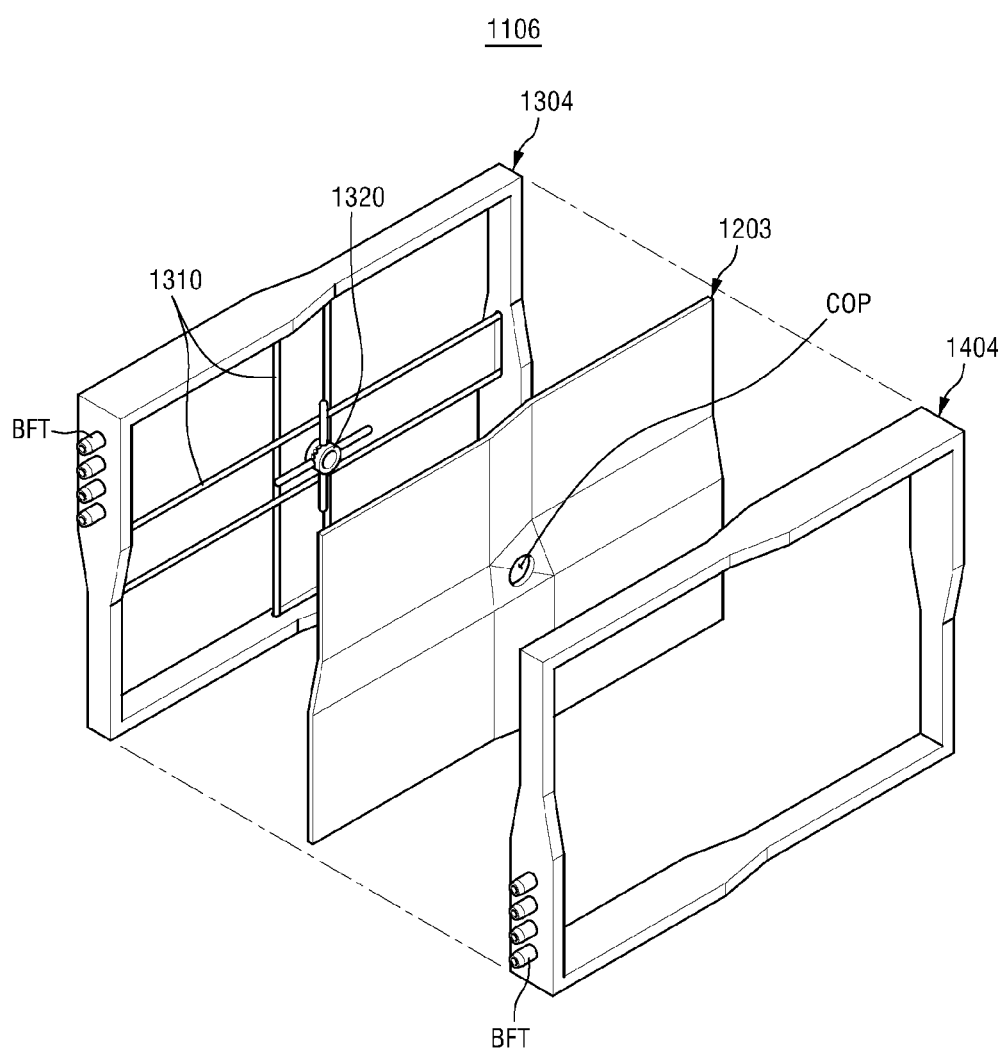
FIG. 80 is an exploded perspective view of a first interlayer spacer, a separation membrane and a second interlayer spacer of the fluid separation membrane module shown in FIG. 79.

FIG. 79 is a side view of a fluid separation membrane module according to another embodiment of the inventive concept. FIG. 80 is an exploded perspective view of a first interlayer spacer, a separation membrane and a second interlayer spacer of the fluid separation membrane module shown in FIG. 79.

Referring to FIGS. 79 and 80, the fluid separation membrane module 1106 according to the current embodiment is different from the embodiment of FIG. 71 in that a frame portion BA of each of the first and second interlayer spacers 1304 and 1404 has a non-uniform thickness.

Specifically, the frame portion BA of each of the first and second interlayer spacers 1304 and 1404 is relatively thick in a region where a side opening BSO is formed and is relatively thin in a region where the side opening BSO is not formed. When the region where the side opening BSO is formed is relatively thick, it is easy to secure the side opening BSO of a sufficient size. In addition, when the region where the side opening BSO is formed is relatively thin, the overall thickness of the fluid separation membrane module 1106 can be reduced.

For example, one or more side openings BSO may be formed in an upper part of a left side and a lower part of a right side of the frame portion BA of the first interlayer spacer 1304 and may not be formed in a lower part of the left side and an upper part of the right side of the frame portion BA of the first interlayer spacer 1304. In this case, the upper part of the left side and the lower part of the right side of the frame portion BA of the first interlayer spacer 1304 may be formed relatively thick, and the lower part of the left side and the upper part of the right side of the frame portion BA of the first interlayer spacer 1304 may be formed relatively thin. Therefore, the left side and the right side of the first interlayer spacer 1304 include the thick upper part and the thin lower part, respectively. Furthermore, an upper side and a lower side of the frame portion BA of the first interlayer spacer 1304 may have thicknesses corresponding to the thicknesses of the adjacent left and right sides. For example, a left part of the upper side and a right part of the lower side of the frame portion BA of the first interlayer spacer 1304 may be relatively thick, and a right part of the upper side and a left part of the lower side of the frame portion BA of the first interlayer spacer 1304 may be relatively thin. In addition, a sloping portion SLP may be formed between the thick part and the thin part of each side of the first interlayer spacer 1304 to connect them.

Unlike the first interlayer spacer 1304, the second interlayer spacer 1404 may have side openings BSO in a lower part of a left side and an upper part of a right side but may have not the side openings BSO in an upper part of the left side and a lower part of the right side. Accordingly, the upper part of the left side and the lower part of the right side of the frame portion BA of the second interlayer spacer 1404 are formed relatively thin, and the lower part of the left side and the upper part of the right side of the frame portion BA of the second interlayer spacer 1404 are formed relatively thick. Furthermore, a left part of an upper side and a right part of a lower side of the frame portion BA of the second interlayer spacer 1404 may be relatively thin, and a right part of the upper side and a left part of the lower side of the frame portion BA of the second interlayer spacer 1404 may be relatively thick. In addition, a sloping portion SLP may be formed between the thick part and the thin part of each side of the second interlayer spacer 1404 to connect them.

When the first interlayer spacer 1304 and the second interlayer spacer 1404 structured as described above are alternately stacked, a thick part of the frame portion BA of the first interlayer spacer 1304 and a thin part of the frame portion BA of the second interlayer spacer 1404 may be placed adjacent to each other, and a thin part of the frame portion BA of the first interlayer spacer 1304 and a thick part of the frame portion BA of the second interlayer spacer 1404 may be placed adjacent to each other. Furthermore, the first interlayer spacer 1304 and the second interlayer spacer 1404 may be shaped to fit each other in a stacking direction. Thus, efficient space utilization is possible while sufficient side openings BSO are ensured. In addition, since the first interlayer spacer 1304 and the second interlayer spacer 1404 stacked alternately are shaped to fit each other, they can be more firmly attached to each other.

Although not shown in the drawings, as in the embodiment of FIG. 67, protrusions and recesses engaged with each other may further be formed in the first interlayer spacer 1304 and the second interlayer spacer 1404 adjacent to each other. In this case, the adhesion between the first interlayer spacer 1304 and the second interlayer spacer 1404 may be more stable.

Figure 81:
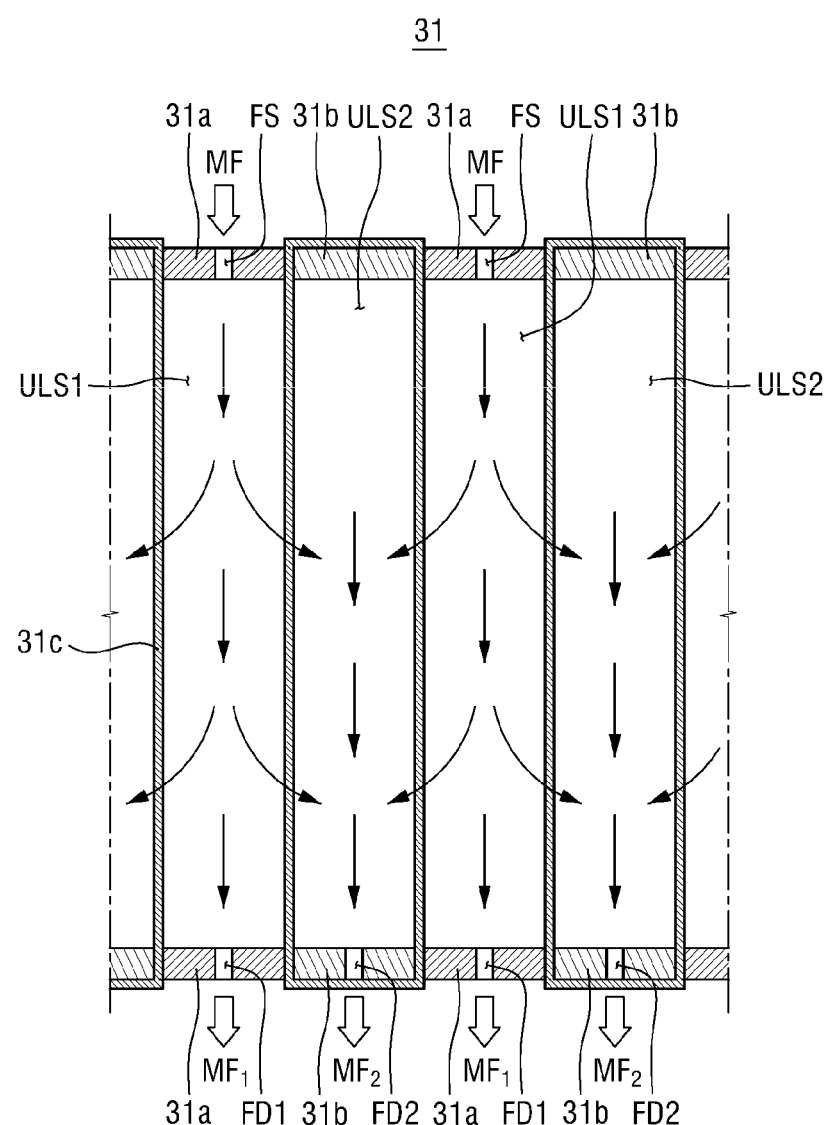
FIG. 81 is a schematic view of a fluid separation membrane module according to another embodiment of the inventive concept.

FIG. 81 is a schematic view of a fluid separation membrane module according to another embodiment of the inventive concept. Referring to FIG. 81, the fluid separation membrane module 31 according to the current embodiment is different from the embodiment of FIG. 51 in that it employs a pair of end spacers 31a separated from each other and a pair of inter-tube spacers 31b separated from each other, instead of first and second interlayer spacers shaped like quadrilateral frames.

More specifically, the fluid separation membrane module 31 includes a plurality of stacked fluid separation membranes 31c and a plurality of spacers 31a and 31b. Each of the fluid separation membranes 31c may be formed in a tubular shape. Here, the term "tubular" indicates that each of the fluid separation membranes 31c is shaped like a tube. Not only a separation membrane formed integrally in a tubular shape by a method such as extrusion but also a separation membrane formed in a tubular shape by preparing a rectangular separation membrane, rolling opposing sides of the rectangular separation membrane and bonding the opposing sides together with an adhesive are referred to as tubular separation membranes.

The fluid separation membranes 31c extend in a direction. The fluid separation membranes 31c overlap each other. A direction in which the fluid separation membranes 31c overlap each other may be a direction, e.g., a vertical direction, different from the extending direction (length direction) of the fluid separation membranes 31c. There is no limitation on the number of the fluid separation membranes 31c overlapping each other. For example, the number of the fluid separation membranes 31c overlapping each other may be tens to thousands.

The inside and the outside of each of the fluid separation membranes 31c are physically separated by walls of the fluid separation membrane 31c. At least a portion of a fluid may move between the inside and the outside of each of the fluid separation membranes 31c by passing through the fluid separation membrane 31c, and this characteristic is used to separate a specific fluid.

The end spacers 31a are disposed inside each of the fluid separation membranes 31c, and the inter-tube spacers 31b are disposed between the fluid separation membranes 31c adjacent to each other in a stacking direction. The end spacers 31a are disposed at both ends of each of the fluid separation membranes 31c in the extending direction. The inter-tube spacers 31b are disposed adjacent to the end spacers 31a.

A first unit limited space ULS1 surrounded by two neighboring fluid separation membranes 31c and the end spacers 31a is defined between the fluid separation membranes 31c. The first unit limited space ULS1 is a space directly provided with a fluid mixture MF. To this end, the first unit limited space ULS1 includes a fluid inlet FS. In addition, the first unit limited space ULS1 includes a first fluid outlet FD1 for discharging a residual fluid MF1 remaining after separation.

In each of the fluid separation membranes 31c, a second unit limited space ULS2 surrounded by the walls of the fluid separation membrane 31c and the end spacers 31a at both ends is defined. The second unit limited space ULS2 is a space not directly provided with the fluid mixture MF. Therefore, the second unit limited space ULS2 does not include a fluid inlet. The second unit limited space ULS2 includes a second fluid outlet FD2 for discharging a separated fluid MF2.

The first unit limited space ULS1 and the second unit limited space ULS2 are disposed adjacent to each other. A plurality of first unit limited spaces ULS1 and a plurality of second unit limited spaces ULS2 may be alternately arranged.

In a case where the fluid mixture MF provided through the fluid inlet FS of the first unit limited space ULS1 contains nitrogen and carbon dioxide and where the mobility of carbon dioxide through the fluid separation membrane 31c is higher than that of nitrogen, the concentration of nitrogen in the first unit limited space ULS1 becomes relatively high as the concentration of carbon dioxide in the first unit limited space ULS1 becomes relatively low. In addition, the concentration of nitrogen in the second unit limited space ULS2 adjacent to the first unit limited space ULS1 becomes relatively low as the concentration of carbon dioxide in the second unit limited space ULS2 becomes relatively high. Therefore, the fluid mixture MF1 having a relatively high nitrogen content is discharged through the first fluid outlet FD1, and the fluid mixture MF2 having a relatively high carbon dioxide content is discharged through the second fluid outlet FD2.

The first and second unit limited spaces ULS1 and ULS2 are separated by each fluid separation membrane 31c, and a fluid can move through the fluid separation membrane 31c. Since second unit limited spaces ULS2 are disposed on both sides of one first unit limited space ULS1, a portion of the mixed fluid MF supplied into the first unit limited space ULS1 may move to the second unit limited spaces ULS2 on both sides. In addition, since two first unit limited spaces ULS1 are disposed on both sides of one second unit limited space ULS2, a portion of the mixed fluid MF may move to the second unit limited space ULS2 from the first unit limited spaces ULS1 on both sides.

In the fluid separation membrane module 31 according to the current embodiment, a plurality of unit limited spaces are arranged in the stacking direction. Therefore, a plurality of separation spaces can be secured within one module. The number of stacked unit limited spaces may be, for example, several tens to several thousands. As the number of stacked unit limited spaces increases, the separation capacity may also increase. Therefore, a large amount of fluid can be separated.

Also, a third unit limited space may be additionally stacked, so that a firstly separated fluid that has moved to a second unit limited space can be moved to the third unit limited space. Through this multistage separation, a highly concentrated fluid can be separated.

The structure of the above-described fluid separation membrane module will now be described in more detail.

Figure 82:
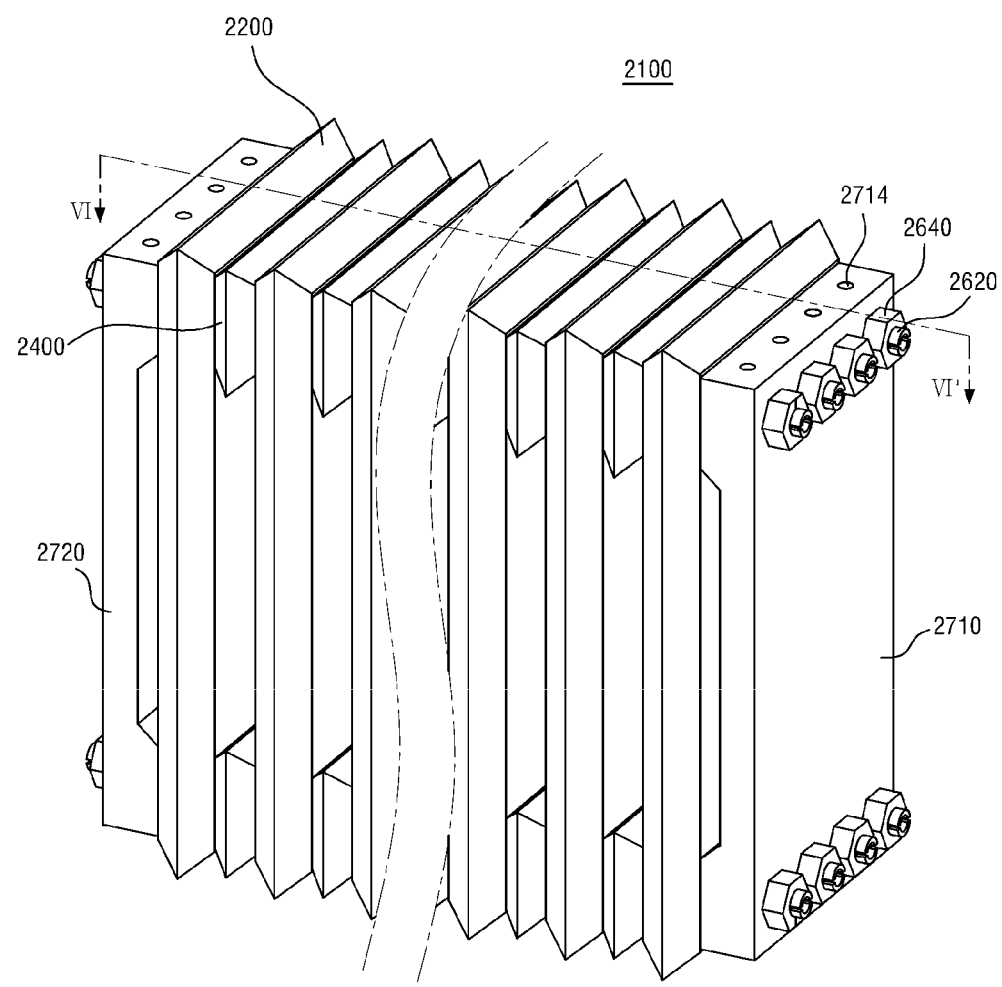
FIG. 82 is a perspective view of a fluid separation membrane module according to another embodiment of the inventive concept.
Figure 83:
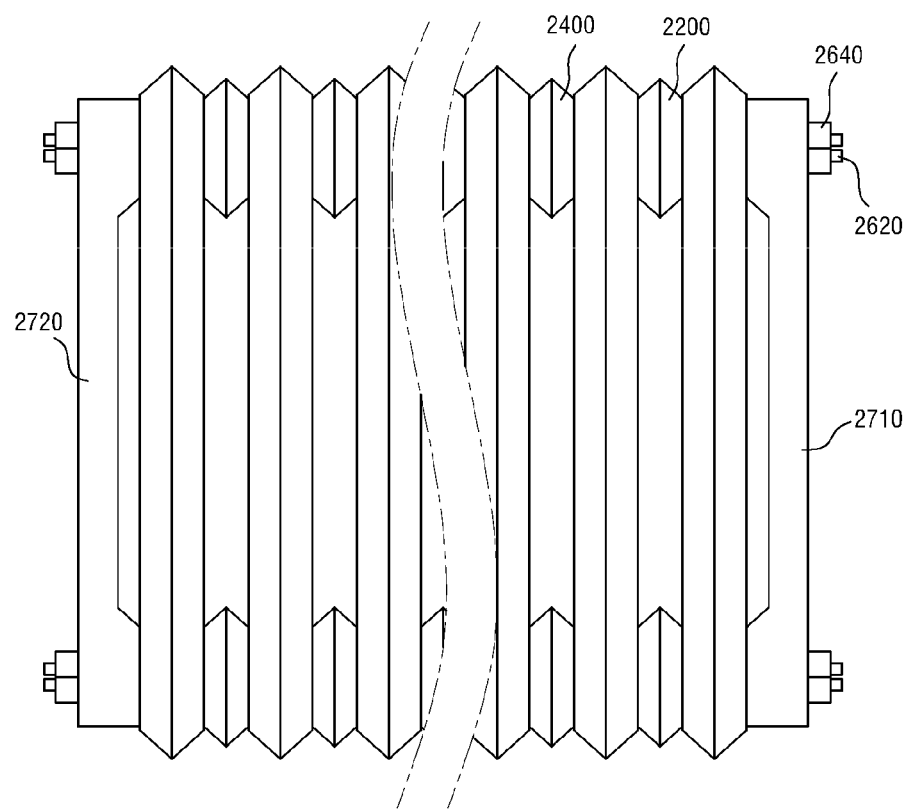
FIG. 83 is a front view of the fluid separation membrane module shown in FIG. 82.
Figure 84:
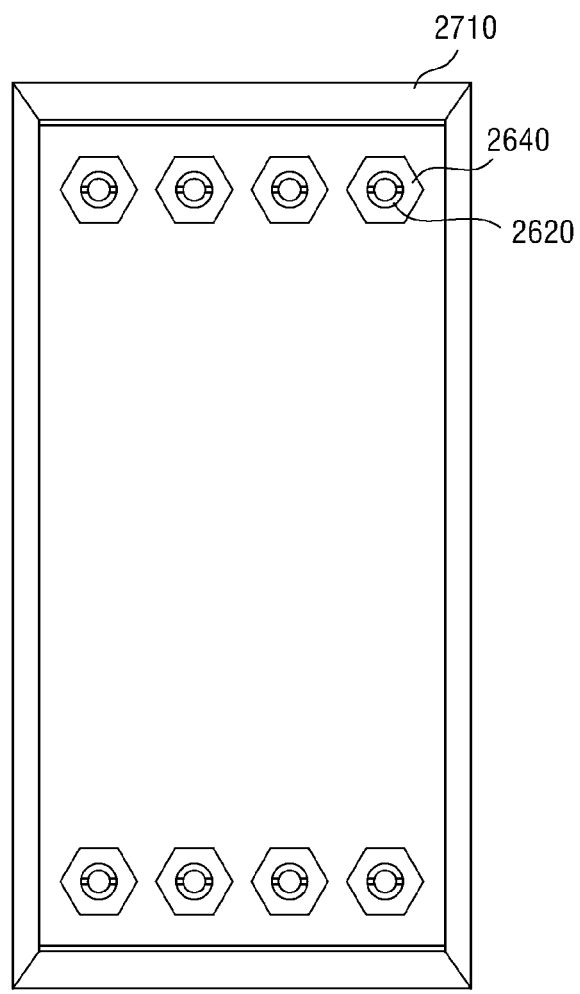
FIG. 84 is a side view of the fluid separation membrane module shown in FIG. 82.
Figure 85:
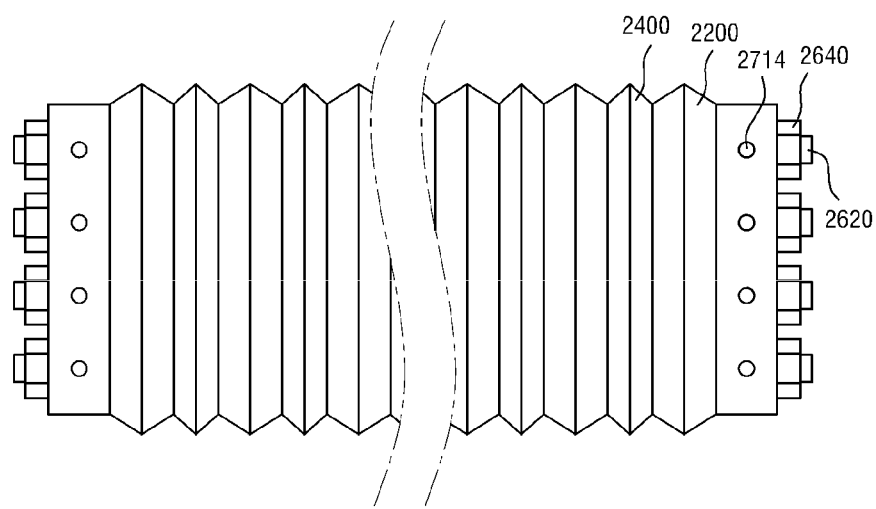
FIG. 85 is a plan view of the fluid separation membrane module shown in FIG. 82.
Figure 86:
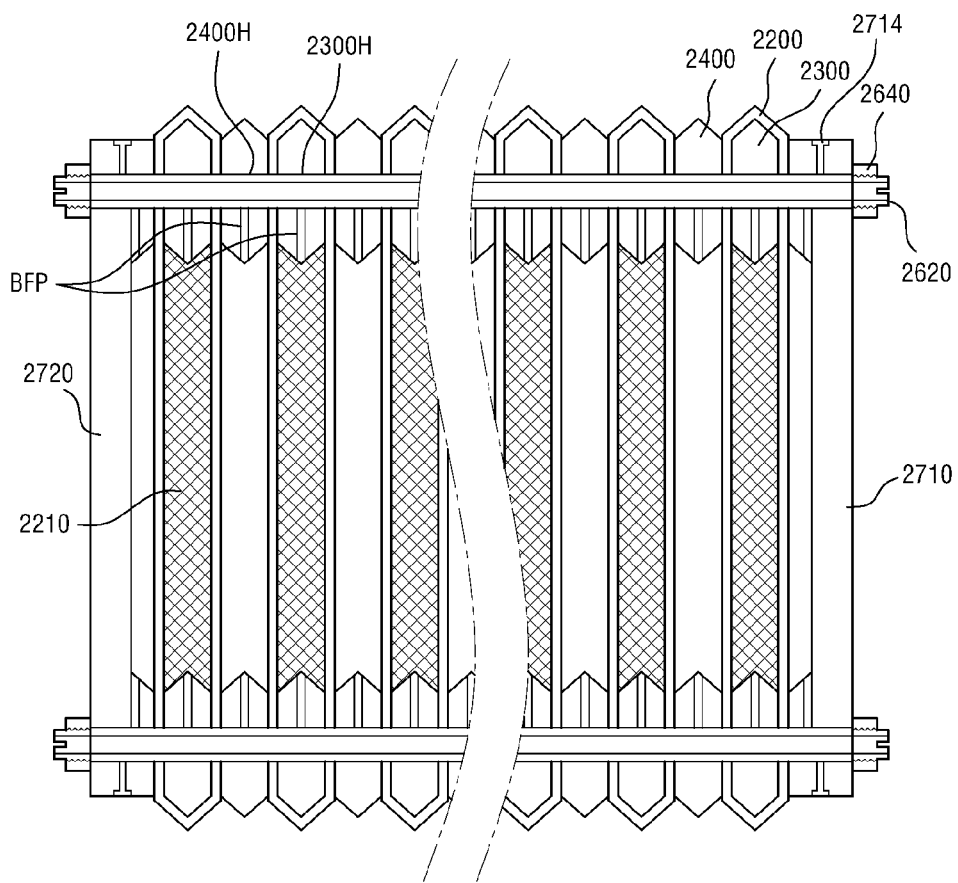
FIG. 86 is a cross-sectional view taken along the line LXXXVI-LXXXVI' of FIG. 82.

FIG. 82 is a perspective view of a fluid separation membrane module according to another embodiment of the inventive concept. FIG. 83 is a front view of the fluid separation membrane module shown in FIG. 82. FIG. 84 is a side view of the fluid separation membrane module shown in FIG. 82. FIG. 85 is a plan view of the fluid separation membrane module shown in FIG. 82. FIG. 86 is a cross-sectional view taken along the line LXXXVI-LXXXVI' of FIG. 82.

Referring to FIGS. 82 through 86, the fluid separation membrane module 2100 according to the current embodiment includes a plurality of fluid separation membranes 2200, a plurality of inter-tube spacers 2400, a plurality of end spacers 2300, and a plurality of assembly pipes 2620.

Since the fluid separation membranes 2200 are the same as those described above, a redundant description of the fluid separation membranes 2200 will be omitted.

The end spacers 2300 are disposed at both ends of each fluid separation membrane 2200 in a length direction of the fluid separation membrane 2200. The fluid separation membrane 2200 and the end spacers 2300 may be attached and sealed with an adhesive. Both ends of the fluid separation membrane 2200 in the length direction may be sealed with an adhesive. In another example, both ends of the fluid separation membrane 2200 in the length direction may originally be closed or sealed.

A membrane spacer 2210 may be disposed inside the tubular fluid separation membrane 2200. When the inside of the fluid separation membrane 2200 has a lower pressure than the outside of the fluid separation membrane 2200, the fluid separation membrane 2200 may contract due to the pressure difference. If inner walls of the fluid separation membrane 220 come into complete contact with each other, a space in which a fluid can move is reduced. Therefore, the membrane spacer 2210 is disposed inside the fluid separation membrane 2200 to prevent the inner walls of the fluid separation membrane 1200 from coming into complete contact with each other. The membrane spacer 2210 may have, but not limited to, a network structure, more specifically, a twisted network structure.

The fluid separation membrane 2200 includes a plurality of openings at both ends. The openings of the fluid separation membrane 2200 may be formed at the same positions as through holes (hereinafter, referred to as end through holes 2300H) of the end spacers 2300 and through holes (hereinafter, referred to as inter-tube through holes 2400H) of the inter-tube spacers 2400. Cross-sections of the openings of the fluid separation membrane 2200, cross-sections of the end through holes 2300H, and cross-sections of the inter-tube through holes 2400H may all have the same shape (e.g., a circular shape) and substantially the same inner diameter.

The end spacers 2300 and the inter-tube spacers 2400 are stacked alternately. That is, the end spacers 2300 and the inter-tube spacers 2400 are alternately arranged in a stacking direction to overlap each other. The assembly pipes 2620 which will be described later are inserted into the openings of the fluid separation membrane 2200, the end through holes 2300H and the inter-tube through holes 2400H, thereby coupling them to each other. Cross-sections of the assembly pipes 2620 may have the same shape (e.g., a circular shape) as those of the openings of the fluid separation membrane 2200, the end through holes 2300H and the inter-tube through holes 2400H. Outer diameters of the cross-sections of the assembly pipes 2620 may be smaller than or equal to the inner diameters of the openings of the fluid separation membrane 2200, the end through holes 2300H and the inter-tube through holes 2400H. The outer diameters of the assembly pipes 2620 may be 5 to 50 mm.

Figure 87:
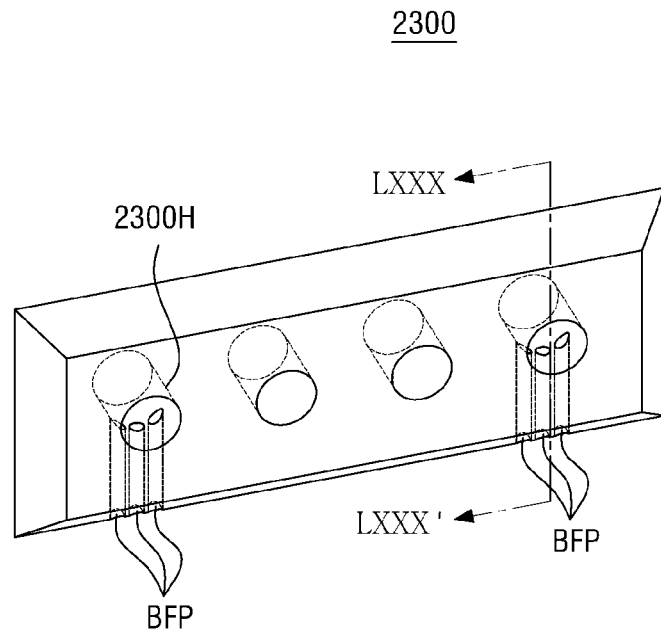
FIG. 87 is a perspective view of an end spacer shown in FIG. 82.
Figure 88:
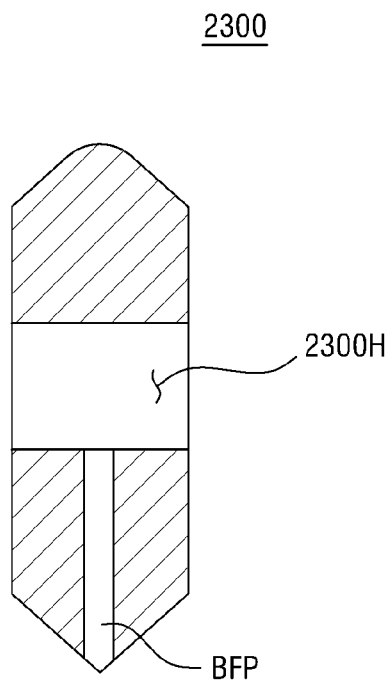
FIG. 88 is a cross-sectional view taken along the line LXXXVIII-LXXXVIII' of FIG. 87.

FIG. 87 is a perspective view of an end spacer shown in FIG. 82. FIG. 88 is a cross-sectional view taken along the line LXXXVIII-LXXXVIII' of FIG. 87.

Referring to FIGS. 82 through 88, the end spacers 2300 discharge a fluid collected inside each fluid separation membrane 2200 to the outside and keep the fluid separation membrane 2200 sealed by withstanding stress when the fluid separation membranes 2200 are stacked. One pair of end spacers 2300 may be disposed at both ends of each fluid separation membrane 2200 and within each fluid separation membrane 2200. The end spacers 2300 disposed at both ends are spaced apart from each other, and a second unit limited space ULS2 (see FIG. 81) is defined in a space between the end spacers 2300.

Each end spacer 2300 includes at least one end through hole 2300H and at least one fluid passage BFP connected to the end through hole 2300H.

The end spacer 2300 may have an inclined surface in the vicinity of an edge. That is, although a central portion of the end spacer 2300 has a uniform thickness, the thickness of the end spacer 2300 may be gradually reduced near the edges disposed to face the inside and outside of the fluid separation membrane 2200.

The end through hole 2300H passes through the end spacer 2300 in a thickness direction of the end spacer 2300. The end through hole 2300H may be formed in the central portion of the end spacer 2300 which has a uniform thickness in the thickness direction. The end through hole 2300H may be formed in a plurality. In the drawings, four end through holes 2300H are shown. However, one, two, three, or five to twenty end through holes 2300H can also be formed. The end through holes 2300H may overlap the openings of the fluid separation membrane 2200.

The fluid passages BFP may be connected to at least some of the end through holes 2300H. The fluid passages BFP spatially connect the second unit limited space ULS2, that is, the inside of the fluid separation membrane 2200 to the end through holes 2300H. For example, ends of the fluid passages BFP are connected to the end through holes 2300H, and the other ends of the fluid passages BFP are open toward the outside of the end spacer 2300. Specifically, the other ends of the fluid passages BFP may be open at an edge of the end spacer 2300 disposed to face the inside of the fluid separation membrane 2200. The number of the fluid flow passages BFP connected to each end through hole 2300H may be more than one. In the drawings, three fluid passages BFP are shown. However, the number of the fluid passages BFP connected to each end through hole 2300H is not limited to three, and one to ten fluid passages BFPs can be disposed. A diameter of each of the fluid passages BFP may be in the range of 10 to 80% of the thickness of the central portion of the end spacer 2300.

The fluid passages BFP may not be connected to the other ones of the end through holes 2300H. For example, while three fluid passages BFP are connected to two outer end through holes 2300H among four end through holes 2300H, no fluid passages BFP may be connected to two end through holes 2300H in the middle.

Figure 89:
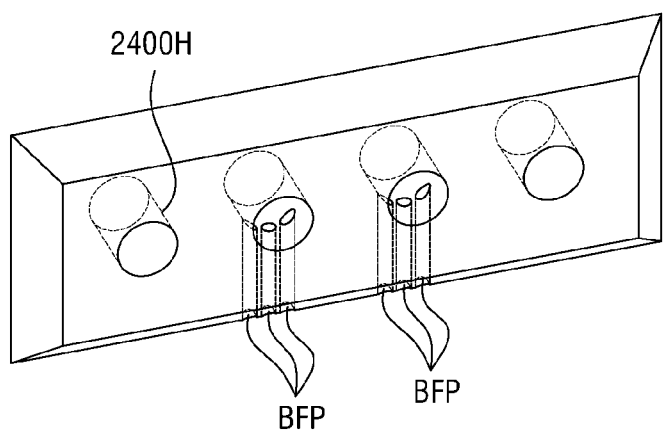
FIG. 89 is a perspective view of an inter-tube spacer shown in FIG. 82.

FIG. 89 is a perspective view of an inter-tube spacer shown in FIG. 82. Referring to FIGS. 82 through 89, the inter-tube spacers 2400 supply a fluid mixture to the outside of each fluid separation membrane 2200, discharge a fluid remaining after separation to the outside, and separate adjacent fluid separation membranes 220 from each other. One of the inter-tube spacers 2400 disposed at both ends of each fluid separation membrane 2200 in the length direction of the fluid separation membrane 2200 may be responsible for the supply of a fluid mixture, and the other one may be responsible for the discharge of a residual fluid.

The inter-tube spacers 2400 have a similar shape to the end spacers 2300. Each of the inter-tube spacers 2400 includes inter-tube through holes 2400H and fluid passages BFP. Like the end spacers 2300, one pair of inter-tube spacers 2400 may be arranged near both ends of each fluid separation membrane 2200. The pair of inter-tube spacers 2400 are spaced apart from each other, and a first unit limited space ULS1 (see FIG. 1) is defined in a space between the pair of inter-tube spacers 2400.

Each inter-tube spacer 2400 and each end spacer 2300 may overlap each other in the stacking direction. Further, the inter-tube through holes 2400H overlap the end through holes 2300H. The fluid passages BFP of the inter-tube spacers 2400 spatially connect the first unit limited space ULS1, that is, the outside of the fluid separation membrane 2200 to the inter-tube through holes 2400H.

However, the fluid passages BFP of the inter-tube spacers 2400 may be formed at different positions from the fluid passages BFP of the end spacers 2300 in the overlapping direction. The assembly pipes 2620 are inserted into the end and inter-tube through holes 2300H and 400H formed at the same positions (where they overlap each other when stacked) in the end and inter-tube spacers 2300 and 2400 stacked on each other. If the fluid passages BFP are formed in all of the end and inter-tube through holes 2300H and 400H located at the same positions in the overlapping direction, the first unit limited space ULS1 and the second unit limited space ULS2 may be spatially connected to each other by the assembly pipes 2620. This indicates that a fluid can move without being separated through the walls of the fluid separation membrane 2200. Therefore, when the fluid passages BFP are connected to two outer end through holes 2300H of each end spacer 2300, they may be connected to two middle inter-tube through holes 2400H of each inter-tube spacer 2400H.

Figure 90:
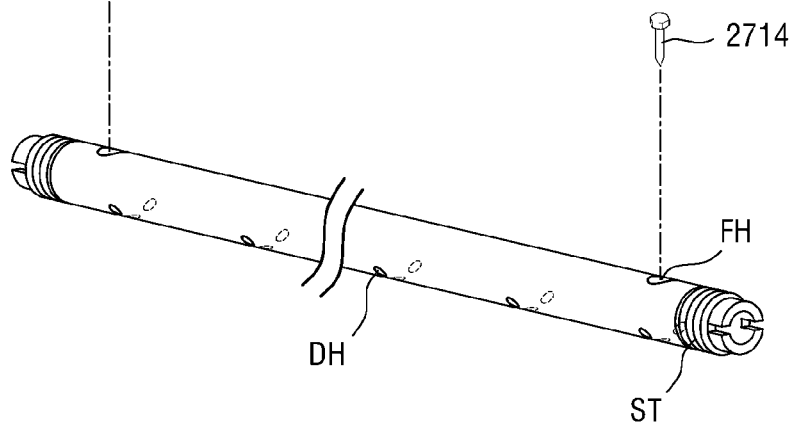
FIG. 90 is a perspective view of an assembly pipe shown in FIG. 82.

FIG. 90 is a perspective view of an assembly pipe shown in FIG. 82.

Referring to FIGS. 82 through 90, a plurality of assembly pipes 2620 have substantially the same shape. Each of the assembly pipes 2620 is shaped like a hollow pipe. The empty spaces inside the assembly pipes 2620 are utilized as passages for fluids introduced from the unit limited spaces ULS1 and ULS2.

Each of the assembly pipes 2620 includes a plurality of pipe holes DH. The pipe holes DH are arranged at positions corresponding to those of the fluid passages BFP of the end or inter-tube through holes 2300H or 400H when the assembly pipes 2620 are inserted. For example, the pipe holes DH of assembly pipes 2620 passing through two outer end or inter-tube through holes 2300H or 400H are connected to fluid passages BFP that are open toward the second unit limited space ULS2. In addition, the pipe holes DH of assembly pipes 2620 passing through two middle end or inter-tube through holes 2300H and 400H are connected to fluid passages BFP that are open toward the first unit limited space ULS1. In the drawings, three pipe holes DH are formed to correspond to three fluid passages BFP. However, one pipe hole DH can also be formed large enough to cover three fluid passages BFP.

Screw threads ST may be formed at both ends of each of the assembly pipes 2620. After the fluid separation membranes 2200, the end spacers 2300 and the inter-tube spacers 2400 are stacked and then the assembly pipes 2620 are inserted into the fluid separation membranes 2200, the end spacers 2300 and the inter-tube spacers 2400, assembly nuts 2640 may be coupled to the screw threads ST, thereby securely coupling the fluid separation membranes 2200, the end spacers 2300 and the inter-tube spacers 2400 to each other.

Each of the assembly pipes 2620 may further include fixing holes FH formed at both ends. Fixing pins 2714 are inserted into the fixing holes FH, so that each of the assembly pipes 2620 can be held in an accurate position without being rotated. The fixing holes FH and the fixing pins 2714 can be omitted.

Both ends of each of the assembly pipes 2620 may be open, and a fluid may flow through the open ends. When a fluid mixture is injected into assembly pipes 2620 connected to the first unit limited space ULS1, a specific fluid such as carbon dioxide may move to the second unit limited space ULS2 through the fluid separation membrane 2200 and may be discharged through assembly pipes 2620 connected to the second unit limited space ULS2.

Different pressures may be applied to the first unit limited space ULS and the second unit limited space ULS2. For example, a relatively high pressure may be applied to the first unit limited space ULS1 provided with a fluid mixture, and a relatively low pressure may be applied to the second unit limited space ULS2 from which a separated fluid is discharged. To this end, a first pump (not shown) for applying a pressure of 0 to 4 kgf/cm² may be connected to the assembly pipes 2620 which inject a fluid into the first unit limited space ULS1, and a second pump (not shown) for applying a pressure of 0 to −1 kgf/cm² may be connected to the assembly pipes 2620 through which a fluid is discharged from the second unit limited space ULS2.

The fluid separation membrane module 2100 may further include outermost covers 2710 and 2720. The outermost covers 2710 and 2720 are located at outermost positions on both sides in the stacking direction of the fluid separation membrane module 2100. Each of the outermost covers 2710 and 2720 may include openings into which the assembly pipes 2620 are inserted.

When the outermost covers 2710 and 2720 are installed in the fluid separation membrane module 2100, the assembly pipes 2620 are inserted into corresponding openings of the outermost covers 2710 and 2720, and the assembly nuts 2640 are coupled to the assembly pipes 2620 on the outside of the outermost covers 2710 and 2720. The fixing pins 2714 are inserted from side surfaces of the outermost covers 2710 and 2720. If the outermost covers 2710 and 2720 are made of a rigid metal, they can prevent deformation due to pressure difference, protect the fluid separation membranes 2200 inside the outermost covers 2710 and 2720, and prevent the separation membrane module 2100 from being deformed or damaged by the pressure applied when the assembly nuts 2640 are coupled.

In the current embodiment, the fluid separation membranes 2200 are firmly coupled to each other by the assembly pipes 2620, thus providing excellent mechanical strength. Also, since the assembly pipes 2620 can be used as fluid inlets/outlets, a withdrawing conduit, a withdrawing conduit collector, and the like can be omitted. This simplifies structure and makes assembling easy.

Hereinafter, other embodiments of the inventive concept will be described.

Figure 91:
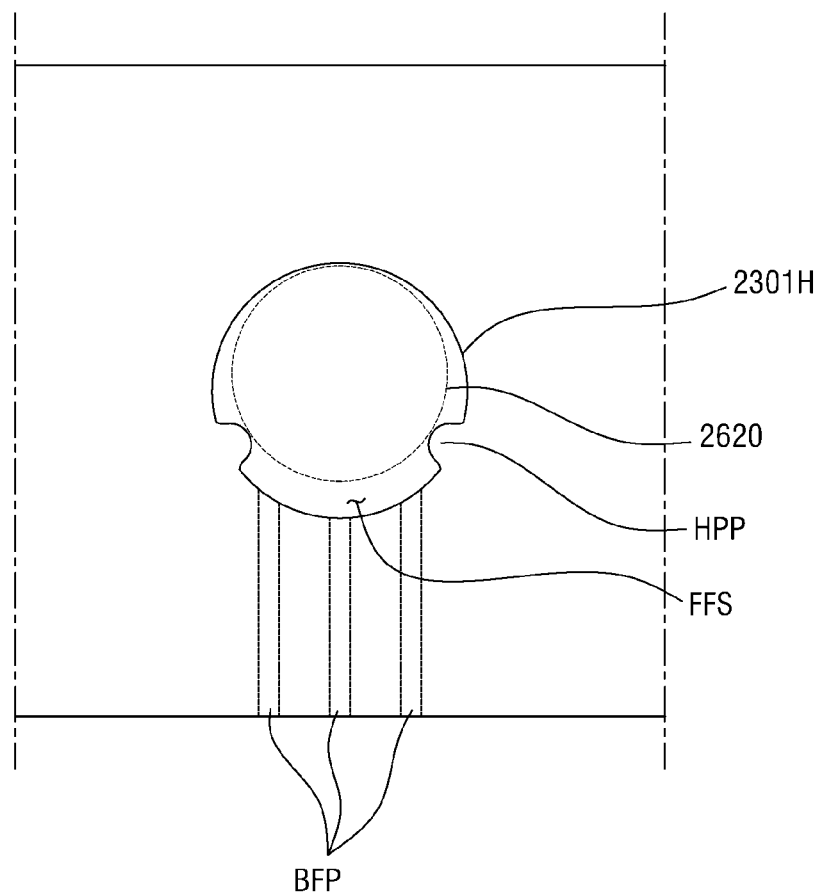
FIGS. 91 and 92 are partial side views of end spacers according to other embodiments of the inventive concept.
Figure 92:
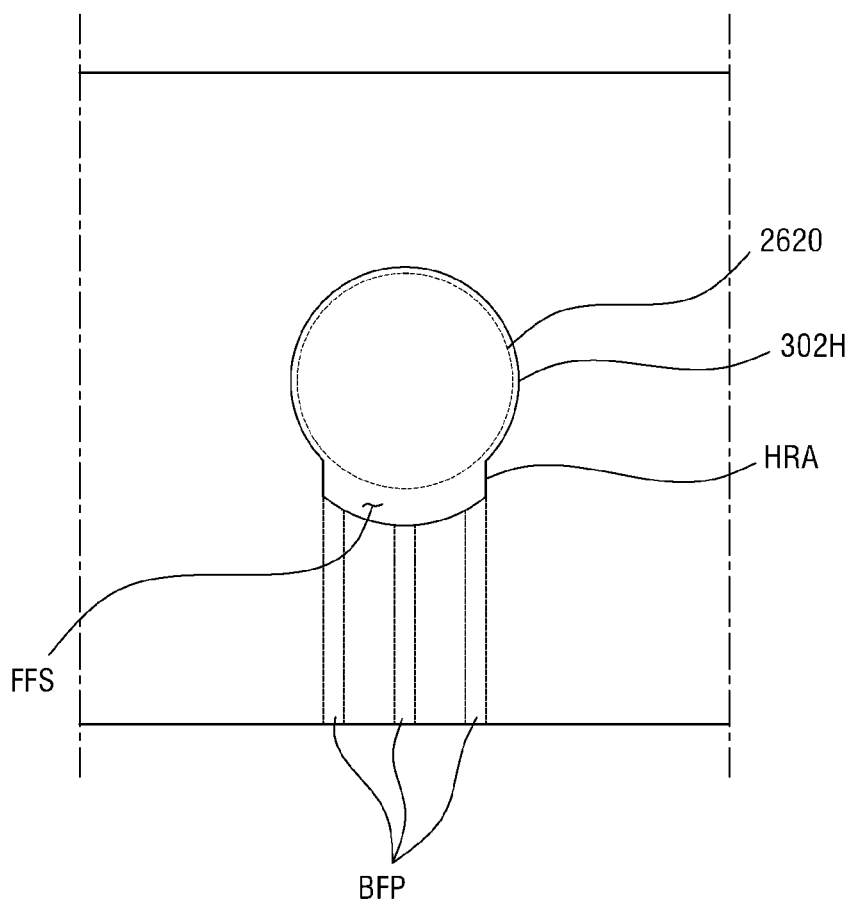

FIGS. 91 and 92 are partial side views of end spacers according to other embodiments of the inventive concept. In the embodiments of FIGS. 91 and 92, a fluid flow space is secured because a size and shape of an end/inter-tube through hole is different from those of an assembly pipe.

In the embodiment of FIG. 91, a cross-section of an assembly pipe 2620 and a cross-section of an end through hole 2301H of an end spacer 2301 have substantially the same circular shape, but the end through hole 2301H has a larger size. The assembly pipe 2620 is installed to contact a sidewall opposite to a portion of the end through hole 2301H where fluid passages BFP are formed. Therefore, a fluid flowing space FFS can be secured in the vicinity of the fluid passages BFP. To this end, protrusions HPP may be formed on an inner wall of the end through hole 2301H near the fluid passages BFP. The secured fluid flow space FFS can prevent the flow of a fluid from being impeded by the assembly pipe 2620 in a vertical direction.

In FIG. 91, the cross-section of the assembly pipe 2620 and the cross-section of the end through hole 2301H are all circular. However, even when the cross-section of the assembly pipe 2620 is circular and the cross-section of the end through hole 2301H is elliptical, the fluid flow space FFS can be secured. Various other modifications are possible.

In the embodiment of FIG. 92, a cross-section of an assembly pipe 2620 is generally circular, and a cross-section of an end through hole 2302H is partially circular. However, a portion HRA of the end through hole 2301H where fluid passages BFP are formed is depressed. Therefore, even if the assembly pipe 2620 and the end through hole 2302H are partially in complete contact with each other, they are spaced apart from each other in the depressed portion HRA of the end through hole 2302H. Therefore, a fluid flow space FFS can be secured.

Figure 93:
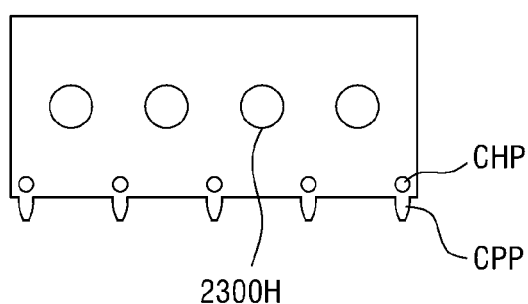
FIG. 93 is a side view of an end spacer according to another embodiment of the inventive concept.

FIG. 93 is a side view of an end spacer according to another embodiment of the inventive concept. Referring to FIG. 93, a membrane spacer 2210 is disposed inside a fluid separation membrane 2200 in which the end spacer 2303 is disposed. If the membrane spacer 2210 moves within the fluid separation membrane 2200, it may have difficulty performing its function fully and may damage the fluid separation membrane 2200. To prevent this, the end spacer 2303 may further include bonding protrusions CPP and/or bonding holes CHP in the vicinity of an edge disposed to face the inside of the fluid separation membrane 2200. The membrane spacer 2210 or other internal instruments may be hung in the bonding holes CHP or attached to the bonding protrusions CPP within the fluid separation membrane 2200, thereby preventing the fluid separation membrane 2200 from being damaged by its own weight, wind, vibrations, external impact, etc.

Figure 94:
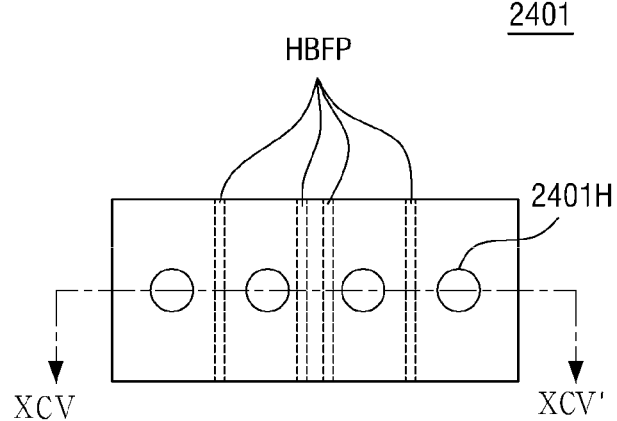
FIG. 94 is a side view of an inter-tube spacer according to another embodiment of the inventive concept.
Figure 95:
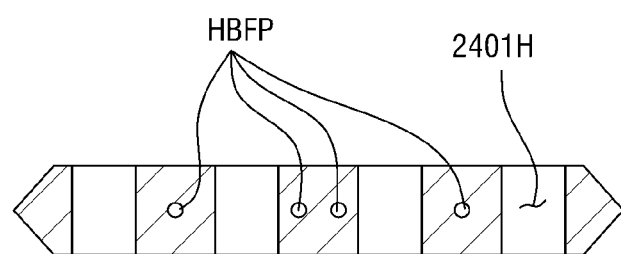
FIG. 95 is a cross-sectional view taken along the line XCV-XCV' of FIG. 94.

FIG. 94 is a side view of an inter-tube spacer according to another embodiment of the inventive concept. FIG. 95 is a cross-sectional view taken along the line XCV-XCV' of FIG. 94.

Referring to FIGS. 94 and 95, the inter-tube spacer 2401 may include fluid passages HBFP penetrating the inter-tube spacer 2401 in a horizontal direction (a direction perpendicular to a direction in which inter-tube through holes penetrate the inter-tube spacer 2401). When a fluid is not supplied to a first unit limited space ULS1 through assembly pipes 2620, no fluid passages need to be connected to the inter-tube through holes 2401H. In this case, the fluid passages HBFP may be formed to penetrate the inter-tube spacer 2401H in the horizontal direction, so that a fluid can be supplied into the first unit limited space ULS1 through the fluid passages HBFP from outside the inter-tube spacer 2401. The horizontally penetrating fluid passages HBFP may not be connected to the inter-tube through holes 2401H, but may be formed outside or between the inter-tube through holes 2401H. A size of each of the horizontally penetrating fluid passages HBFP may be in the range of 10 to 80% of a thickness of the inter-tube spacer 2401.

Figure 96:
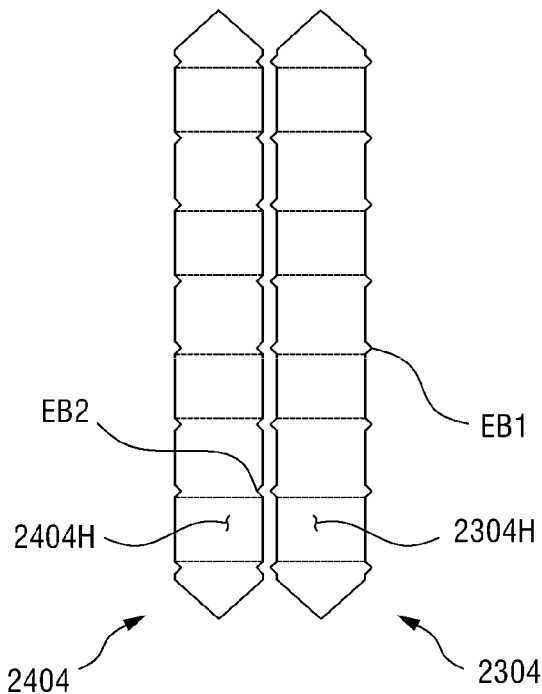
FIG. 96 is a plan view of an end spacer and an inter-tube spacer according to another embodiment of the inventive concept.

FIG. 96 is a plan view of an end spacer and an inter-tube spacer according to another embodiment of the inventive concept.

Referring to FIG. 96, the end spacer 2304 according to the current embodiment includes protrusions EB1 formed around end through holes 2304H, and the inter-tube spacer 2404 includes recesses EB2 formed around inter-tube holes 2404H. The protrusions EB1 of the end spacer 2304 are shaped to fit into the recesses EB2 of the inter-tube spacer 2404 and are provided at positions corresponding to those of the recesses EB2. When the protrusions EB1 and the recesses EB2 are formed between the end spacer 2304 and the inter-tube spacer 2404 neighboring each other, they may be engaged with each other with a fluid separation membrane 2200 disposed between them when a module is assembled. This can ensure improved airtightness.

Unlike in the example shown in the drawing, recesses may be formed around end through holes, and protrusions may be formed around inter-tube through holes. Alternatively, recesses may be formed on a side surface of an end or inter-tube spacer, and protrusions may be formed on the other side surface. Even in this case, airtightness can be ensured as long as the recesses and the protrusions are engaged with each other.

Figure 97:
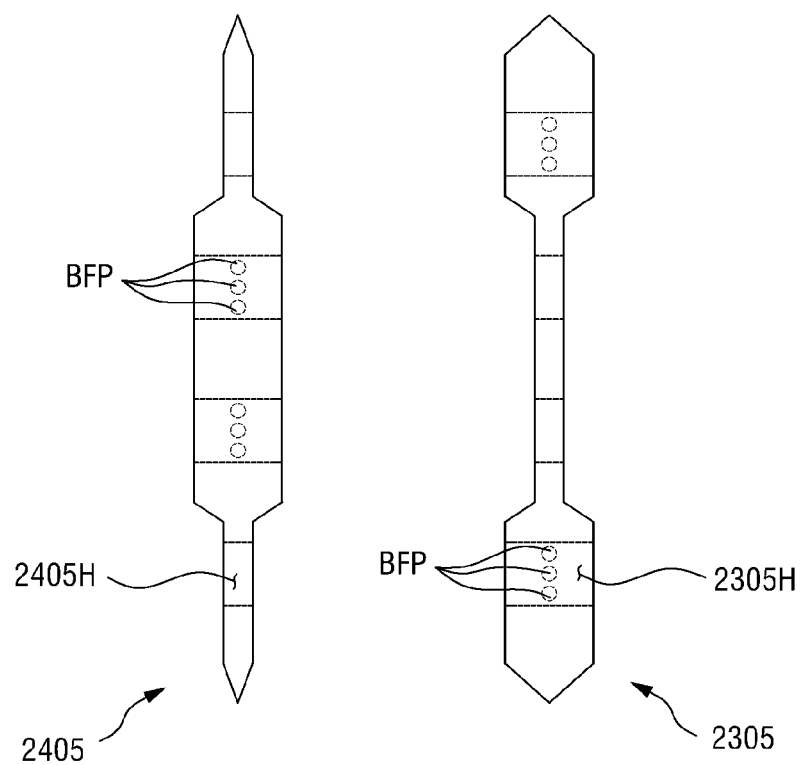
FIG. 97 is a plan view of an end spacer and an inter-tube spacer according to another embodiment of the inventive concept.
Figure 98:
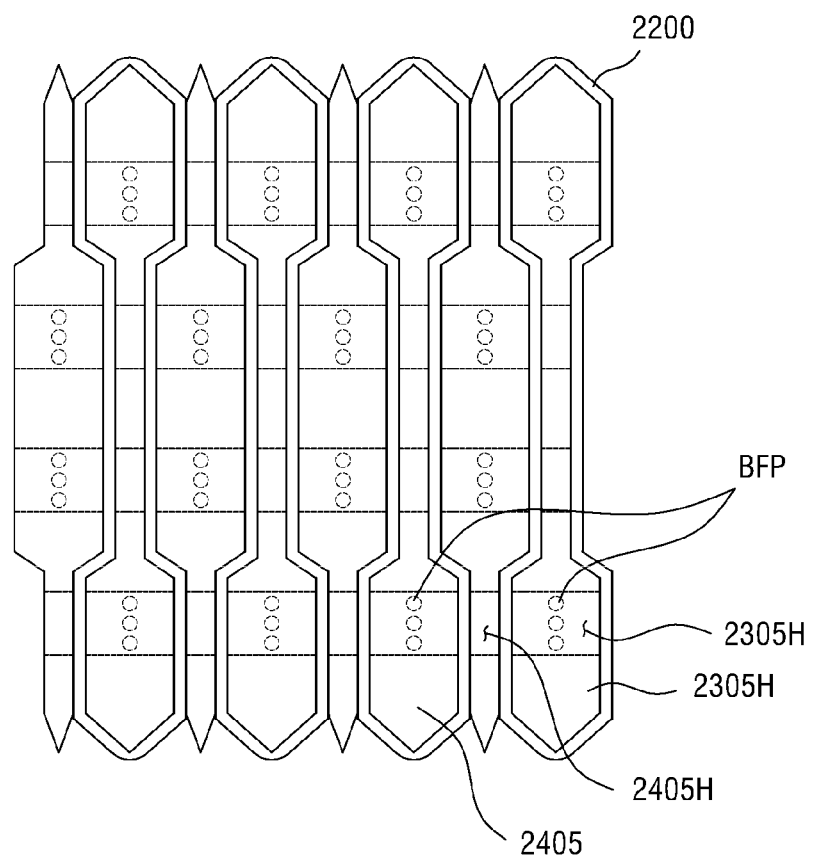
FIG. 98 is a schematic view showing a state in which a plurality of end spacers and a plurality of inter-tube spacers of FIG. 97 are coupled to each other.

FIG. 97 is a plan view of an end spacer and an inter-tube spacer according to another embodiment of the inventive concept. FIG. 98 is a schematic view showing a state in which a plurality of end spacers and a plurality of inter-tube spacers of FIG. 97 are coupled to each other.

Referring to FIGS. 97 and 98, an end spacer 2305 and an inter-tube spacer 2405 according to the current embodiment are similar to the embodiment of FIG. 96 in that they are engaged with each other, but are different from the embodiment of FIG. 96 in that they are engaged with each other not through protrusions and recesses formed around part of end and inter-tube through holes 2305H and 2405H but through the adjustment of the overall thickness.

Specifically, a portion (a protruding portion) where an end or inter-tube through hole 2305H or 2405H connected to fluid passages BFP is formed is thick, whereas a portion (a recessed portion) where an end or inter-tube through hole 2305H or 2405H not connected to the fluid passages BFP is formed is thin. As described above, the fluid passages BFP are formed at different positions in the end and inter-tube through holes 2305H and 2405H of the end spacer 2305 and the inter-tube spacer 2405. Therefore, the thick portion of the end spacer 2305 may be in contact with the thin portion of the inter-tube spacer 2405, and the thin portion of the end spacer 2305 may be in contact with the thick portion of the inter-tube spacer 2405. Therefore, the overall thickness can be reduced, which, in turn, improves the degree of integration.

Figure 99:
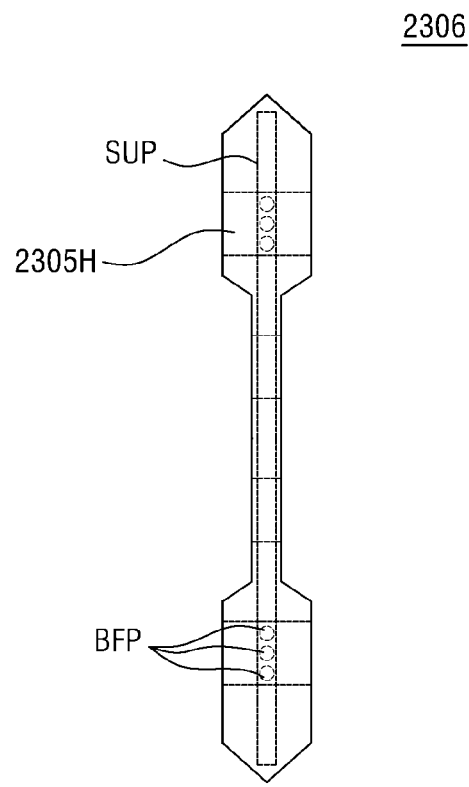
FIG. 99 is a plan view of an end spacer according to another embodiment of the inventive concept.
Figure 100:
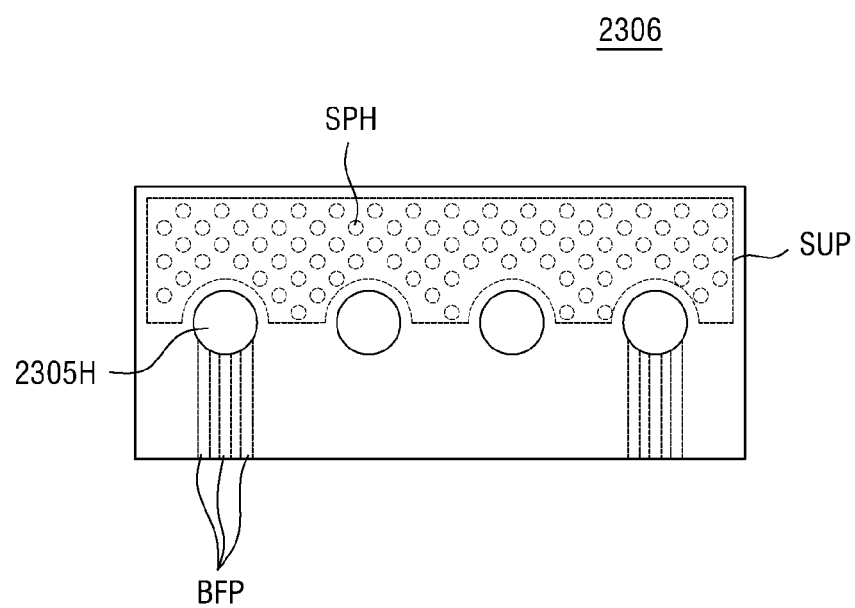
FIG. 100 is a side view of FIG. 99.

FIG. 99 is a plan view of an end spacer according to another embodiment of the inventive concept. FIG. 100 is a side view of FIG. 99.

Referring to FIGS. 99 and 100, the end spacer 2305 and the inter-tube spacer 2405 of FIG. 97 described above may be mechanically weak because they have thin portions. To overcome this drawback, the end spacer 2306 according to the current embodiment may further include a reinforcing member SUP. A thickness of the reinforcing member SUP may be smaller than a minimum thickness of the end spacer 2306. Since the reinforcing member SUP is disposed inside the end spacer 2306, it may not be visible from the outside.

The reinforcing member SUP may be made of, for example, a metal plate or a tough fiber. In a planar arrangement, the reinforcing member SUP may be formed in a shape that does not cover end through holes 2305H and fluid passages BFP. When the end spacer 2306 is made of resin and the reinforcing member SUP is plate-shaped, the reinforcing member SUP may include a plurality of holes SPH penetrating the reinforcing member SUP in a thickness direction. Since resin on a surface of the reinforcing member SUP is connected to resin on the other surface through the holes SPH, the separation of the reinforcing member SUP and the resin can be prevented.

Although the end spacer 2306 is described in the current embodiment, it is obvious that the same can be applied to an inter-tube spacer.

Figure 101:
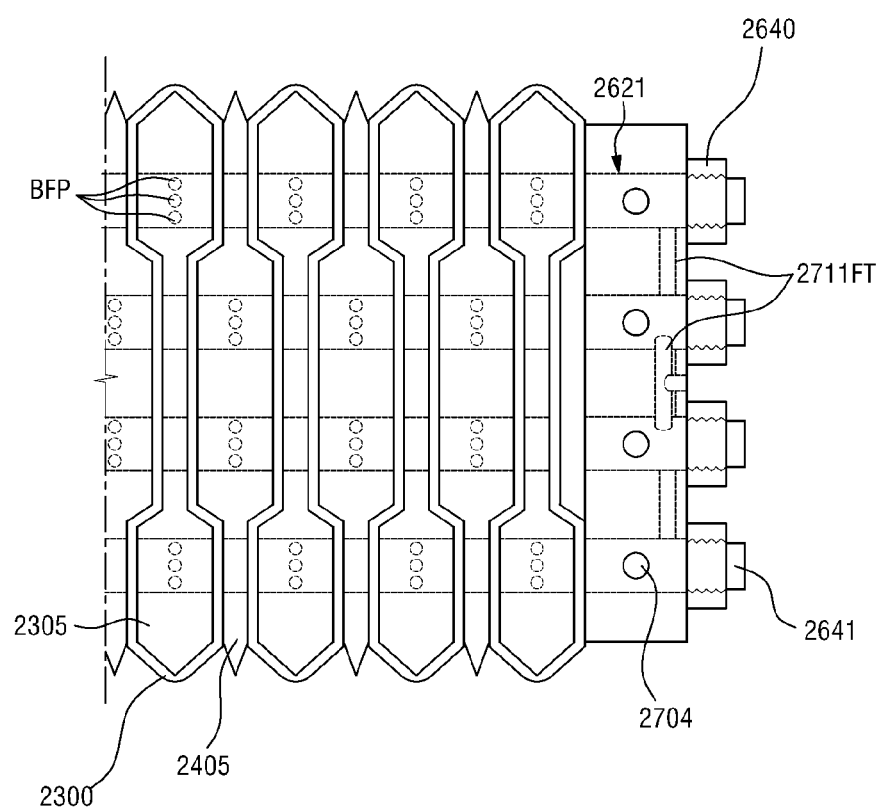
FIG. 101 is a partial plan view of a fluid separation membrane module according to another embodiment of the inventive concept.
Figure 102:
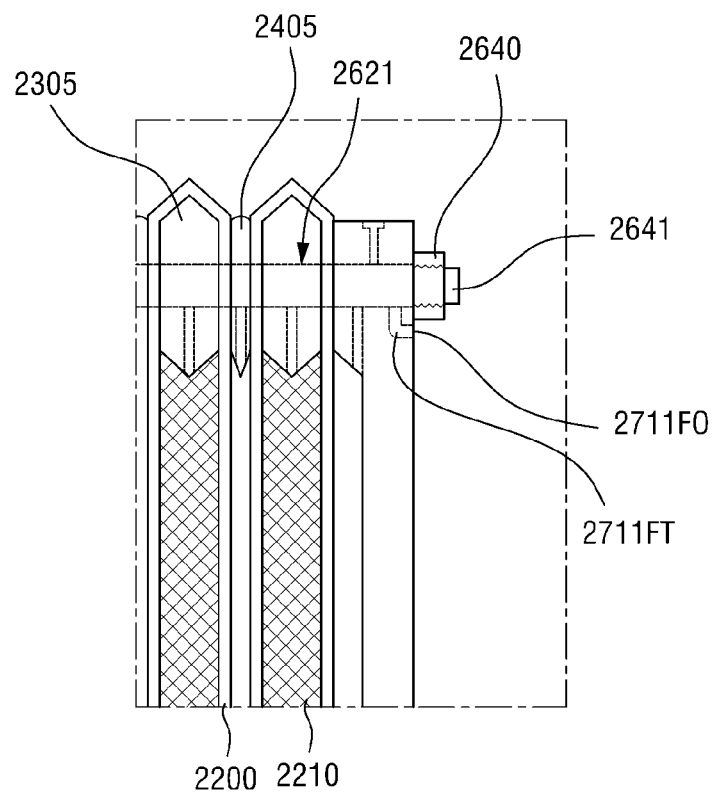
FIG. 102 is a front view of the fluid separation membrane module shown in FIG. 101.
Figure 103:
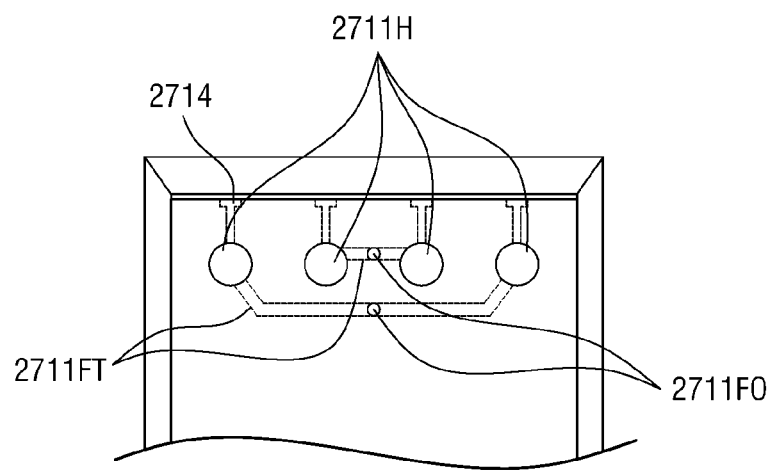
FIG. 103 is a partial side view of the fluid separation membrane module shown in FIG. 101.
Figure 104:
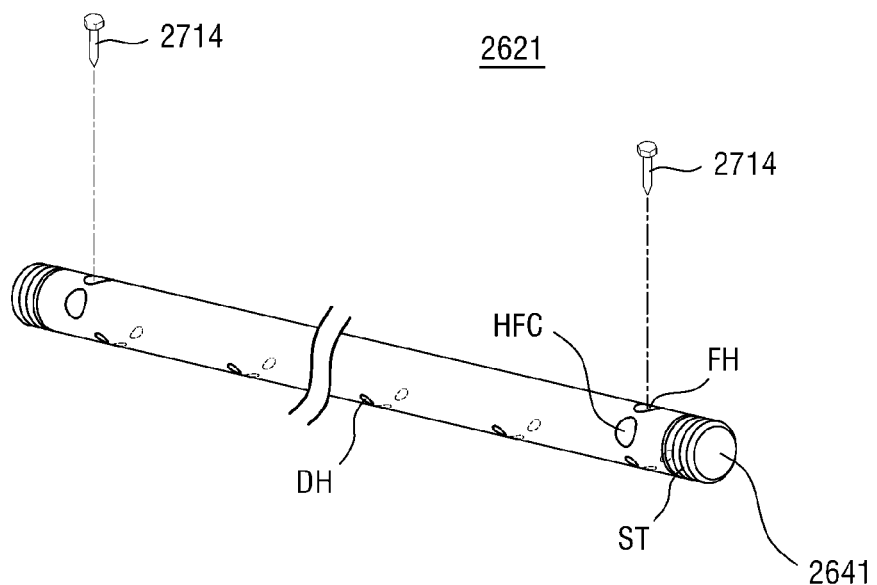
FIG. 104 is a perspective view of an assembly pipe shown in FIG. 101.

FIG. 101 is a partial plan view of a fluid separation membrane module according to another embodiment of the inventive concept. FIG. 102 is a front view of the fluid separation membrane module shown in FIG. 101. FIG. 103 is a partial side view of the fluid separation membrane module shown in FIG. 101. FIG. 104 is a perspective view of an assembly pipe shown in FIG. 101.

Referring to FIGS. 101 through 104, the fluid separation membrane module 22101 according to the current embodiment is different from the embodiment of FIG. 82 in that a connection pipe 2711FT is formed in an outermost cover 2711.

More specifically, assembly pipes 2621 passing through two middle through holes 2711H among four through holes 2711H are spatially connected to a first unit limited space ULS1 and are responsible for the supply of a fluid mixture or the discharge of a residual fluid. In addition, assembly pipes 2621 passing through two outer through holes 2711H among the four through holes 2711H are responsible for the transport of a separated fluid.

When the through holes 2711H and the assembly pipes 2621 having the same function but disposed at different positions are connected to each other, the supply/discharge of a fluid can be performed in an integrated manner. To this end, the connection pipe 2711FT is installed in the outermost cover 2711. In addition, a connection hole HFC that can be connected to the connection pipe 2711FT may be formed in each of the assembly pipes 2621.

The connection pipe 2711FT may be formed inside the outermost cover 2711. The connection pipe 2711FT may have an outlet open toward the outside of the outermost cover 2711. Fluid may be supplied or discharged fluid (?) may be collected through the outlet 2711FO of the connection pipe 2711FT. That is, the connection pipe 2711FT can serve as a collecting pipe. In this case, both ends of each of the assembly pipes 2621 do not need to be open and may be sealed with bolts.

A separate pipe may be disposed inside the outermost cover 2711 as the connection pipe 2711FT. Alternatively, a tunnel may be formed inside the outermost cover 2711 and used as the connection pipe 2711FT. Alternatively, a groove may be formed in a surface of the outermost cover and may be covered with a cover for use as a connection pipe.

In the drawings, the connection pipe 2711FT is formed inside the outermost cover 2711. However, the connection pipe 2711FT performing the same function can also be installed outside the outermost cover 2711.

Figure 105:
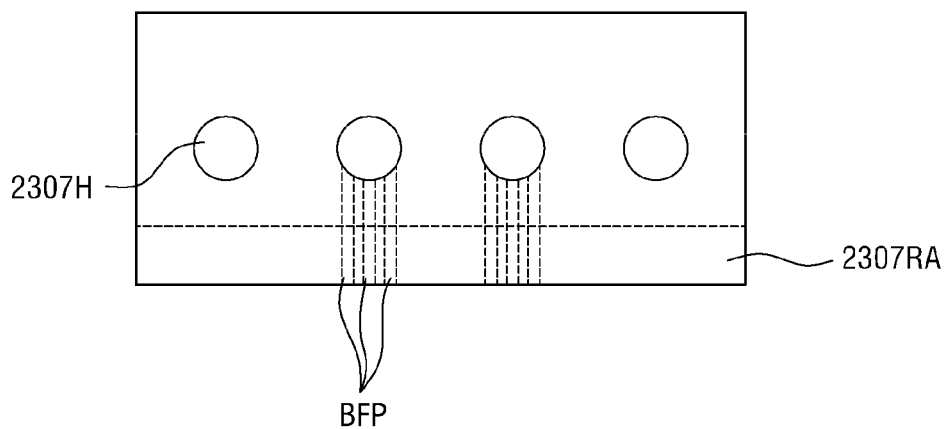
FIG. 105 is a side view of an end spacer according to another embodiment of the inventive concept.
Figure 106:
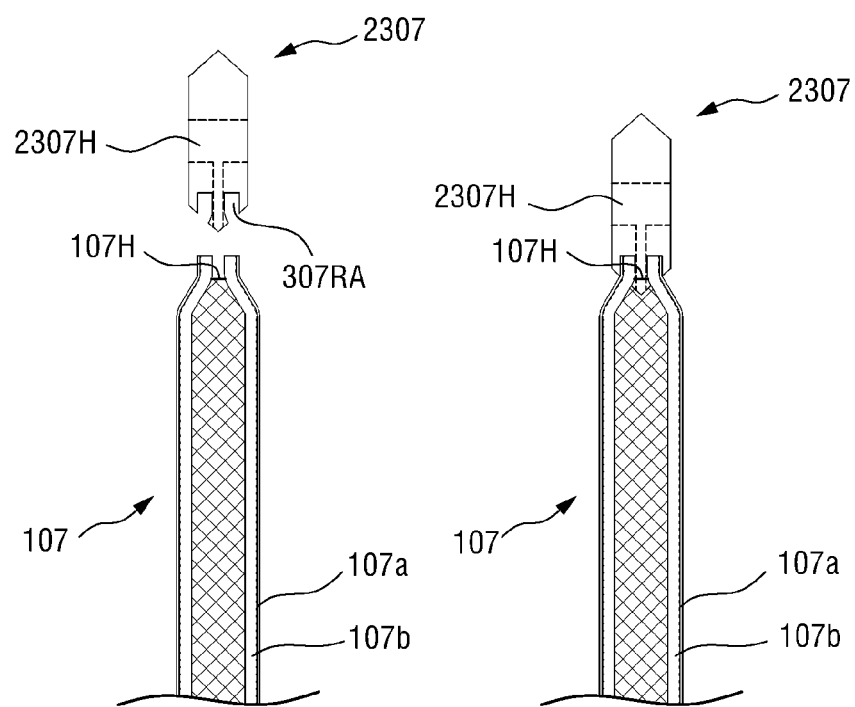
FIG. 106 is a front view showing the coupling relationship between the separation membrane of FIGS. 26 and 27 and the end spacer of FIG. 105.

FIG. 105 is a side view of an end spacer according to another embodiment of the inventive concept. FIG. 106 is a front view showing the coupling relationship between the separation membrane of FIGS. 25 and 26 and the end spacer of FIG. 105.

Referring to FIGS. 105 and 106, the end spacer 2307 according to the current embodiment includes a receiving groove 2307RA for accommodating the fluid separation membrane 107. A vent hole 107H of the fluid separation membrane 107 is inserted into the receiving groove 2307RA. That is, the current embodiment is different from the embodiment of FIG. 82 in that the end spacer 2307 is not disposed inside the fluid separation membrane 107 but is disposed outside both ends of the fluid separation membrane 107.

When a space between the receiving groove 2307RA and the separation thin membrane 2220 adjacent to the receiving groove 2307RA is sealed using an adhesive, the end spacer 2307 and the fluid separation membrane 107 can be stably coupled to each other. In the current embodiment, the fluid separation membrane 107 may not include openings through which assembly pipes pass, unlike in the embodiment of FIG. 82. In the drawings, reference character 2307H indicate end through holes.

The fluid separation membranes, the fluid separation membrane modules, and the fluid separation apparatuses described above can be applied in various fields. For example, a fluid separation apparatus may be installed in a thermal power plant and used to separate and collect a specific fluid, e.g., carbon dioxide, from exhaust gas discharged from the thermal power plant. An application example in which a fluid separation apparatus is installed in a thermal power plant will hereinafter be described.

Figure 107:
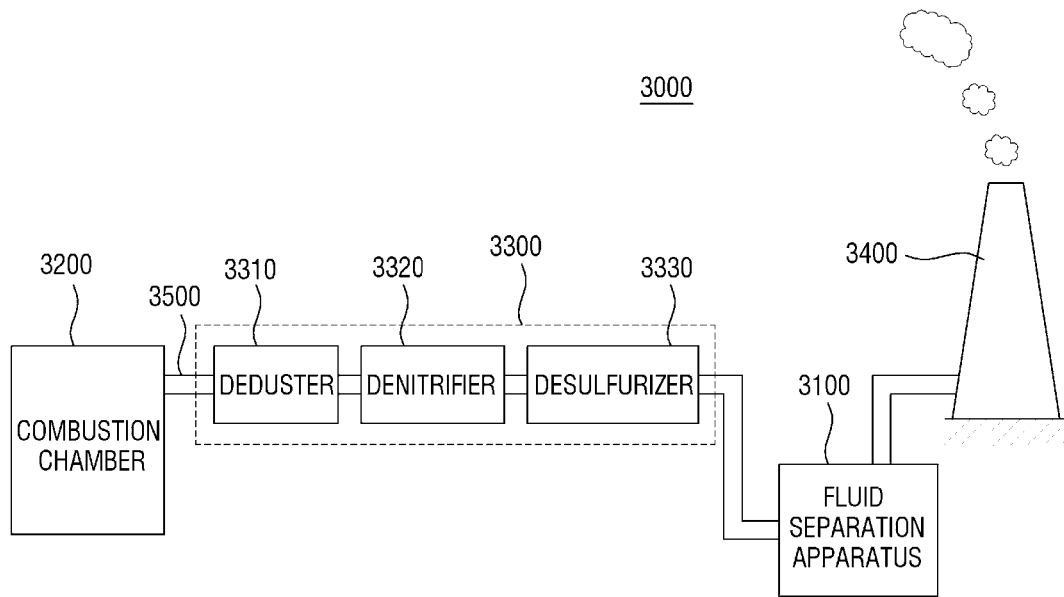
FIG. 107 is a schematic view of a thermal power generation system including a fluid separation apparatus according to an embodiment of the inventive concept.

FIG. 107 is a schematic view of a thermal power generation system including a fluid separation apparatus according to an embodiment of the inventive concept.

Referring to FIG. 107, the thermal power generation system 3000 may include a combustion chamber 3200, a fluid separation apparatus 3100 provided with exhaust gas discharged from the combustion chamber 3200, and an exhaust stack 3400 connected to the fluid separation apparatus 3100. The thermal power generation system 3000 may further include an exhaust gas purifier 3300 between the combustion chamber 3200 and the fluid separation apparatus 3100. A flow pipe 3500 through which exhaust gas moves may be installed between the above devices.

The combustion chamber 3200 burns fossil fuel and generates steam by heating water with the heat generated from the combustion of the fossil fuel. The generated steam is sent to a power generation turbine for power generation. An exhaust gas discharged from the combustion chamber 3200 is discharged through the flow pipe 3500.

The exhaust gas discharged through the flow pipe 3500 is supplied to the exhaust gas purifier 3300. An appropriate device can be selected as the exhaust gas purifier 3300 according to the composition of the exhaust gas. For example, when the exhaust gas discharged from the combustion chamber contains dust, nitric oxides and sulfur oxides, the exhaust gas purifier 3300 may include a deduster 3310, a denitrifier 3320, and a desulfurizer 3330. The deduster 3310 removes dust mixed with the exhaust gas. The denitrifier 3320 removes nitric oxides mixed with the exhaust gas. The desulfurizer 3330 removes sulfur oxides mixed with the exhaust gas. The deduster 3310, the denitrifier 3320 and the desulfurizer 3330 may be provided as separate facilities and connected in series by the flow pipe 3500. However, the inventive concept is not limited to this case, and two or more of the above devices described above can be integrated into one facility.

The exhaust gas from which harmful components have been removed by the exhaust gas purifier 3300 is supplied to the fluid separation apparatus 3100 before being discharged to the exhaust stack 3400. The fluid separation apparatus 3100 separates a specific fluid from the fluids contained in the exhaust gas and discharges a residual gas. The residual gas discharged from the fluid separation apparatus 3100 is transferred to the exhaust stack 3400 through the flow pipe 3300 and then discharged to the outside.

The fluid separation apparatus 3100 will now be described in more detail.

Figure 108:
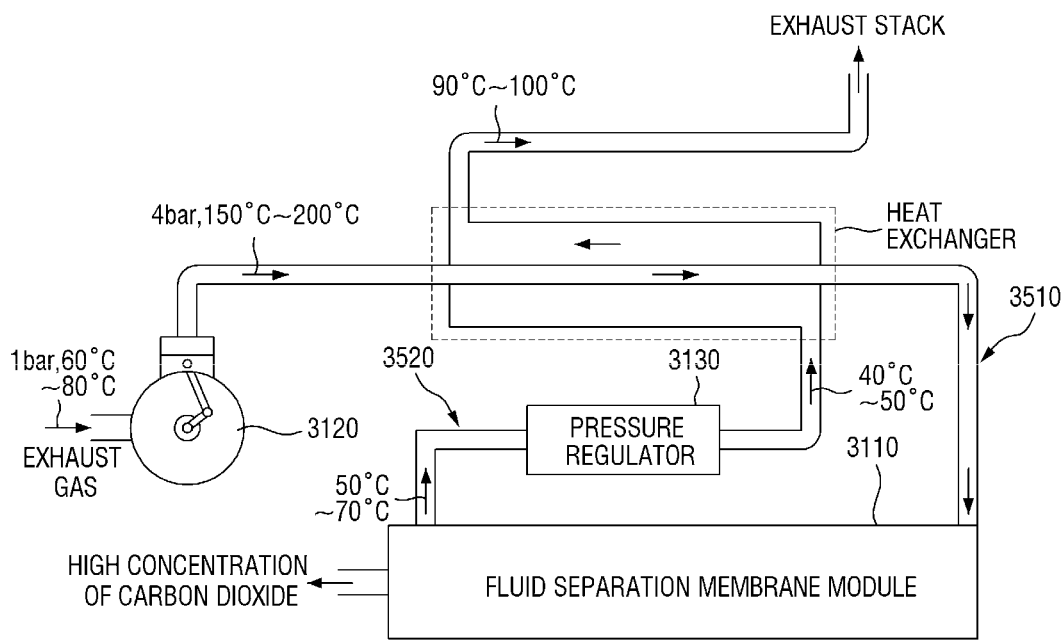
FIG. 108 is a schematic view of a fluid separation apparatus according to an embodiment of the inventive concept.

FIG. 108 is a schematic view of a fluid separation apparatus according to an embodiment of the inventive concept. Referring to FIGS. 107 and 108, the fluid separation apparatus 3100 includes a fluid separation membrane module 3110, a compressor 3120, and supply and discharge flow pipes 3510 and 3520.

The fluid separation membrane module 3110 is a device used to separate a specific fluid from a fluid mixture MF. In the current embodiment, the fluid separation membrane module 3110 may receive an exhaust gas containing carbon dioxide, nitrogen, etc. as the fluid mixture MF and separate a specific fluid, e.g., carbon dioxide from the exhaust gas. The fluid separation membrane module 3110 includes a fluid inlet and a fluid outlet. The fluid outlet includes a first fluid outlet through which a high concentration of carbon dioxide is discharged and a second fluid outlet through which residual gas is discharged. The fluid separation membrane module 3110 will be described in detail later.

The degree of separation by the fluid separation membrane module 3110 increases as the pressure of a supplied gas increases. Therefore, the separation efficiency of the fluid separation membrane module 3110 can be increased by increasing the pressure of the exhaust gas through the compressor 3120. To this end, the compressor 3120 is disposed at a supply end with respect to the fluid separation membrane module 3110. The compressor 3120 increases the pressure of the exhaust gas received through the flow pipe 3500. For example, when the pressure of the exhaust gas purified by the exhaust gas purifier 3300 is 1 bar, the compressor 3120 may increase the pressure of the exhaust gas to 4 bar. When the pressure of the exhaust gas is increased by the compressor 3120, the temperature of the exhaust gas also rises. For example, when the temperature of the exhaust gas purified by the exhaust gas purifier 3300 is 60 to 80° C., the temperature of the exhaust gas pressurized by the compressor 3120 may be 150 to 200° C.

The flow pipe 3500 includes the supply flow pipe 3510 located on an input side of the fluid separation membrane module 3110 and the discharge flow pipe 3520 located on an output side of the fluid separation membrane module 3110. The supply flow pipe 3510 may connect the compressor 3120 and the fluid separation membrane module 3110. The discharge flow pipe 3520 may connect between the fluid separation membrane module 3110 and the exhaust stack. A portion of a fluid flowing through the supply flow pipe 3510 is separated in the fluid separation membrane module 3110, and the other portion of the fluid is moved through the discharge flow pipe 3520. That is, a fluid flowing through the discharge flow pipe 3520 is a fluid that has moved through the supply flow pipe 3510.

It is advantageous when the exhaust gas supplied to the fluid separation membrane module 3110 has high pressure. However, if the temperature of the exhaust gas is too high, a separation membrane can be damaged. Therefore, it is desirable to cool the exhaust gas that has excessively increased in temperature through the pressurization of the compressor 3120. For example, an exhaust gas at a temperature of 150 to 200° C. may be lowered to 60 to 80° C. and then supplied to the fluid separation membrane module 3110.

In addition, when the temperature of the exhaust gas discharged through the exhaust stack 3400 is low, the moving speed of the exhaust gas is low. Therefore, condensation may occur, or fine dust, sulfur oxides, etc. remaining in the exhaust gas may adhere to walls of the exhaust stack 3400. To prevent this, the temperature of the exhaust gas should be sufficiently high as compared with the external atmospheric temperature. For example, when the temperature of an exhaust gas supplied to the fluid separation membrane module 3110 is 60 to 80° C., the temperature of an exhaust gas (residual gas) discharged from the fluid separation membrane module 3110 may be lowered to about 50 to 70° C. The temperature of the exhaust gas may be further lowered to 40 to 50° C. as it passes through the discharge flow pipe 3520. However, such a temperature is not sufficient to solve the above-mentioned problem of condensation. Therefore, the temperature of the exhaust gas may be raised to, for example, 90 to 100° C. before the exhaust gas enters the exhaust stack 3400.

That is, the temperature of the exhaust gas supplied to the fluid separation membrane module 3110 may be lowered, and the temperature of the exhaust gas discharged from the fluid separation membrane module 3110 may be raised. One solution is to install a cooler in the supply flow pipe 3510 and a heater in the discharge flow pipe 3520. However, it is inefficient in terms of energy to install both the cooler and the heater.

For both effective temperature rise and fall, at least part of the supply flow pipe 3510 and at least part of the discharge flow pipe 3520 are placed adjacent to each other. The supply flow pipe 3510 and the discharge flow pipe 3520 placed adjacent to each other form a heat exchanger. That is, a high-temperature exhaust gas passing through the supply flow pipe 3510 is deprived of heat energy by a relatively low-temperature exhaust gas passing through the adjacent discharge flow pipe 3520. Therefore, the temperature of the high-temperature exhaust gas passing through the supply flow pipe 3510 is lowered. Conversely, the low-temperature exhaust gas passing through the discharge flow pipe 3520 obtains heat energy from the relatively high-temperature exhaust gas passing through the adjacent supply flow pipe 3510. Therefore, the temperature of the low-temperature exhaust gas passing through the discharge flow pipe 3520 is raised. As described above, an exhaust gas passing through the discharge flow pipe 3520 is a gas that has passed through the supply flow pipe 3510. That is, the exhaust gas plays both heating and cooling roles.

When a target temperature by which the temperature of an exhaust gas passing through the supply flow pipe 3510 is to be lowered is greater than a target temperature by which the temperature of an exhaust gas passing through the discharge flow pipe 3520 is to be raised, the desired target temperatures can be met by adjusting the amount of exhaust gas staying in the heat exchanger. For example, when the discharge flow pipe 3520 has a larger diameter than the supply flow pipe 3510 in the heat exchanger, the temperature of the exhaust gas in the supply flow pipe 3510 can be lowered more after passing through the heat exchanger.

To further increase the heat exchange efficiency, the moving direction of the exhaust gas in the supply flow pipe 3510 of the heat exchanger may be opposite to the moving direction of the exhaust gas in the discharge flow pipe 3520.

Although not shown in the drawings, the heat exchanger may further include a chamber for preventing heat loss, in addition to the supply flow pipe 3510 and the discharge flow pipe 3520 disposed adjacent to each other. In addition to the heat exchanger, a cooler and/or a heater may be further installed to assist a desired temperature to be reached. Even in this case, energy efficiency is increased.

A pressure regulator 3130 may be installed in the discharge flow pipe 3520 between the fluid separation membrane module 3110 and the heat exchanger. The pressure regulator regulates the pressure of the exhaust gas, thereby controlling the speed of a fluid entering the heat exchanger while recovering the power to be recycled. The pressure regulator 3130 may be, but is not limited to, e.g., a turbo-expander.

The fluid separation membranes, the fluid separation membrane modules, and the fluid separation apparatuses described above can also be used as air purifiers. An air purifier is a device that removes harmful components mixed in the air to provide clean air. Air purifiers are commonly used in closed spaces such as classrooms, hospitals, and submarines.

One of the components that air purifiers are primarily designed to remove is fine dust. Conventional air purifiers filter out fine dust through physical or chemical filters. However, in a closed space, the concentration of carbon dioxide as well as fine air is an important variable in the living environment. Carbon dioxide is generated by the respiration of a person or an animal living in a space. Under an environment where the concentration of carbon dioxide is high, residents can have reduced concentration, can be easily fatigued, and can have severe breathing difficulties. As described above, since the fluid separation membranes, the fluid separation membrane modules, and the fluid separation apparatuses according to the embodiments of the inventive concept can effectively separate carbon dioxide, the limitations of the conventional air purifiers can be overcome. An air purifier according to an embodiment of the inventive concept will now be described.

Figure 109:
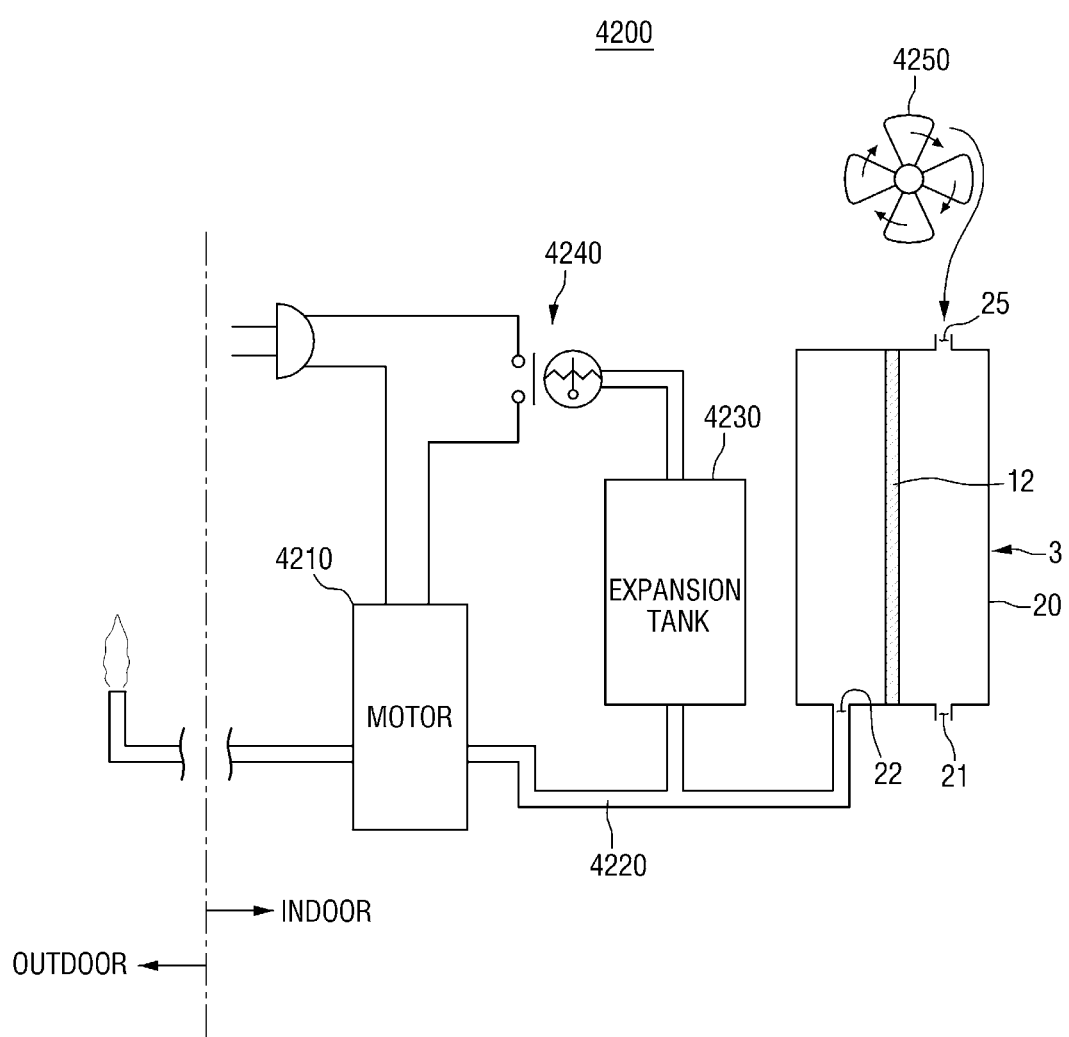
FIG. 109 is a schematic view of an air purifier according to an embodiment of the inventive concept.

FIG. 109 is a schematic view of an air purifier according to an embodiment of the inventive concept. In FIG. 109, the fluid separation apparatus of FIG. 3 is included in the air purifier. However, the inventive concept is not limited to this case, and fluid separation membranes, fluid separation membrane modules or fluid separation apparatuses according to various other embodiments can also be applied.

The air purifier 4200 includes a fluid separation apparatus 3 and a vacuum pump 4210.

The vacuum pump 4210 discharges air separated by the fluid separation apparatus 3 to the outside (outdoor) of a space (indoor) in which the air purifier 4200 is disposed. The vacuum pump 4210 is connected to the fluid separation apparatus 3 by a flow pipe 4220. The flow pipe 4220 is connected to the vacuum pump 4210 and to an outlet for discharging a separated fluid among fluid outlets of the fluid separation apparatus 3. For example, if the fluid separation apparatus 3 according to the embodiment of FIG. 3 is applied, the flow pipe 4220 may be connected to a first fluid outlet 21. The flow pipe 4220 extends through the vacuum pump 4210 to the outside (outdoor) of the space (indoor) in which the air purifier 4200 is disposed. When the vacuum pump 4210 operates, negative pressure is applied to the flow pipe 4220. Accordingly, separated air moves from the fluid separation apparatus 3 to the vacuum pump 4210 and passes through the vacuum pump 4210 to be discharged to the outside.

The air purifier 4200 may further include an expansion tank 4230 and a vacuum switch 4240.

The expansion tank 4230 is connected to the flow pipe 4220 between the vacuum pump 4210 and the fluid separation apparatus 3. The air separated by the fluid separation apparatus 3 is stored in the expansion tank 4230 via the flow pipe 4220.

The vacuum switch 4240 controls the operation of the vacuum pump 4210 according to the pressure of the expansion tank 4230. That is, one end of the vacuum switch 4240 is connected to a power source, and the other end is connected to the vacuum pump 4210. A control end of the vacuum switch 4240 is connected to the expansion tank 4230. When the pressure of the expansion tank 4230 is less than a predetermined pressure, the vacuum switch 4240 is turned off. Accordingly, the vacuum pump 4210 does not operate. When the expansion tank 4230 reaches the predetermined pressure or more, the vacuum switch 4240 is turned on to operate the vacuum pump 4210. Therefore, the vacuum pump 4210 operates only when the air separated by the fluid separation apparatus 3 is accumulated in the expansion tank 4230 to a predetermined amount or more. If the vacuum pump 4210 is not continuously operated and is operated only when necessary as described above, noise can be reduced, and the life of the vacuum pump 4210 can be extended.

The air purifier 4200 may further include a fan 4250. The fan 4250 circulates the air in the space (indoor) in which the air purifier 4200 is disposed while actively providing the air to the fluid separation apparatus 3. The fan 4250 may be disposed near a fluid inlet 25 of the fluid separation apparatus 3. More air can be provided to the fluid separation device 3 by the wind generated when the fan 4250 operates. The fan 4250 may be provided as a separate device. However, a fan included in another device (such as an air conditioner, an electric fan, or an air fan) in a place where the air purifier 4200 is provided can also be utilized. The fan 4250 may be located below or above the air purifier 4200.

While the inventive concept has been particularly illustrated and described with reference to exemplary embodiments thereof, it will be understood by those of ordinary skill in the art that various changes in form and detail may be made therein without departing from the spirit and scope of the inventive concept as defined by the following claims. The exemplary embodiments should be considered in a descriptive sense only and not for purposes of limitation.

The invention claimed is:

1. A fluid separation apparatus comprising a fluid separation membrane extending in one direction and having a cross-section with a closed curve shape, wherein the fluid separation membrane has a thickness of 0.1 mm to 2 mm, and an outer diameter of 60 mm to 360 mm when the cross-section is adjusted to be circular,
wherein the fluid separation membrane comprises silicone rubber.

2. The fluid separation apparatus of claim 1, wherein the fluid separation membrane has a length of 500 mm to 5000 mm in the extending direction.

3. The fluid separation apparatus of claim 1, wherein the thickness (d), the diameter (R1), and the length (L) satisfy the following expression:

$$S \propto d/(L \times R1) \geq 1/3000000.$$

4. The fluid separation apparatus of claim 1, wherein a first width of the cross-section of the fluid separation membrane in a first direction is greater than a second width of the cross-section of the fluid separation membrane in a second direction.

5. The fluid separation apparatus of claim 4, further comprising a membrane spacer disposed in the fluid separation membrane such that a width direction of the membrane spacer corresponds to the rust direction.

6. The fluid separation apparatus of claim 5, wherein the membrane spacer comprises a plurality of stem portions and a net portion which is disposed in a space between the stem portions and comprises a plurality of openings formed in a thickness direction, wherein the stem portions comprise a hollow vertical stem portion extending in a length direction of the fluid separation membrane, the vertical stem portion comprising a plurality of holes.

7. The fluid separation apparatus of claim 1, wherein the fluid separation membrane comprises a support portion which comprises a plurality of openings open in the thickness direction and a separation membrane portion which fills the openings, wherein a thickness of the separation membrane portion located in a central portion of each opening between regions of the support portion is smaller than that of the separation membrane portion located around the support portion.

8. A fluid separation apparatus comprising a fluid separation membrane extending in one direction and having a cross-section with a closed curve shape, wherein the fluid separation membrane has a thickness of 0.1 mm to 2 mm, and an outer diameter of 60 mm to 360 mm when the cross-section is adjusted to be circular, wherein the fluid separation membrane comprises a plurality of surface recesses and protrusions and a plurality of internal pores and does not comprise a complete opening that penetrates a surface and the other surface of the fluid separation membrane in a thickness direction.

9. The fluid separation apparatus of claim 8, wherein a volume of the internal pores is 0.1 to 20% of a total volume of the fluid separation membrane.

10. A fluid separation apparatus comprising a fluid separation membrane extending in one direction and having a cross-section with a closed curve shape, wherein the fluid separation membrane has a thickness of 0.1 mm to 2 mm, and an outer diameter of 60 mm to 360 mm when the cross-section is adjusted to be circular, wherein the fluid separation membrane comprises a first tubular separation membrane and a second tubular separation membrane inserted into the first separation membrane to overlap the first separation membrane.

11. The fluid separation apparatus of claim 10, further comprising:
a first spacer which is disposed between the first separation membrane and the second separation membrane; and
a second spacer which is disposed in the second separation membrane.

* * * * *

UNITED STATES PATENT AND TRADEMARK OFFICE
CERTIFICATE OF CORRECTION

PATENT NO. : 10,898,860 B2  
APPLICATION NO. : 15/559682  
DATED : January 26, 2021  
INVENTOR(S) : Gwan Shig Kim et al.

Page 1 of 1

It is certified that error appears in the above-identified patent and that said Letters Patent is hereby corrected as shown below:

In the Claims

In Column 71, Line 42, after the word "the" and before the word "direction," please delete the word "rust" and insert the word --first.--

Signed and Sealed this  
Thirteenth Day of April, 2021

Drew Hirshfeld  
*Performing the Functions and Duties of the*  
*Under Secretary of Commerce for Intellectual Property and*  
*Director of the United States Patent and Trademark Office*